US007778938B2

(12) United States Patent
Stimac

(10) Patent No.: US 7,778,938 B2
(45) Date of Patent: Aug. 17, 2010

(54) SYSTEM AND METHOD FOR SCREENING OF JOB APPLICANTS

(75) Inventor: Damir Joseph Stimac, Vernon, CT (US)

(73) Assignee: Accuhire.com Corporation, Vernon, CT (US)

( * ) Notice: Subject to any disclaimer, the term of this patent is extended or adjusted under 35 U.S.C. 154(b) by 549 days.

(21) Appl. No.: 10/162,446

(22) Filed: Jun. 4, 2002

(65) Prior Publication Data

US 2003/0071852 A1 Apr. 17, 2003

Related U.S. Application Data

(60) Provisional application No. 60/296,011, filed on Jun. 5, 2001.

(51) Int. Cl.
*G06Q 99/00* (2006.01)

(52) U.S. Cl. .................................................... 705/321

(58) Field of Classification Search .................... 705/1, 705/321

See application file for complete search history.

(56) References Cited

U.S. PATENT DOCUMENTS

| | | | | |
|---|---|---|---|---|
| 5,592,375 | A * | 1/1997 | Salmon et al. | 705/7 |
| 6,289,340 | B1 * | 9/2001 | Puram et al. | 707/5 |
| 6,431,875 | B1 * | 8/2002 | Elliott et al. | 434/322 |
| 7,080,057 | B2 * | 7/2006 | Scarborough et al. | 706/60 |
| 7,167,855 | B1 * | 1/2007 | Koenig | 707/3 |
| 2002/0046074 | A1 * | 4/2002 | Barton | 705/8 |
| 2002/0055866 | A1 * | 5/2002 | Dewar | 705/8 |
| 2002/0091669 | A1 * | 7/2002 | Puram et al. | 707/1 |
| 2002/0143573 | A1 * | 10/2002 | Bryce et al. | 705/1 |

FOREIGN PATENT DOCUMENTS

JP 11338879 A * 12/1999

OTHER PUBLICATIONS

Field, Anne, "Hire Education," Inc., v20n4, pp: 88-91, Mar. 17, 1998.*

* cited by examiner

*Primary Examiner*—Jonathan Ouellette
(74) *Attorney, Agent, or Firm*—Thompson Coburn LLP; Kevin M. Kercher, Esq.

(57) ABSTRACT

A method and system for objectively evaluating job applicants utilizing a computer system is disclosed. This includes allowing the job applicant to answer a series of predetermined job related profile questions, providing a numeral score associated with each response, and tabulating the total score for all responses so that each job applicant can be objectively compared to other job applicants. The questions selected and numerical weight of each response can be custom tailored for each position. There is also a method and system for creating interview questions for job applicants utilizing a computer system is disclosed. Moreover, there is a method and system for managing the recruiting process for job applicants. This includes flexible shifting of job applicant responsibility among numerous personnel on a global basis and sharing information including objective test scores and interview questions.

46 Claims, 97 Drawing Sheets

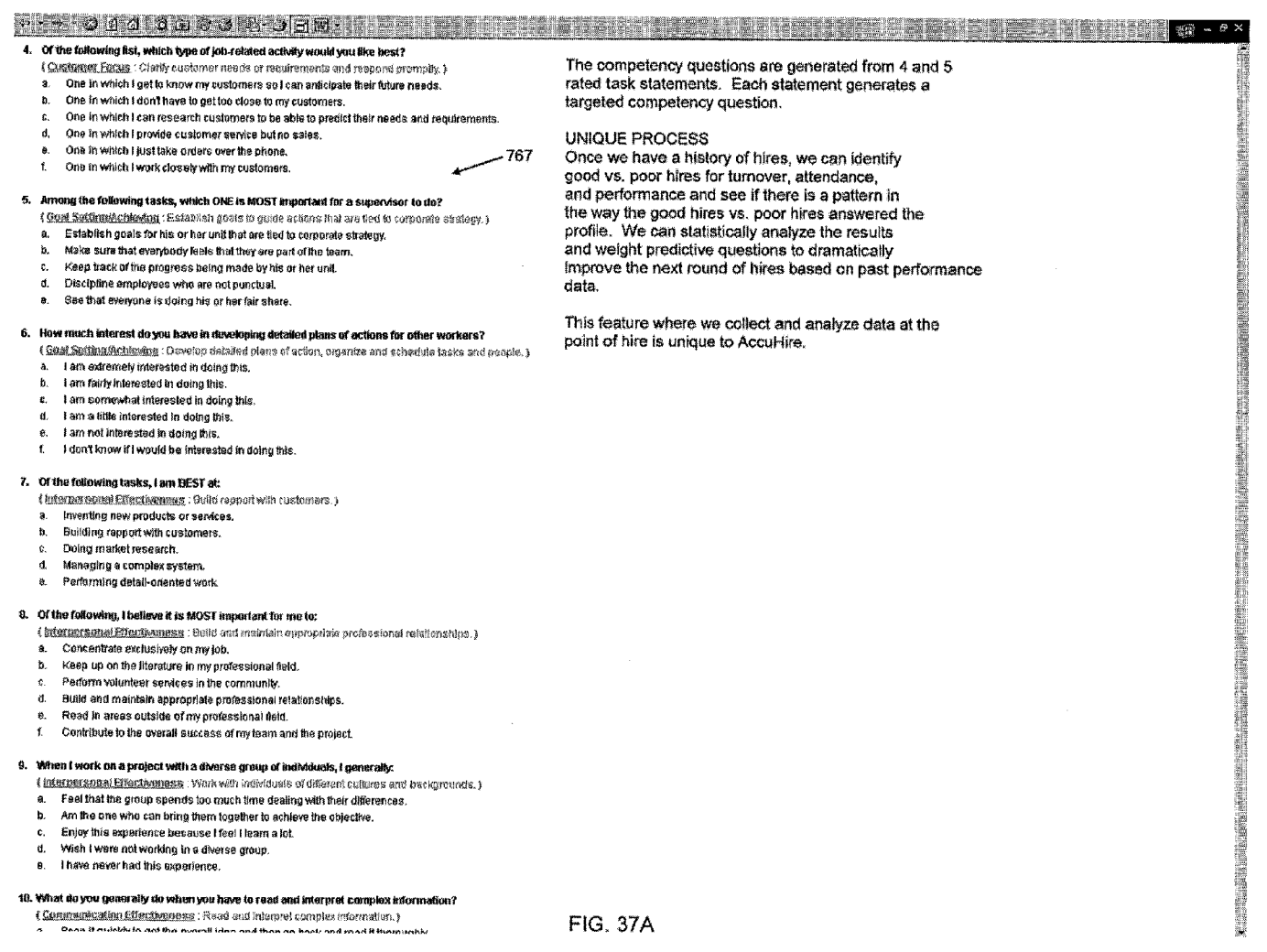

4. Of the following list, which type of job-related activity would you like best?
( Customer Focus : Clarify customer needs or requirements and respond promptly. )
a. One in which I get to know my customers so I can anticipate their future needs.
b. One in which I don't have to get too close to my customers.
c. One in which I can research customers to be able to predict their needs and requirements.
d. One in which I provide customer service but no sales.
e. One in which I just take orders over the phone.
f. One in which I work closely with my customers.

767

5. Among the following tasks, which ONE is MOST important for a supervisor to do?
( Goal Setting/Achieving : Establish goals to guide actions that are tied to corporate strategy. )
a. Establish goals for his or her unit that are tied to corporate strategy.
b. Make sure that everybody feels that they are part of the team.
c. Keep track of the progress being made by his or her unit.
d. Discipline employees who are not punctual.
e. See that everyone is doing his or her fair share.

6. How much interest do you have in developing detailed plans of actions for other workers?
( Goal Setting/Achieving : Develop detailed plans of action, organize and schedule tasks and people. )
a. I am extremely interested in doing this.
b. I am fairly interested in doing this.
c. I am somewhat interested in doing this.
d. I am a little interested in doing this.
e. I am not interested in doing this.
f. I don't know if I would be interested in doing this.

7. Of the following tasks, I am BEST at:
( Interpersonal Effectiveness : Build rapport with customers. )
a. Inventing new products or services.
b. Building rapport with customers.
c. Doing market research.
d. Managing a complex system.
e. Performing detail-oriented work.

8. Of the following, I believe it is MOST important for me to:
( Interpersonal Effectiveness : Build and maintain appropriate professional relationships. )
a. Concentrate exclusively on my job.
b. Keep up on the literature in my professional field.
c. Perform volunteer services in the community.
d. Build and maintain appropriate professional relationships.
e. Read in areas outside of my professional field.
f. Contribute to the overall success of my team and the project.

9. When I work on a project with a diverse group of individuals, I generally:
( Interpersonal Effectiveness : Work with individuals of different cultures and backgrounds. )
a. Feel that the group spends too much time dealing with their differences.
b. Am the one who can bring them together to achieve the objective.
c. Enjoy this experience because I feel I learn a lot.
d. Wish I were not working in a diverse group.
e. I have never had this experience.

10. What do you generally do when you have to read and interpret complex information?
( Communication Effectiveness : Read and interpret complex information. )

The competency questions are generated from 4 and 5 rated task statements. Each statement generates a targeted competency question.

UNIQUE PROCESS
Once we have a history of hires, we can identify good vs. poor hires for turnover, attendance, and performance and see if there is a pattern in the way the good hires vs. poor hires answered the profile. We can statistically analyze the results and weight predictive questions to dramatically improve the next round of hires based on past performance data.

This feature where we collect and analyze data at the point of hire is unique to AccuHire.

FIG. 37A

Job description pops up when a recruiter clicks on the job description link.

SYSTEM AND METHOD FOR SCREENING OF JOB APPLICANTS

CROSS REFERENCE TO RELATED APPLICATION

This application claims priority of U.S. Provisional Patent Application No. 60/296,011 filed Jun. 5, 2001.

BACKGROUND OF THE INVENTION

There is a desperate need for employers to be able to rapidly screen applicants, due to the fact that the most qualified applicants will go first. This is especially true in positions that are more common and where there are high-volume numbers of applicants. The problem with the rapid screening of applicants in high-volume positions is that the work itself is extremely tedious and time-consuming. The organization that can review a tremendous number of resumes in a short period of time and make offers to the appropriate candidates will have a tremendous advantage over other organizations and obtain a much higher quality workforce. Most corporations cannot really afford to hire the type of manpower it takes to have a very efficient operation, especially with the deluge of resumes that are submitted at their doorstep. In addition, it is also very difficult to keep the resume reviewer interested in the process, since it is a very tedious and boring task, especially with the lower-level, high-volume positions.

Another problem facing job recruiters today is that they are sent a number of unsuitable and unqualified applicants. This is due to the fact that employers are requiring applicants immediately, and the recruiters are unable to perform the tedious task of sorting through resumes in the requisite period of time. In some cases, they are unable to discern whether a job applicant is truly qualified based on the generic quality of his or her resume.

Moreover, it has been statistically shown that fewer that six percent of job applicants have a current and ready resume. This alone prevents them from applying to an employer. Typically, these potential applicants feel compelled to customize their resume for each and every position for which they are applying. This factor also keeps the pool of eligible job applicants way down.

The major problem with either the human resources organization of companies or recruiting organizations is that they do not or are unable to catalog applicants for future disposition and placement. They simply are unable to truly and objectively measure their attributes against specific jobs and effectively correlate these individuals to potential positions with any degree of accuracy. This typically requires the legal recruiter or human resources person to pull a particular resume from the past and make this correlation by hand. Organizations that receive hundreds of resumes on a weekly basis would simply be unable to accomplish this task. Still another problem facing human resource and recruiting personnel is the inability of these hiring personnel to conduct targeted interviews. To truly perform an effective interview sometimes requires weeks of training. In some cases these recruiters move on to other positions, and all of this training is lost. This training can be very expensive and time consuming. Most organizations forego truly extensive training and hope that some very basic principles and common sense on the part of the human resource manager or recruiter will carry the day. The end result can be a very unscientific and poor interview that provides the interviewer with very little indication as to how this person truly would perform in a required job.

Corporations and recruiting firms do sometimes provide employees with questionnaires. These are very time consuming exercises that require extensive analysis from a human being. Typically they do not correlate to the position at hand.

The present invention is directed at overcoming one or more the problems set forth above.

SUMMARY OF THE INVENTION

This invention relates generally to a method and system for screening and recruitment of job applicants and, more particularly, to a method and system of selective screening of job applicants through targeted profiling.

In one aspect of this invention, a method and system for objectively evaluating job applicants utilizing a computer system is disclosed. This includes allowing the job applicant to answer a series of predetermined job related profile questions, providing a numeral score associated with each response, and tabulating the total score for all responses so that each job applicant can be objectively compared to other job applicants. The questions selected and numerical weight of each response can be custom tailored for each position. This information can be electronically shared, under password protection, on a global basis.

In another aspect of this invention, a method and system for creating interview questions for job applicants utilizing a computer system is disclosed. This includes generating interview questions based on a series of predetermined job related profile questions selected by a recruiter or human resource personnel for the job applicant as well as the job applicant's responses. Problem responses by the job applicant can be flagged. This information can be electronically shared, under password protection, on a global basis as well as the scheduling of interviews.

Yet another aspect of this invention, a method and system for managing the recruiting process for job applicants utilizing a computer system is disclosed. This includes flexible shifting of job applicant responsibility among numerous personnel on a global basis and sharing information including objective test scores and interview questions. This allows portions of the recruitment process to be handled by different recruiters throughout the world.

Still another aspect of this invention, a method and system for receiving and providing information from the job applicant is disclosed. This includes sending electronic communication to the job applicant to request additional information or provide notification of an interview. The job applicant can check on their job status and receive information on what the job will be like.

These aspects of the invention are merely illustrative of the innumerable aspects associated with the present invention and should not be construed as limiting in any manner.

BRIEF DESCRIPTION OF THE DRAWINGS

For a better understanding of the present invention, reference may be made to the accompanying drawings in which:

FIGS. 37 and 37A illustrate an exemplary screen display (graphical user interface) of the present invention for viewing questions associated with a particular job position;

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. For example, the invention is not limited in scope to the particular type of industry application depicted in the figures, a particular type of software language, or to particular conventions regarding software designations. In other instances, well-known methods, procedures and components have not been described in detail so as not to obscure the present invention. A processor referred to in this Application can be a single processor or a whole series of processors. The preferred method of communication for this invention is through a global computer network, e.g., Internet, however there are numerous mechanisms for electronic communication that might suffice for this present invention.

Figure 1:
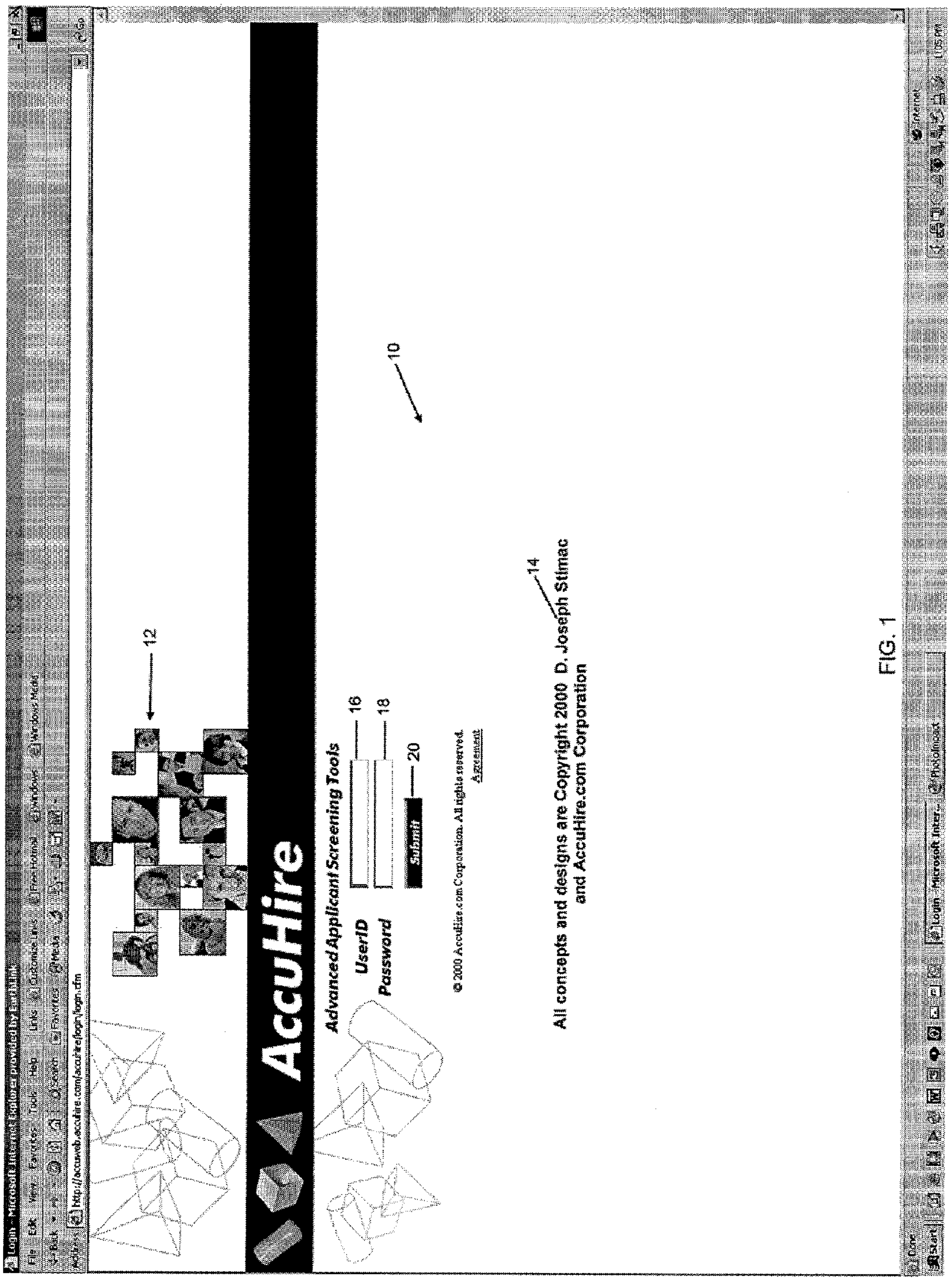
FIG. 1 illustrates an exemplary screen display (graphical user interface) of the present invention showing a main home page viewed by a recruiter or human resource personnel having the log-in function.

Referring now to the drawings, initially to FIG. 1, where FIG. 1 is a sample screen display of a graphical user interface utilized for a log-in function. This log-in screen is generally indicated by 10 and includes a customized background graphic 12 as well as intellectual property warnings 14. Moreover, this log-in screen 10 includes a graphical user interface for inputting a user I.D. or user identification 16 as well as a password 18. When the appropriate user identification 16 and password 18 have been entered, there is a submit button 20 for inputting this information.

Figure 2:
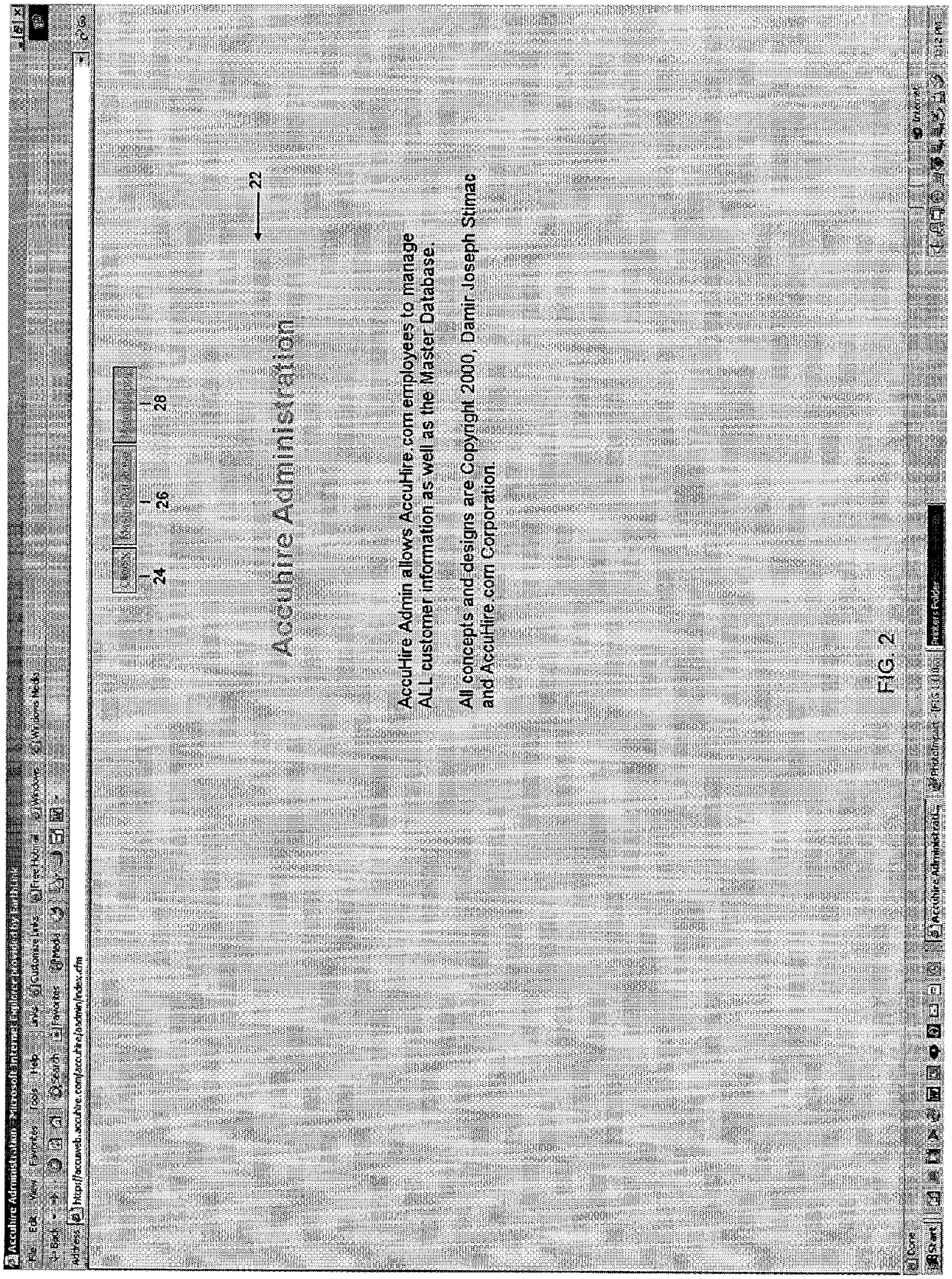
FIG. 2 illustrates an exemplary screen display (graphical user interface) of the present invention showing a main administration screen.

Upon the successful inputting of a correct user identification 16 that is correlated to a correct password 18, this system will take you to the main administration screen 22, as shown in FIG. 2, which provides not only warnings regarding intellectual property rights, but also makes clear to the user that system employees are allowed to manage customer information, including that found in a master database. There is an input link related to information on clients 24, an input link to a master database 26 and an input link to maintenance functions that is designated by numeral 28.

Figure 3:
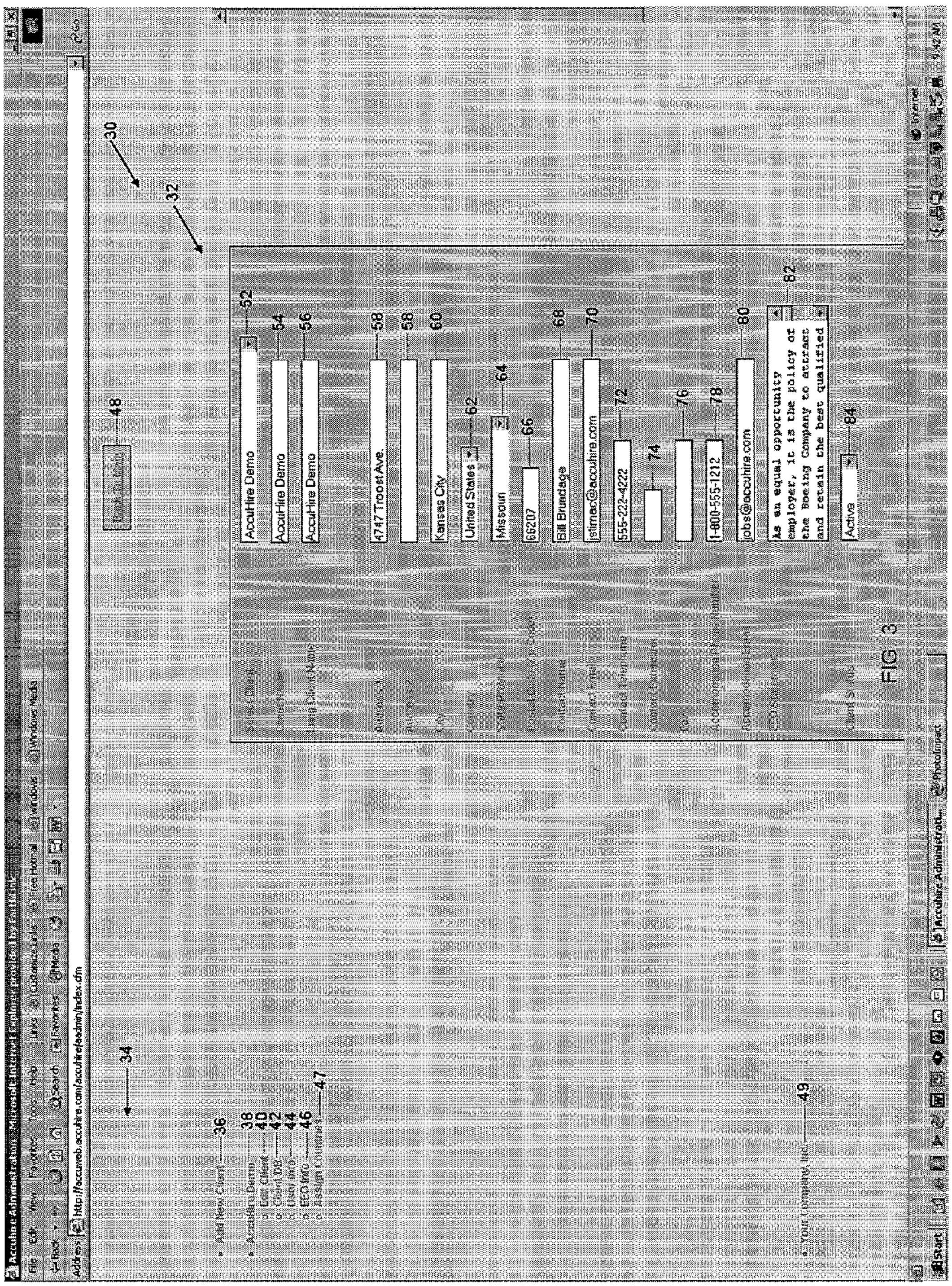
FIGS. 3 and 3A illustrate an exemplary screen display (graphical user interface) of the present invention showing a client administration screen.
Figure 3A:
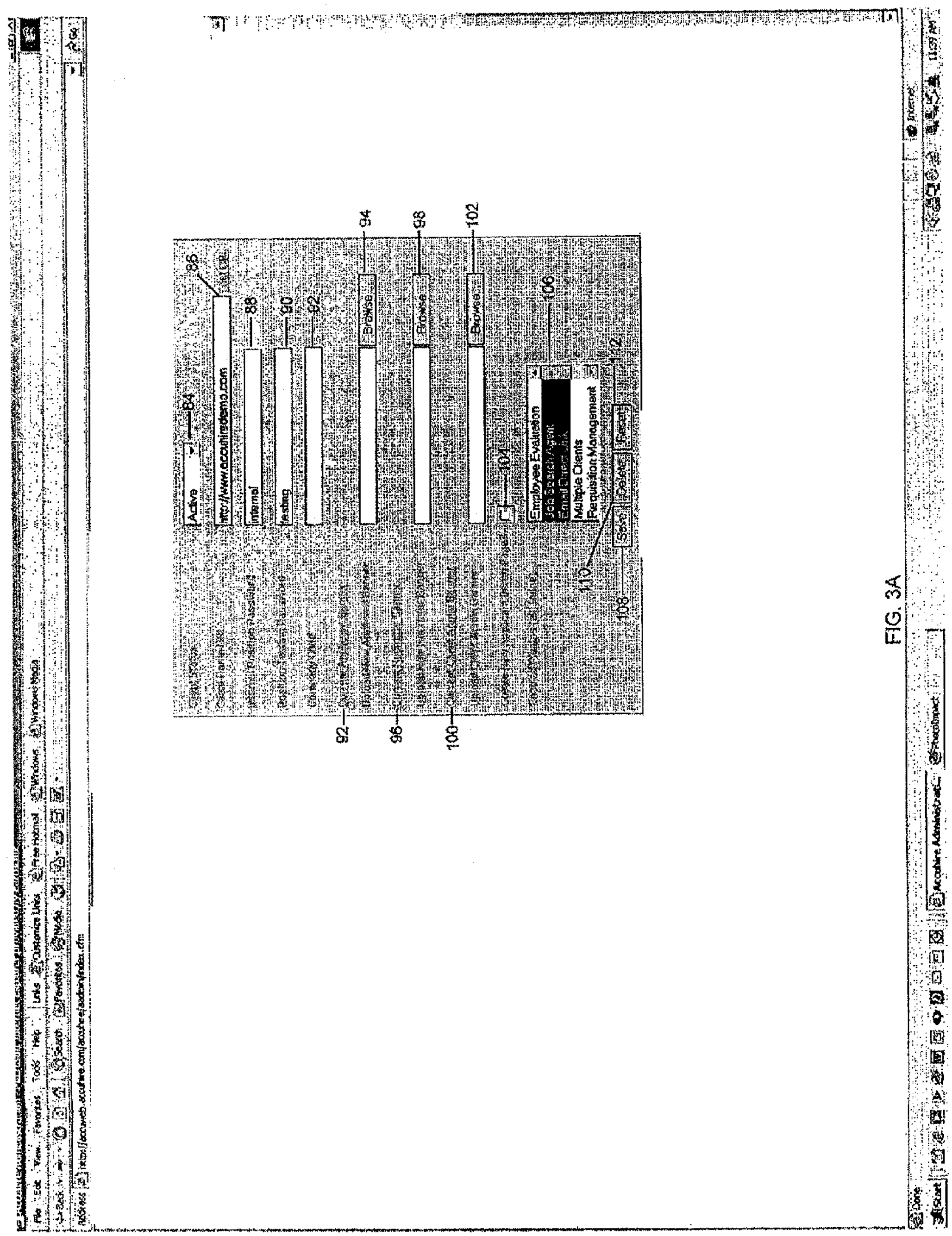

Clicking on the client's input link 24 directs the user to a client graphical user interface screen that is generally indicated by numeral 30, as shown in FIGS. 3 and 3A. On the left hand column in FIG. 3 is an interactive listing 34 that includes a function for adding a new client 36 and a listing for a representative client 38. Underneath the listing for the representative client are five main linked functions. This includes a client editing function 40, client database function 42, user information function 44, equal employment opportunity information function 46 and an assign countries function 47. Clicking on either the function of adding a new client 36 or the edit client function 40 directs a person to a client data input screen that is generally indicated by numeral 32 which can include a client selection drop-down input 52, abbreviated client's name input 54, entire client's full name input 56, address inputs 58, city input 60, country input 62, state input 64, postal code input 66, contact name input 68, contact e-mail input 70, contact telephone input 72, contact phone extension input 74, client facsimile number input 76, accommodation phone number input 78, accommodation e-mail address input 80, and Equal Opportunity Statement scrolling input 82. Referring now to FIG. 3A, there is client status drop-down input 84, client's home URL input 86, internal position password input 88, position testing password input 90, current applicant banner input 92, upload new applicant banner input 94, current recruiter banner input 96, upload new recruiter banner input 98, current client administrative banner input 100, upload client administrative banner input 102, create new applicant demo page query click-on input 104, and enable plug-ins selection input 106. This can include an input to select all plug-ins 107 or no plug-ins 109. Some of this information, such as country, state and province, as well as the actual selection of the client, can be accomplished through a drop-down type menu. This information can be saved, deleted or reset through input buttons 108, 110 and 112, respectively.

An entire listing of other clients can be listed as indicated by their company, designated by numeral 49. There is a return link 48 that allows the user to return to the main administration screen 22 on FIG. 2.

Figure 4:
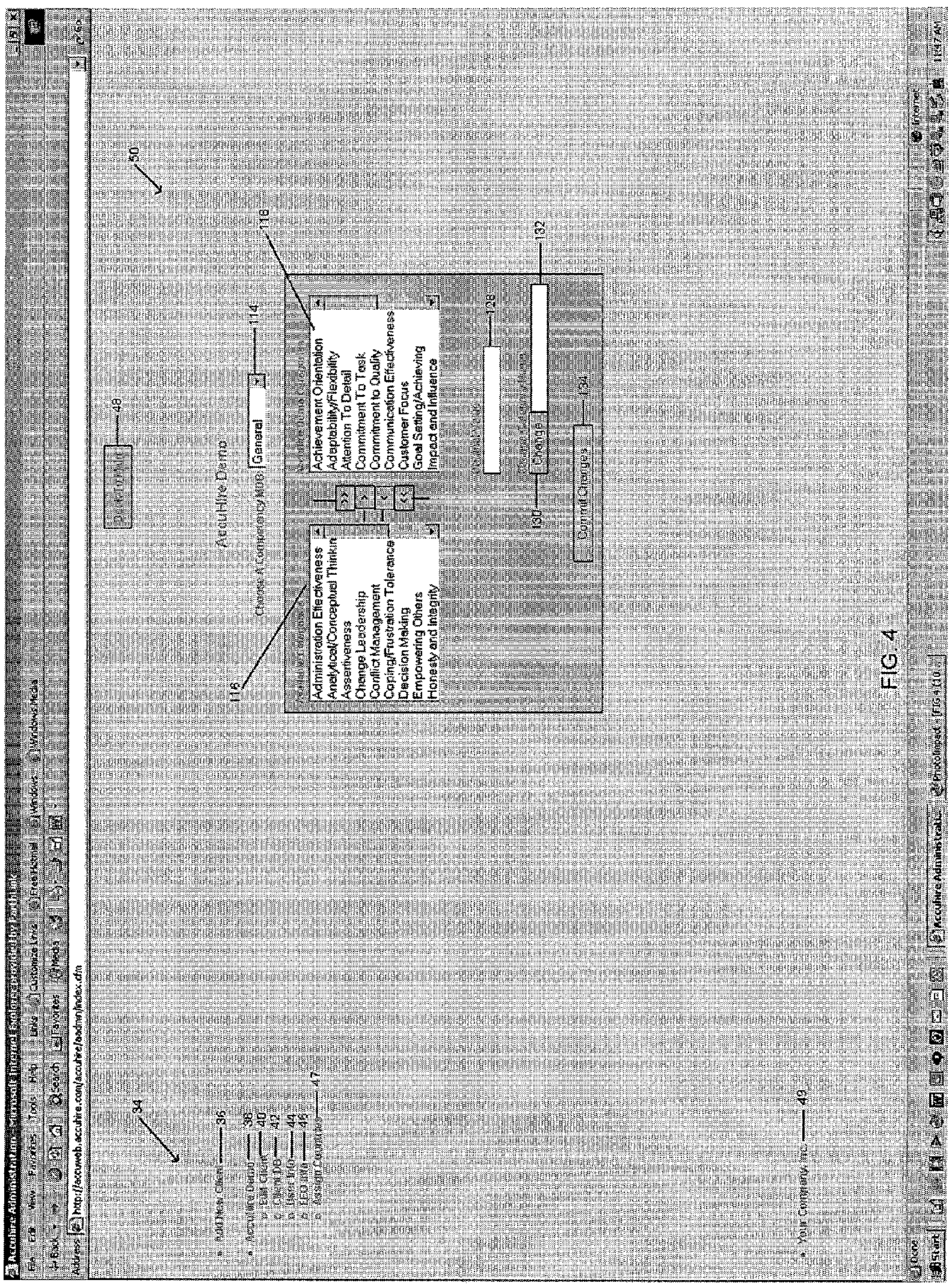
FIG. 4 illustrates an exemplary screen display (graphical user interface) of the present invention showing a client database administration screen.

Clicking on the client database function 42 on the client graphical user interface screen 30 under the interactive listing 34 in FIG. 3 or 3A allows the user to access a client database screen that is indicated by numeral 50 as shown in FIG. 4.

Referring now to FIG. 4, the next function on the client graphical user interface screen 30 under the interactive listing 34, is the client database function 42. The graphical user interface screen for the client database function is generally indicated by numeral 50. The first action that can be taken is to choose the competency master database. This can be accomplished through the drop-down screen indicated by numeral 114. Examples of competency master databases can be either general or management. On the left-hand side of the screen, there is a listing of available competency categories, listed in column 116. In column 118 are the selected categories for a specific organization. Pushbutton 120 is able to take the entire listing of categories listed in 116 and shift it to the organization's categories listed in 118. However, only specific categories may be targeted out of the available categories listed in 116, and pushbutton input 122 will allow those categories to be moved to the organization's categories on an item-by-item basis. Pushbutton 124 allows individuals to select categories out of the organization's selected categories listed in 118 and move them back on an item-by-item basis to the available category listing 116. Pushbutton input 126 is able to take all of the organization's listed categories 118 and shift them back to the available categories 116. When a category is selected under the organization's categories 118, it can be highlighted and this will show up as an original value in input 128. Through input 132 the user can change the name of this category by clicking on the category change name input 130. Once you have all of the desired categories listed under the organization's categories 118 with the appropriate names, these changes can be committed through pushbutton input 134.

Figure 5:
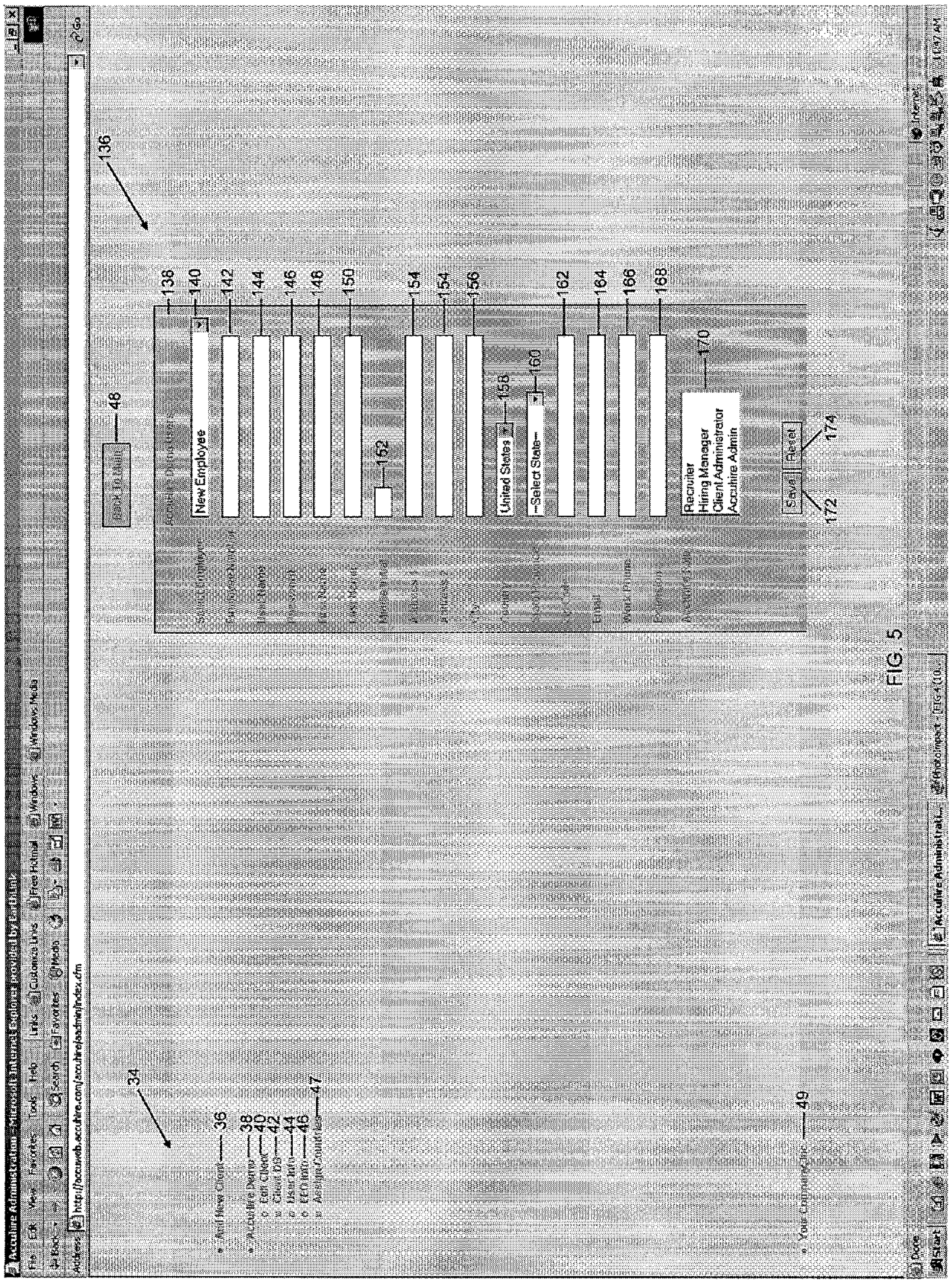
FIG. 5 illustrates an exemplary screen display (graphical user interface) of the present invention showing a user information administration screen.
Figure 6:
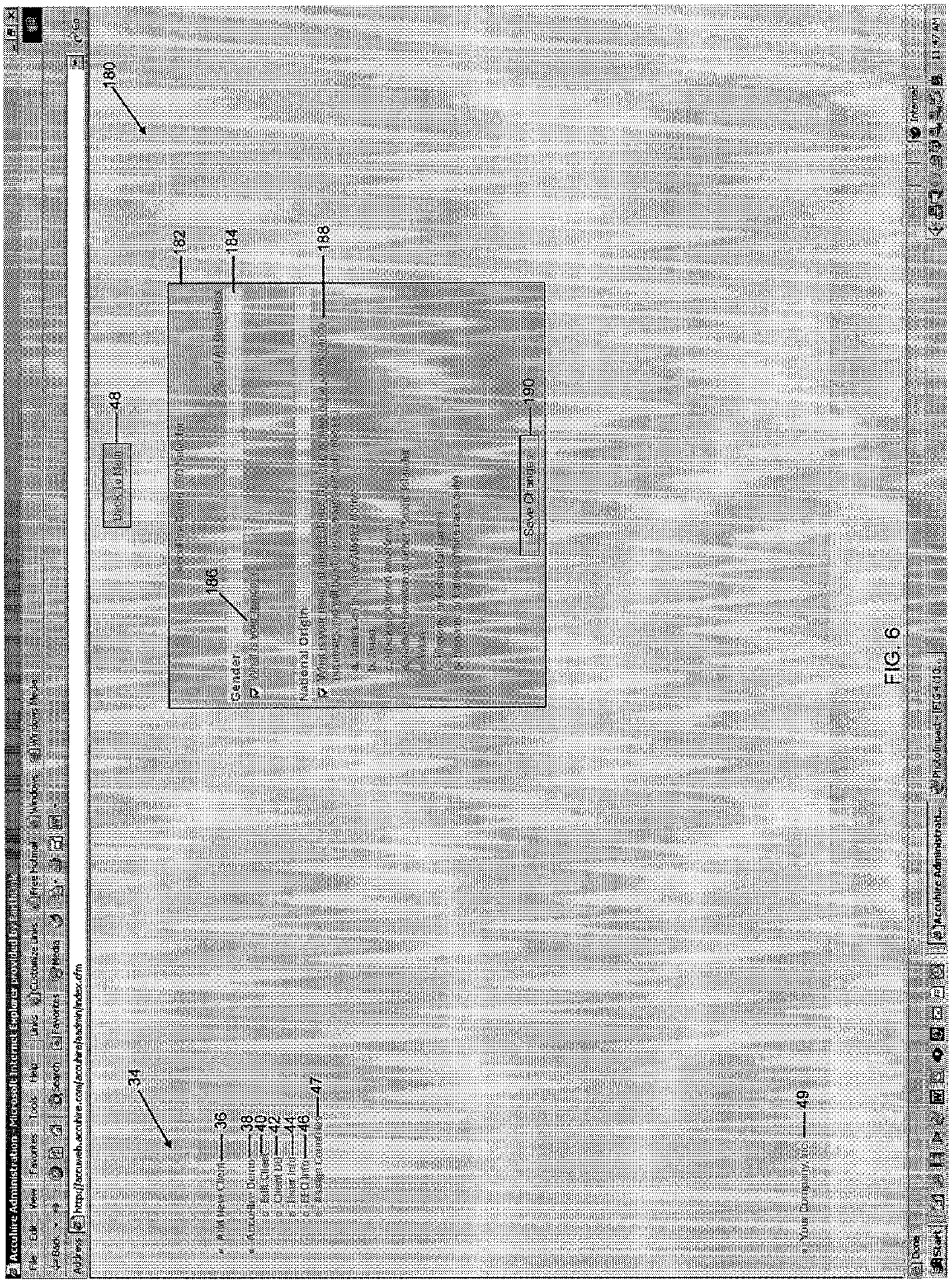
FIG. 6 illustrates an exemplary screen display (graphical user interface) of the present invention showing an equal employment information administration screen.

The next main link function is a user information function 44, located in the left-hand column in FIG. 4 underneath interactive listing 34. Referring now to FIG. 5, the user information screen is generally indicated by numeral 136. The graphical user interface input screen is generally indicated by numeral 138. The first item to be inputted is an employee selection drop-down input, designated by numeral 140. In this case, the organization can input all prospective employees and the drop-down input can be utilized to merely select the appropriate employee. The next input is for the employee number 142. The next item is the input for the password 146. The user's name is provided in input 144 with the user's first name provided in input 148 and last name through input 150, along with a middle initial in input 152. The user's first and second addresses are provided in input 154, and the user's city is provided in input 156. Drop-down input 158 is utilized to select a country, while drop-down input 160 is for selecting a state or province. The zip code of the user can be provided in input 162, along with the user's e-mail address in input 164. The user's work phone number is provided in input 166, with the appropriate phone extension in input 168. There are numerous levels of permission that can be provided through input 170. In this illustrative, but non-limiting, example, the examples are recruiter, hiring manager, client administrator and organization administrator. This information can be saved through input button 172 or reset and re-entered utilizing input button 174. Upon completion of this graphical input screen 136, the next main link function from the client graphical user interface screen indicated by numeral 30 is the equal employment opportunity information function 46. This equal employment opportunity information function 46 is a main link function provided under the interactive listing 34. This equal employment opportunity information function 46 directs you to equal employment opportunity screen, as generally indicated by numeral 180, as shown on FIG. 6. There is an EEO selector screen indicated by numeral 182. There is an input that allows you to select all questions 184, which places an inputted check with regard to both questions. The first question asks: "What is your gender?" which is indicated by numeral 186, and the response is either "male", "female" or "prefer not to respond". The next input is "Please select one of the following Equal Employment Opportunity Identification Groups" which is indicated by numeral 188. There is "Black-African origin (not of Hispanic origin)", "Asian", "Pacific Islander", "Hispanic", "White (not of Hispanic origin)", "American Indian", "Alaskan Native" or an indication that the individual does not desire to respond. There is an input button 190 that allows the individual to save the changes made. With input button 48, the individual can return to the main administration screen 22.

Figure 7:
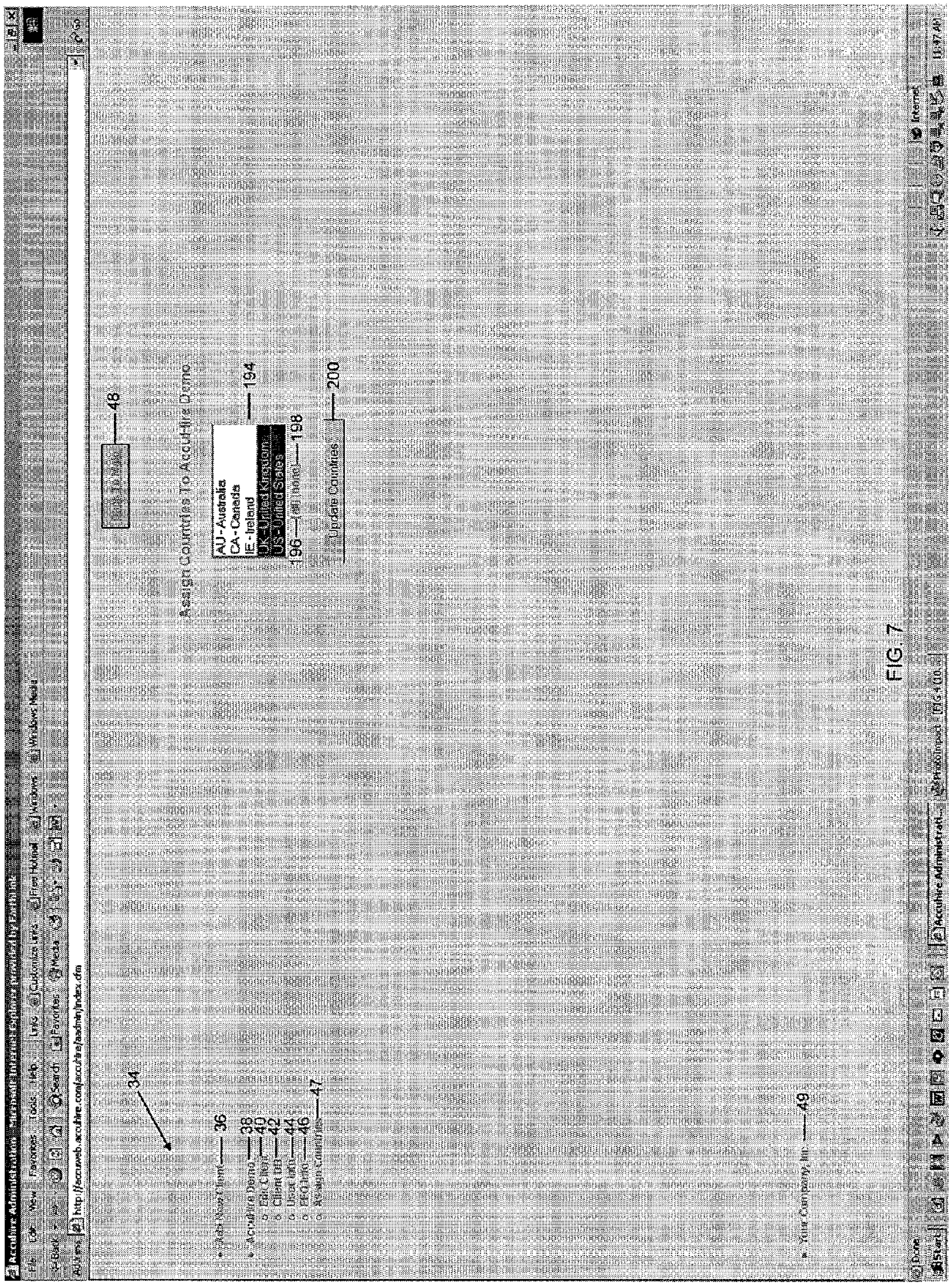
FIG. 7 illustrates an exemplary screen display (graphical user interface) of the present invention showing an assignment of countries administration screen.

The fifth function located on the interactive listing 34 is that of assigning countries for the user, indicated by numeral 47. Clicking on this function directs the user to the assign countries to the particular organizations screen as generally indicated by numeral 192 as shown on FIG. 7. There is an input that lists each individual country as indicated by numeral 194 with an input 196 to assign all countries to a particular organization as well as an input 198 which indicates that none of the countries are assigned to that organization. Each country can then be clicked on individually after input 198 is clicked. A new listing of countries for that organization can be updated by clicking on pushbutton input 200.

Figure 8:
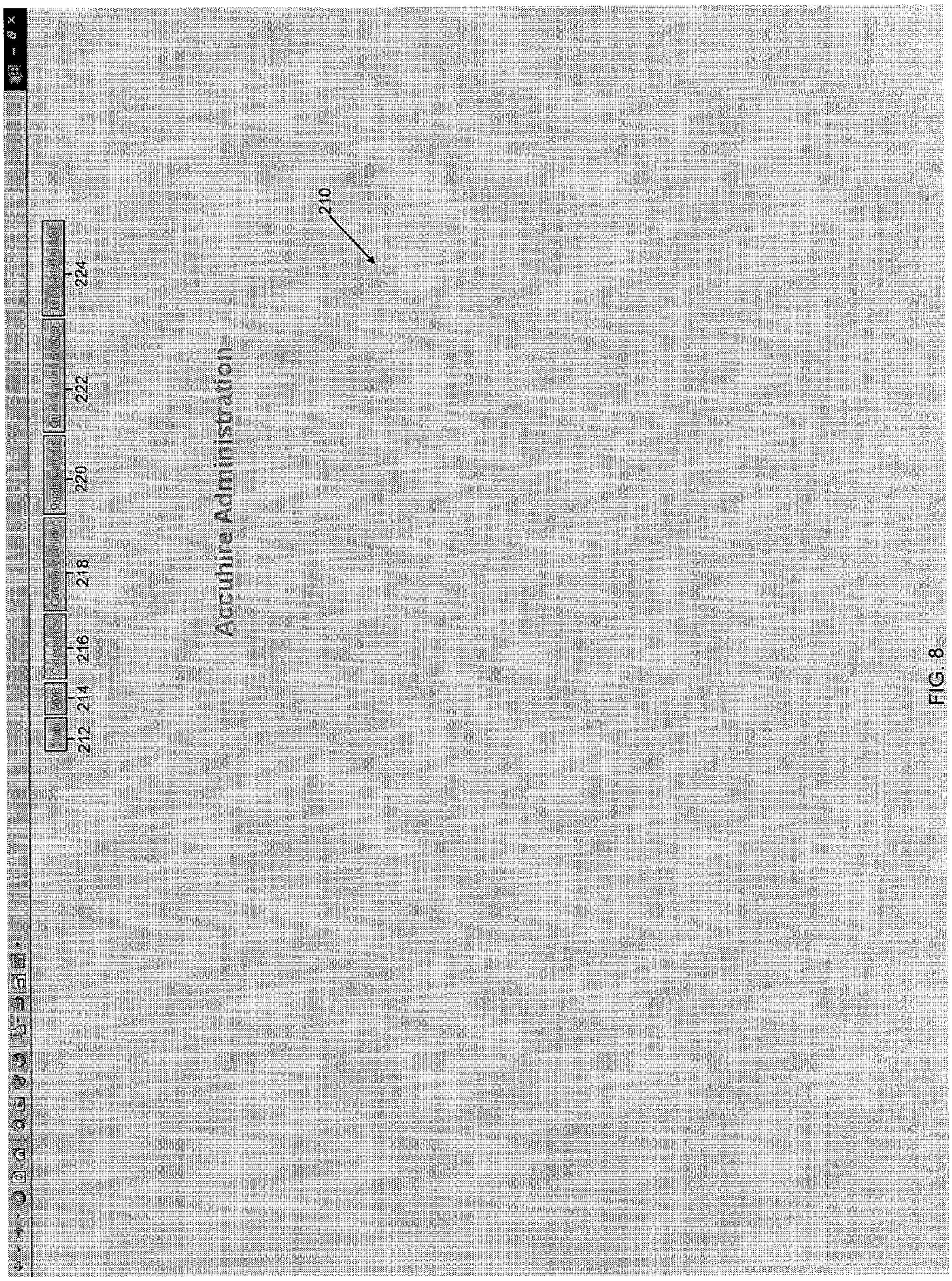
FIG. 8 illustrates an exemplary screen display (graphical user interface) of the present invention showing a main master database screen.
Figure 9:
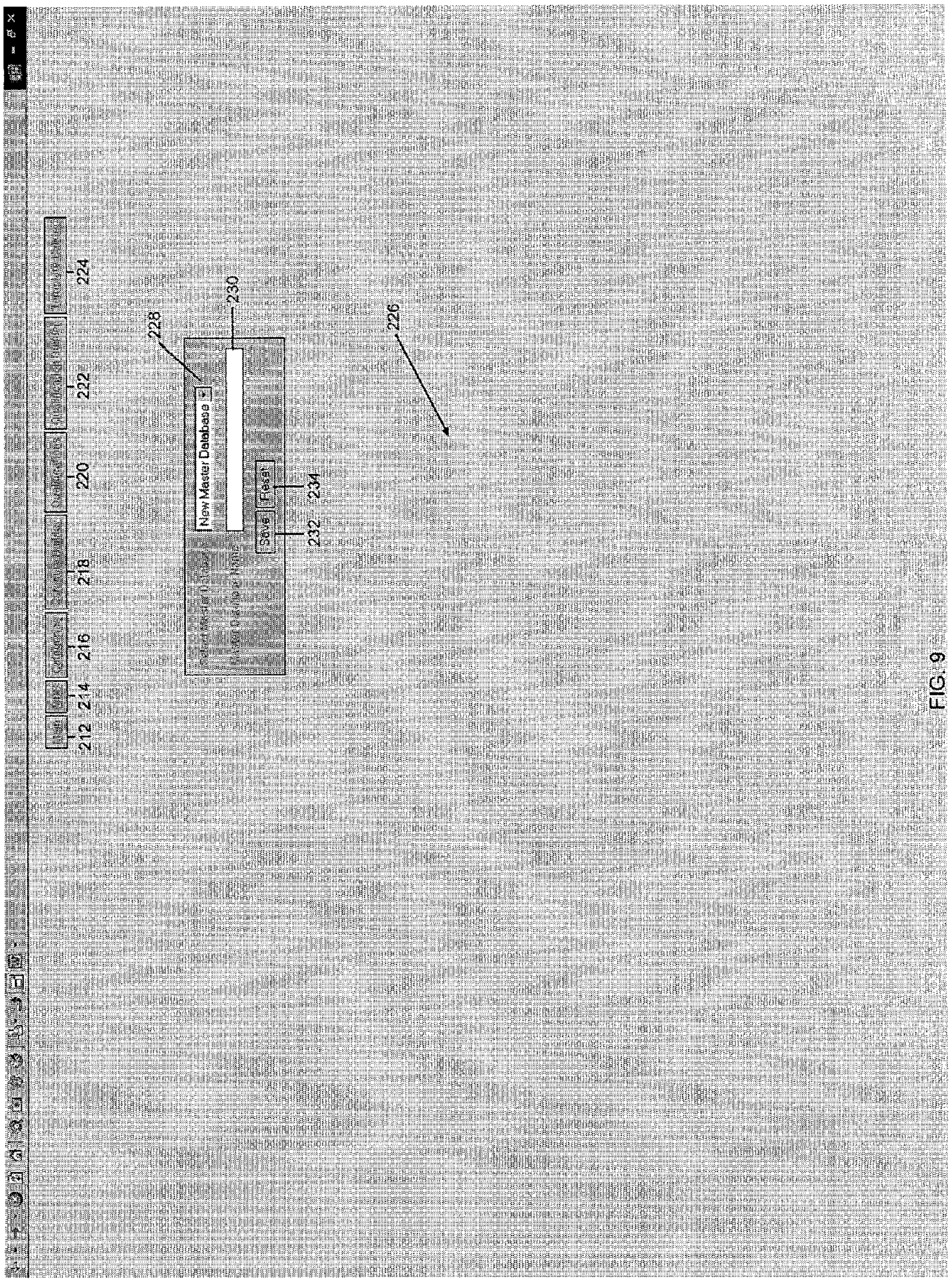
FIG. 9 illustrates an exemplary screen display (graphical user interface) of the present invention showing a master database selection screen.
Figure 10:
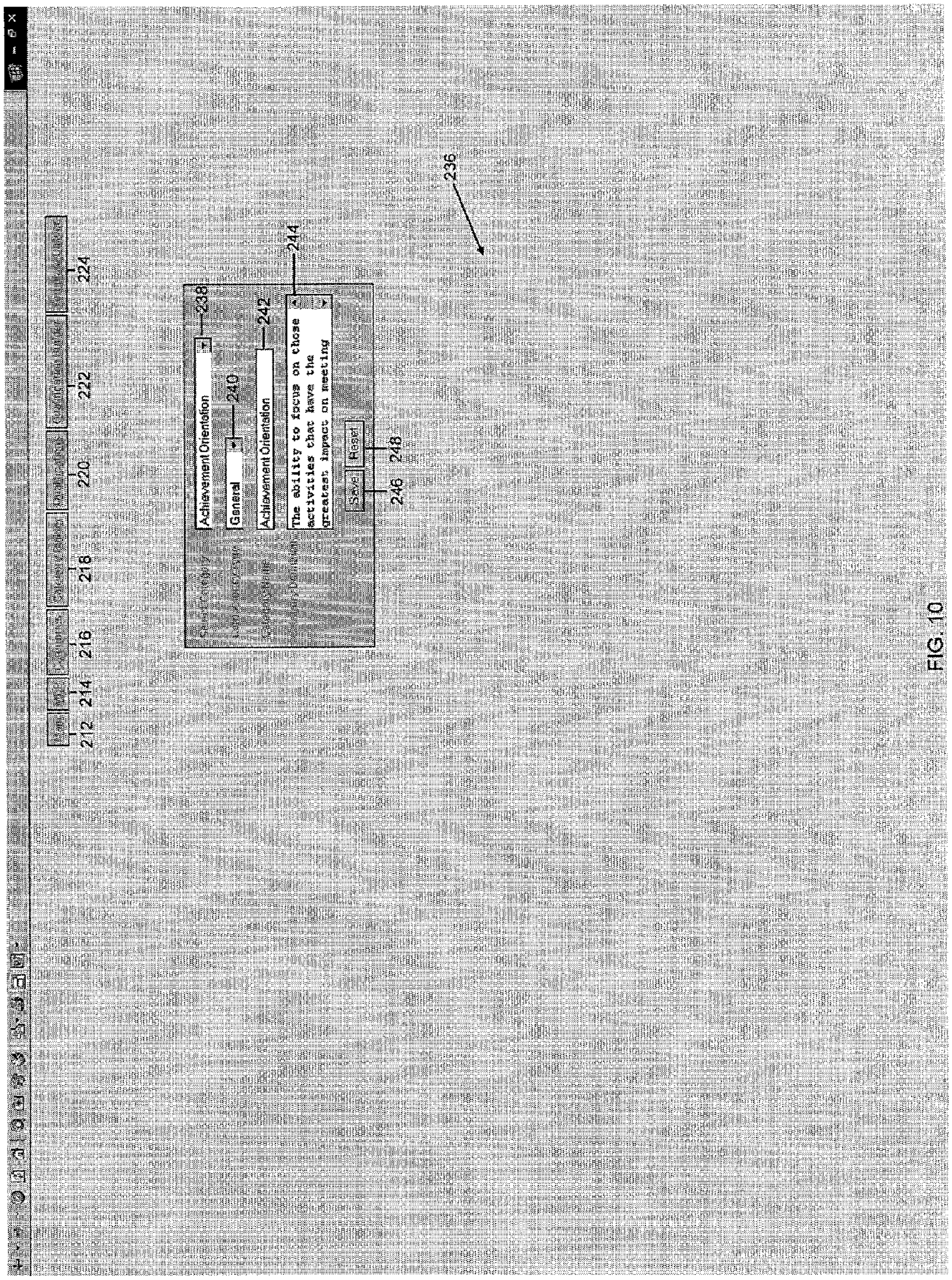
FIG. 10 illustrates an exemplary screen display (graphical user interface) of the present invention showing a category selection screen.

Returning now back to the main menu through the main administration 22 on FIG. 2 through pushbutton input 48. Through this main administration screen 22, the user can access the Master Database link 26. This returns the user to the main master database screen, indicated by numeral 210 on FIG. 8. The first input link is the main input link 212, which will take the user back to the main administration screen 22 on FIG. 2. The second input link is the master database input link 214, which diverts the user to the master database selection screen, generally indicated by numeral 226 on FIG. 9. There is a drop-down database selection input 228, which allows the users to choose a new master database or the general or management database. Input 230 allows the user to type in a new master database name, which can be saved through input button 232 or cleared and reset through input 234. Returning again to the main master database screen 210 on FIG. 8, the user can then select categories link 216 which directs the user to a category selection screen on FIG. 10 that is generally indicated by numeral 236. This has a category selection drop-down input 238 in which a new category can be selected or a pre-existing category can be utilized. Examples of pre-existing categories include: "achievement orientation"; "adaptability/flexibility"; "administration effectiveness"; "analytical/conceptual thinking"; "assertiveness"; "attention to detail"; "change leadership"; "commitment to task"; "commitment to quality"; "communication effectiveness"; "conflict management"; "coping/frustration tolerance"; "customer focus"; "decision making"; "empowering others"; "goal setting/achieving"; "honesty and integrity"; "impact and influence"; "initiative"; "innovation"; "interpersonal effectiveness"; "leadership orientation"; "learning orientation"; "organization and planning"; "performance management"; "policy and procedure"; "problem solving"; "sales aptitude"; "team building"; and "tolerance of ambiguity" among numerous other possible categories. These are merely illustrative examples. Competency type can then be selected through a drop-down menu input 240. Typically the two main types are general and management. A category name can then be inputted in input 242. A definition of the category can be inputted through input 244. This information can be saved through input 246 or reset though input 248.

Figure 11:
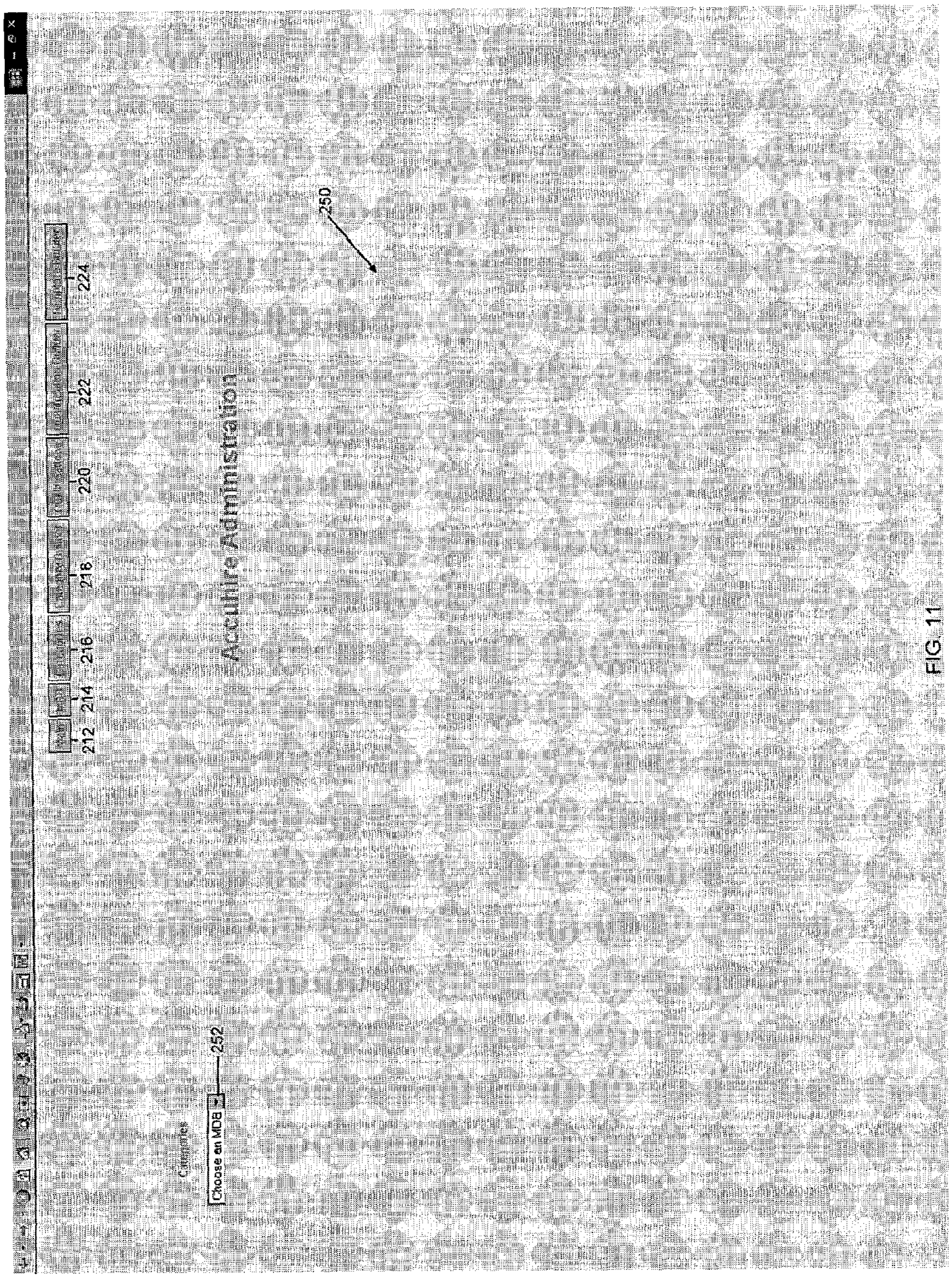
FIG. 11 illustrates an exemplary screen display (graphical user interface) of the present invention showing a category builder screen.
Figure 12:
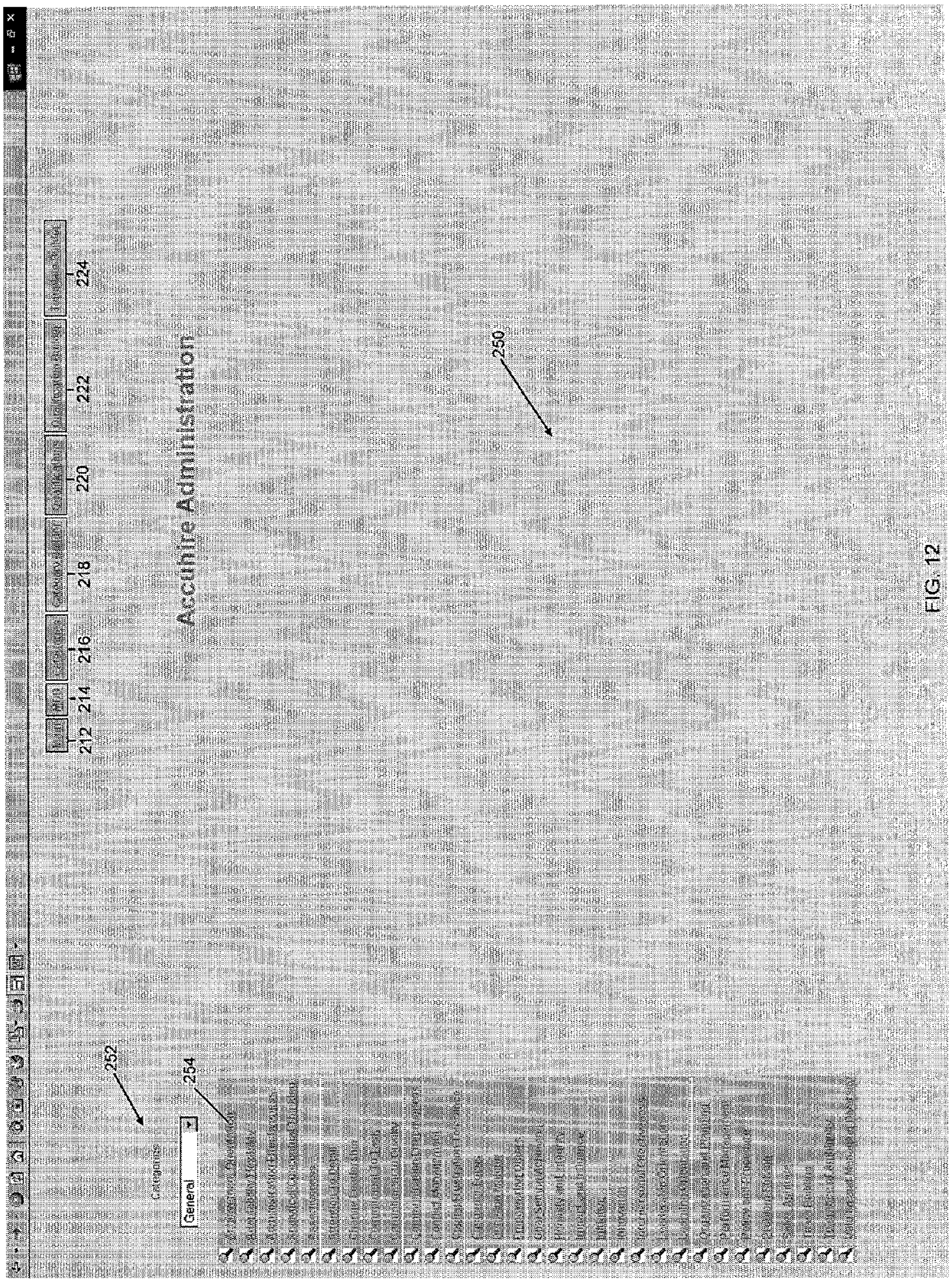
FIG. 12 illustrates an exemplary screen display (graphical user interface) of the present invention showing a category builder listing screen.

The user can then go and utilize the category builder function through link input 216. This category builder screen is generally indicated by numeral 250 shown on FIG. 11. On the left-hand side of the screen, there is a drop-down selector 252 that allows the individual to choose between either a general or management category. Selecting the general category lists all the potential categories that may be utilized in selecting an employee. Upon selecting the general category in drop-down selector 252 as shown in FIG. 12, a complete listing of categories is revealed in category column 254. This includes, but is not limited to: "achievement orientation"; "adaptability/flexibility"; "administration effectiveness"; "analytical/conceptual thinking"; "assertiveness"; "attention to detail"; "change leadership"; "commitment to task"; "commitment to quality"; "communication effectiveness"; "conflict management"; "coping/frustration tolerance"; "customer focus"; "decision making"; "empowering others"; "goal setting/achieving"; "honesty and integrity"; "impact and influence"; "initiative"; "innovation"; "interpersonal effectiveness"; "leadership orientation"; "learning orientation"; "organization and planning"; "performance management"; "policy and procedure"; "problem solving"; "sales aptitude"; "team building"; and "tolerance of ambiguity" among numerous other possible categories. These are merely illustrative examples and should not be construed as all-inclusive.

Figure 13:
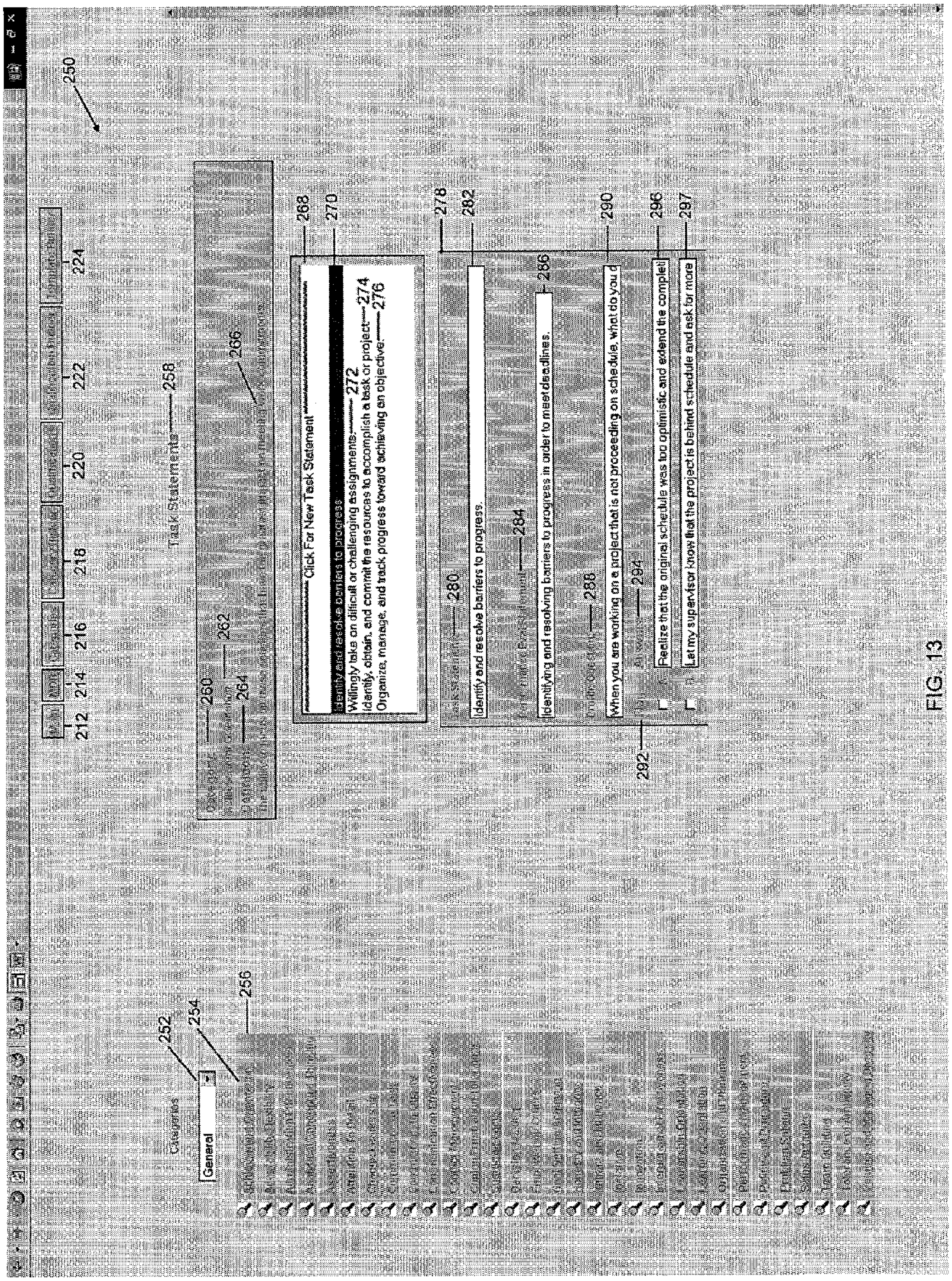
FIGS. 13, 13A and 13B illustrate an exemplary screen display (graphical user interface) of the present invention showing a task statement screen with profile questions, profile answers, and interview questions.
Figure 13A:
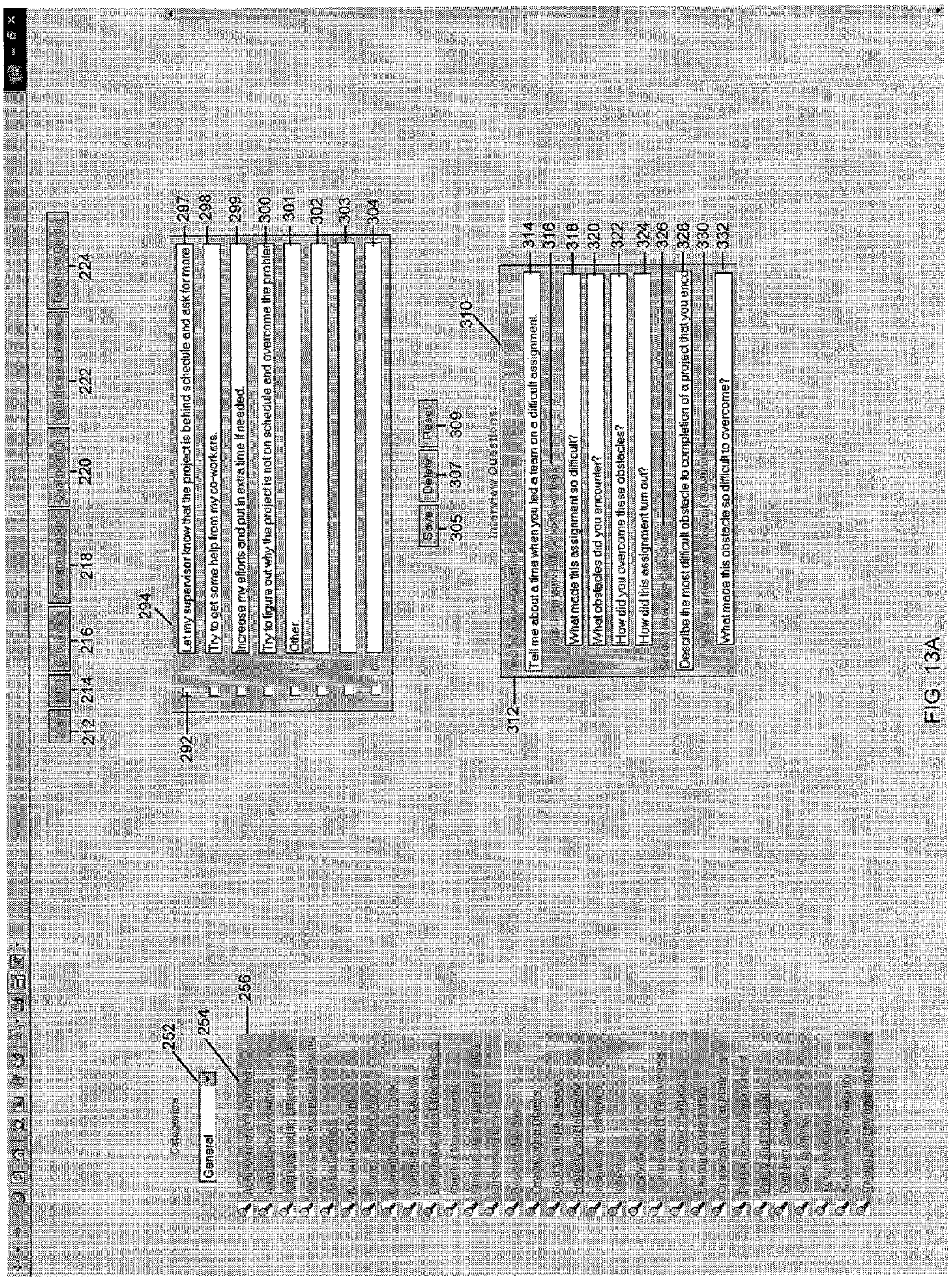

By clicking on any one of these categories creates a task statement listing output as shown in FIG. 13. For example, clicking on "achievement orientation" indicated by numeral 256 pulls up a task statement listing for a category 260 with the specific category listing 262, e.g. "achievement orientation". A statement indicating a definition will follow 264 and then the actual definition listing 266 related to achievement orientation in this Example. It also creates a task-listing screen 268, which lists the various tasks underneath this category. Non-limiting examples include: "identifying and resolving barriers to progress" 270; "willing to take on difficult or challenging assignments" 272; "identify, obtain, and commit resources to expedite a task or project" 274; and "organize, manage, and track progress to achieve an objective 276". Upon clicking on the first task 270, which in this illustrative example is to "identify and resolve barriers to progress", opens up a profile question and answer screen that is generally indicated by numeral 278. The first item is the heading identifying that a task statement will follow 280. Then the task statement listed under numeral 270 is replicated as indicated by numeral 282. There is a performance evaluation heading as indicated by numeral 284 and follows there-after which basically provides an augmented, full explanatory statement regarding the task statement 282. In this illustrative, but non-limiting example, includes: "identifying and resolving barriers to progress in order to meet deadlines" as indicated by numeral 286. The next item is a heading for a profile question as indicated by numeral 288. The next item is a specific profile question. In this case, a non-limiting example would be as follows: "When you are working on a project that is not proceeding on schedule, what do you do?". As shown both in FIG. 13 and FIG. 13A, there are numerous answers that may be possible with a flag click-on input. A listing of the flag inputs for the potential answers can be found in the column indicated by numeral 292 and to the left of the column is a listing of the answers indicated by numeral 294. Although there are nine possible answers and at least six answers listed, any possible number might be utilized. The first possible answer is indicated by numeral 296. An illustrative but non-limiting example of a possible answer would be: "Realized that the original schedule was too optimistic and extend the completion date". The next answer is listed by numeral 297. A non-limiting example would be: "To let my supervisor know that the project is behind schedule and ask for more help". The third potential answer is listed by numeral 298. A non-limiting example would be: "To try to get some help from my co-workers". The fourth potential answer is listed by numeral 299. A non-limiting example answer would be: "Increase my efforts and put in extra time if needed". A fifth potential answer is listed by numeral 300. A non-limiting example answer would be: "Try to figure out why the project is not on schedule and to overcome the problem." A sixth potential answer is listed by numeral 301. A non-limiting example answer would be simply: "Other". Listings 302, 303 and 304 provide three other spots for potential answers that may be selected through the click-on flag column input 292. This information can either be saved through input button 305, deleted through input button 307 or reset through input button 309.

The advantage to this questioning system is that it provides very accurate analysis of the employee's qualifications. Based on experience, the employee will truthfully mark their response to these questions, and thus the information can be scored against the optimal result. Instead of merely a resume tailored to what they think is the job description, you now have an indication of how the job applicant relates to the position with quantifiable numerical results. This not only indicates how close the individual tracks in comparison to the optimal qualities related to the job opening, but also can be utilized to compare numerous job applicants against each other, especially those with very similar interviewing skills and resumes. This is a very powerful tool that supplies an unsurpassed advantage in evaluating job applicants.

Figure 13B:
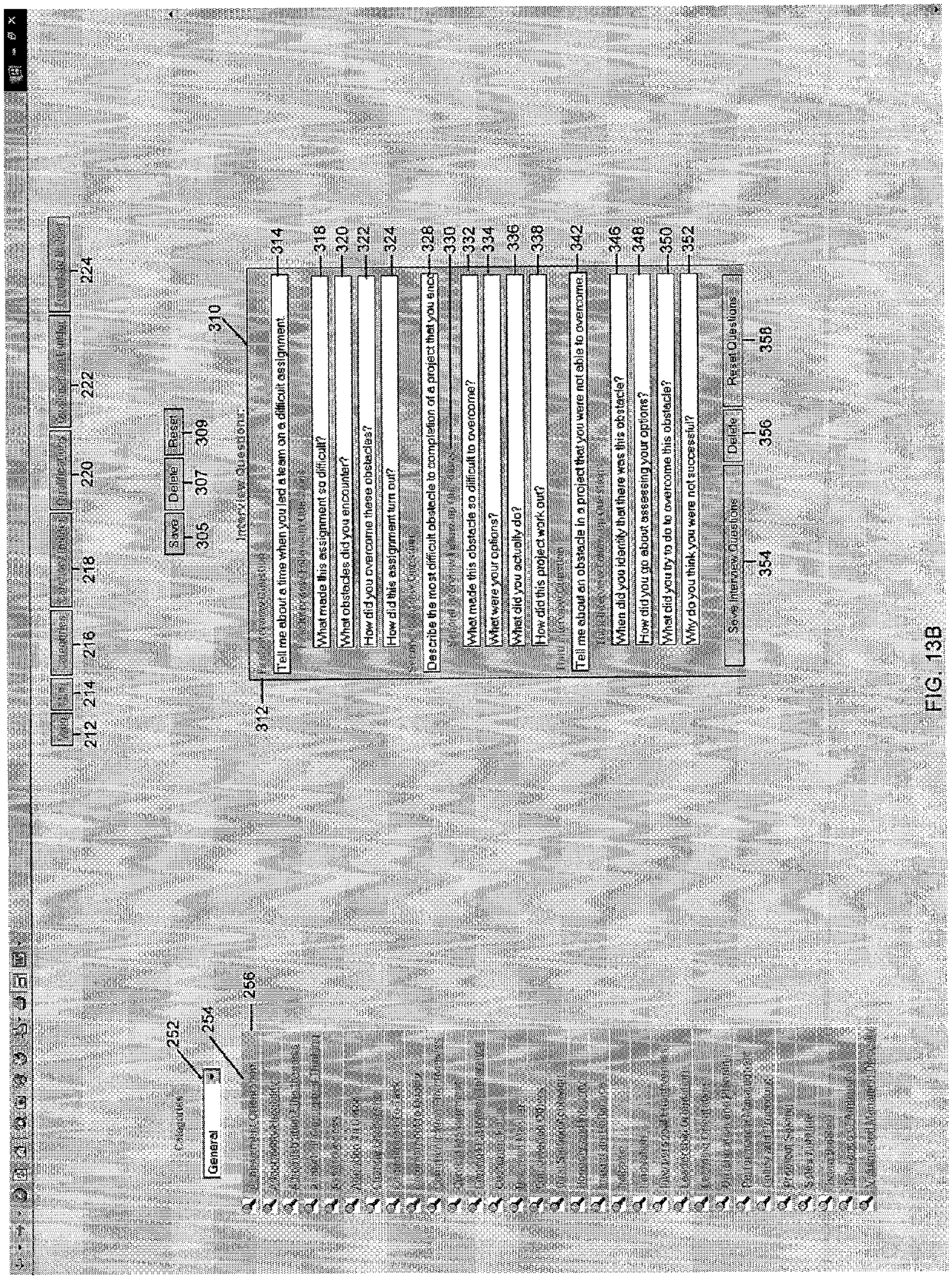

Referring now to FIG. 13B, there is also an interview question screen 310 that appears so that the job applicant can be interviewed over questions under this same selected category, e.g., "achievement orientation". There is a heading for a first interview question indicated by numeral 312. This first interview question is found in output 314. A non-limiting example of this first interview question 314 would be: "Tell me about a time when you led a team on a difficult assignment". There is also a heading for first interview follow-up questions, indicated by numeral 316. Sample questions are listed under outputs indicated by numeral 318, 320, 322 and 324, respectively. Non-limiting exemplary questions include: "What made this assignment so difficult?"; "What obstacles did you encounter?"; "How did you overcome these obstacles?"; and "How did this assignment turn out?". Under the heading for a second interview question 326 there is an output listing for this question indicated by numeral 328. An illustrative, non-limiting example would be: "Describe the most difficult obstacle to completing a project that you have encountered". The next heading is for second interview follow-up questions indicated by numeral 330. This includes output questions indicated by numerals 332, 334, 336 and 338, respectively. Illustrative but non-limiting questions that may be utilized would be: "What made this obstacle so difficult to overcome?"; "What were your options?"; "What did you actually do?"; and "How did this project work out?". The next heading is for a third interview question, indicated by numeral 340. This question can be outputted as indicated under numeral 342. An illustrative but non-limiting example question would be: "Tell me about an obstacle on the project that you were not able to overcome". The next heading is for third interview follow-up questions, indicated by numeral 344. These questions are listed under numerals 346, 348, 350 and 352, respectively. Illustrative but non-limiting examples of these types of questions include: "When did you identify that there was this obstacle?"; "How did you go about assessing your options?"; "What did you do to try to overcome this obstacle?"; and "Why did you think you were not successful?". Through input pushbutton 354, these interview questions can be saved. Input pushbutton 356 provides for the deletion of selected questions and input pushbutton 358 resets the entire output screen.

Figure 14:
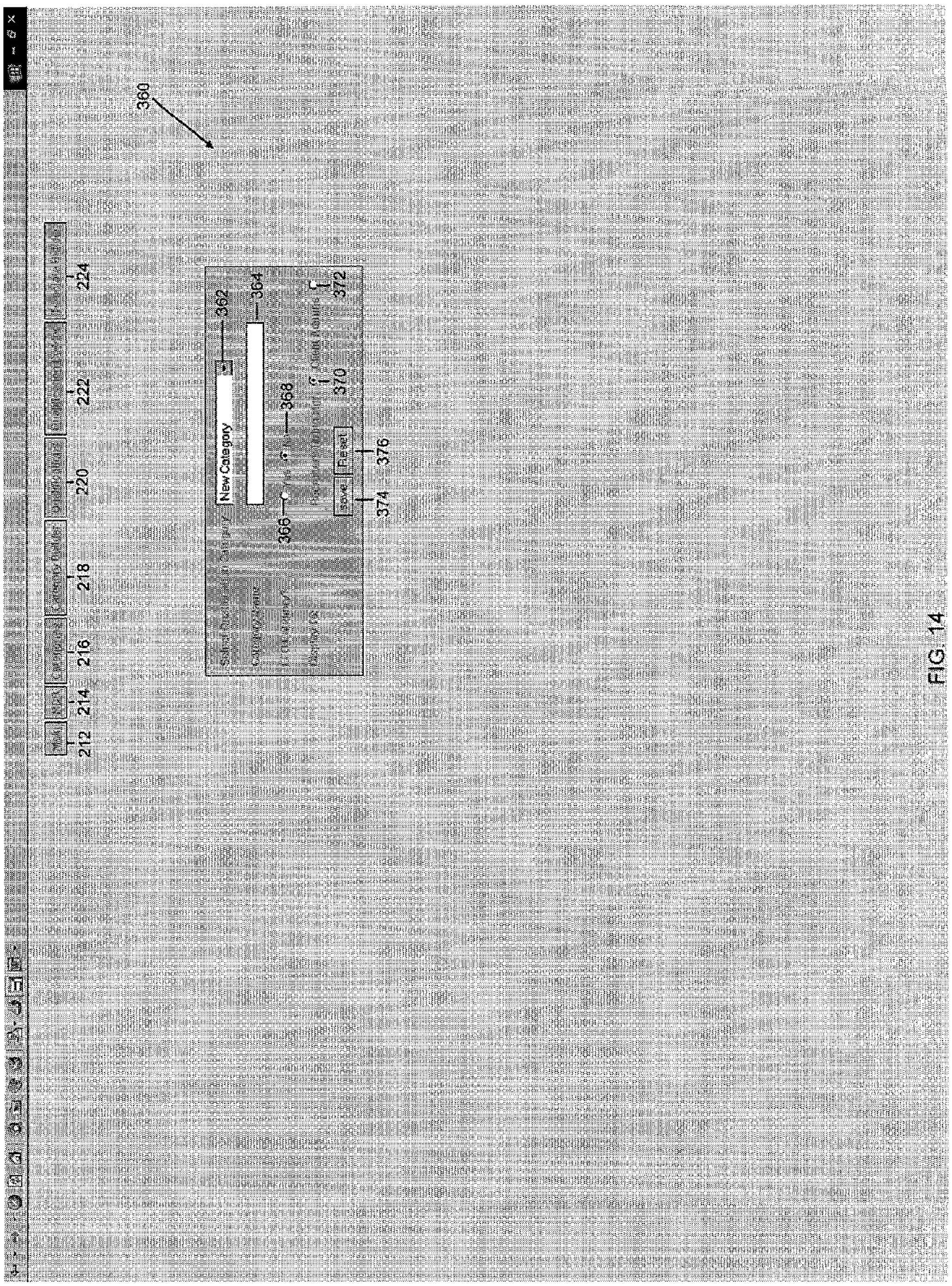
FIG. 14 illustrates an exemplary screen display (graphical user interface) of the present invention showing a qualification selection screen.

Referring now to FIG. 14, the next feature of Applicant's invention is a qualifications selection feature which is accessed through input 222. This feature directs the user to a qualification category selection screen generally indicated by numeral 360. The drop-down input for selection of the qualification category is indicated by numeral 362. Other category names can be inputted through input 364. Indication as to whether it is an Equal Employment Opportunity category is either clicked-on affirmatively through input 366 or in the negative through input 368. Determination can be made whether this is displayed to recruiters/hiring managers with a clicked on input 370 or the client administrator through click-on input 372. This can be either saved through pushbutton input 374 or reset through pushbutton input 376. Illustrative but non-limiting examples of qualification categories include: accounting/finance"; "age"; "basic information"; "disability"; "education"; "employment history"; "engineering"; "exit interview"; "gender"; "human resources"; "job fit/work style"; "marketing/sales"; "national origin"; "position requirements"; "programming"; "satisfaction survey"; "skills/requirements"; "template questions"; and "veterans status". This is merely an illustrative and non-limiting list of categories.

Figure 15:
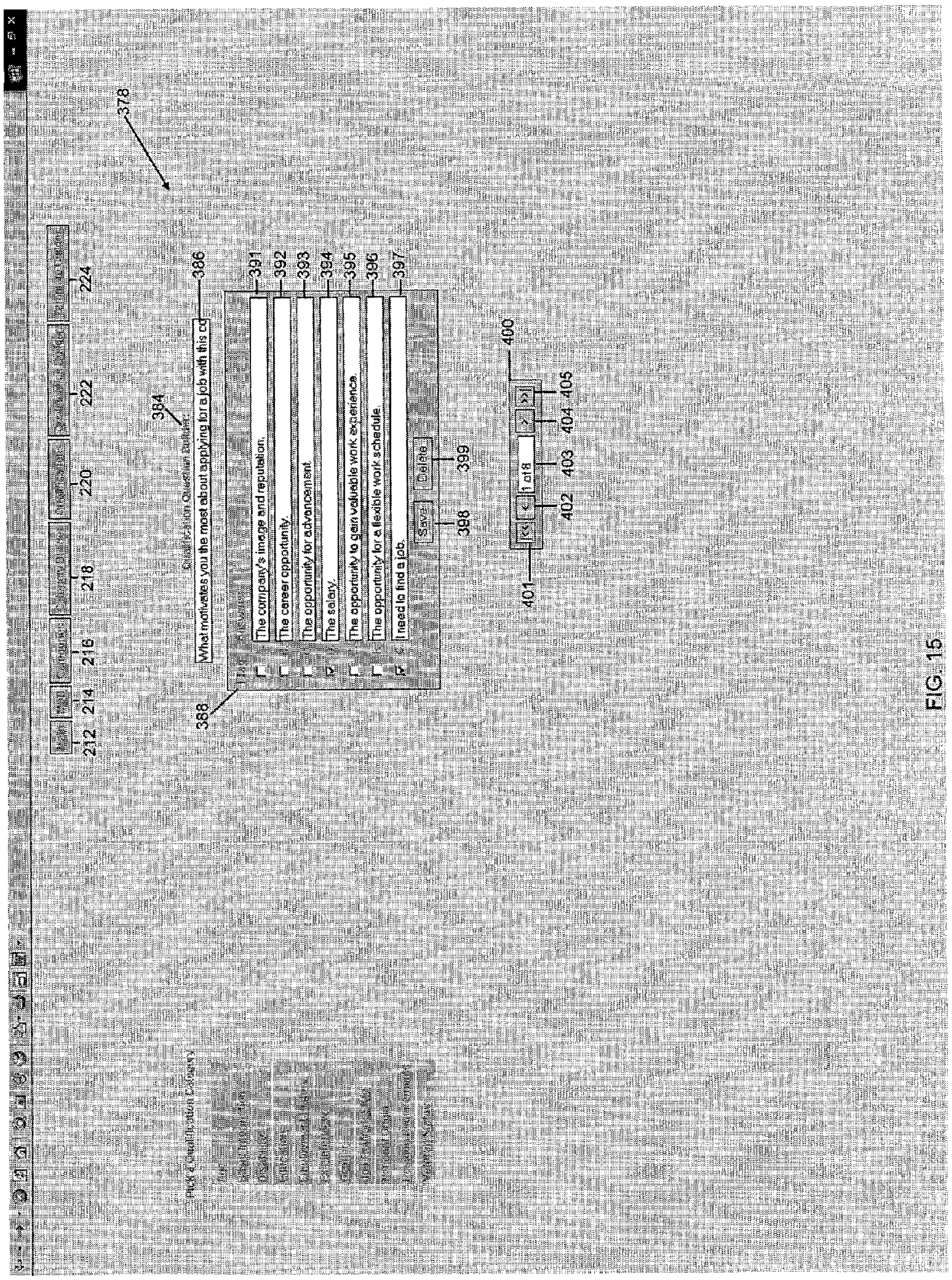
FIG. 15 illustrates an exemplary screen display (graphical user interface) of the present invention showing a qualification builder screen.

Referring now to FIG. 15, the next feature is the qualification builder, indicated by numeral 222. There is a column that indicates for the user to pick a qualification category indicated by numeral 380. Illustrative but non-limiting examples of qualification categories include: "age"; "basic information"; "disability"; "education"; "employment history"; "exit interview"; "gender"; "job fit/work style"; "national origin"; "position requirements"; and "veterans status". Upon clicking upon the basic information indicated by numeral 382, there is a heading indicated as "Qualification Question Builder" 384, which lists the question underneath as indicated by numeral 386. An illustrative but non-limiting question would include: "What motivates you the most about applying for a job with this company?". This would be under the qualification category "Basic Information" 382. There is a column 388 that lists flags where an input can be clicked from a mouse. Answers to the questions can be found under numerals 391, 392, 393, 394, 395, 396 and 397, respectively. There is a pushbutton input to either save 398 and a pushbutton input 399 to delete the displayed questions. There is the possibility for numerous sets of questions as indicated by output 400. There is an input 401 that directs the display to show the very first question set, input 402 that increments back one question set, output 403 displays the number of the question set, input 404 increments forward one question set, and input 405 directs the display to show the very last question set.

Figure 16:
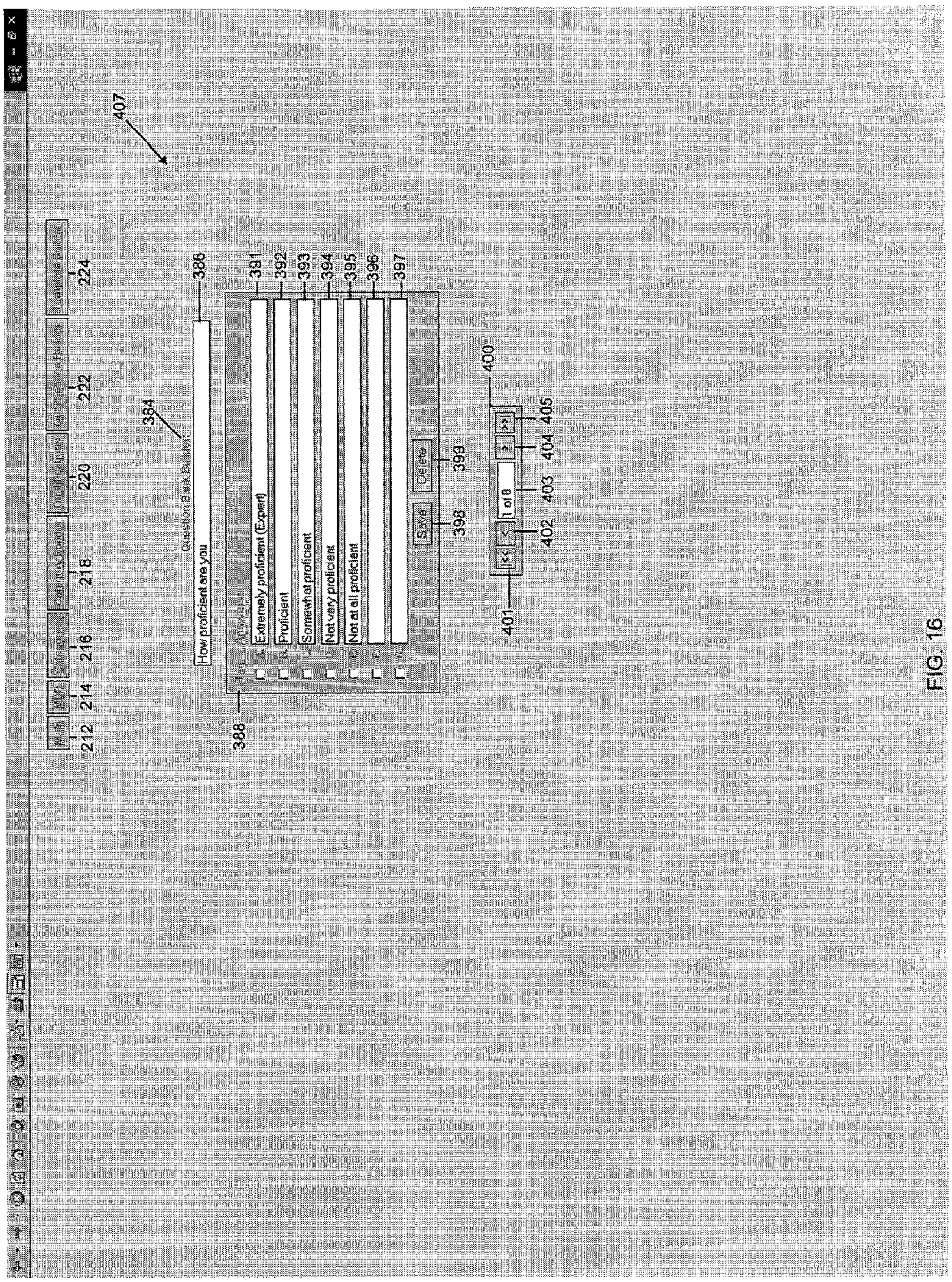
FIG. 16 illustrates an exemplary screen display (graphical user interface) of the present invention showing a template builder screen.

The next function is indicated by numeral 224, which is the template builder. This takes you to template builder screen generally indicated by numeral 407 on FIG. 16. This screen essentially replicates that found on the qualification builder screen indicated by numeral 378 on FIG. 15. It allows you to type in various answers, such as those indicated by numerals 391, 392, 393, 394, 395, 396 and 397 and responds to a specific question indicated by numeral 386. Once again, there is a question set input device 400 that allows you to move through various question set screens. Clicking again on the main input link 212 returns you to the main administration screen indicated by numeral 22 on FIG. 2.

Figure 17:
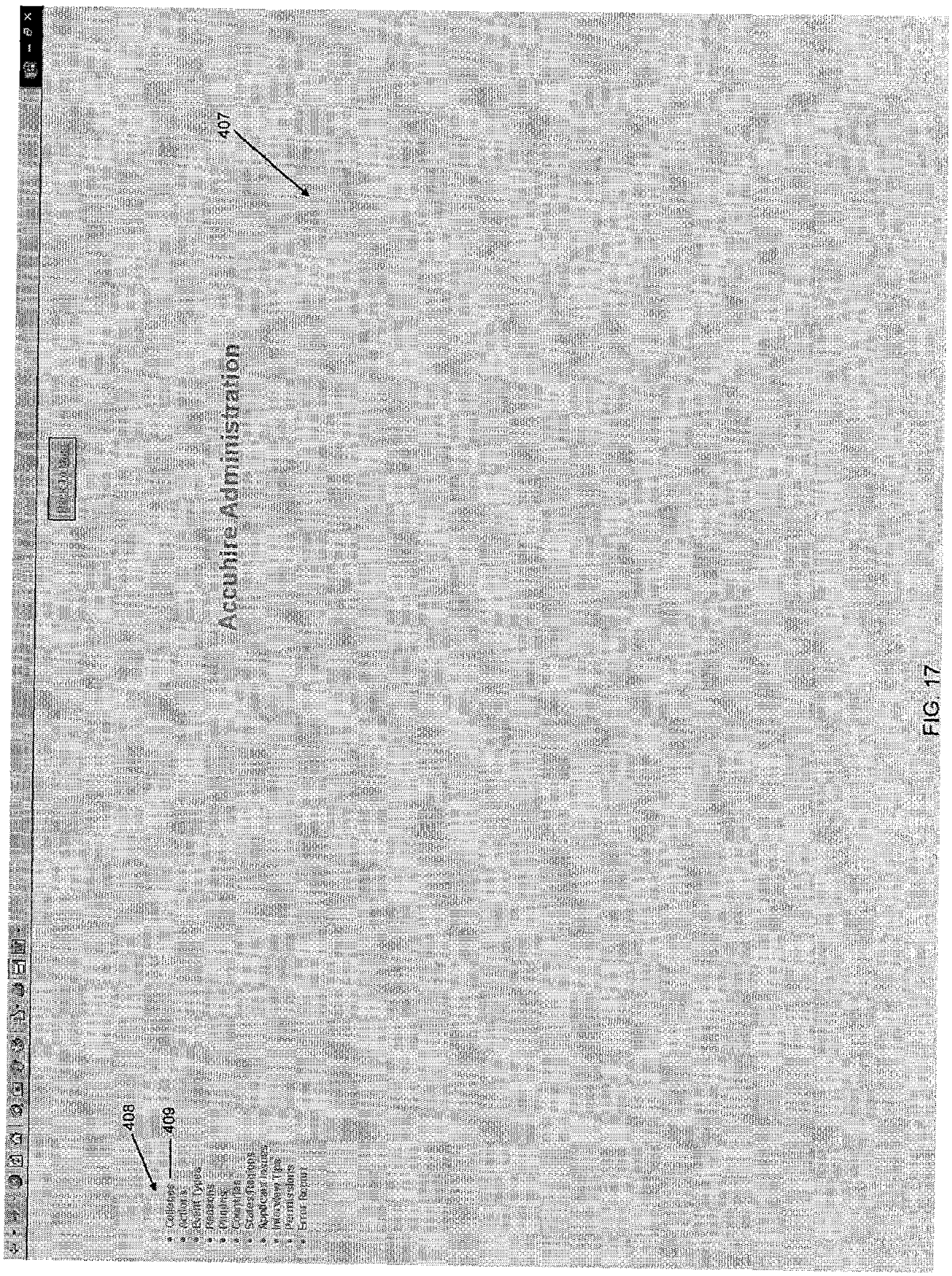
FIG. 17 illustrates an exemplary screen display (graphical user interface) of the present invention showing a main maintenance screen.
Figure 18:
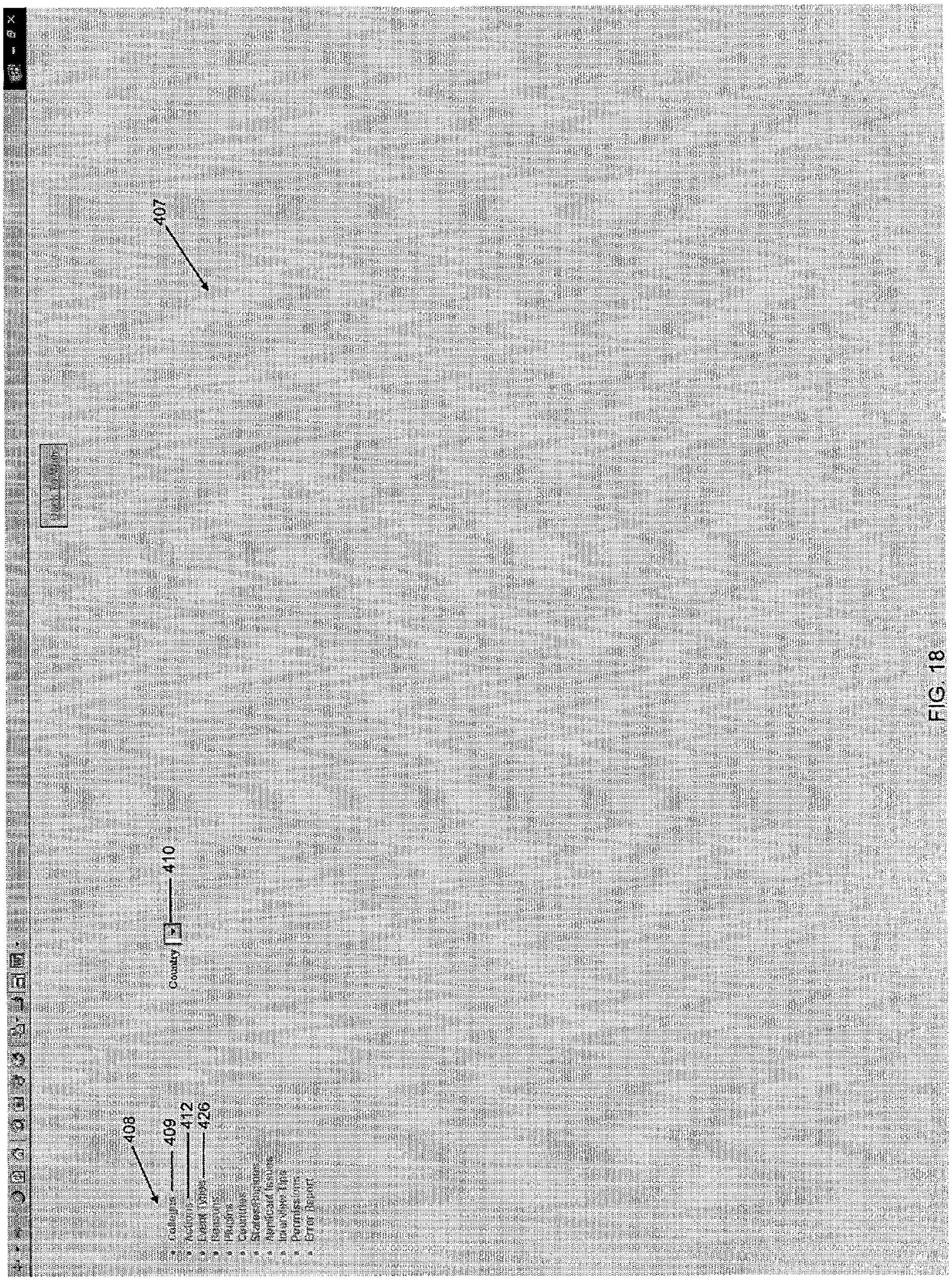
FIG. 18 illustrates an exemplary screen display (graphical user interface) of the present invention showing a college listing maintenance screen.
Figure 19:
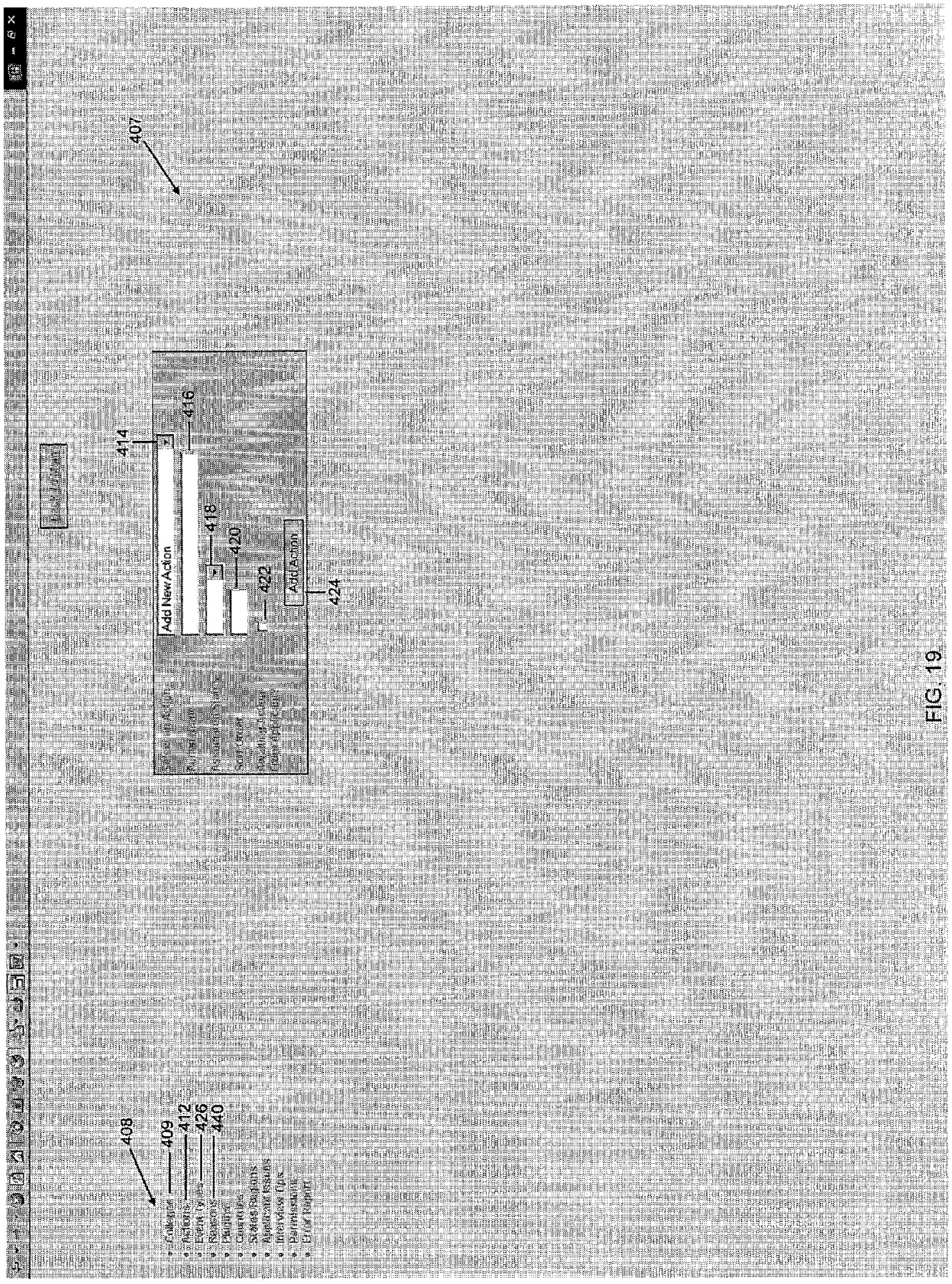
FIG. 19 illustrates an exemplary screen display (graphical user interface) of the present invention showing an actions listing maintenance screen.

The third main function on this screen is maintenance indicated by numeral 28. This takes the user to the main maintenance screen indicated by numeral 407 as shown on FIG. 17. There is an entire column of maintenance items generally indicated by numeral 408. Clicking on the colleges link indicated by numeral 409 directs the user to screen 407 which provides a listing of the various countries to select a college, indicated by numeral 410 as shown in FIG. 18. Clicking on link 412 for "actions" directs the user to FIG. 19. It allows the recruiter to select an action through a drop-down input menu 414. Illustrative, but nonlimiting, actions can include: "consider further"; "reject or remove from consideration"; "called and left message"; "awaiting response"; "hired with a notation of the starting date"; "to archive"; and "consider in the future". The action name can be inputted through input 416. There is a drop-down menu 418 for the associated status of the prospective applicant, such as but not limited to: "active"; "hired"; "archives"; and "rejected". However, these are merely examples. There is an input for a sorting order 420 and an input that you click to indicate that you are awaiting action from the job applicant 422. To add the "action" requires clicking on the "add action" input indicated by numeral 424.

Figure 20:
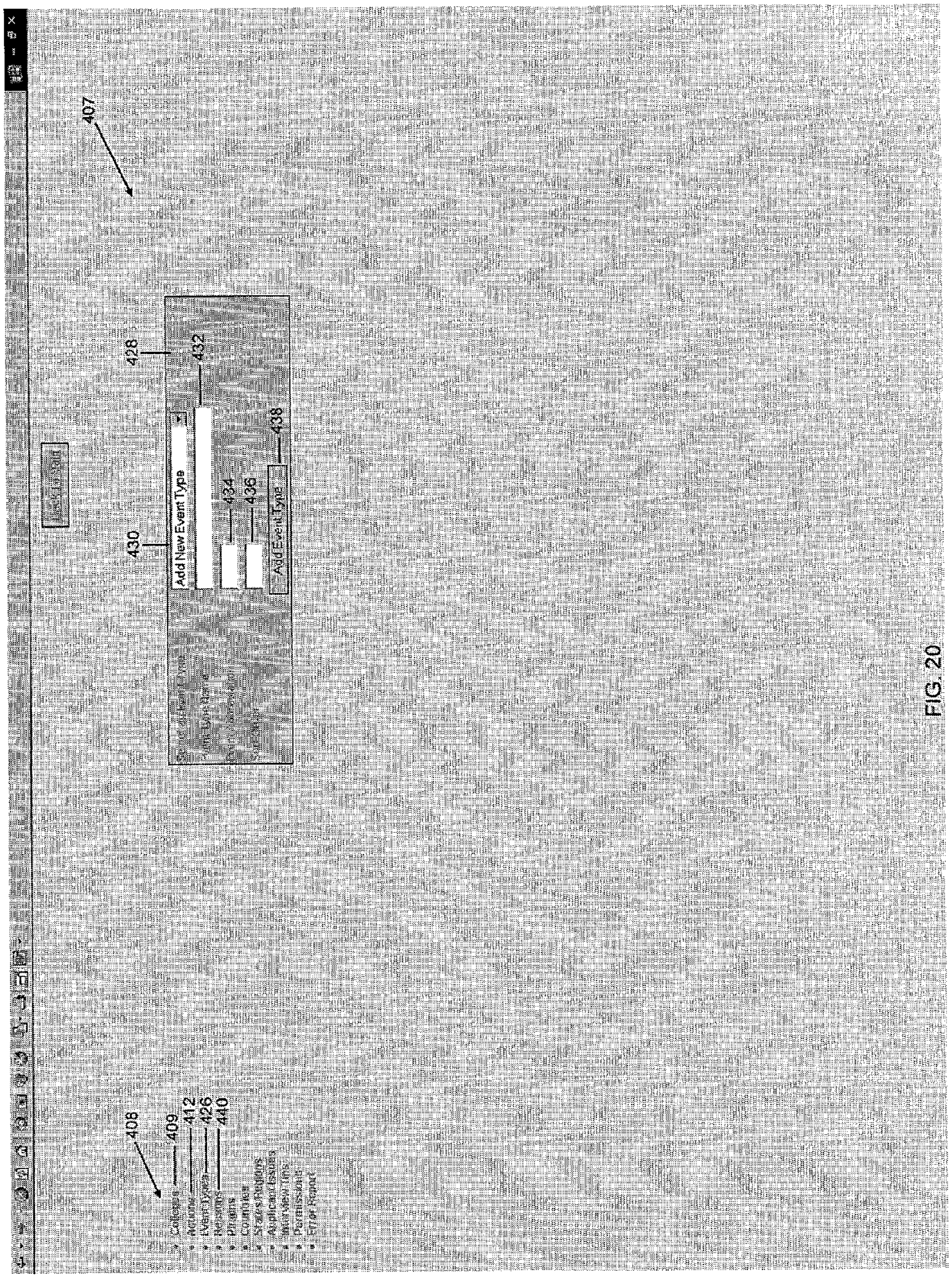
FIG. 20 illustrates an exemplary screen display (graphical user interface) of the present invention showing an event type maintenance screen.

The next item on the left-hand column 408 is "Event Types" indicated by numeral 426. This directs the user to FIG. 20 where the event type screen is indicated by numeral 428. There is a drop-down input for the event type listed by numeral 430. Illustrative examples can include: "adding a new event type"; "qualifications review"; "first interview review"; "second interview review"; "third interview review"; "testing"; "send offer"; "upgrade offer"; "offer accepted"; "offer rejected"; and "withdraw offer". There is an input for the event type name, indicated by numeral 432, event abbreviation indicated by numeral 434 and a sort order indicated by numeral 436. There is a pushbutton input to add the event type indicated by numeral 438 once that name has been selected with an abbreviation and its position is determined within the sort order.

Figure 21:
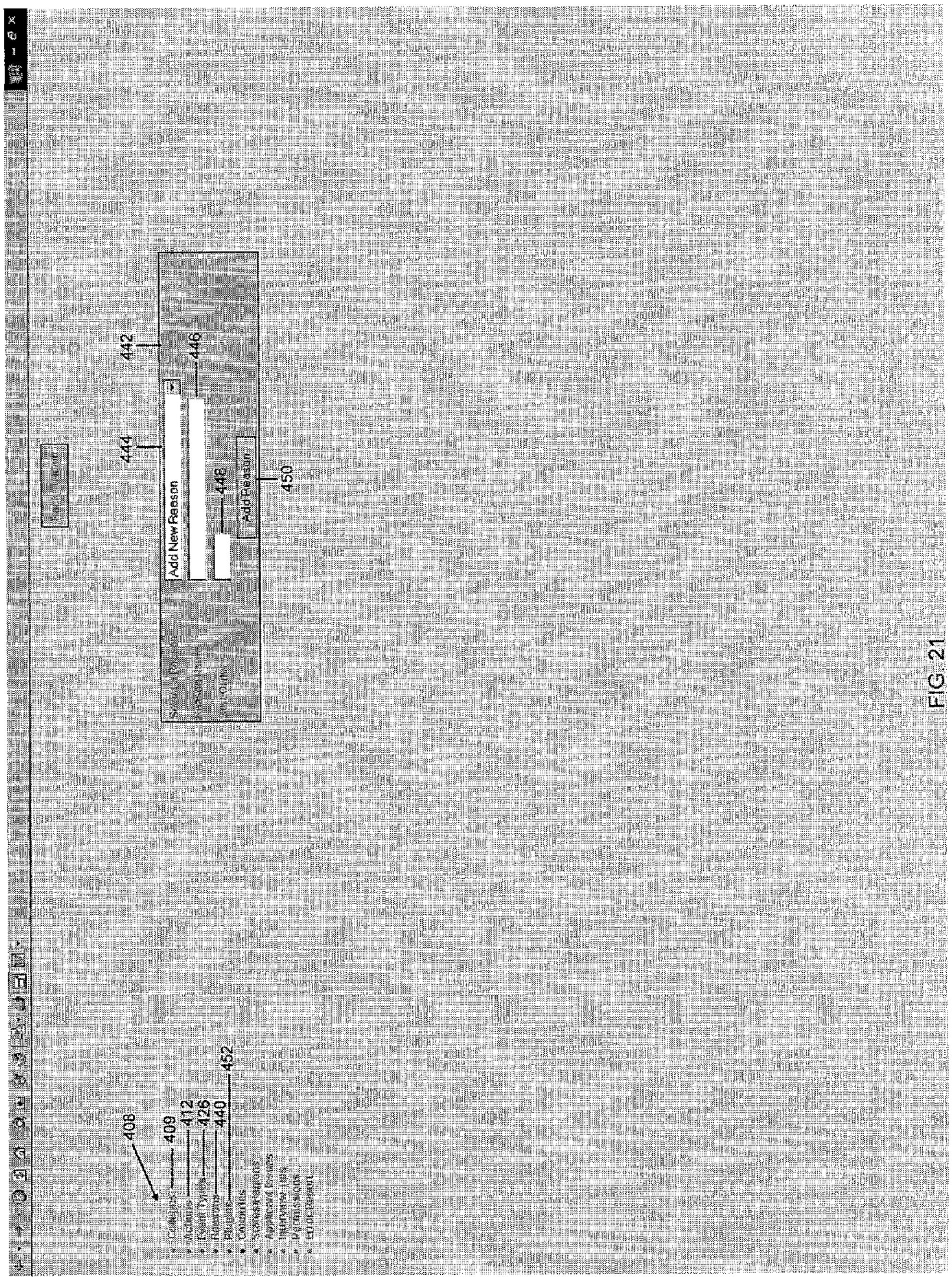
FIG. 21 illustrates an exemplary screen display (graphical user interface) of the present invention showing an actions maintenance screen.

The next item listed under column 408 is the "Reasons" indicated by numeral 440. Clicking on this link 440 directs the user to FIG. 21. The "Reasons screen" is generally indicated by numeral 442. Illustrative but non-limiting examples of the reasons could include: "see notes"; "highly qualified"; "qualified"; "not qualified"; "need additional information"; "information inconsistent"; "inadequate compensation"; "accepted another position"; "withdrew candidacy"; and "no show" or "no call". This is indicated by drop-down input 444.

Each name can be inputted through input 446 with a corresponding sort order listed in 448. The reason can be added through input pushbutton 450.

Figure 22:
FIG. 22 illustrates an exemplary screen display (graphical user interface) of the present invention showing a plug-ins maintenance screen.

The next item under column 408 is a "plug-ins" input 452 that directs user to FIG. 22 to the plug-in information screen indicated by numeral 454. There is a drop-down input for adding that allows the user to either add or select a plug-in such as employee evaluation or job search agent indicated by numeral 456. A plug-in description can be inputted in 458 with a pushbutton to add the plug-in indicated by numeral 460. Plug-ins provide subroutines or small programs that enhance the functionality and provide custom features.

Figure 23:
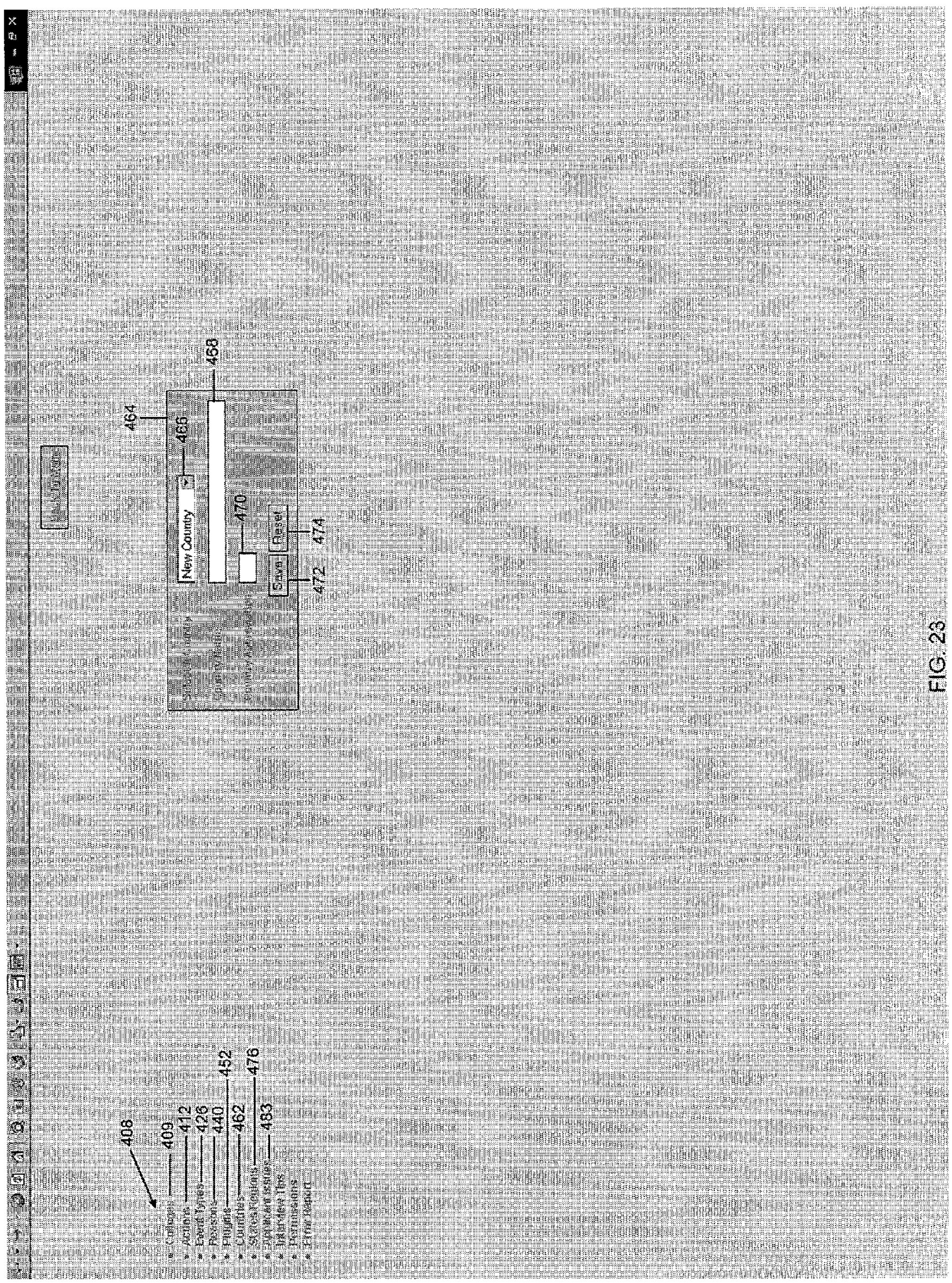
FIG. 23 illustrates an exemplary screen display (graphical user interface) of the present invention showing a countries maintenance screen.

The next item listed under column 408 is "countries" indicated by numeral 462, which directs the user to FIG. 23 to the countries selection screen indicated by numeral 464. This includes a drop-down selector input for selecting a country or creating a new country. Input 468 allows the user to type in a country name and input 470 allows the user to type in an abbreviation. This can be saved through pushbutton input 472 or cleared and reset through pushbutton 474.

Figure 24:
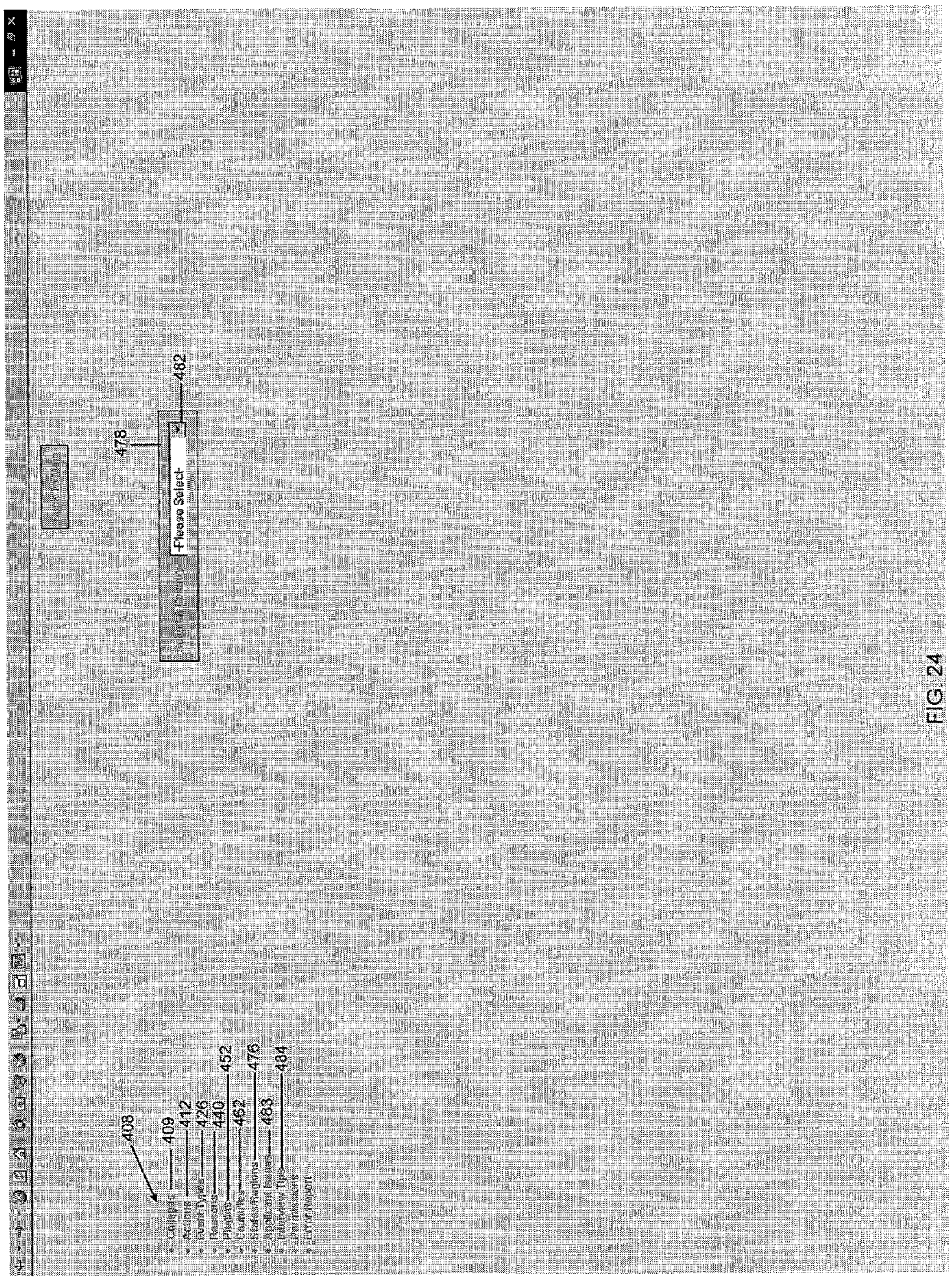
FIG. 24 illustrates an exemplary screen display (graphical user interface) of the present invention showing a countries maintenance screen.
Figure 25:
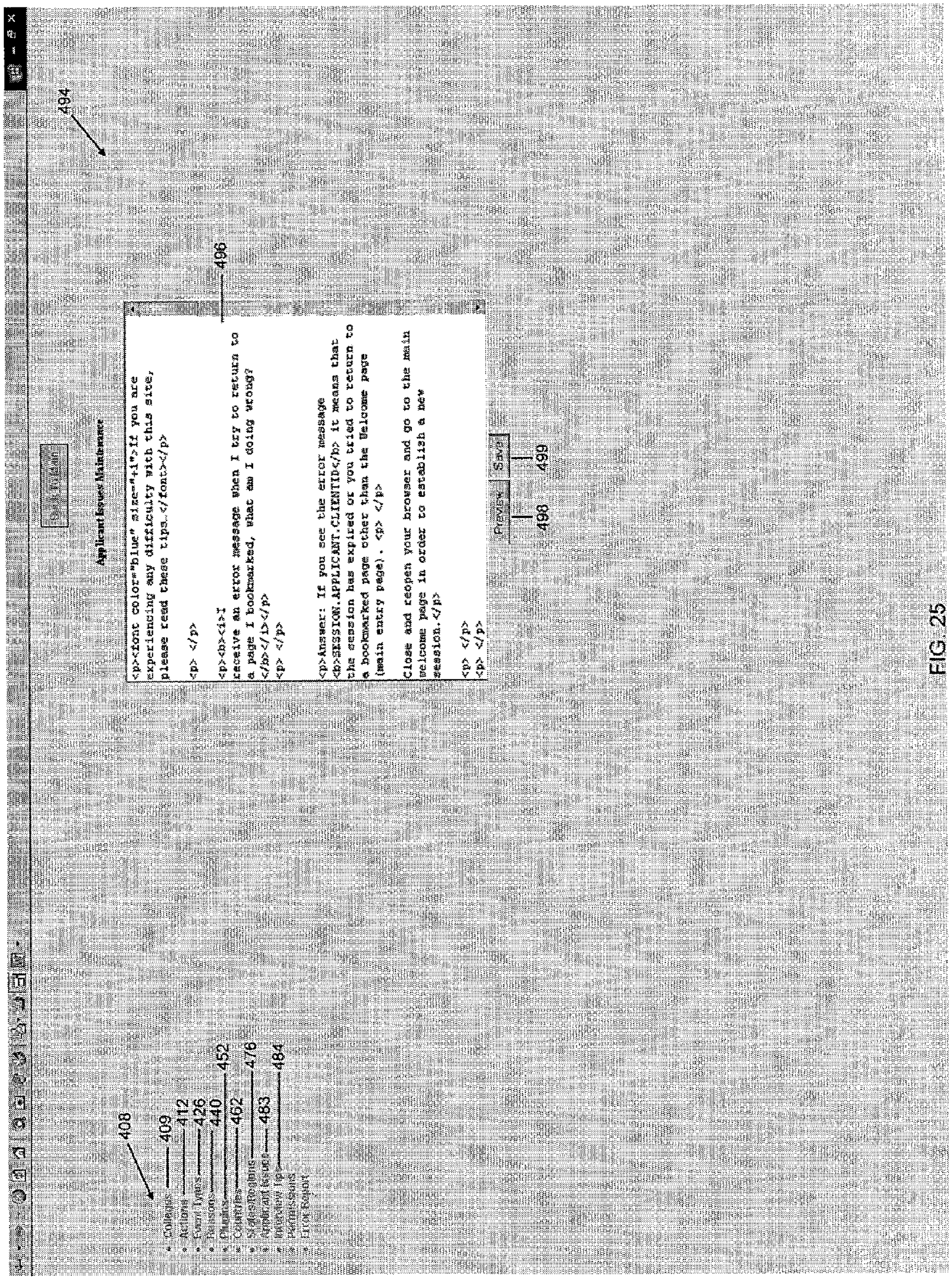
FIG. 25 illustrates an exemplary screen display (graphical user interface) of the present invention showing an applicant issues maintenance screen.

The user then is directed to column 408 again and can select the state or the region indicated by numeral 476 that directs the user to FIG. 24. This directs the user to the country selection screen indicated by numeral 478 which provides the drop-down country selector input 482 which includes a representative list of countries such as Australia, Canada, Ireland, United Kingdom, and United States among other countries.

The next maintenance item under column 408 is an "applicant issues" indicated by numeral 483 which directs the user to an "applicant issues" maintenance screen indicated by numeral 494 with an entire listing of inputs received by the user seen through a scroll down output indicated by numeral 496. This provides a question and answer type of material, which can be previewed through input 498 with additional material, typed in and saved through input 499.

Figure 26:
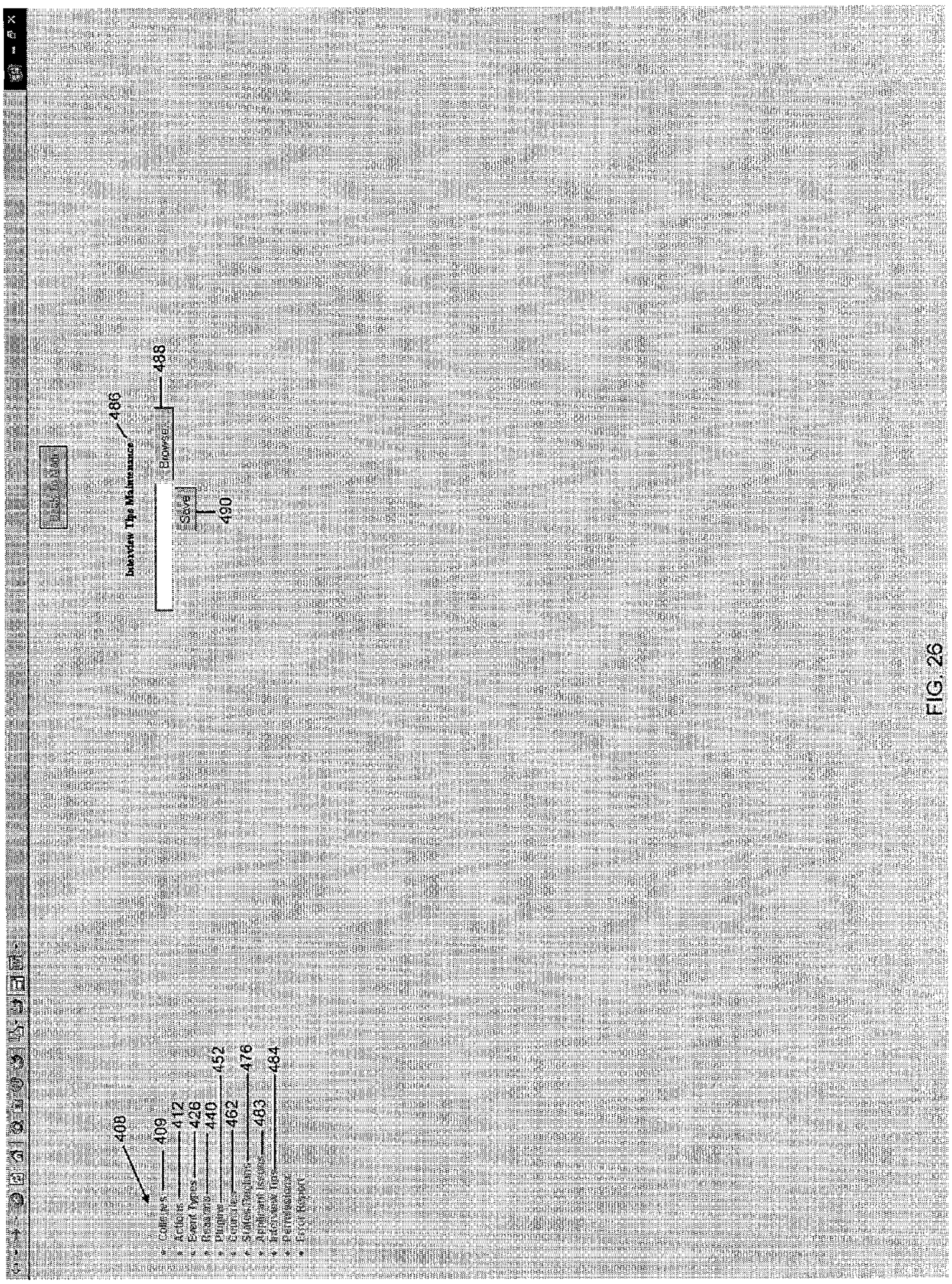
FIG. 26 illustrates an exemplary screen display (graphical user interface) of the present invention showing an interview tips maintenance screen.

The next item under column 408 is "interview tips" indicated by numeral 484 which directs the user to FIG. 26 which is "interview tips" maintenance, as generally indicated by 486. There is a browse pushbutton function 488 to allow the user to retrieve a particular file that includes interview tips. These interview tips can be saved through the save pushbutton input as indicated by numeral 490.

Figure 27:
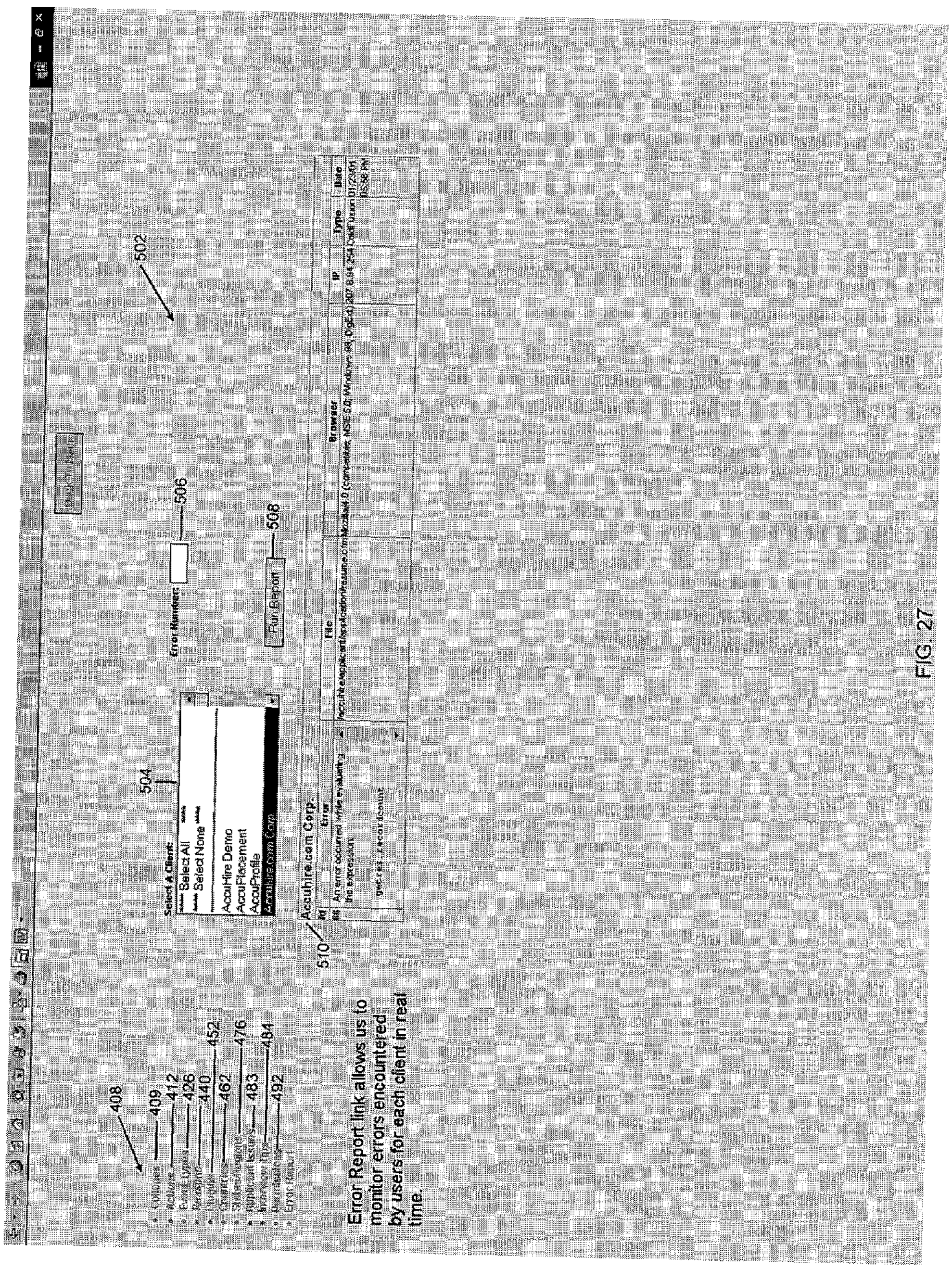
FIG. 27 illustrates an exemplary screen display (graphical user interface) of the present invention showing an error report maintenance screen.

The last maintenance item is an "error report" indicated by numeral 492 under column 408 which directs the user to FIG. 27. There is an error report generally indicated by numeral 502 with a scroll down client selection screen 504. The user can input a specific type of error number 506 and run the report with a pushbutton input indicated by numeral 508. The actual error report is listed under screen 510 with a scroll down output.

Figure 28:
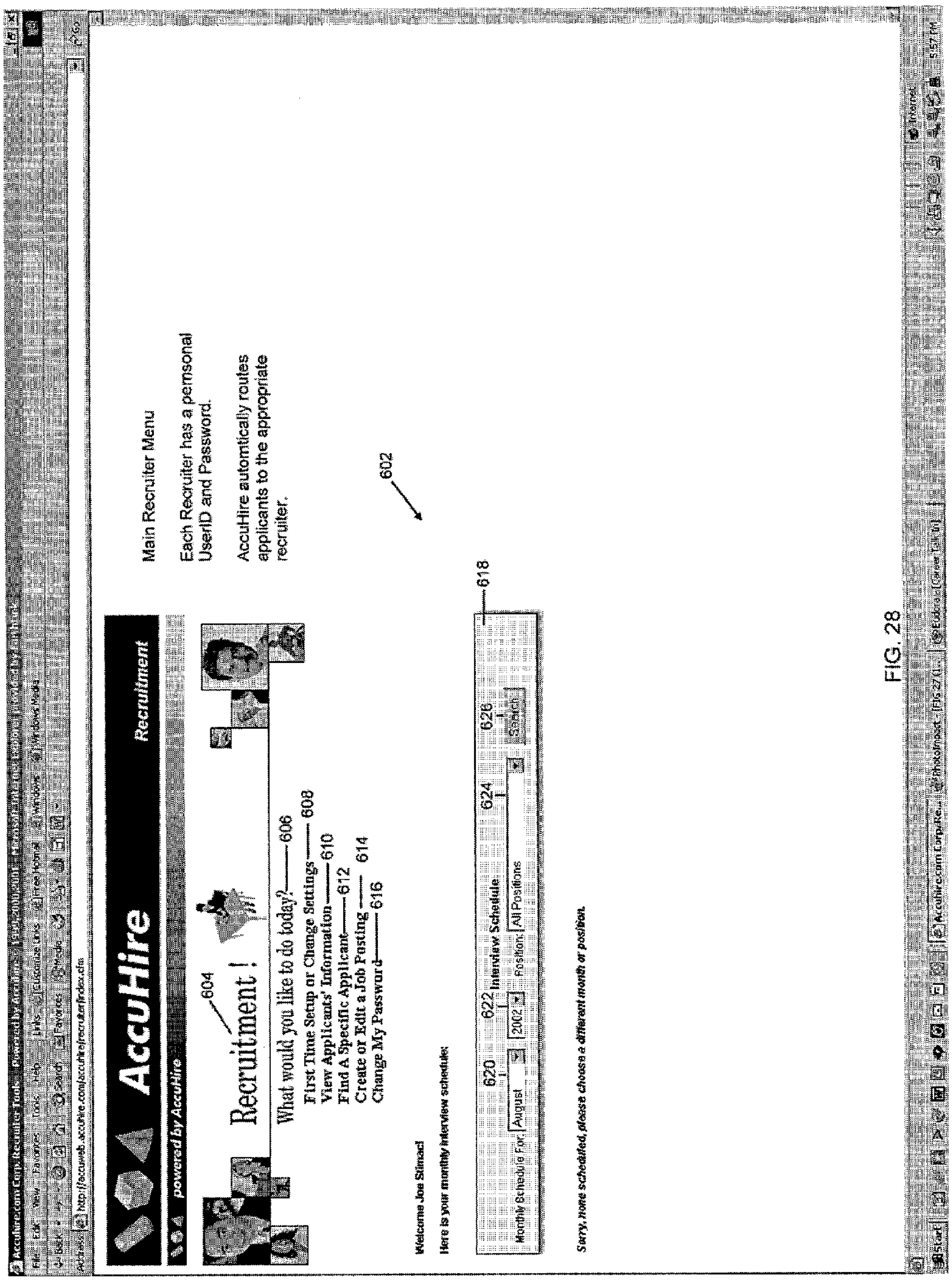
FIG. 28 illustrates an exemplary screen display (graphical user interface) of the present invention showing a main recruitment screen.

Referring now to the main recruitment screen, as generally indicated by numeral 602 on FIG. 28. There is a "Recruitment!" heading indicated by numeral 604 with a query as to "What would you like to do today?" indicated by numeral 606. The first functional hyperlink is entitled "First time Setup or Change Settings" link function as indicated by numeral 608. The next link function is "View Applicants' Information" as indicated by numeral 610. The third link function is "Find a Specific Applicant" as indicated by numeral 612. The fourth link function is "Create or Edit a Job Posting" indicated by numeral 614, and the fifth link function is to "Change my Password" indicated by numeral 616. There is an interview scheduling search function indicated by numeral 618 in which a month through a drop-down selector can be indicated by input function 620, the year through another drop-down selection process through input 622.

There is a drop-down input 624 for selecting positions, including one for "all positions", and there is a pushbutton input 626 for performing the search function.

Figure 29:
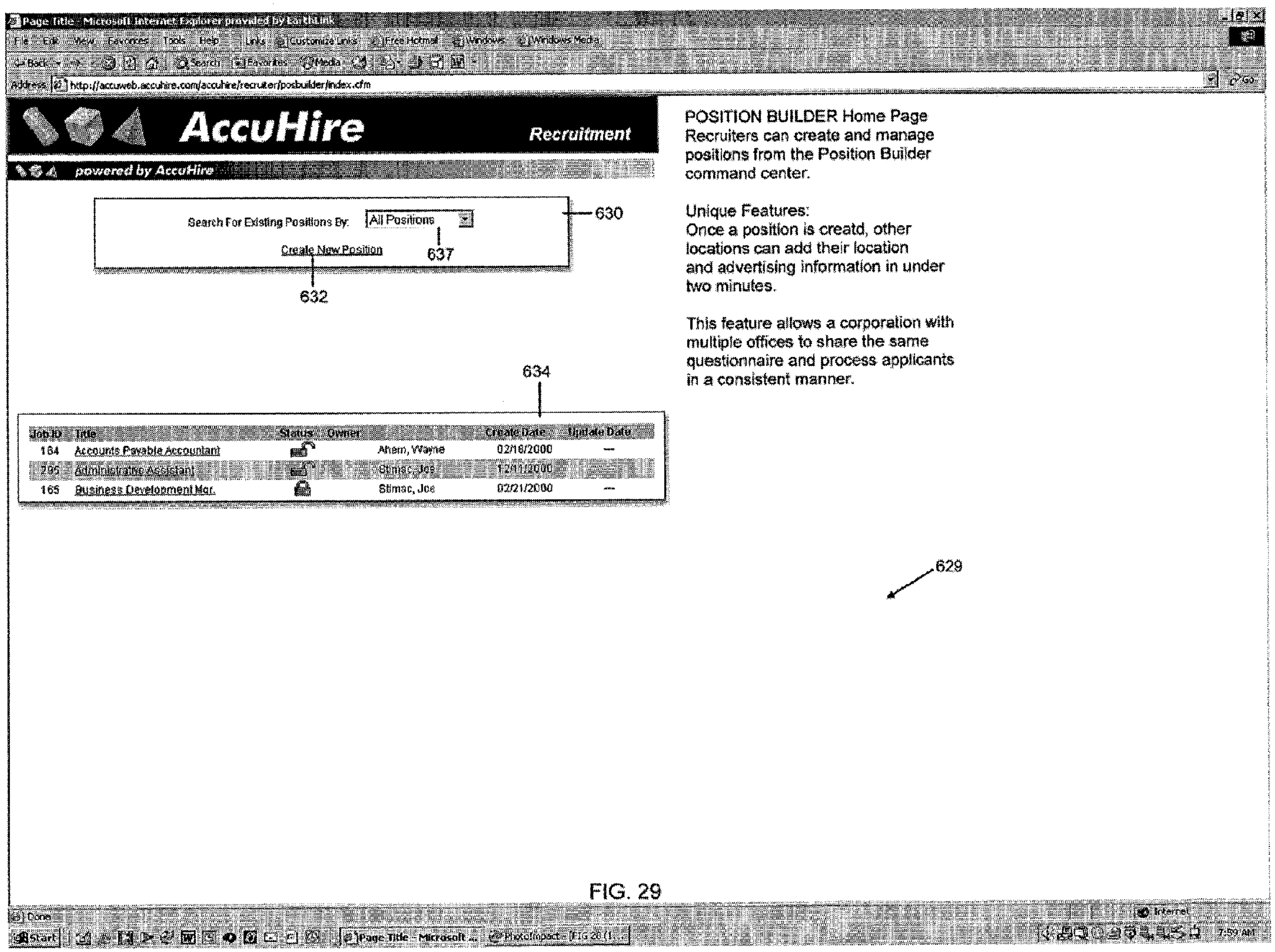
FIG. 29 illustrates an exemplary screen display (graphical user interface) of the present invention showing a job search results screen.
Figure 30:
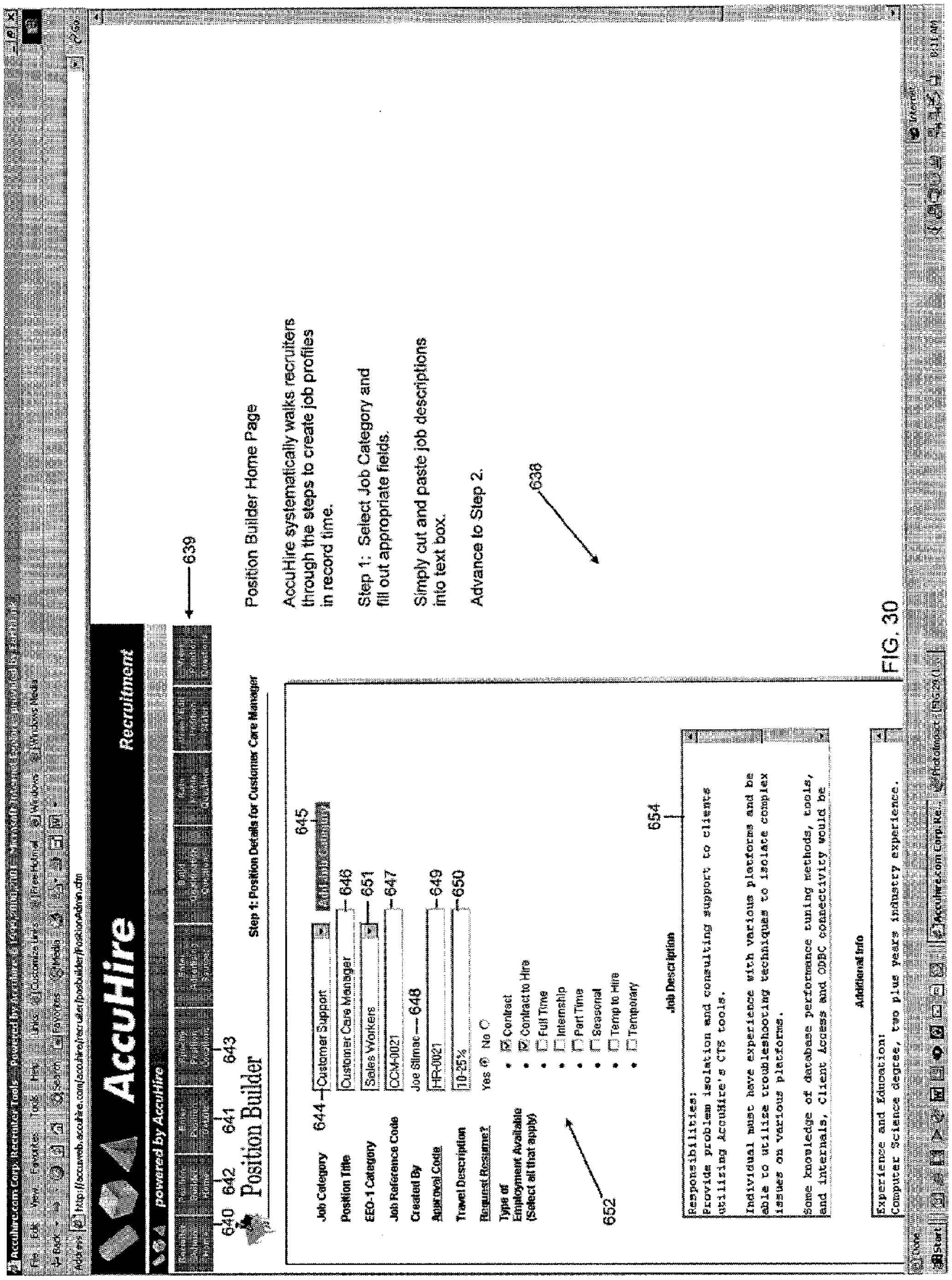
FIG. 30 illustrates an exemplary screen display (graphical user interface) of the present invention showing a position builder main screen.

Upon performing the search function indicated by pushbutton input 626, it directs the user to a search results screen generally indicated by numeral 629 on FIG. 29. There is a search bar 630, which allows the user to search a particular position, or for all positions through drop-down input 632. The search results are listed in output 634. An example of a non-limiting listing of position information could include the "position", "status", "owner", "the creation date" and the "update date". By clicking on the Create New Position link indicated by numeral 637 directs the user to Position Builder home screen generally indicated by numeral 638 on FIG. 30. There is a power bar of pushbutton inputs that directs the user to various functions. This is generally indicated by numeral 639. There is a link input 640, which directs the user to the main recruitment page indicated by FIG. 28. There is also a Position Builder Home link, which will result in the user viewing the screen shown on FIG. 30. In the Position Builder function, the first step is to select a job category through a drop-down input, indicated by numeral 644. There is a link to add a job category indicated by numeral 645. There is an input for the position title indicated by numeral 646 and a Job Reference Code can be inputted through input 647. There is an indication of the individual that created the position indicated by numeral 648, followed by an input for an approval code indicated by numeral 649. There is also an input for a percentage of travel required for the position indicated by numeral 650. There is also a click-on type of input for the type of employment that is available. Non-limiting examples could include: "contract"; "contract for hire"; "full time"; "internship"; "part time"; "seasonal"; "temporary to hire"; and "temporary". A comprehensive description of the job can be listed on scroll-down output listing 654.

Figure 30A:
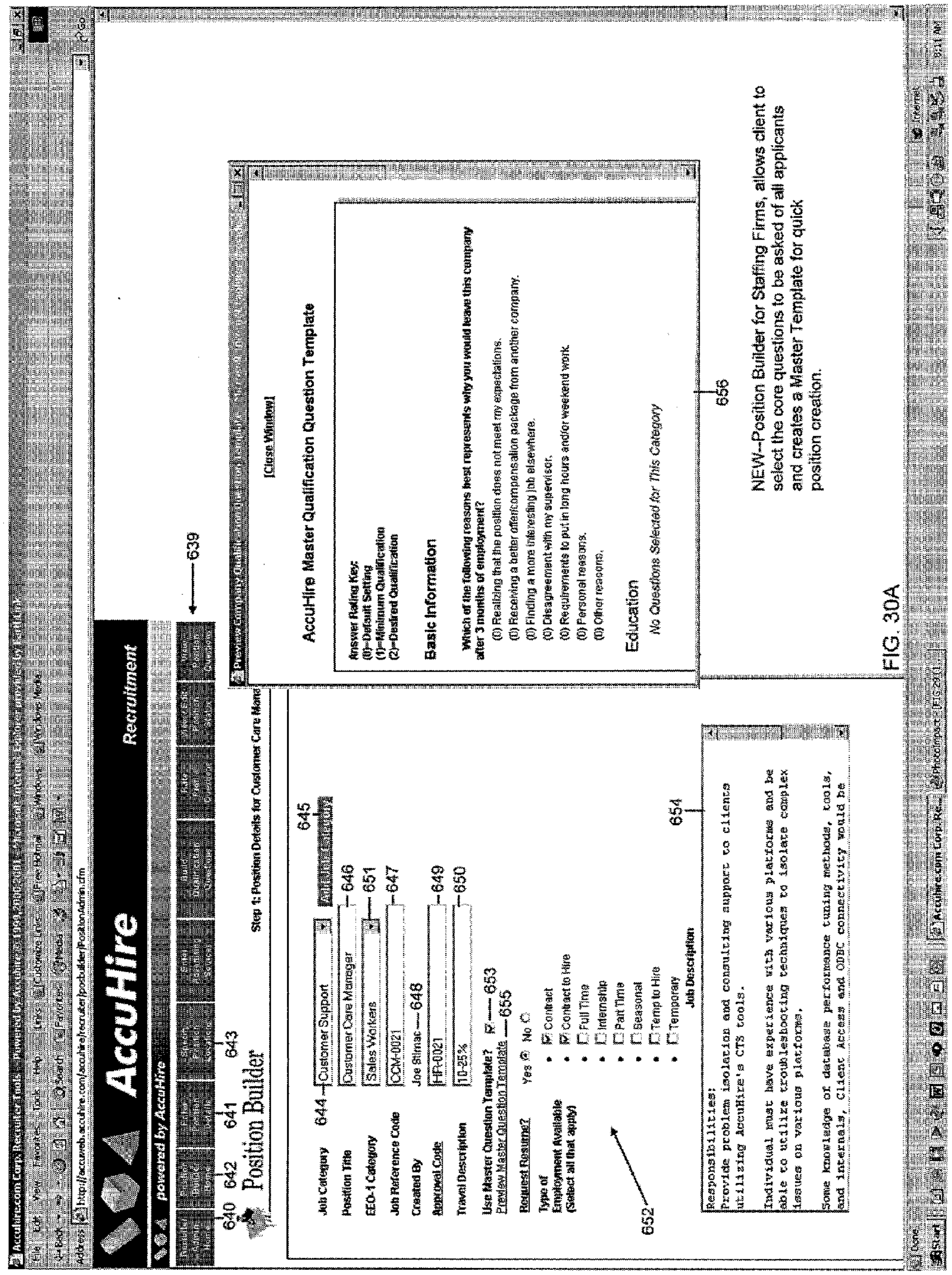
FIG. 30A illustrates an exemplary screen display (graphical user interface) of the present invention showing a position builder main screen with a master qualification question template.
Figure 31:
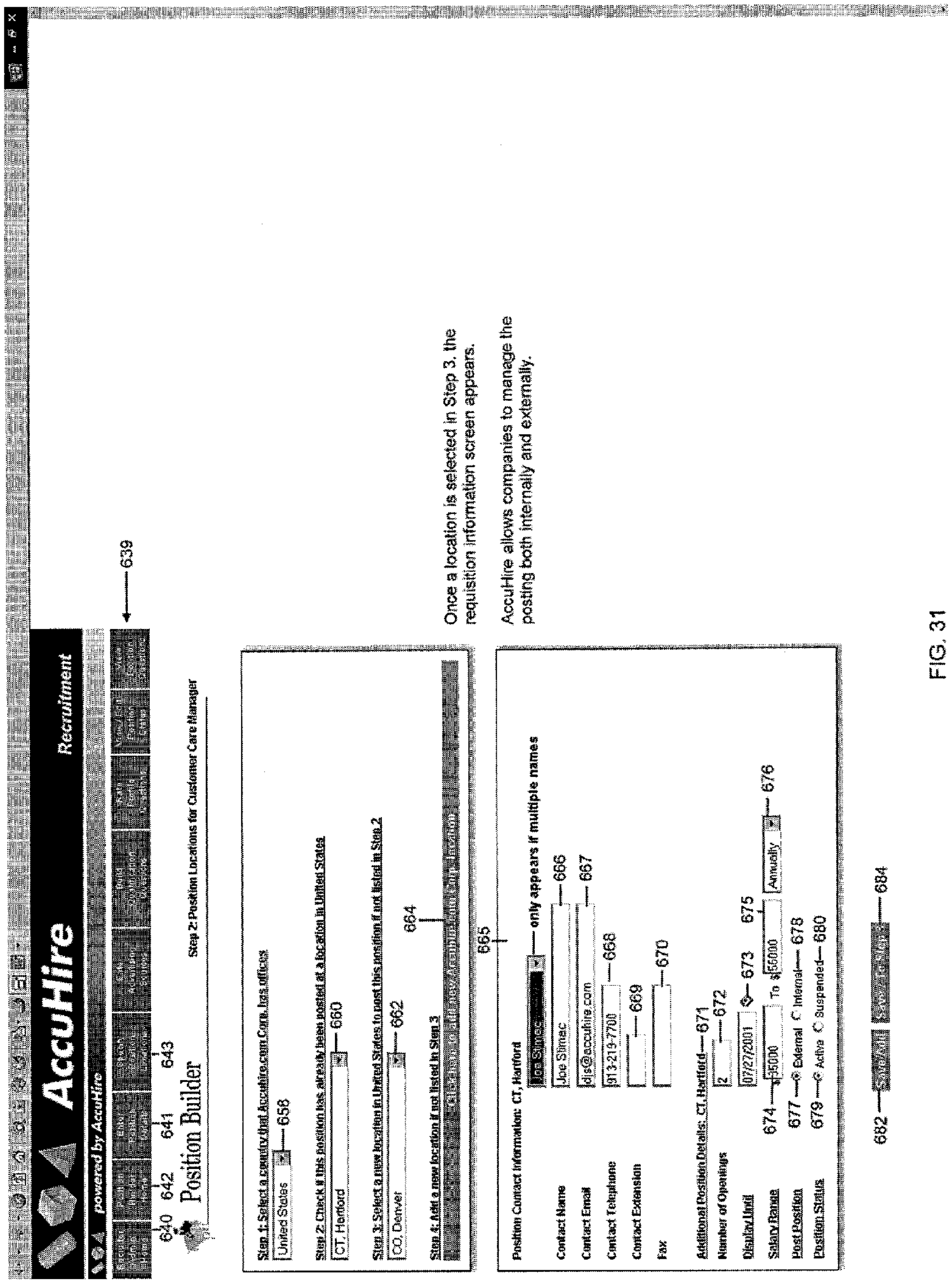
FIG. 31 illustrates an exemplary screen display (graphical user interface) of the present invention showing a position builder main screen with a location and contact information.

Referring now to FIG. 30A, is the option to enter Equal Opportunity Employment category indicated by numeral 651, as well as a click-on input to use the master question template 653 with a link to preview the master question template 655 as also shown on this main position builder graphical user interface screen. Clicking on the master question template input 655 reveals a preview screen 656. There is an answer-rating key, which would qualify these questions as: "a desired qualification"; "minimum qualification"; or merely a "default setting". The bottom part of this Screen includes selecting a country, which the user's organization has offices, inputted through a drop-down menu indicated by numeral 658 found on FIG. 31. The next step is to determine if this position has already been posted which is found by inputting a drop-down menu 660. If this is a new location that has not previously been listed, then this information can be inputted through drop-down menu 662. Adding a new location to your organization can be done by clicking on input button 664.

The position contact information is under a heading under numeral 665. The contact name is inputted as indicated by numeral 666 with the contact e-mail inputted by numeral 667. The inputs for the contact telephone number, contact extension and facsimile numbers are indicated by numerals 668, 669 and 670, respectively. There is a heading for additional position details indicated by numeral 671. There is an input for the number of possible openings indicated by numeral 672. There is an input for how long this job opening should be displayed indicated by numeral 673. This also includes a calendar function so that a date can be selected from a calendar. There is an input to form a beginning salary range 674 and ending salary range 675 with a drop-down menu to provide the basis for the salary indicated by numeral 676. The user can determine whether this position is posted externally through input 677 or internally through click-on input 678. It can also be activated through clicking on input 679 or held in a suspended state through input 680. This information can be saved or added through pushbutton input 682 or saved and then the user is directed to determining the marketing sources for the position through pushbutton input 684. The power bar selection 639 also allows you to enter position details by clicking on numeral 641, such as that found on FIG. 30A. Specify the Position Locations found on FIG. 30 can be accessed directly through pushbutton input 643 on power bar 639 which directs the user to inputs 658, 660, 662 and 664 as indicated on FIG. 31.

Figure 32:
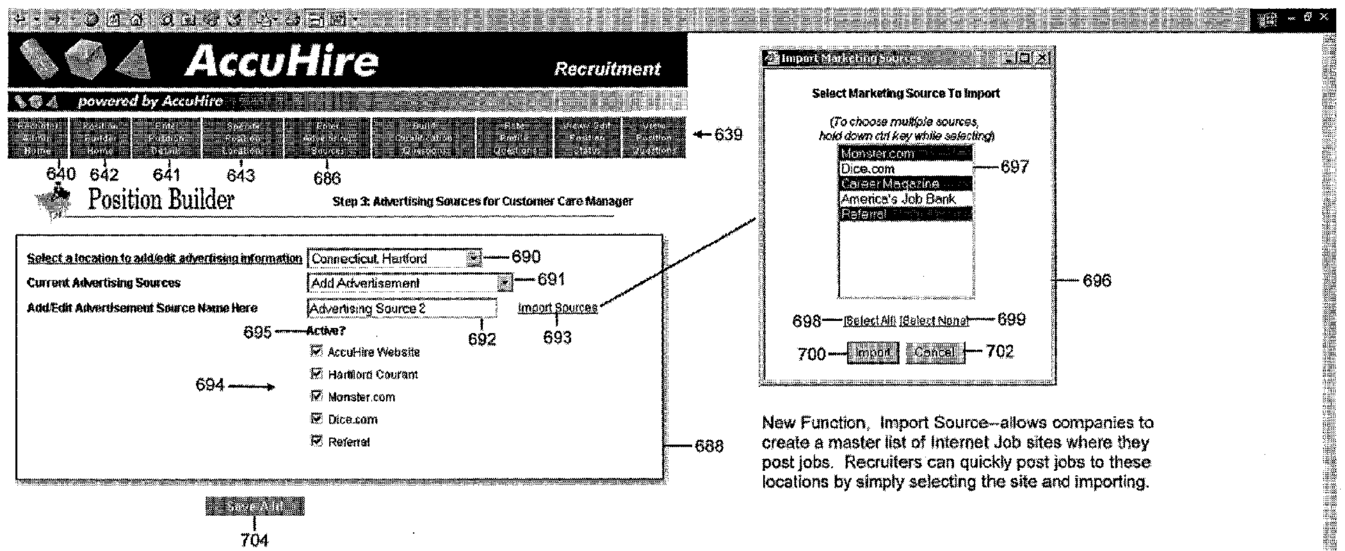
FIG. 32 illustrates an exemplary screen display (graphical user interface) of the present invention for indicating marketing sources associated with a specific position.
Figure 33:
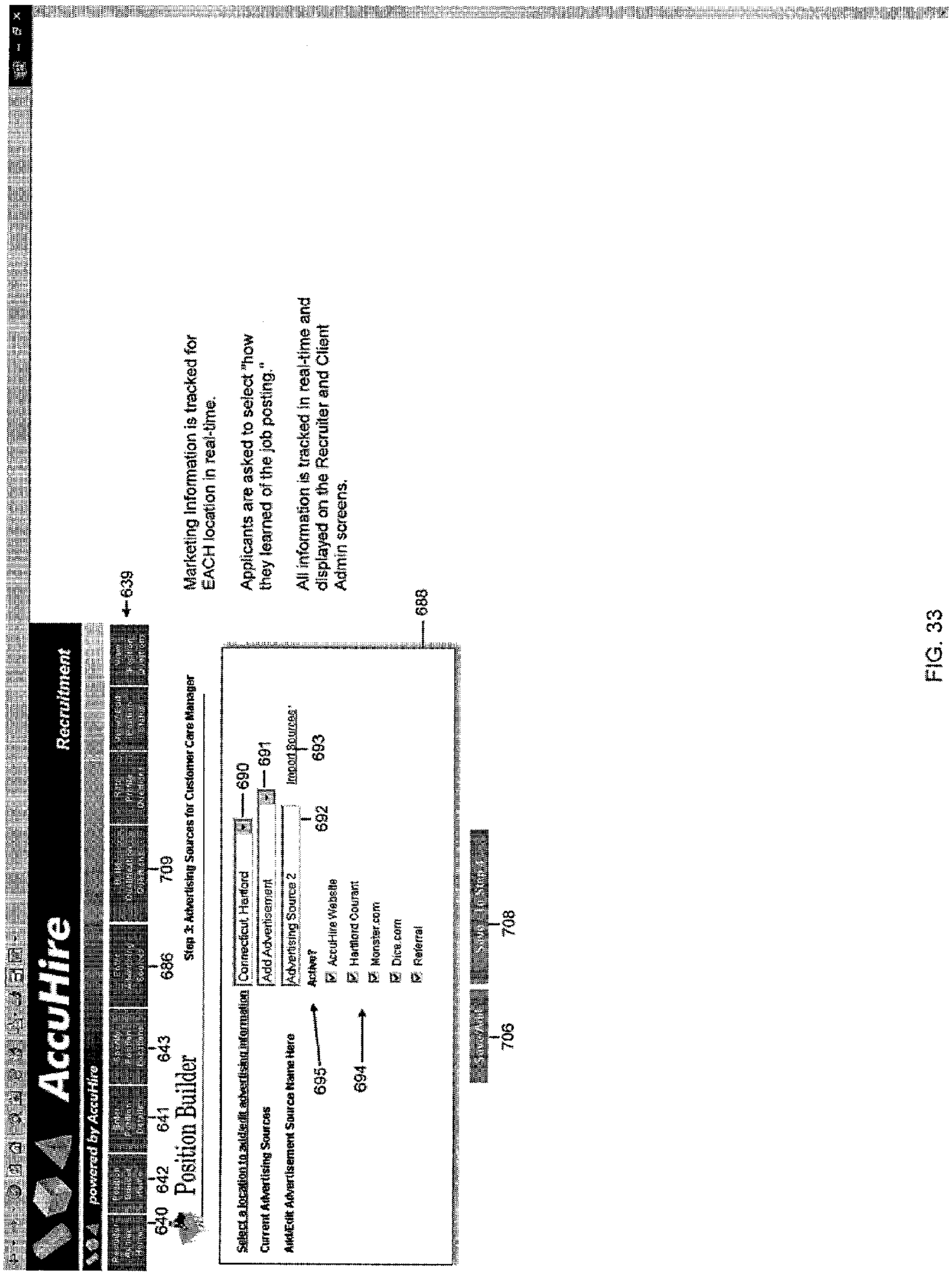
FIG. 33 illustrates an exemplary screen display (graphical user interface) of the present invention for indicating marketing sources, as shown in FIG. 32, with editing capacity for selected positions with marketing sources.

Pushbutton input 684 saves the information and then goes to the next step, which is to enter the marketing sources, shown in FIG. 32. This can also be accessed through pushbutton 686 located on the power bar indicated by numeral 639. The "marketing sources" screen is generally indicated by numeral 688 and includes the drop-down input 690 for indicating the location. There is another drop-down input for indicating the marketing source, indicated by numeral 691. This input also provides the user with an opportunity to add an advertising source. There is an input in which the advertisement name can be inputted as indicated by numeral 692 and a link function 693 to import sources for marketing job positions. There is a column to determine which publication is active indicated by numeral 695 in which the user can provide a click-on input next to the publication that is used with the entire listing generally indicated by numeral 694. When the link 693 to import sources is clicked, the "Marketing Source to Import" screen appears, indicated by numeral 696. A complete listing of want ad sources are listed under numeral 697 with an input to select all of them indicated by numeral 698 or an input to select none of them indicated by numeral 699. Clicking on pushbutton input 700 imports the source to the position builder 688 or it can be canceled through pushbutton input 702. Information can be saved through input 704, which will list the job position with selected marketing sources as shown in FIG. 33, which includes the drop-down input for the location 690, the marketing sources with the ability to add an advertisement 691 and the specific name of the advertisement indicated by numeral 692. There is a complete listing of specific advertisements indicated by numeral 694 with a column for inputting through a mouse whether this advertisement is active, indicated in column 695.

Figure 34:
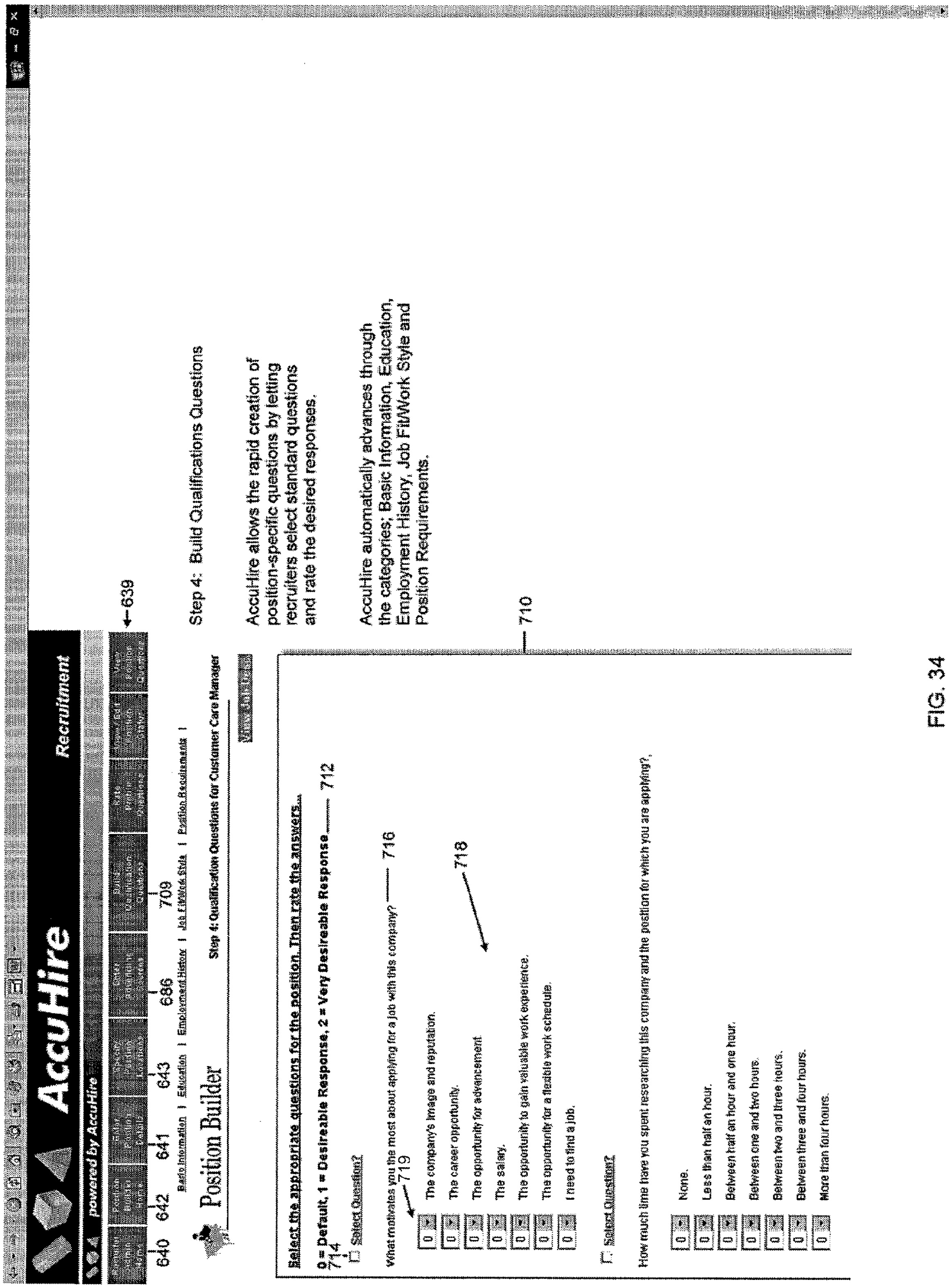
FIG. 34 illustrates an exemplary screen display (graphical user interface) of the present invention for rating answer associated with profile questions.

This information can be saved or augmented through pushbutton input 706 or saved with the users directed to the next step of creating qualification questions for a recruiter or a person in human resources, found on FIG. 34. This can also be accessed through pushbutton input 709, which is part of the power bar indicated by numeral 639. The step of determining qualification questions and rating answers is generally indicated by numeral 710. In this illustrative, but nonlimiting example, the answers can be ranked as to whether or not response is a "default value" or is a necessary "minimum qualification" or a "desired qualification", as numbers 0, 1 and 2 respectively, as indicated by numeral 712. There is a click-on input indicated by numeral 714 as to whether or not a particular question should be selected. The question is listed as indicated by numeral 716. This allows the rapid creation of position-specific questions by allowing recruiters or human resource personnel to select appropriate questions and rate the desired responses. It advances through numerous categories, such as, but not limited to: "basic information"; "education"; "employment history"; "job fit/work style"; and "position requirements". Potential responses are indicated by numeral 718, while associated with each one is a drop-down input which allows you to rate the answers in accordance with the desired response indicated by numeral 719. There are links that direct the recruiter to the "basic information", indicated by numeral 720, "education" 721, "employment history" 722, "job fit/work style" 723 and "position requirements" 724 as shown on FIG. 35.

Figure 35:
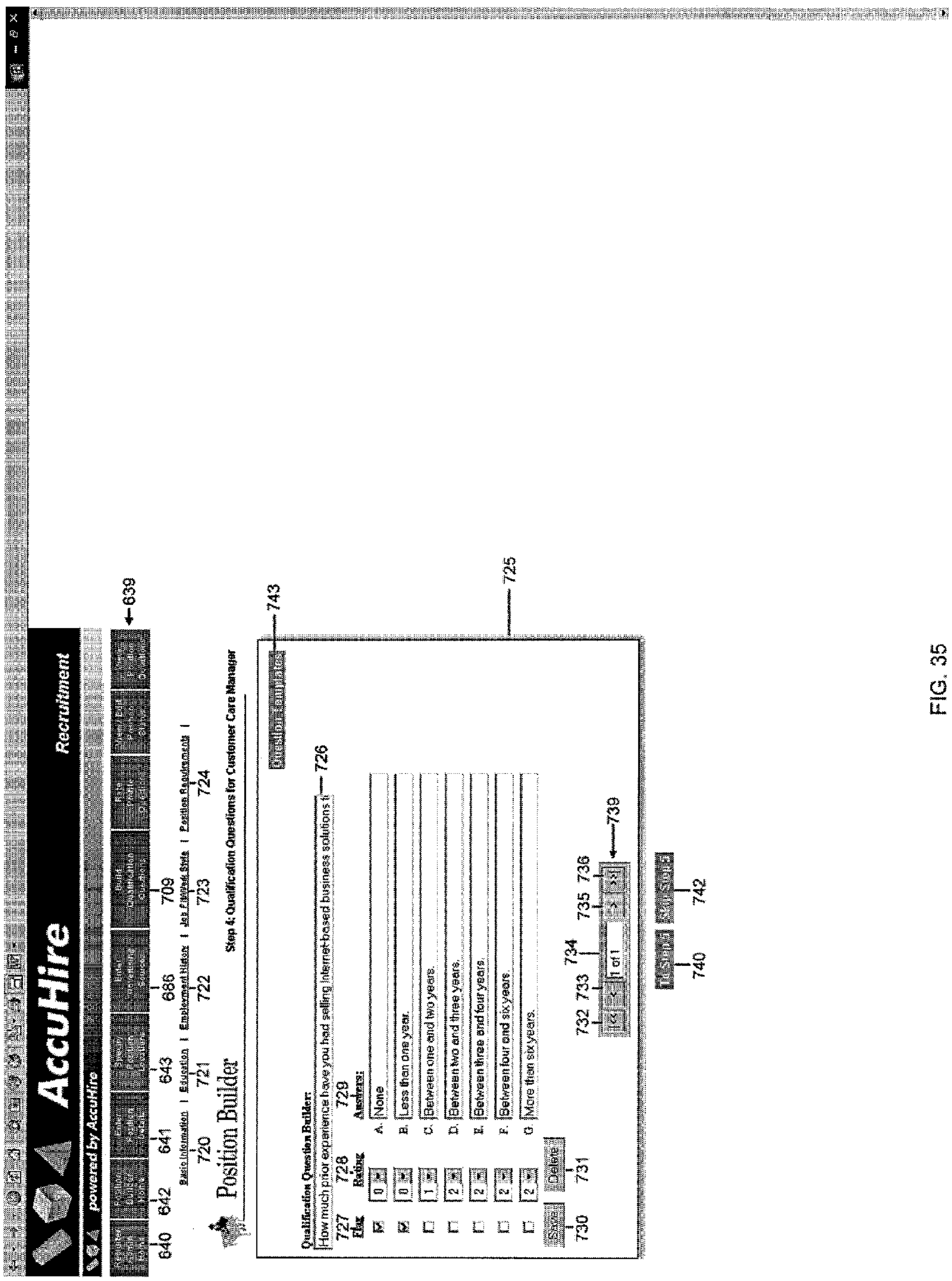
FIGS. 35 and 35A illustrate an exemplary screen display (graphical user interface) of the present invention including a question template utilized in building a position.
Figure 35A:
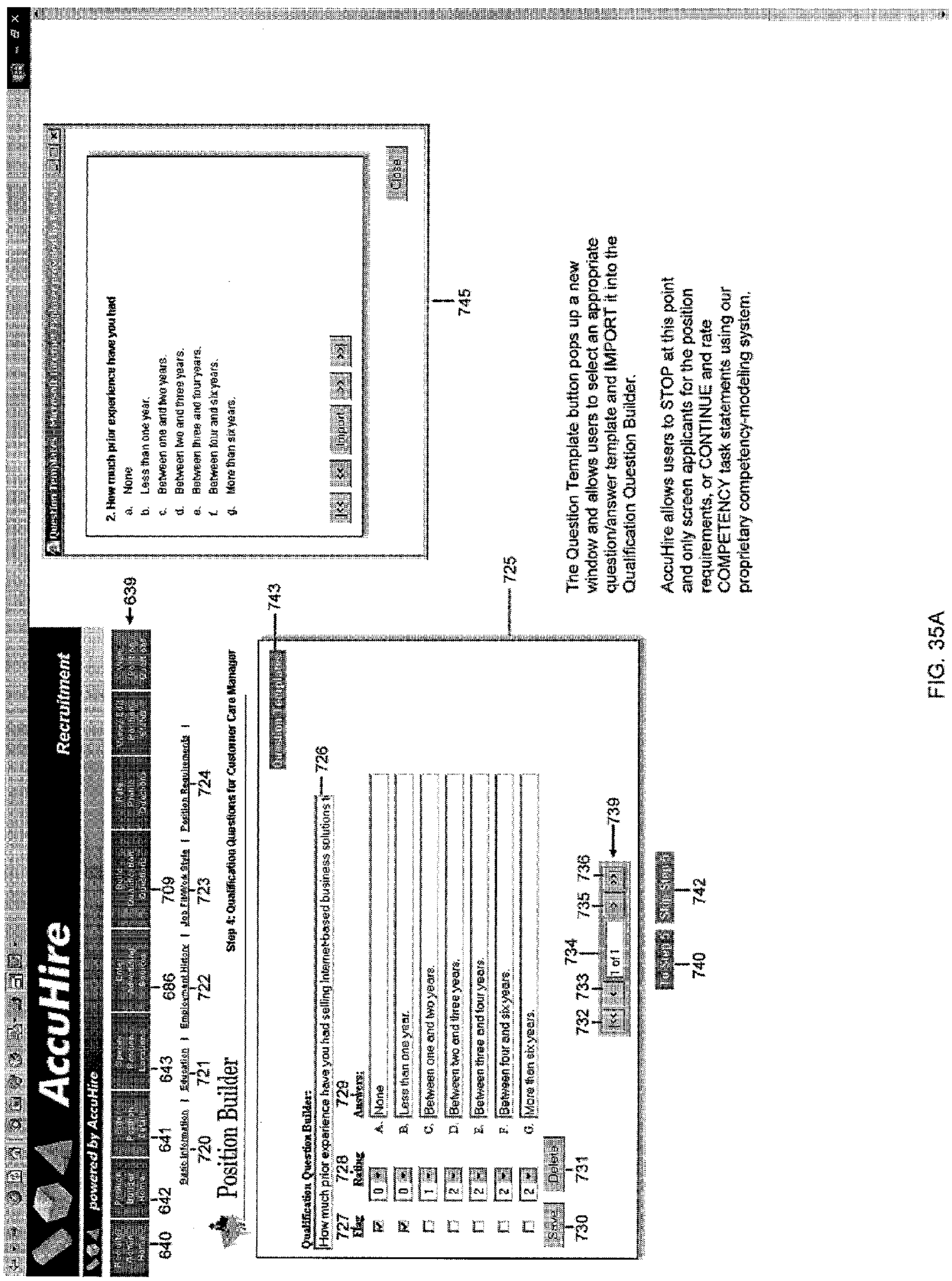
Figure 36:
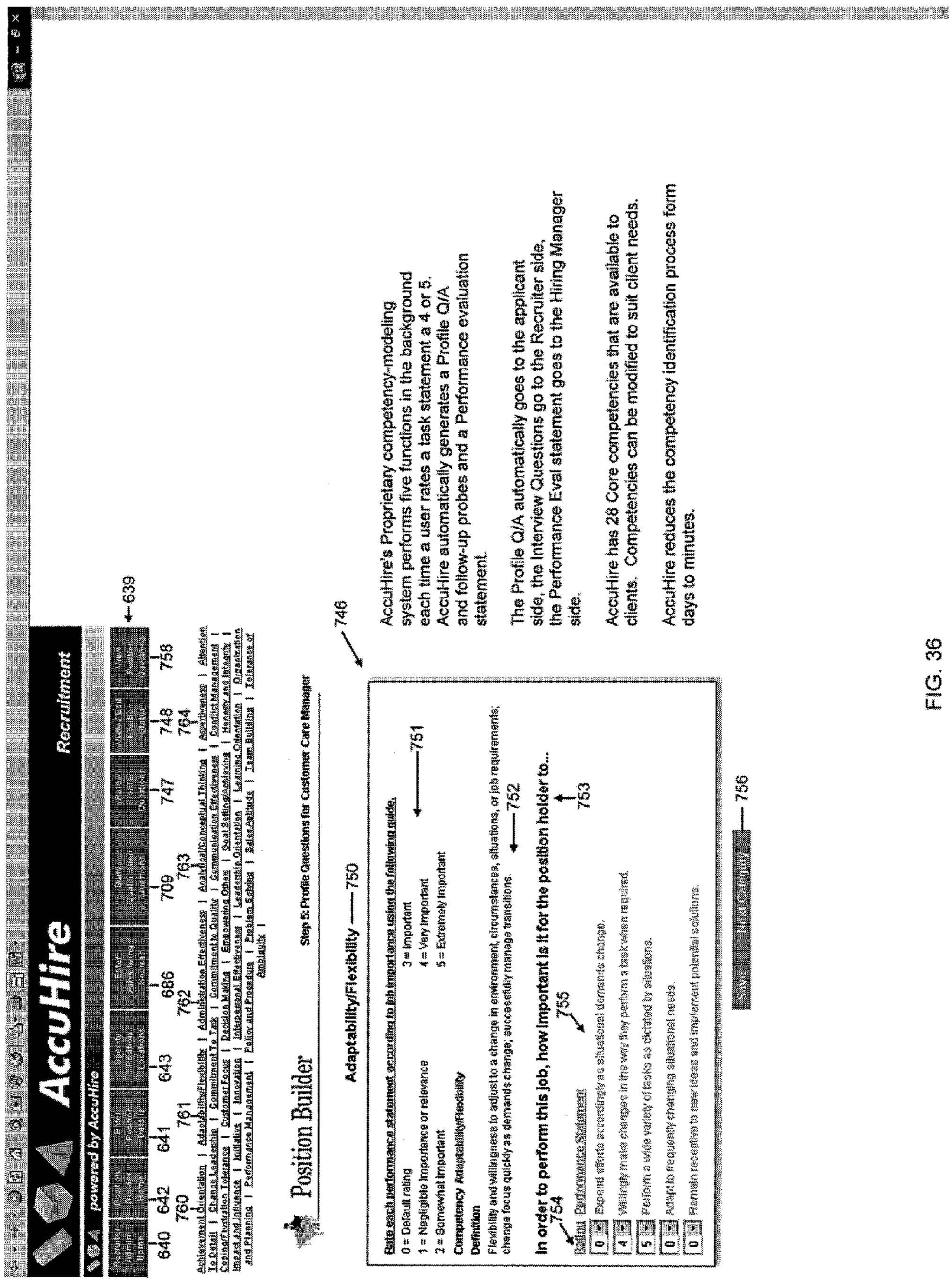
FIGS. 36 and 36A illustrate an exemplary screen display (graphical user interface) of the present invention for rating answers to job profile questions.
Figure 36A:
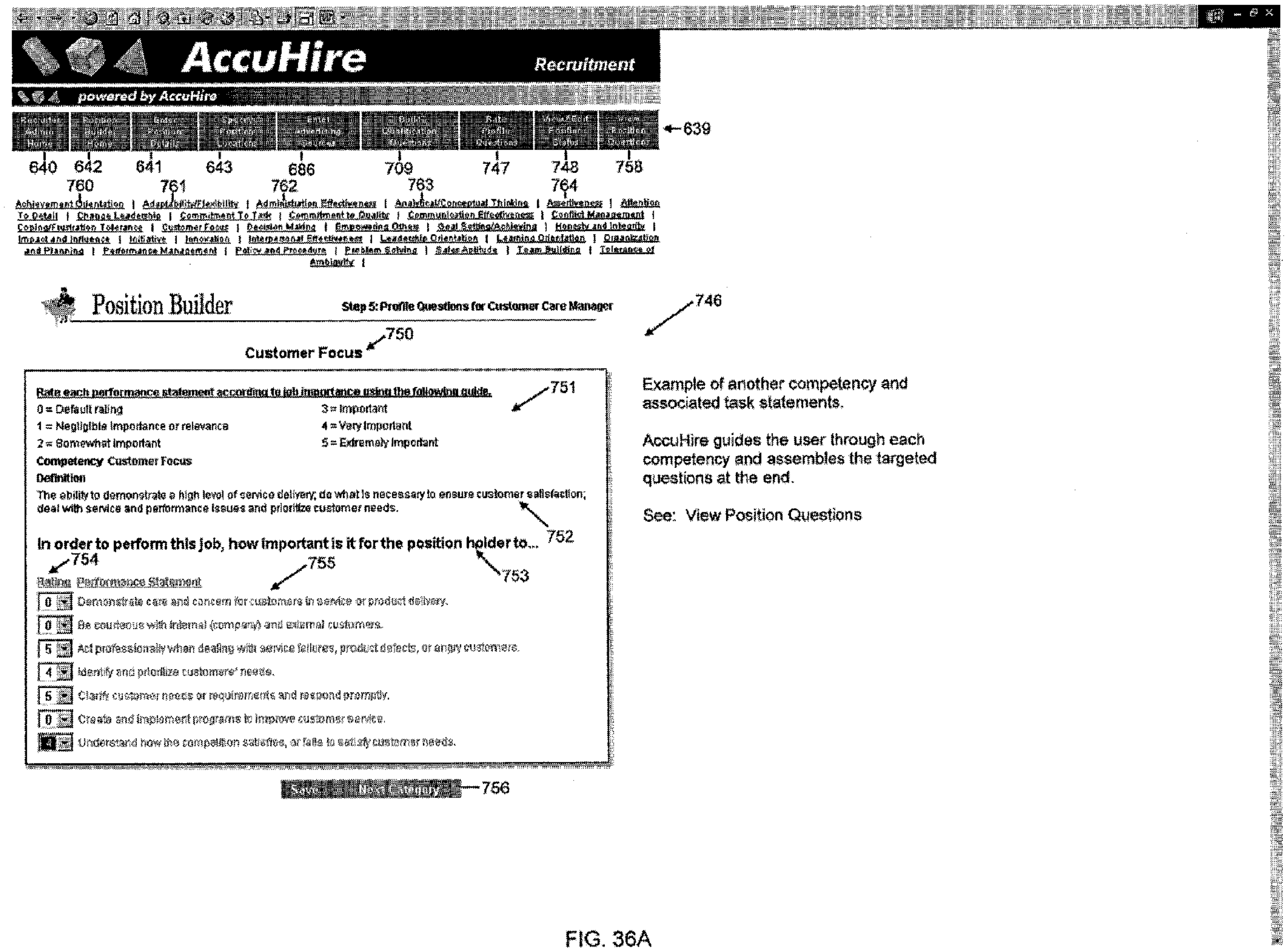

As also shown in FIG. 35, the question template is generally indicated by numeral 725 that allows importation into position builder screen indicated by numeral 710 on FIG. 34. There is an input for the specific question 726 and a column in which the user can click-on a flag for a particular response, indicated by numeral 727. The next column is a rating response through a series of drop-down inputs indicated by numeral 728. A non-limiting example of these ratings would be "0" for "default", "1" for a "minimum qualification" and "2" for a "desired qualification". Column 729 indicates the respective answers. This information can either be saved through input pushbutton 730 or deleted through input pushbutton 731. The templates can be shifted to numerous screens through a question set-shifting device generally indicated by the numeral 739. This includes going to the initial set of questions with associated answers 732, incrementing backwards one set of answers 733, outputting the set of answers and question that the user is on 734, incrementing forward one set of answers 735 and going to the very last set of answers and associated responses 736. There is a pushbutton input 740 to direct the user to the profile question development on FIG. 36A or there is pushbutton 742 where the user can bypass that step and go directly to FIG. 38, which locks the position down.

By clicking on the "question template" indicated by numeral 730 opens up a new window indicated by 745 which is a question template that allows you to import it into the question builder as shown in FIG. 35. The user can stop at this point and only screen applicants for the position requirements or continue with the applicant based on competency task statements. This screen can also be accessed through the rate profile questions pushbutton 747 on pushbutton bar 639. This ranking of profile questions for an account executive is found on FIG. 36. It is generally indicated by numeral 746. Referring now to both FIGS. 36 and 36A, where numeral 750 refers to a specific competency. A list of rankings under job importance is found under numeral 751. Nonlimiting examples would include: "0" as the "default" rating; "1" as "negligible importance or relevance"; "2" as "somewhat important"; "3" as "important"; "4" as "very important"; and "5" as "extremely important". A definition of that particular competency is indicated by numeral 752. In this example, it is "adaptability/flexibility" in FIG. 36 and customer focus in FIG. 36A. A heading of a statement "In order to perform this job, how important is it for the position holder to . . . " is listed by numeral 753. A column with drop-down input selections for the performance numbers listed in 751 is inputted under column 754. This specific performance statement is listed under column 755. This information can be saved or the user can then go on the next category with the pushbutton indicated by numeral 756.

Figure 37:
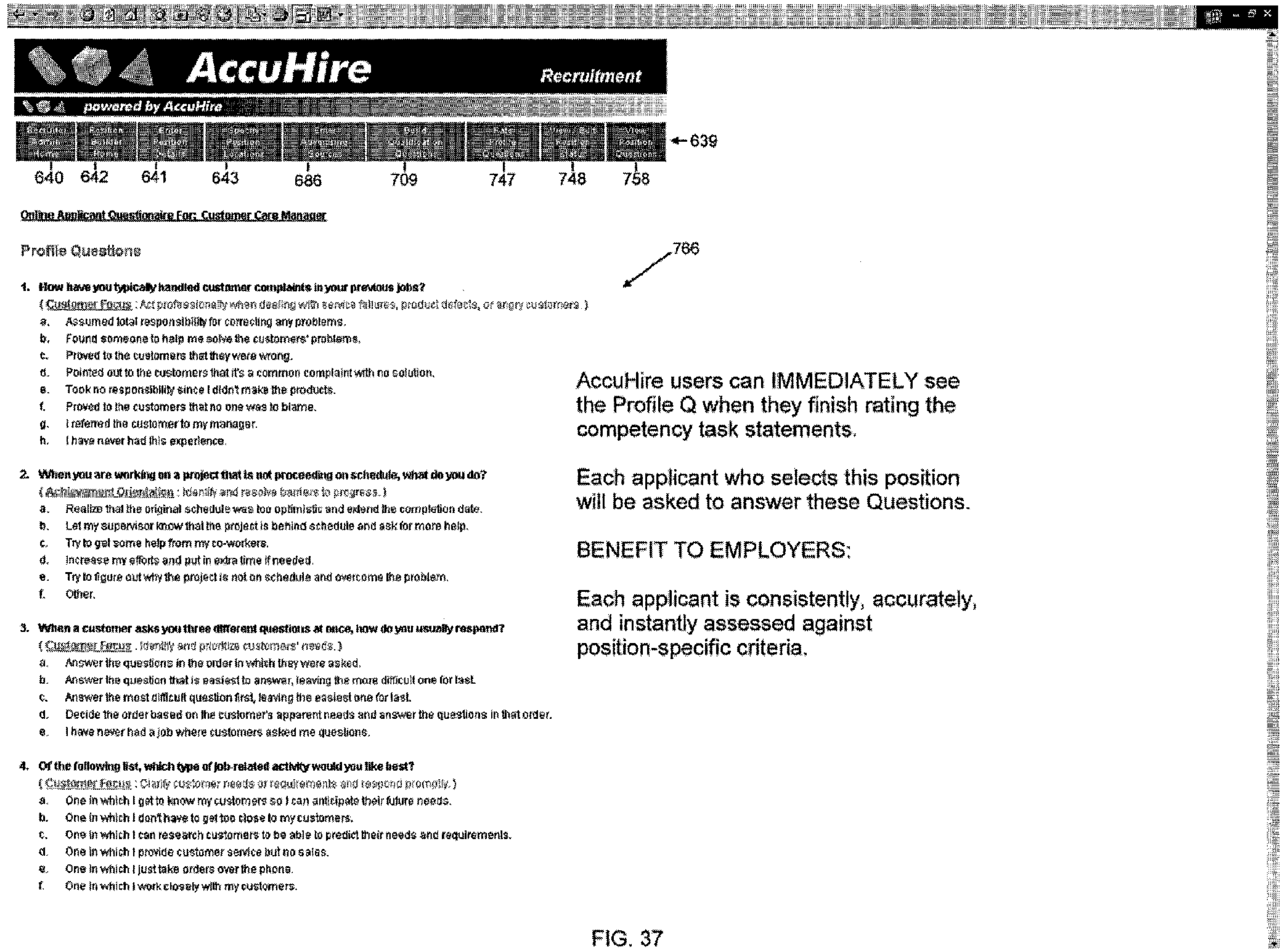

By selecting pushbutton 758 on the pushbutton bar indicated by numeral 639 allows the user to view the various position questions and possible responses. It provides a strong benefit to the employers since each applicant is consistently, accurately and instantly assessed against these position-specific criteria. There are also links relating to specific categories, which can include but is not limited to: "adaptability/flexibility" 760; "communication effectiveness" 761; "customer focus" 762; "interpersonal effectiveness" 763; and "team building" 764. By clicking on the "view position questions" 758, the user is referred to overall questions indicated in FIGS. 37 and 37A. Example questions 1-3 are listed in FIG. 37 and example questions 4-8 are listed on FIG. 37A by numerals 766 and 767 respectively. The job applicant is requested to answer the specific questions associated with the position.

A tremendous advantage associated with this invention is that once you have a history of quality employees, the employer can identify good versus poor hires for turnover, attendance and performance to see if there is a pattern as to how the good hires versus the bad hires answered the questions. These results can be statistically analyzed with weight-predictive questions to dramatically improve the next round of hires based upon past performance data. This is a very unique feature that moves well beyond merely evaluating prospective employees into actually creating a powerful tool for selecting the best possible potential employees for the specific job.

Figure 38:
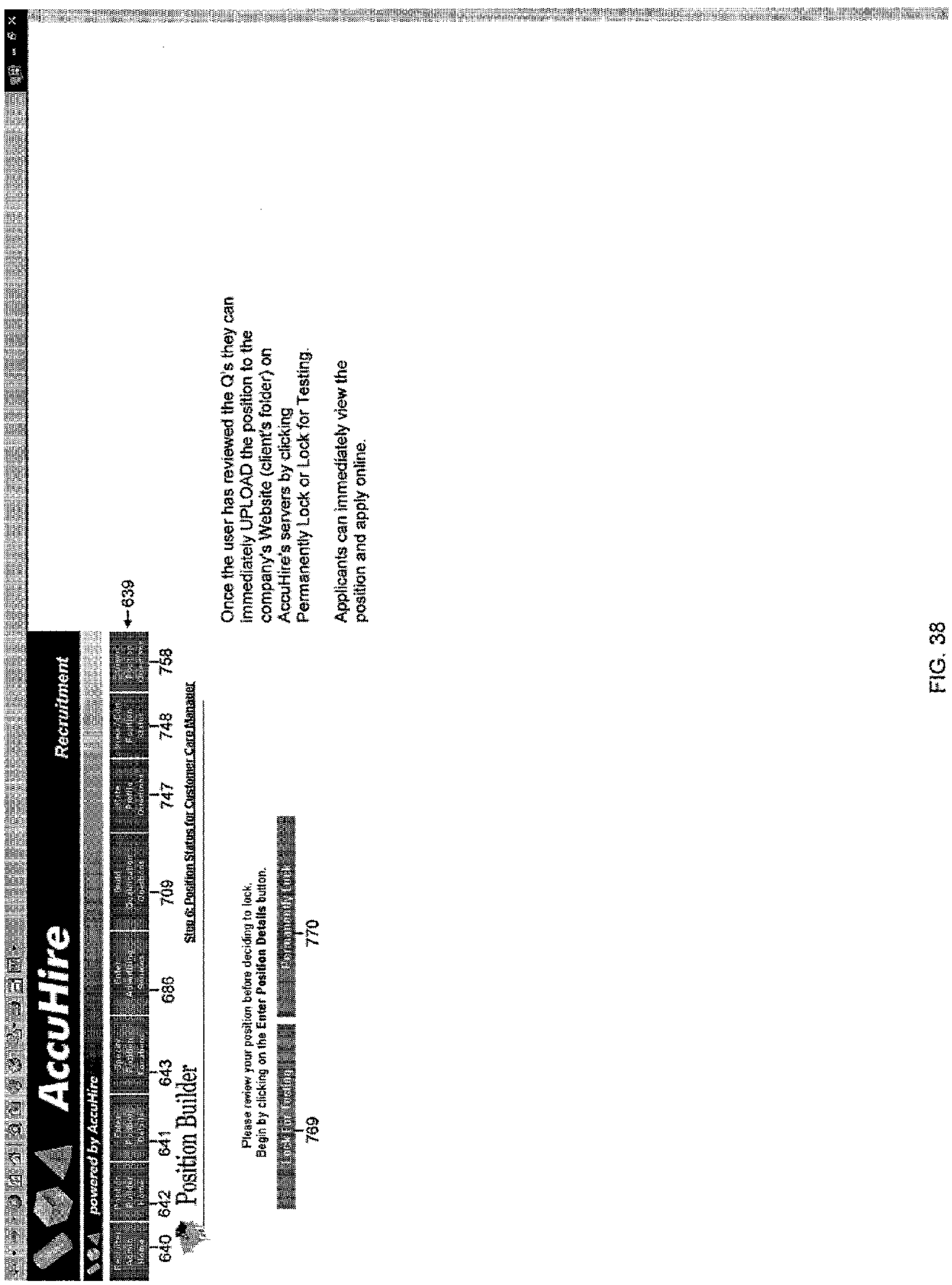
FIG. 38 illustrates an exemplary screen display (graphical user interface) of the present invention for locking down permanently or for testing information associated with a particular position.

The final step is shown on FIG. 38 and is to lock the position for testing or permanently lock the position in accordance with pushbuttons 769 and 770. Positions will be indicated with a green unlock symbol or a yellow color with a capital "T" on the lock for test locking. A permanent lock will be a red colored lock that is in a locked position with a symbolic padlock picture. This screen can be accessed through the view/edit pushbutton 748 found on pushbutton bar 639.

Figure 39:
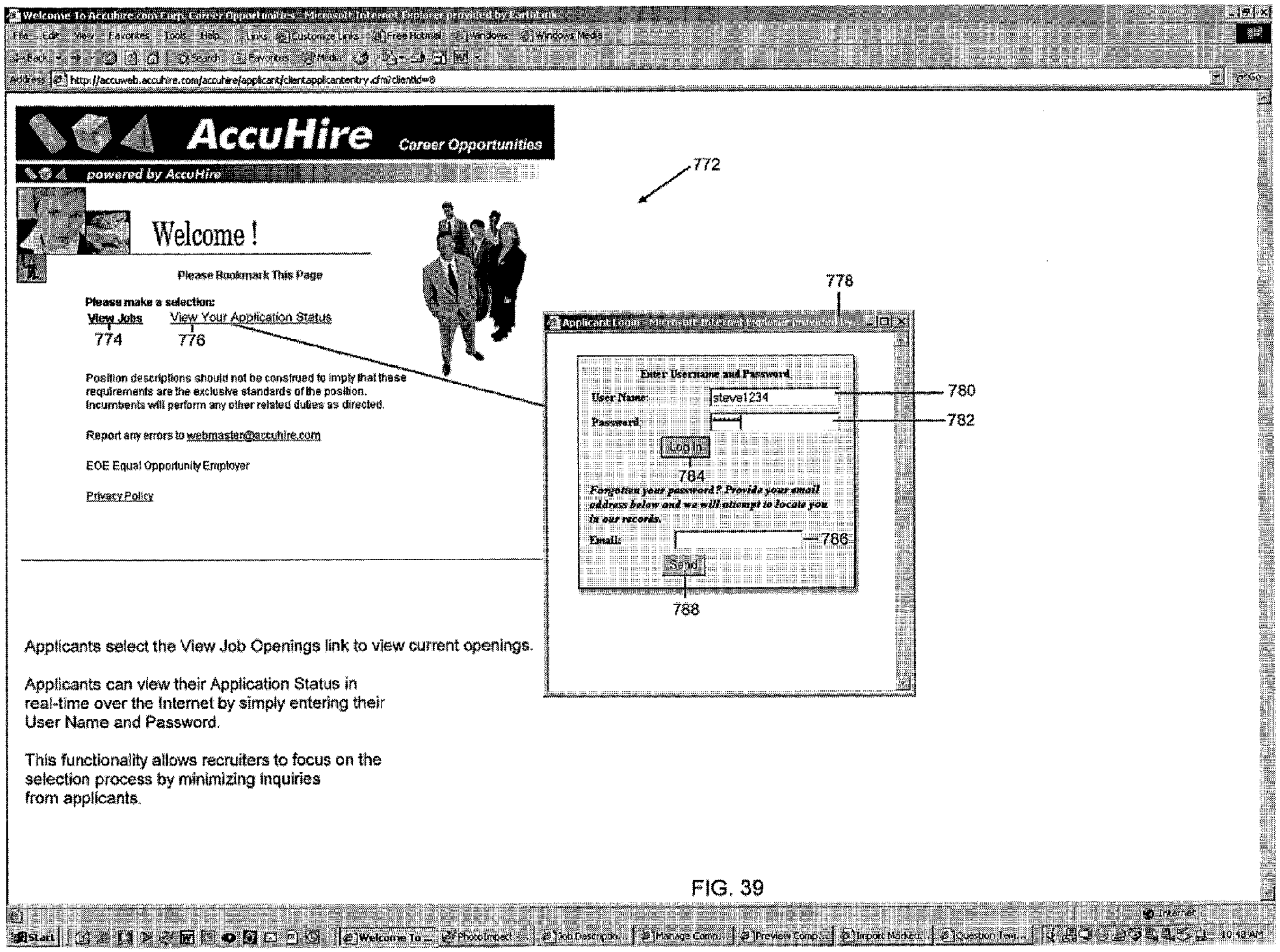
FIG. 39 illustrates an exemplary screen display (graphical user interface) of the present invention showing a main home page for job applicants.

The next major feature of the present invention is how the potential job applicants would utilize this system. Referring now to FIG. 39, a "welcome screen" for applicants is generally indicated by numeral 772. There is also a link to view the potential job openings indicated by numeral 774, or the job applicant can view the status of their application through link 776. Also, specialized messages by a particular employer may be placed on this screen. Upon clicking on the link to view the application status, an application status screen indicated by numeral 778 is shown. There is an input for the user name 780 and an associated password 782 and an enter pushbutton 784 to input this information. There is also a provision if the applicant forgot their password that they can input their e-mail address 786 with a send input button 788 associated with that particular input. After viewing the application status, they can receive input from the employer in real time. There is a much faster response, and employers are not bothered with harassing follow-up phone calls. This can provide a tremendous advantage to either human resources personnel or a professional recruiter. The employee would be able to view the application status for all jobs that the applicant has applied.

Figure 40:
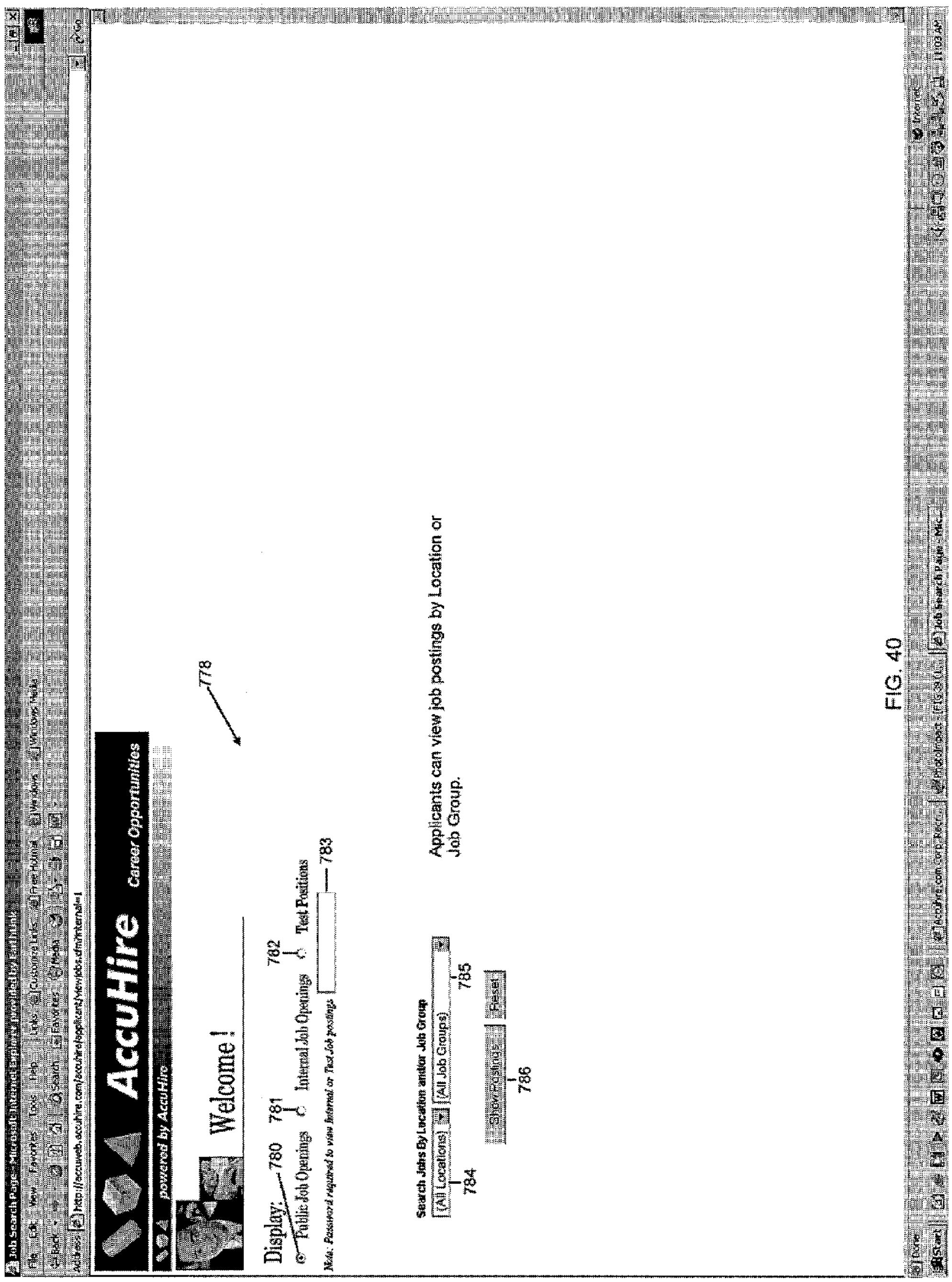
FIGS. 40 and 40A illustrate an exemplary screen display (graphical user interface) of the present invention showing a job openings screen.
Figure 40A:
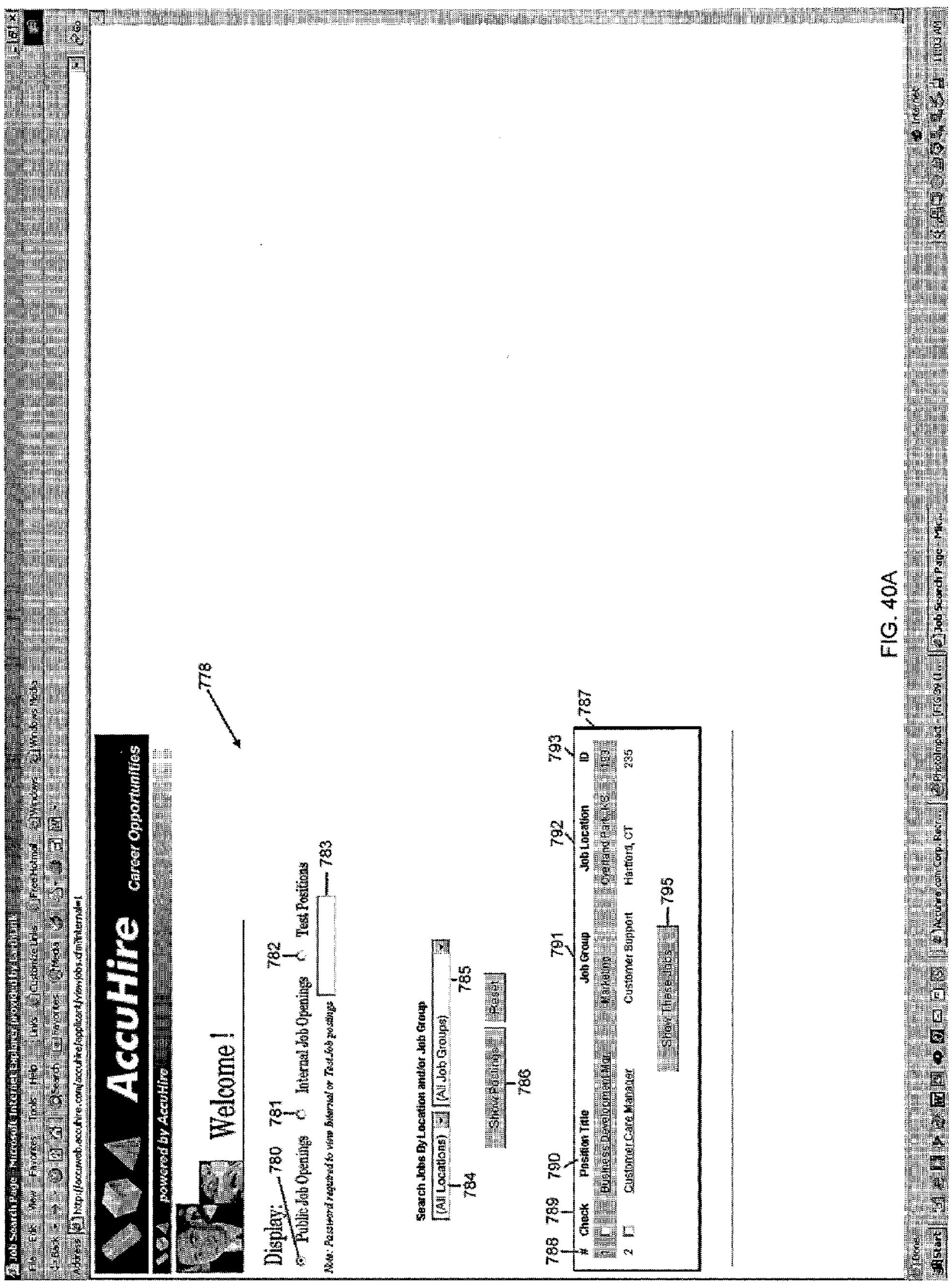
Figure 41:
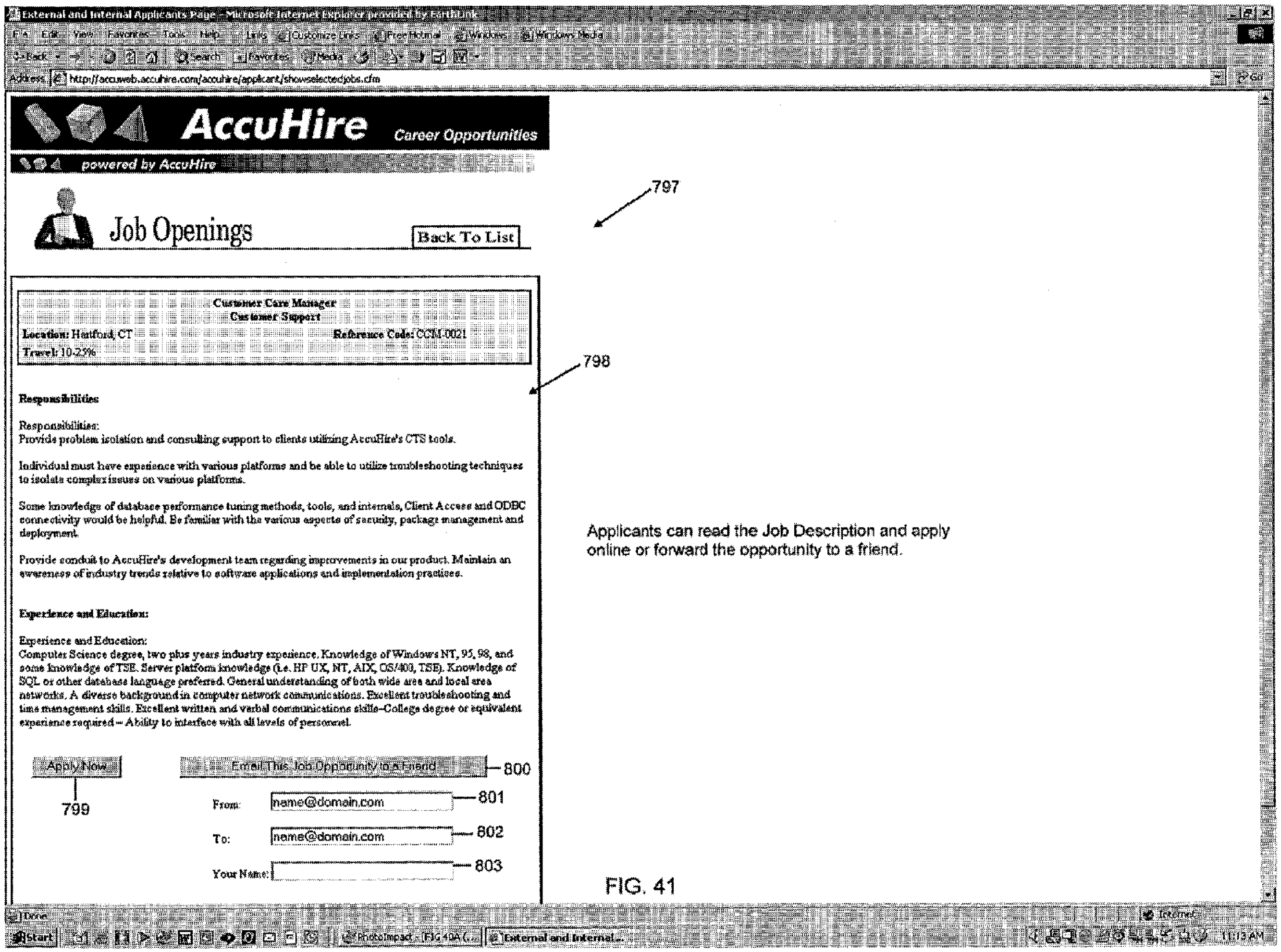
FIG. 41 illustrates an exemplary screen display (graphical user interface) of the present invention showing a specific job opening.

Upon clicking the view job openings 774, this takes the applicant to the job openings screen, generally indicated by numeral 778 on FIG. 40. With a mouse click, the applicant can select among public job openings 780, internal job openings 781 and test positions 782. To view internal job postings, a password would be needed which can be inputted through input 783. The location can be selected through input 784 or all locations. There is a drop-down input selection of the various types of job present in 785, or you can search for all job groups if you have a very diverse background. Pushbutton 786 will show the posting based on the selective job groups and relative locations. As shown in FIG. 40A, a listing is shown as generally indicated by numeral 787, which includes the number of the position in column 788. Numeral 789 indicates a click-on mouse input to check if you are interested in that position. The position title is listed in column 790, with the job group listed in column 791. The job location is listed in column 792, and the specific job identification number is listed in 793. All jobs for which applicants have placed a check in input column 789 will be shown upon clicking "Show These Jobs" input 795 which directs the applicant to a specific job opening indicated by numeral 797 on FIG. 41. Specific information regarding a position, including as examples: travel; location; the job title; the reference code; responsibilities; experience; and education.

The applicant can now apply for that position through pushbutton input 799 or e-mail the job opportunity to a friend through pushbutton input 800. To e-mail to a friend, you can list your e-mail address in input 801 and your friend's e-mail address in input 802. You can also type in your full name so the user's friends will know where the job opportunity came from in numeral 803.

Figure 42:
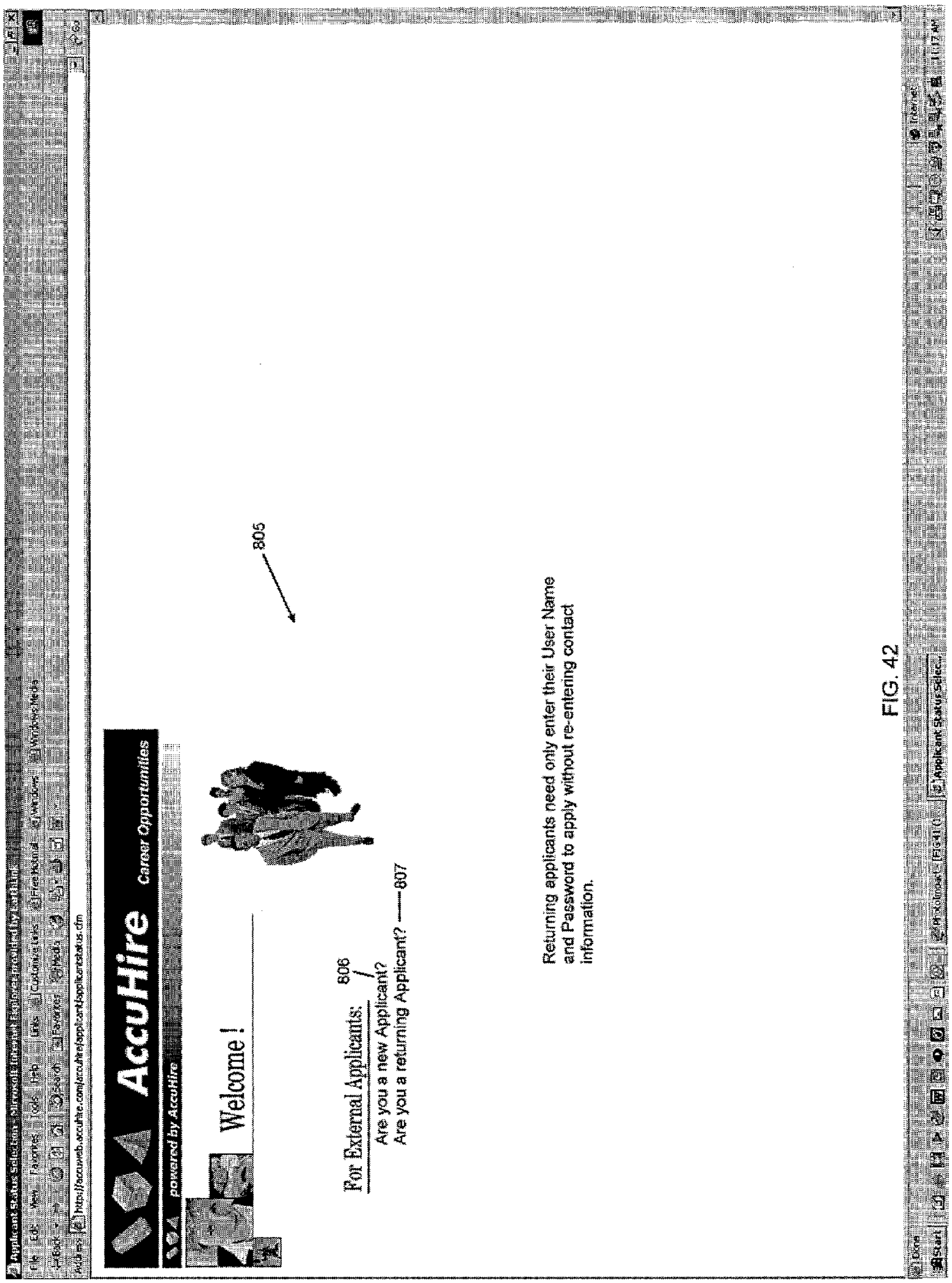
FIG. 42 illustrates an exemplary screen display (graphical user interface) of the present invention showing a main screen for external job applicants.
Figure 43:
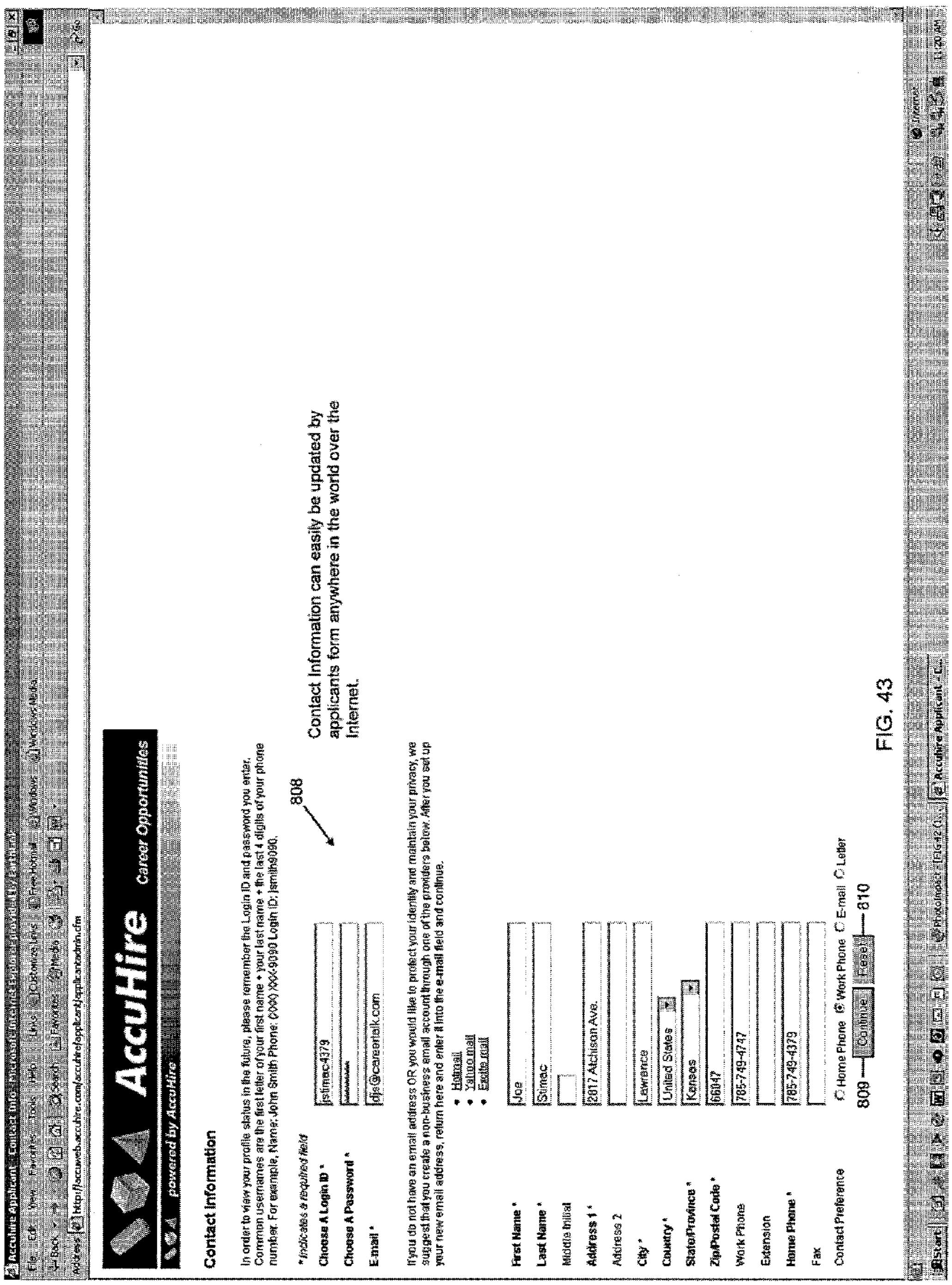
FIG. 43 illustrates an exemplary screen display (graphical user interface) of the present invention showing contact information input screen for job applicants.

If the applicant clicks the "apply now" pushbutton input 799, he or she is directed to FIG. 42, which is generally indicated by numeral 805 for external job applicants. There is a link 806 if you are a new applicant and 807 if you are a returning applicant. Returning applicants need only enter their user name and password and do not need to re-enter contact information. However, new job applicants will be directed through link 806 to an information sheet where contact information has to be provided. This information is self-explanatory, and examples of this type of information could include user name, password, first name, last name, middle initial, address, city, state/province, country, zip code, e-mail, work phone, extension, home phone, fax and a mouse-clicked contact preference. There is a continue input pushbutton 809 or a pushbutton input that allows you to reset the information and clear it as indicated by numeral 810.

Figure 44:
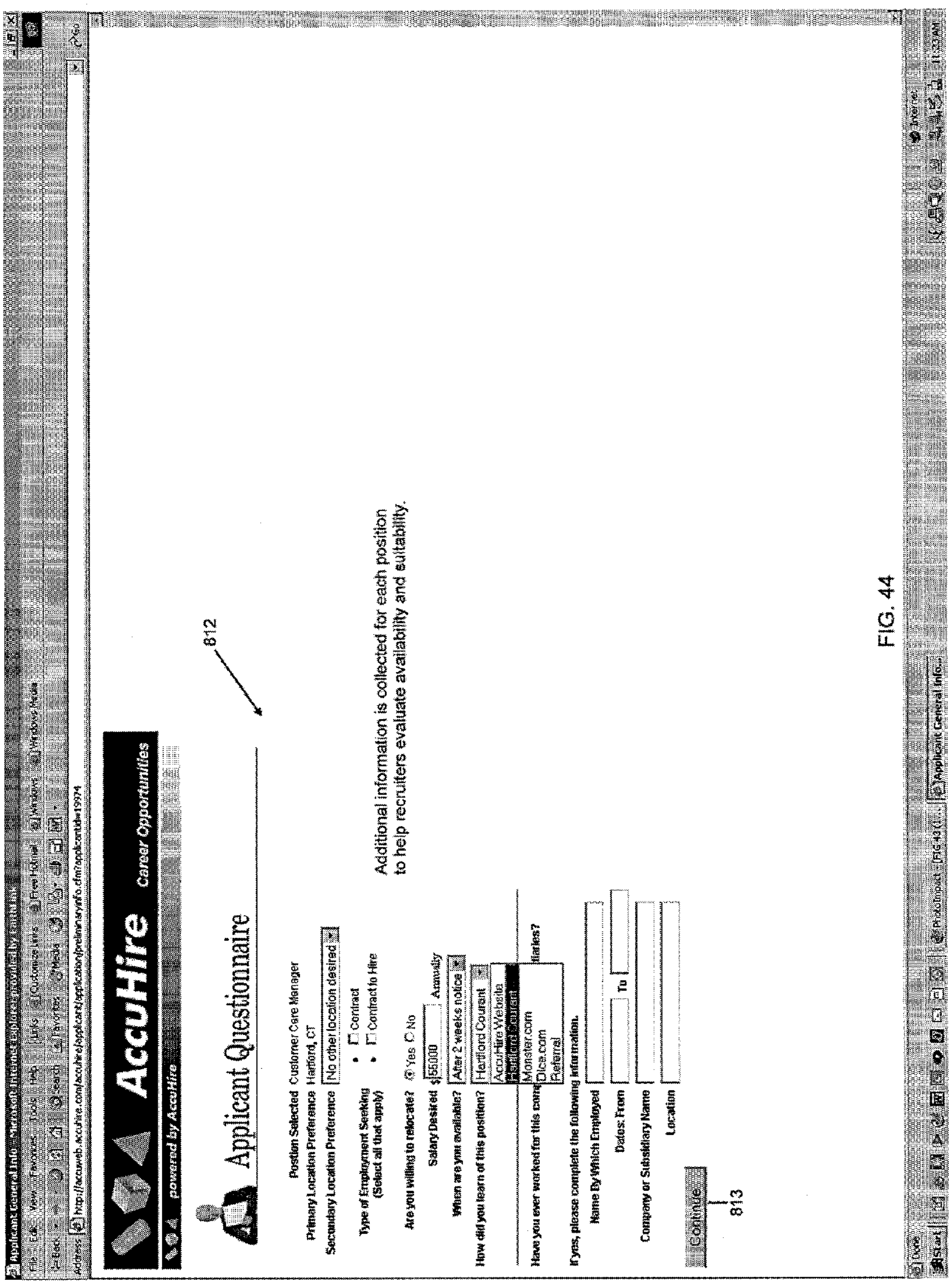
FIG. 44 illustrates an exemplary screen display (graphical user interface) of the present invention showing a job applicant questionnaire.

If the user clicks on the continue button 809, they are directed to an applicant questionnaire, located on FIG. 44, which is indicated by numeral 812. This information is also self-explanatory, and can include such items as the: selected position; primary location preference; secondary location preference; type of employment (such as full time, part time, etc.); willingness to relocate; salary requirements; and availability, which is how long the applicant must provide notice. Also requested is how the applicant learned of the position, if they have worked for the company, and if so, the name when the employee was employed, the dates, the company or subsidiary name and their respective location. These are provided through a series of inputs, including some drop-down inputs. It is relatively self-explanatory.

Figure 45:
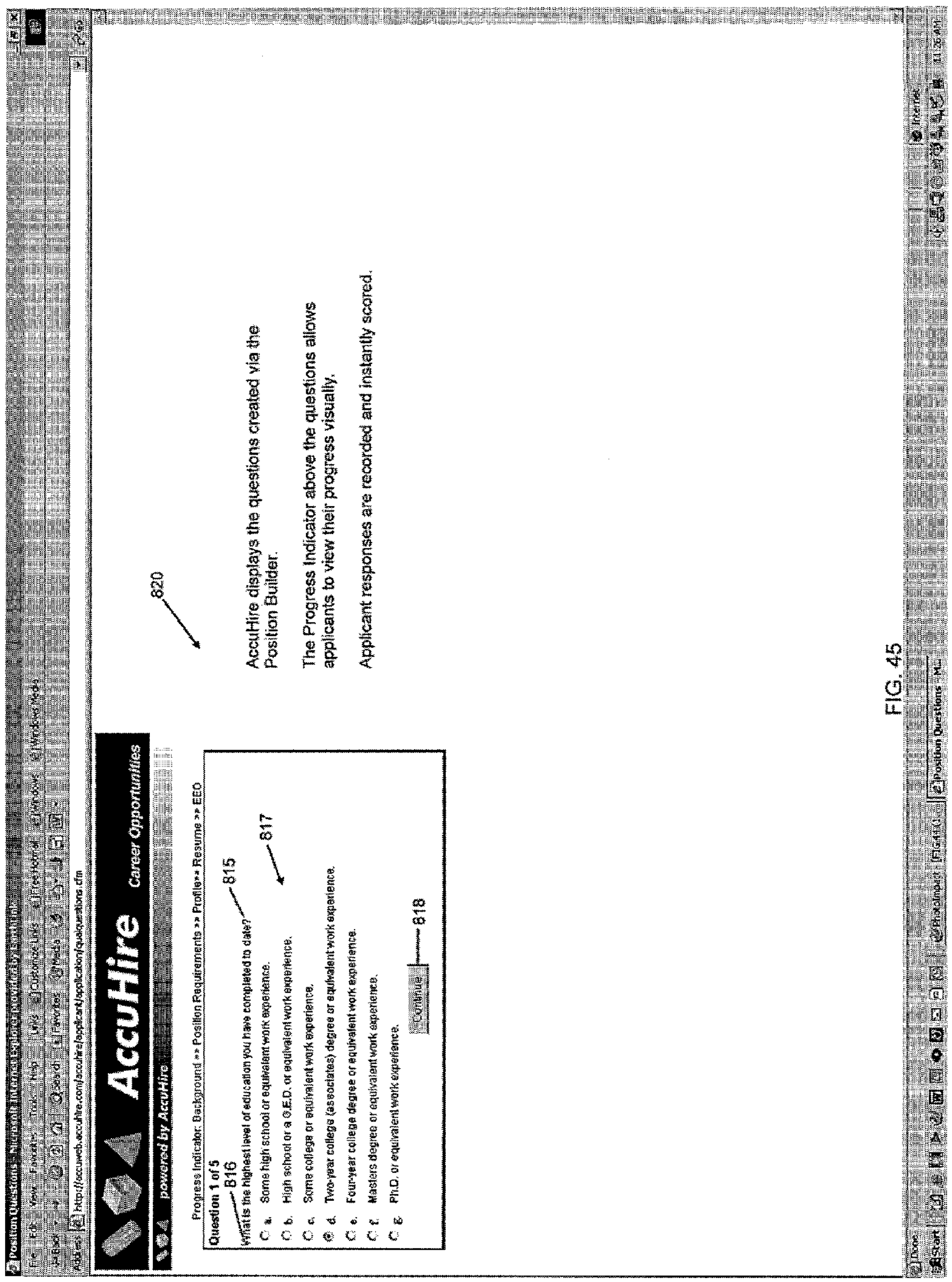
FIGS. 45, 45A and 45B illustrate an exemplary screen display (graphical user interface) of the present invention showing click-on question screens for a job applicant.
Figure 45A:
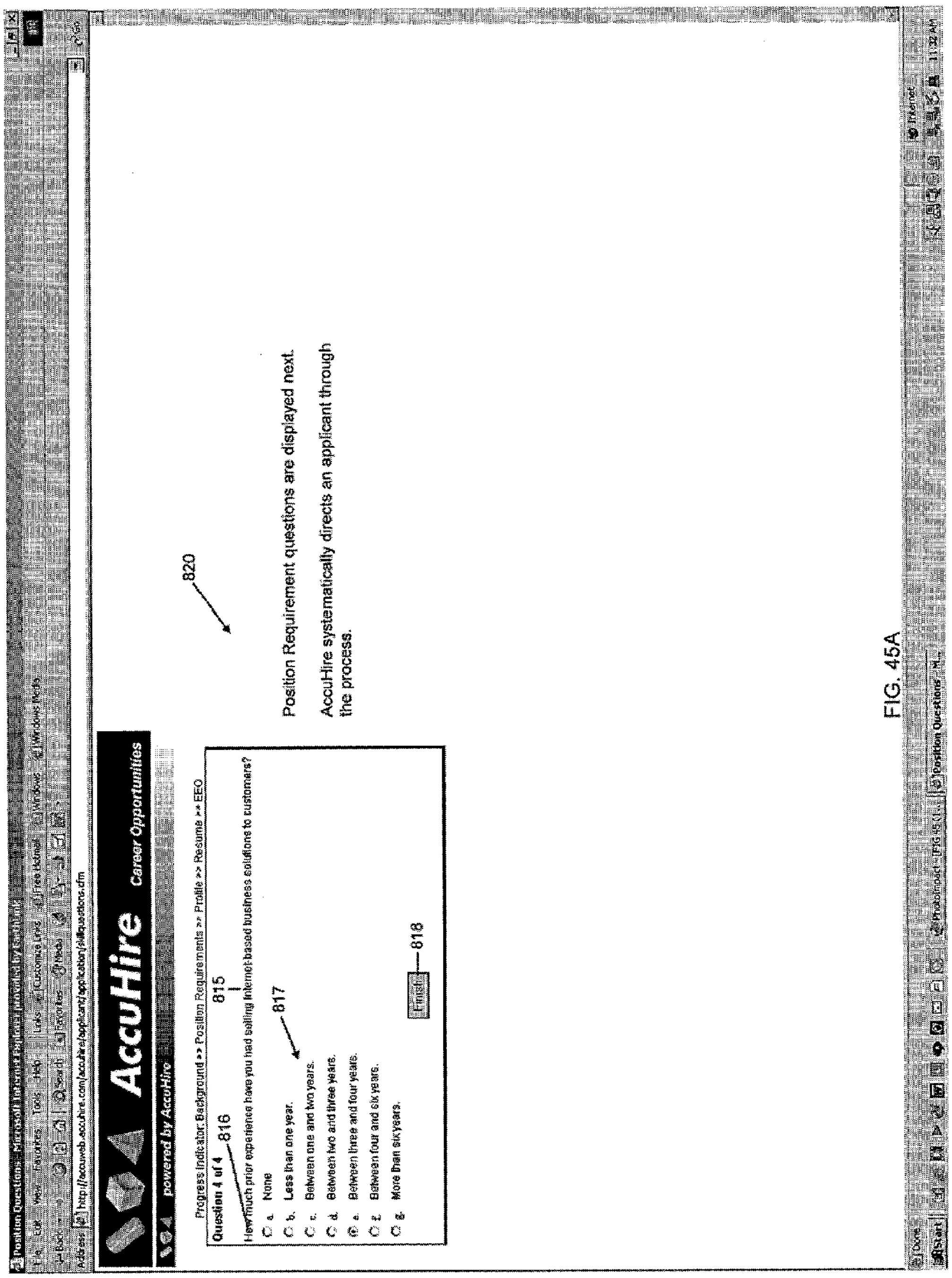
Figure 45B:
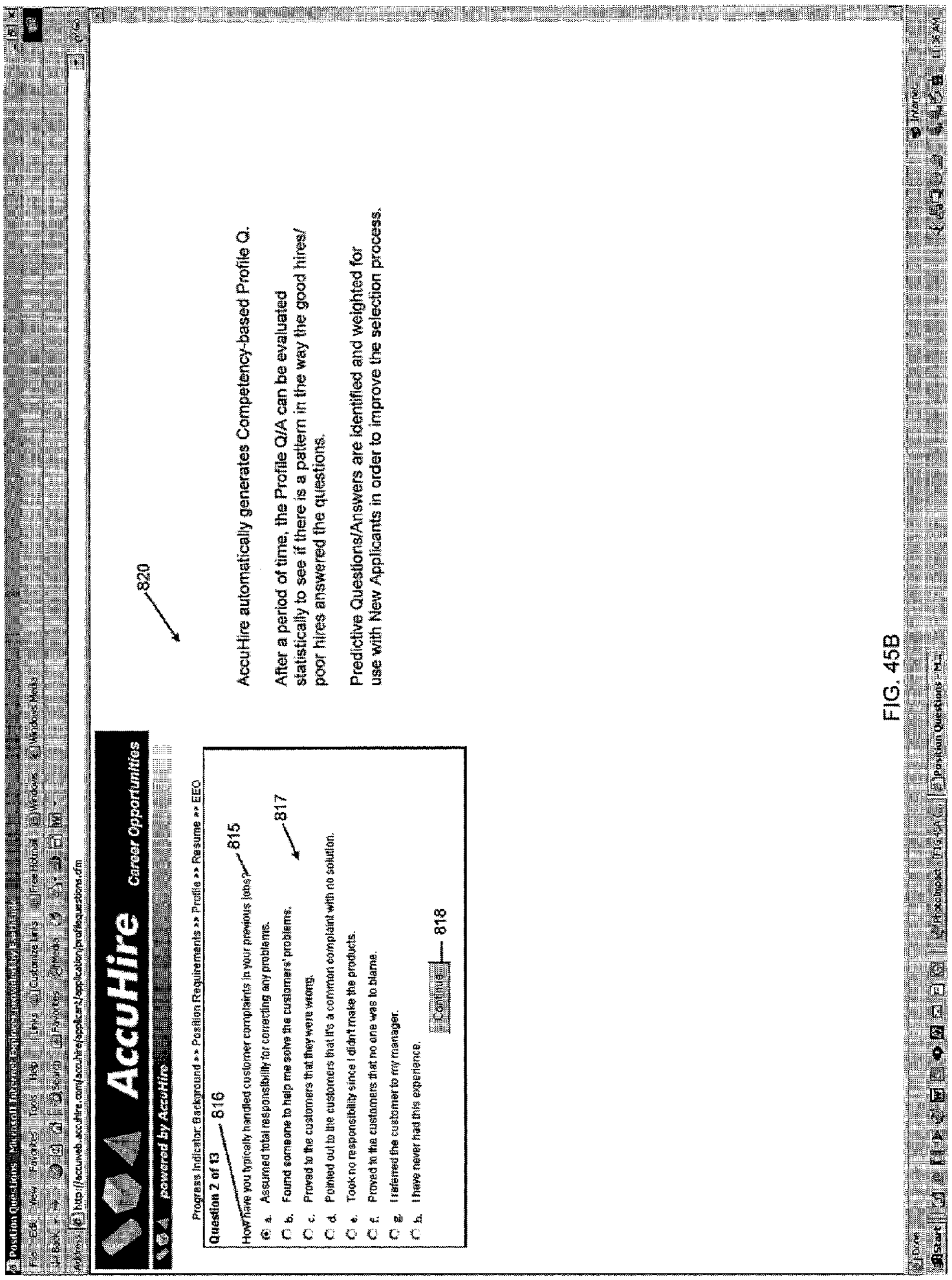

There is another "continue" button 813, which directs the applicant through a series of questions. This question screen is generally indicated by numeral 820. There is a question, generally indicated by numeral 815. Under each question, there is a column of answers 817, and to the left of this column of answers 817 is a column of click-on mouse inputs to select the most appropriate response by the job applicant as shown in FIGS. 45 and 45A. The job applicant then clicks on pushbutton input 818, which is a pushbutton to continue.

Figure 46:
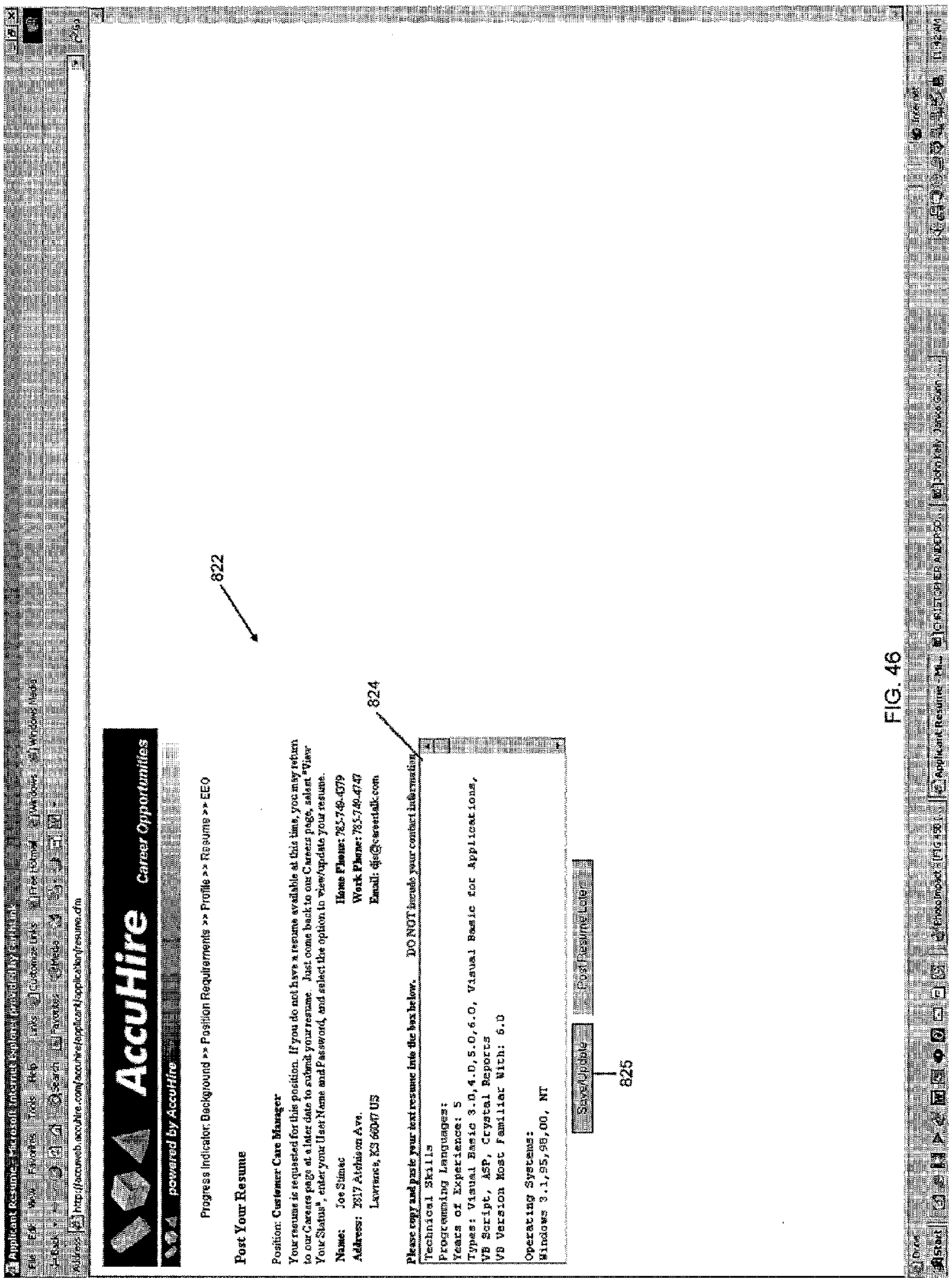
FIG. 46 illustrates an exemplary screen display (graphical user interface) of the present invention showing a resume transmission function.

The applicant is then directed to the resume paste function generally indicated by numeral 822 on FIG. 46. There is an input that allows the potential applicant to paste their resume, and it can be saved or updated through pushbutton input 825.

Figure 47:
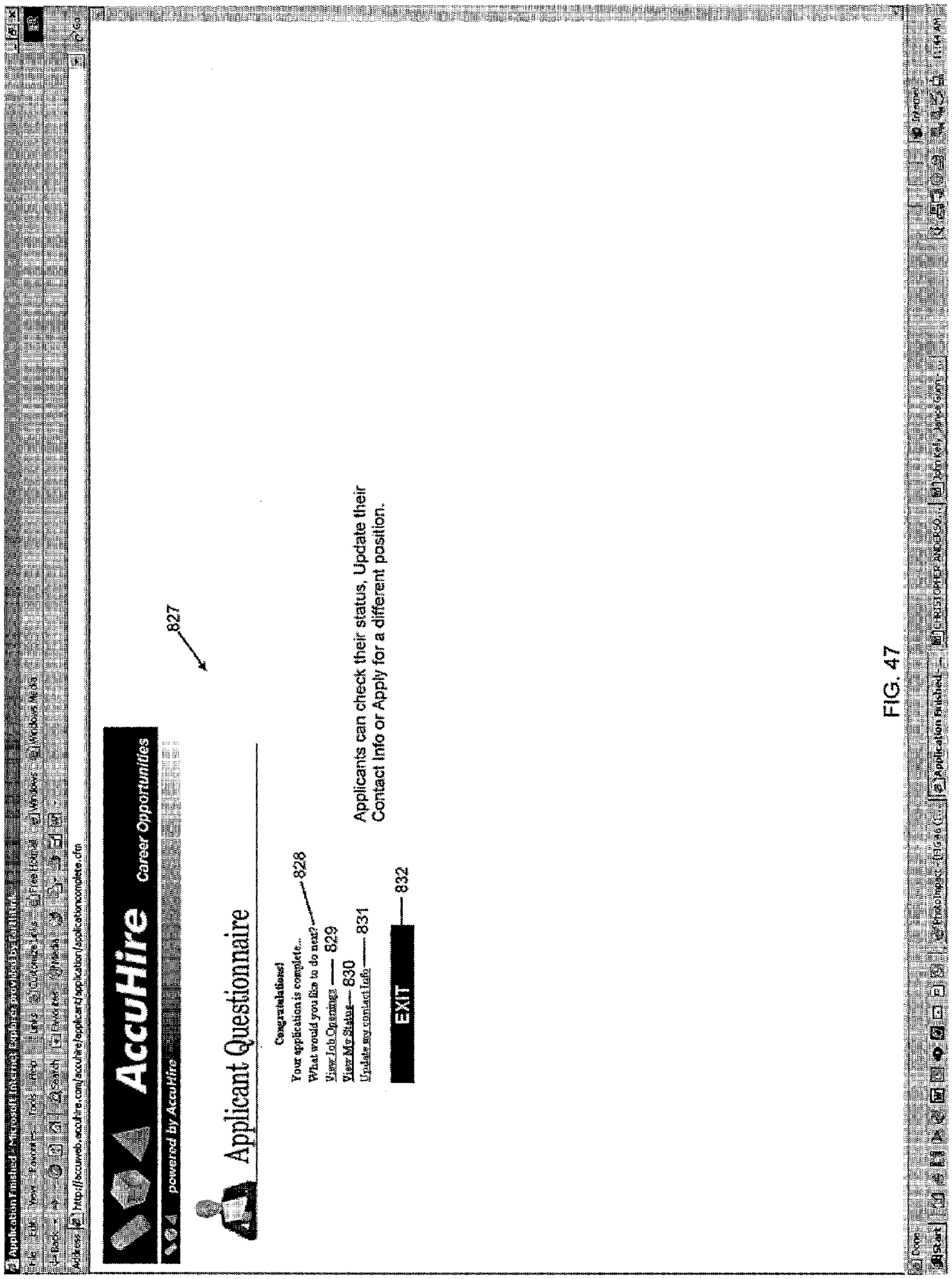
FIG. 47 illustrates an exemplary screen display (graphical user interface) of the present invention showing an application completion function.

This pushbutton input 825 directs the applicant to a "congratulations" screen generally indicated by numeral 827 on FIG. 47. There is a congratulations and a query as to what the applicant would like to do next, with a link 829 that allows the applicant to view job openings, and a third link 831 to allow the applicant to update his contact information. The applicant can also exit the system through pushbutton input 832.

Figure 48:
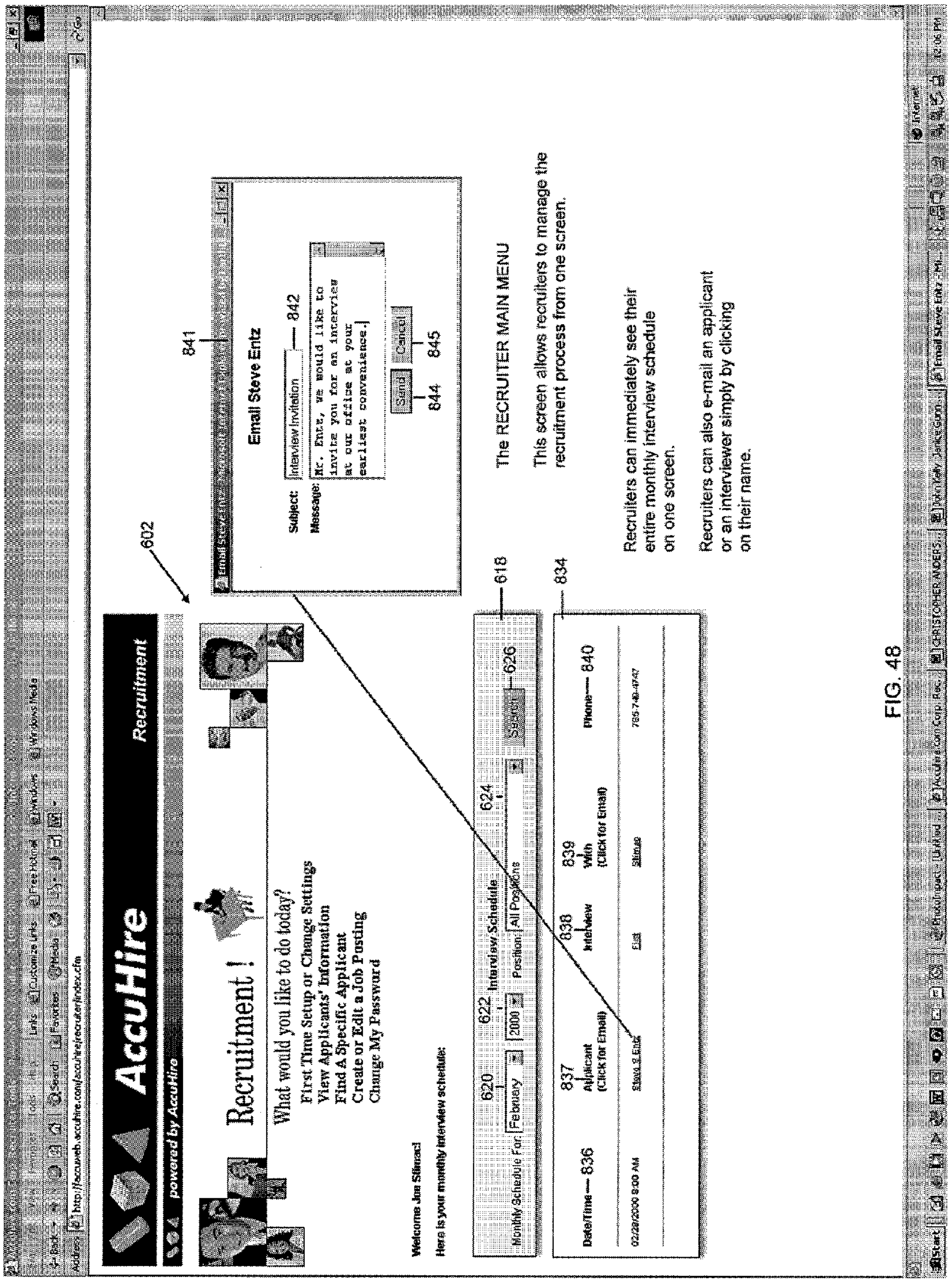
FIG. 48 illustrates an exemplary screen display (graphical user interface) of the present invention showing an e-mail feature associated with the main recruitment screen.

The next major aspect of the invention is the recruitment process. The main recruiter menu is generally indicated by numeral 602 on FIG. 48, which is similar to FIG. 28. In this case, there are actual applicants in the system, as indicated by numeral 834 on FIG. 48. There is a listing of the date and time of the interview 836, the applicant's name 837, the number of the interview 838, the interviewer 839 and the phone number of the applicant 840. By clicking on the applicant 837, you can send an e-mail 841 to the job applicant which includes the subject of the e-mail 842, which is the interview invitation, and a message in a scroll down input 843. A pushbutton input 844 allows you to send an e-mail or it can be cancelled with pushbutton input 845. The interviewer can also be e-mailed by clicking in the name of that individual in column 839.

Figure 49:
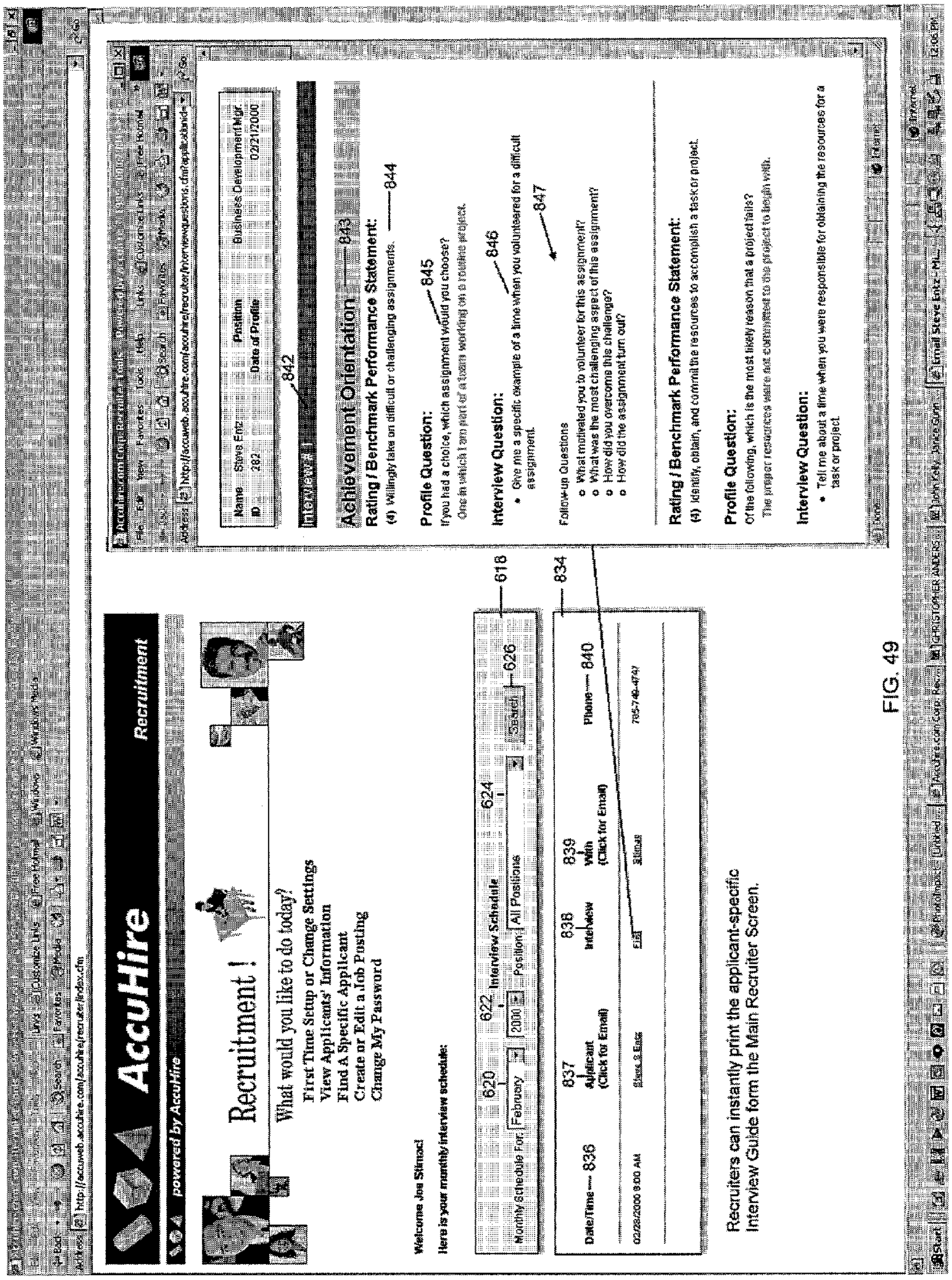
FIG. 49 illustrates an exemplary screen display (graphical user interface) of the present invention showing an interview summary material for use by a recruiter or human resource personnel.
Figure 50:
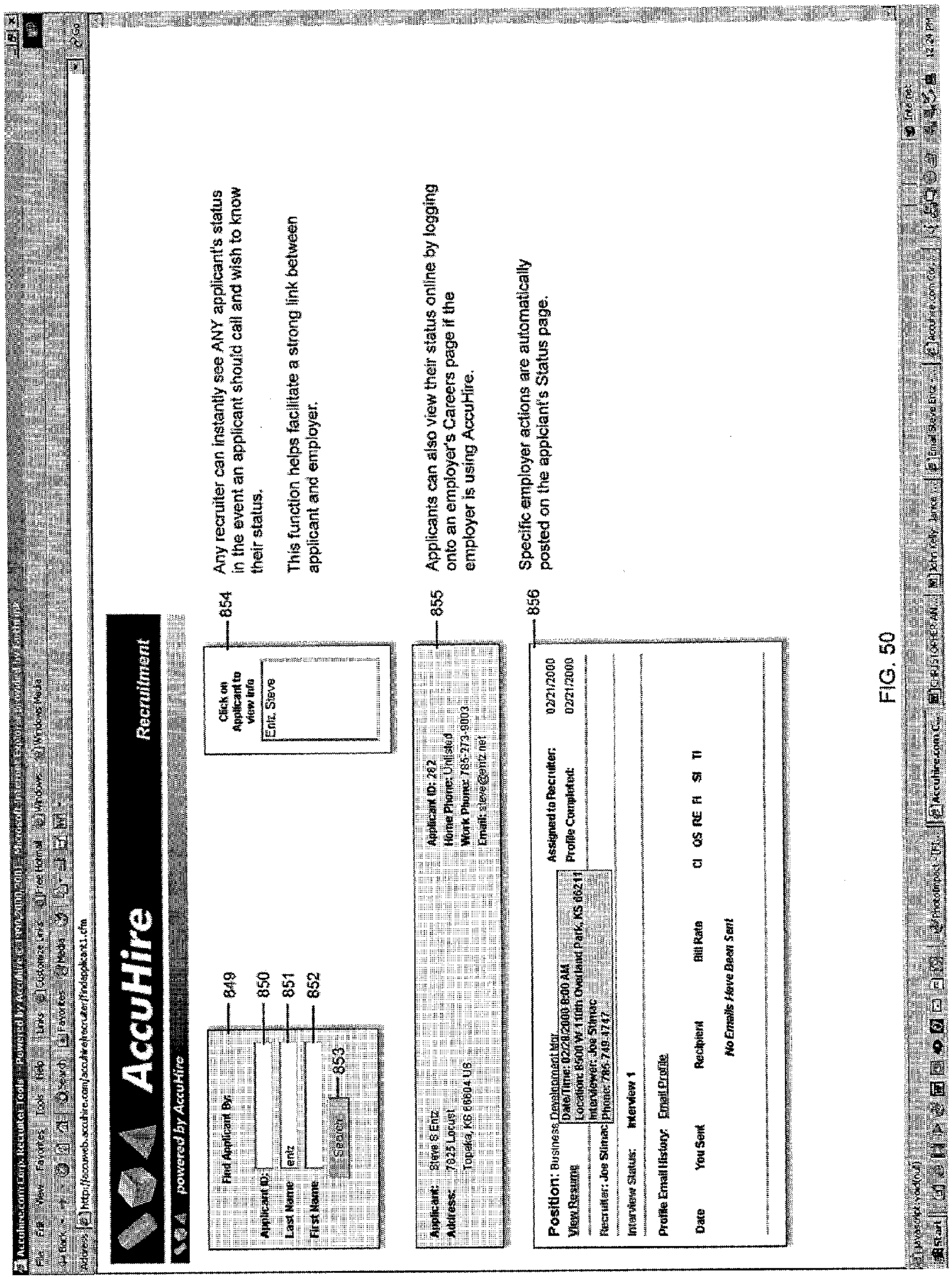
FIG. 50 illustrates an exemplary screen display (graphical user interface) of the present invention showing a job applicant status search and output function.

By clicking on the number of the interview 838 provides interview summary material indicated by numeral 842 in FIG. 49. There is a first listing of a particular category 843, with a non-limiting example being adaptability/flexibility. Underneath this category would be a rating in association with that category and a benchmark performance statement as indicated by numeral 844. After that is a profile question along with an associated answer indicated by numeral 845, a sample interview question indicated by numeral 846, as well as follow up questions indicated by numeral 847.

The recruiter/human resource person can also look at any applicant's status based on desire or if the applicant calls and desires input on the applicant's own status. This function 849 allows the recruiter to input the applicant identification number 850, last name 851 or first name 852, among other categories. The recruiter will then hit a search function button as indicated by numeral 853. The applicant will come into view in output 854. By clicking on the applicant shows the applicant name and identification number in output 855, as well as an output of the interview status, indicated in output 856, which can include the interview, the date, the time, location, the interviewer name, when the applicant was assigned to the recruiter and when the profile was completed in association with that particular position. Specific employer actions can automatically be posted to the applicant's status page indicated by numeral 856, and applicants can view their status online by logging into an employer's careers page if the employer is using the present invention.

Figure 51:
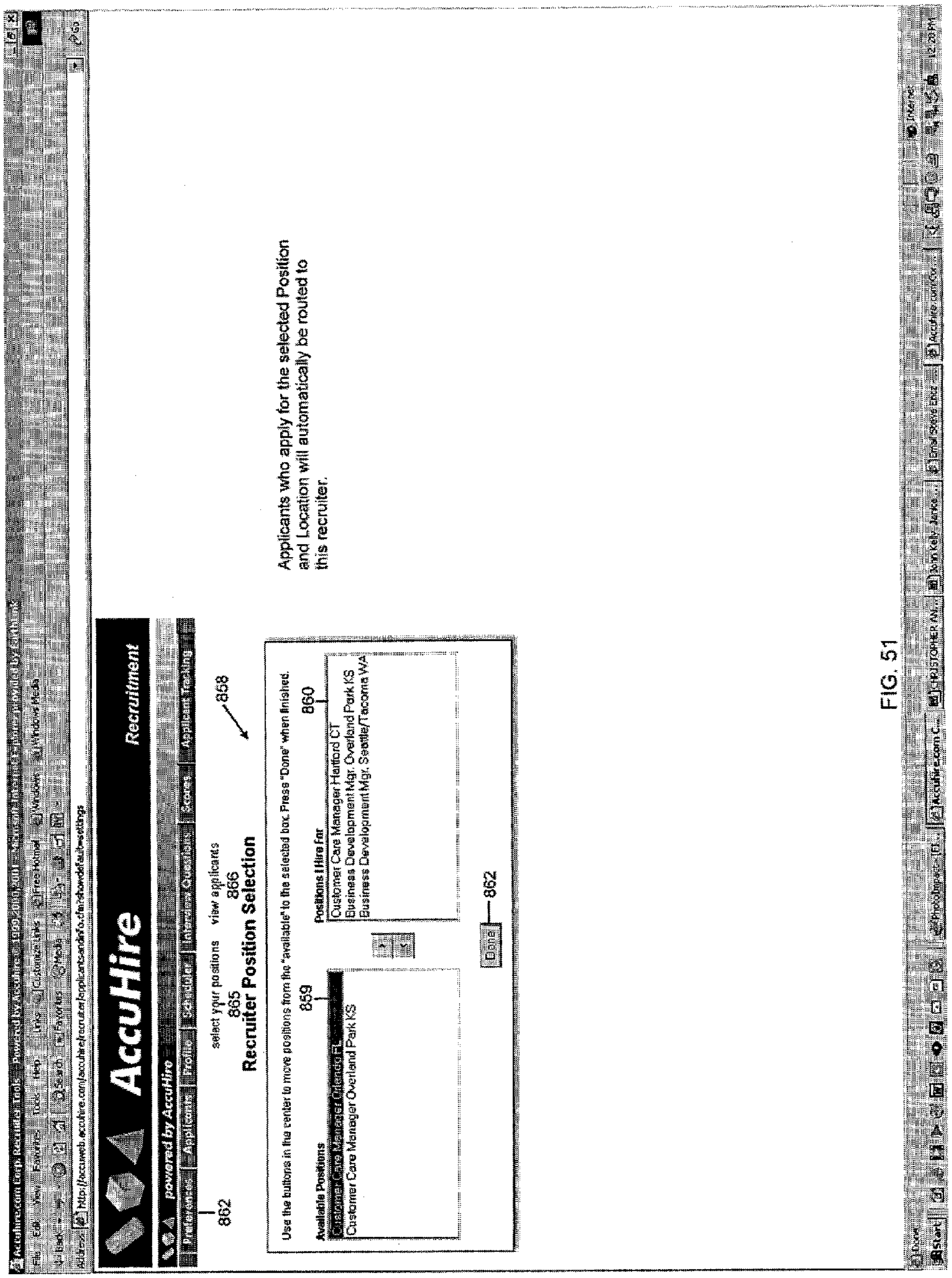
FIG. 51 illustrates an exemplary screen display (graphical user interface) of the present invention showing a recruiter position selector feature.

The next feature is to return to FIG. 28 and for the recruiter to click-on first time setup or change settings indicated by numeral 608. The next feature is for the recruiter to be able to select what positions he or she is hiring for which is generally indicated by numeral 858, located on FIG. 51. In column 859 is a listing of available positions for which the recruiter may hire, and in column 860 are positions for which the recruiter is currently hiring. These can be exchanged between columns 859 and 860 through a series of buttons 861, such as the button that places all available positions in column 859 into column 860 or all positions that that person hires for from column 860 to 859, and then buttons to selectively move positions from 859 to 860. This selective movement is previously described in this application. When the recruiter is finished with the process, there is a "Done" pushbutton 862 that can be selected.

Figure 52:
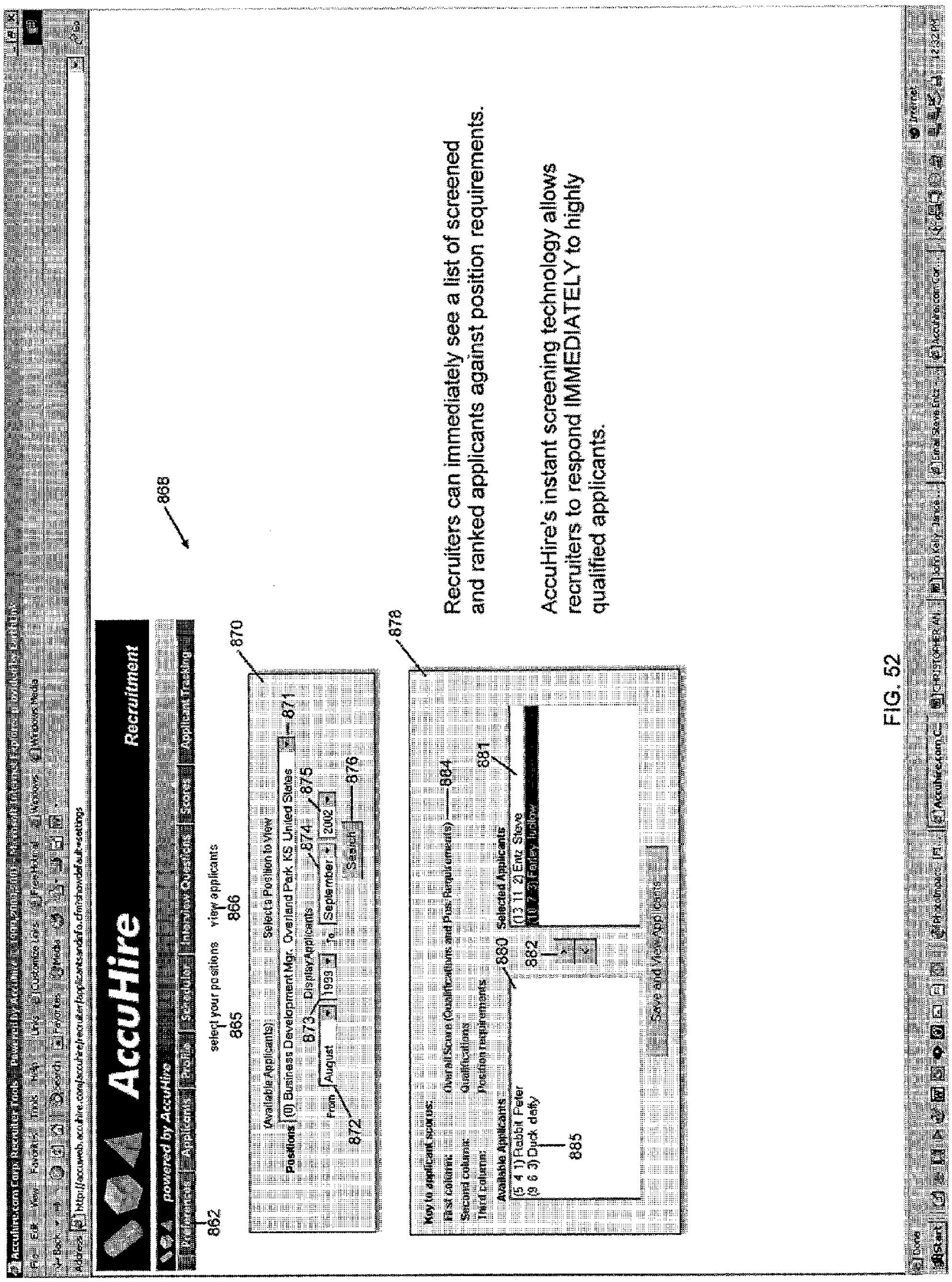
FIG. 52 illustrates an exemplary screen display (graphical user interface) of the present invention showing a position and corresponding applicant selector feature.

Under the preferences button 862, there is a "select your positions" 865 input link. Upon selection of the 866 input link to view applicants, the recruiter is directed to the screen generally indicated by numeral 868 in FIG. 52. It includes an applicant search function, generally indicated by numeral 870 that has a drop-down input 871 to select the position, and drop-down inputs for putting in the starting date (month and year) 872 and 873, and the ending date (month and year) 874 and 875, respectively. A search input button is indicated by numeral 876. The available applicants are then revealed in screen 878. There is a column for available applicants 880, a column for selected applicants 881, and a device for shifting these applicants between columns 882, either right or left, through buttons that provide the shifting of the highlighted applicant. This screening technology allows the recruiters to respond immediately to highly qualified applicants, since you can see their raw scores and qualifications of position requirements in the series of three columns, as explained in the verbiage detailed in numeral 884 and as illustrated by numeral 885.

Figure 53:
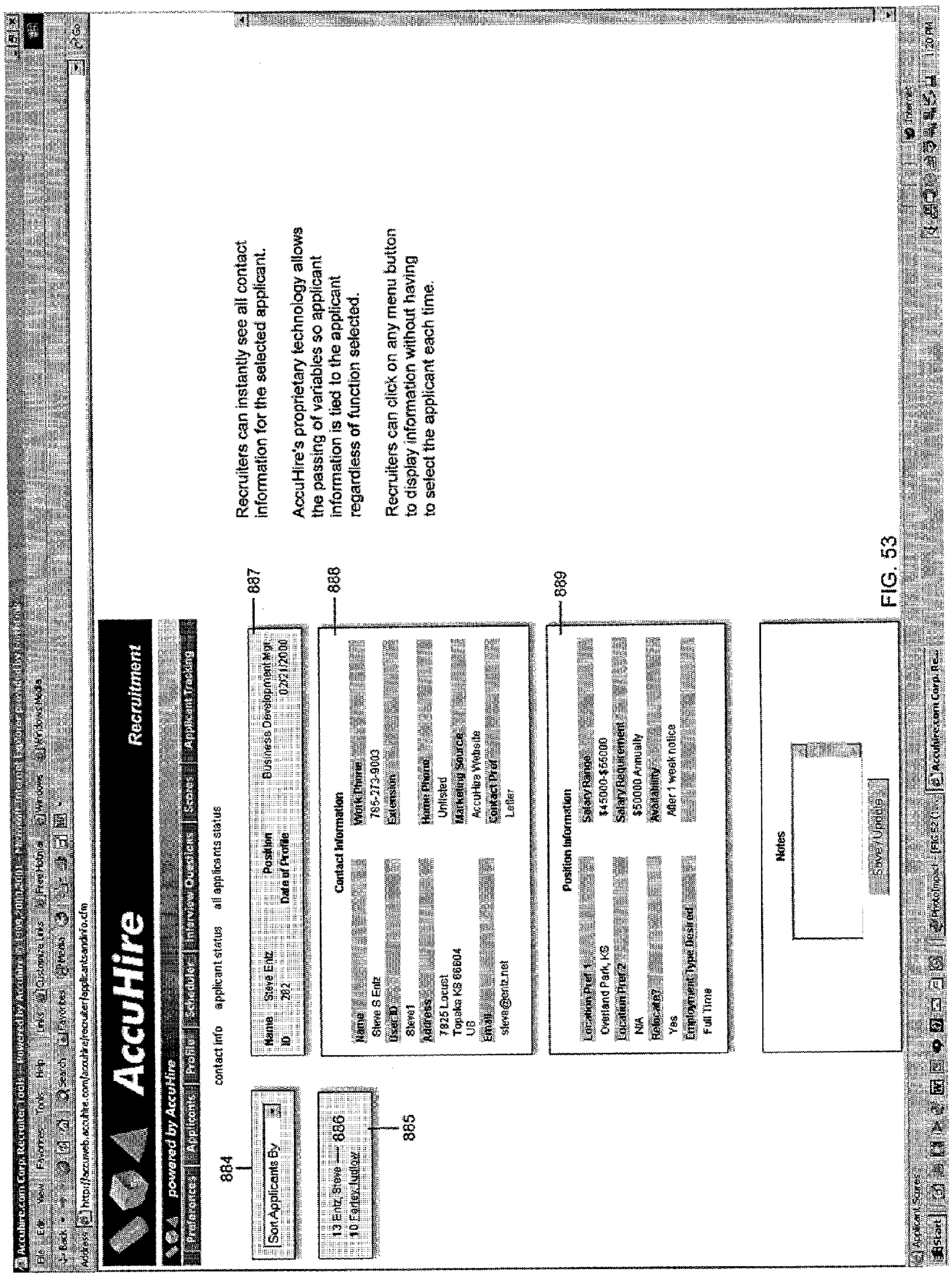
FIGS. 53, 53A and 53B illustrate an exemplary screen display (graphical user interface) of the present invention showing output of job application and position information.
Figure 53A:
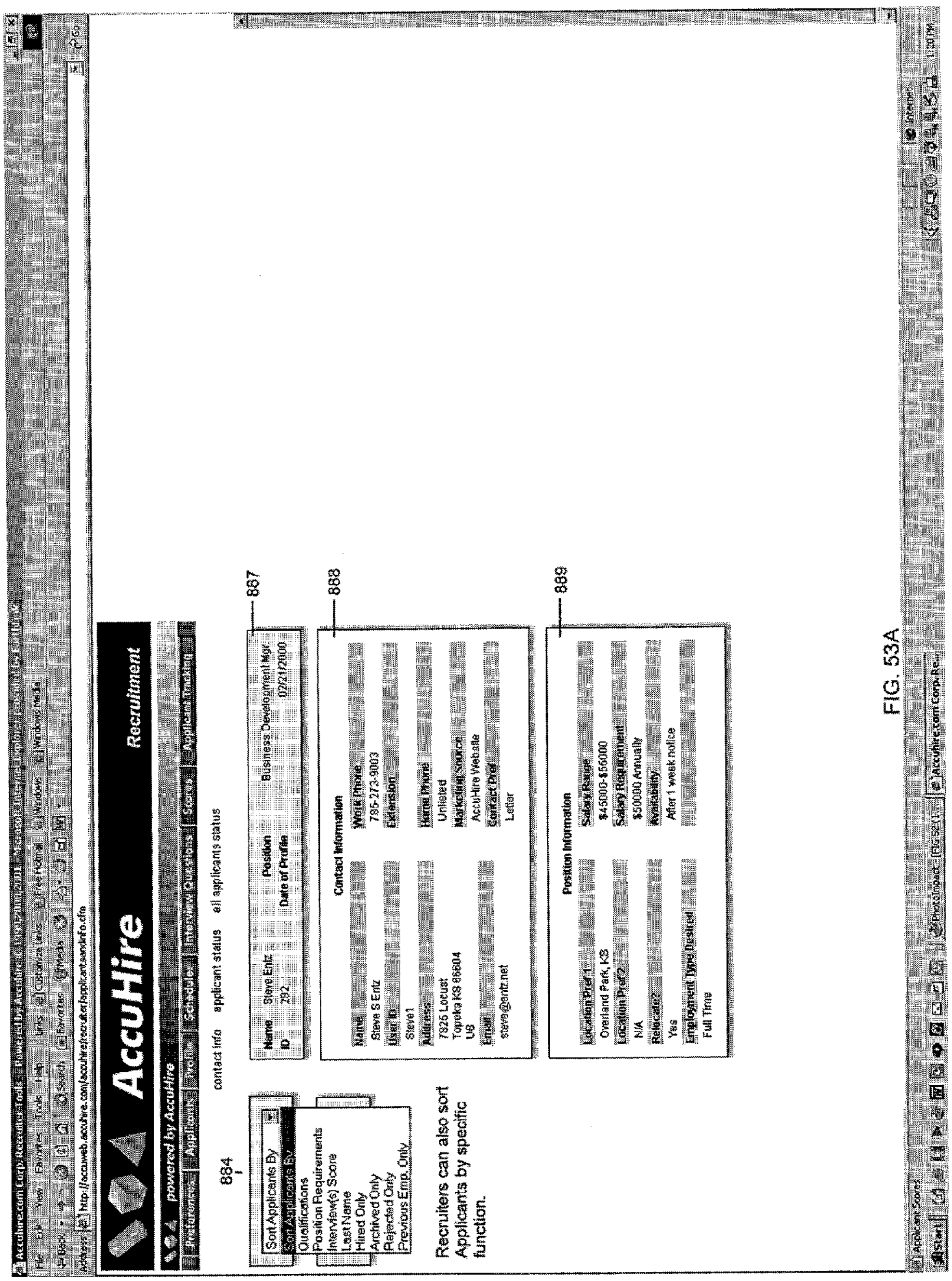
Figure 53B:
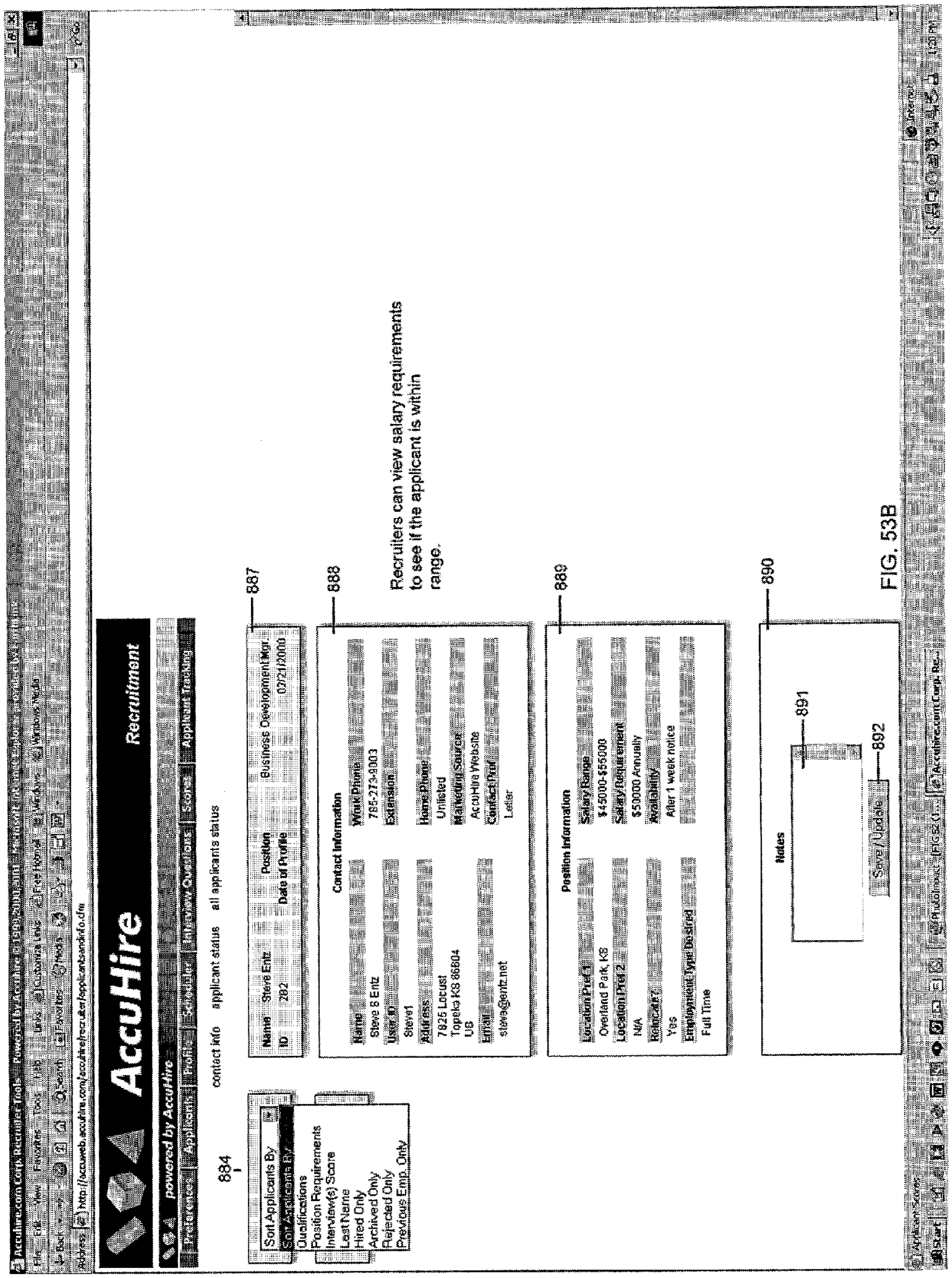

Referring now to FIG. 53, the selected applicants from column 881 can then be inserted through a drop-down input indicated by numeral 884. This provides the output of the sorted applicants in output 885. By clicking on the particular name, such as that highlighted in 886, information about that particular job applicant as well as position, identification number and date of profile appears in output 887. Contact information appears in output 888, and position information appears in output 889. FIG. 53A details some of the sorting capabilities, such as storing applicants by qualifications, skills and abilities, interview score, whether or not they are currently employed or last name. This is merely an exemplary and non-limiting list of the potential sorting capability of the present invention. FIG. 53B shows details about the position information, indicated by numeral 889. This also provides the salary requirement of the applicant to see if it comports with the salary range, and availability and willingness to relocate. There is a further input screen 890 which provides a scroll down input indicated by numeral 891 so that notes can be entered with regard to this particular job applicant. These can be saved or updated through pushbutton input 892.

Figure 54:
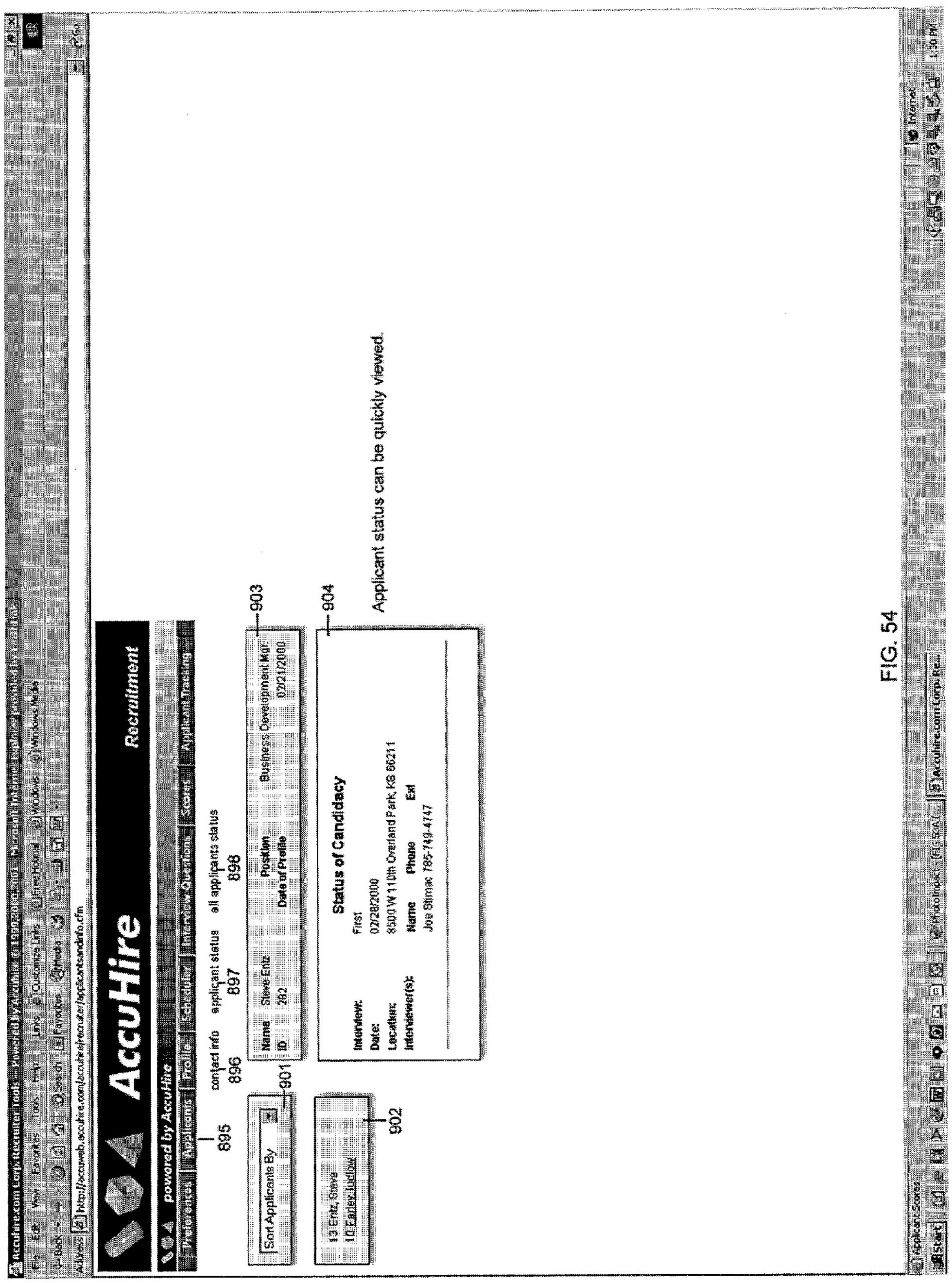
FIG. 54 illustrates an exemplary screen display (graphical user interface) of the present invention showing a particular job applicant status information.

Clicking on the "Applicants" pushbutton input 895 as shown in FIG. 54, reveals contact information link 896, an applicant status link 897 and an all applicants status link 898. Clicking on the applicant's status link 897 shows the status of a particular applicant. There is a position requirements drop-down input indicated by numeral 901, a listing of potential candidates indicated by numeral 902. By clicking on one of the applicants provides information about the job, indicated by numeral 903, as well as a status of the job candidacy in output 904.

Figure 55:
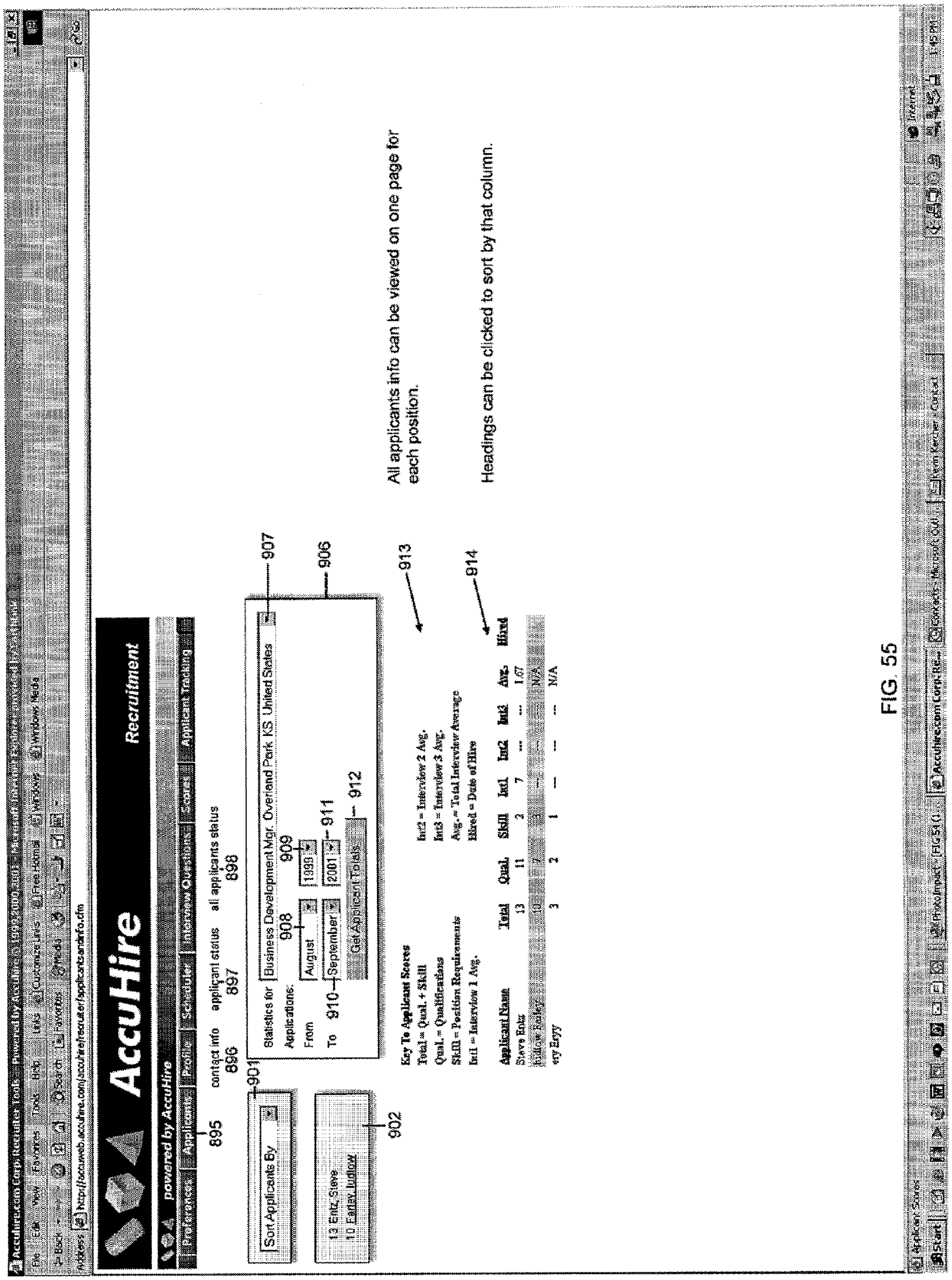
FIG. 55 illustrates an exemplary screen display (graphical user interface) of the present invention showing a status information for all job applicants associated with a particular position.
Figure 56:
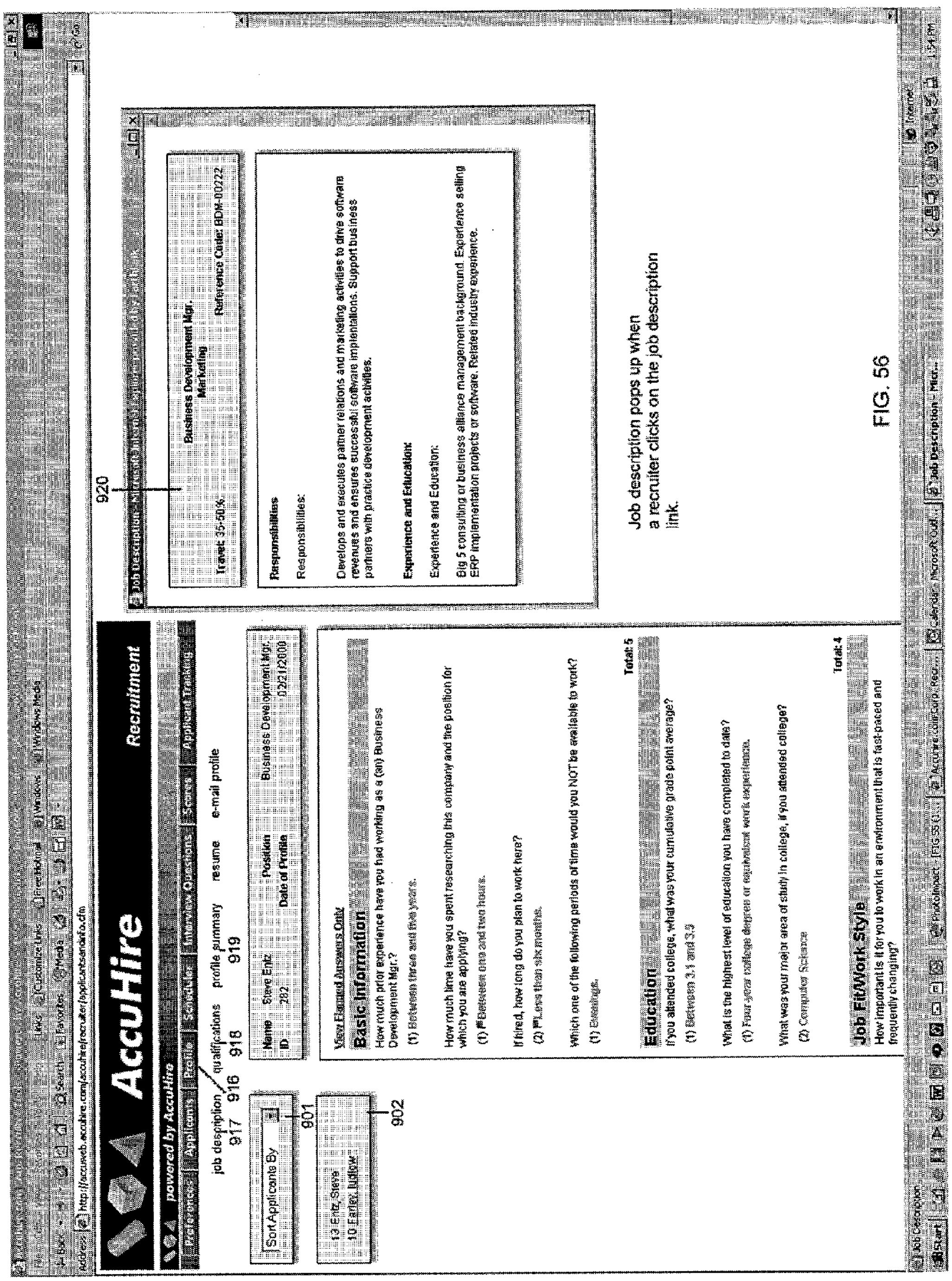
FIG. 56 illustrates an exemplary screen display (graphical user interface) of the present invention showing a profile summary of a job description.

By clicking on the "all applicants status" 898 input link shown in FIG. 55, you can be directed to a statistics output for a particular position, indicated generally by numeral 906, with a drop-down input indicated by numeral 907 for the particular position. There is a starting date (month and year) drop-down inputs 908 and 909, respectively, and a stopping date (month and year) inputs 910 and 911, respectively. There is a pushbutton input to obtain the applicant totals indicated by numeral 912, which provides information such as that listed under 913, which provides a key to the applicant's score, which is total score, qualifications scores, skill scores, first interview score, second interview score, third interview score, the average interview score, and the date of hiring. These are utilized in headings provided by numeral 914 so job applicants can be compared head-to-head with this tool on a quantitative basis. This tool allows the recruiter to quantitatively compare applicants based on objective information from a variety of sources and make the best possible decision. If you click-on the headings, the applicants can be sorted within that particular column so the user can see who ranks the highest within each particular category.

Clicking on input button 916 for profile provides three different links: one for job description 917: one for qualifications 918: and one for a profile summary 919. Clicking on job description 917 provides a description of the job description as indicated by numeral 920, with the percentage of travel, reference code, responsibility and experience and education. Other factors could be listed, and this is merely an illustrative example.

Figure 57:
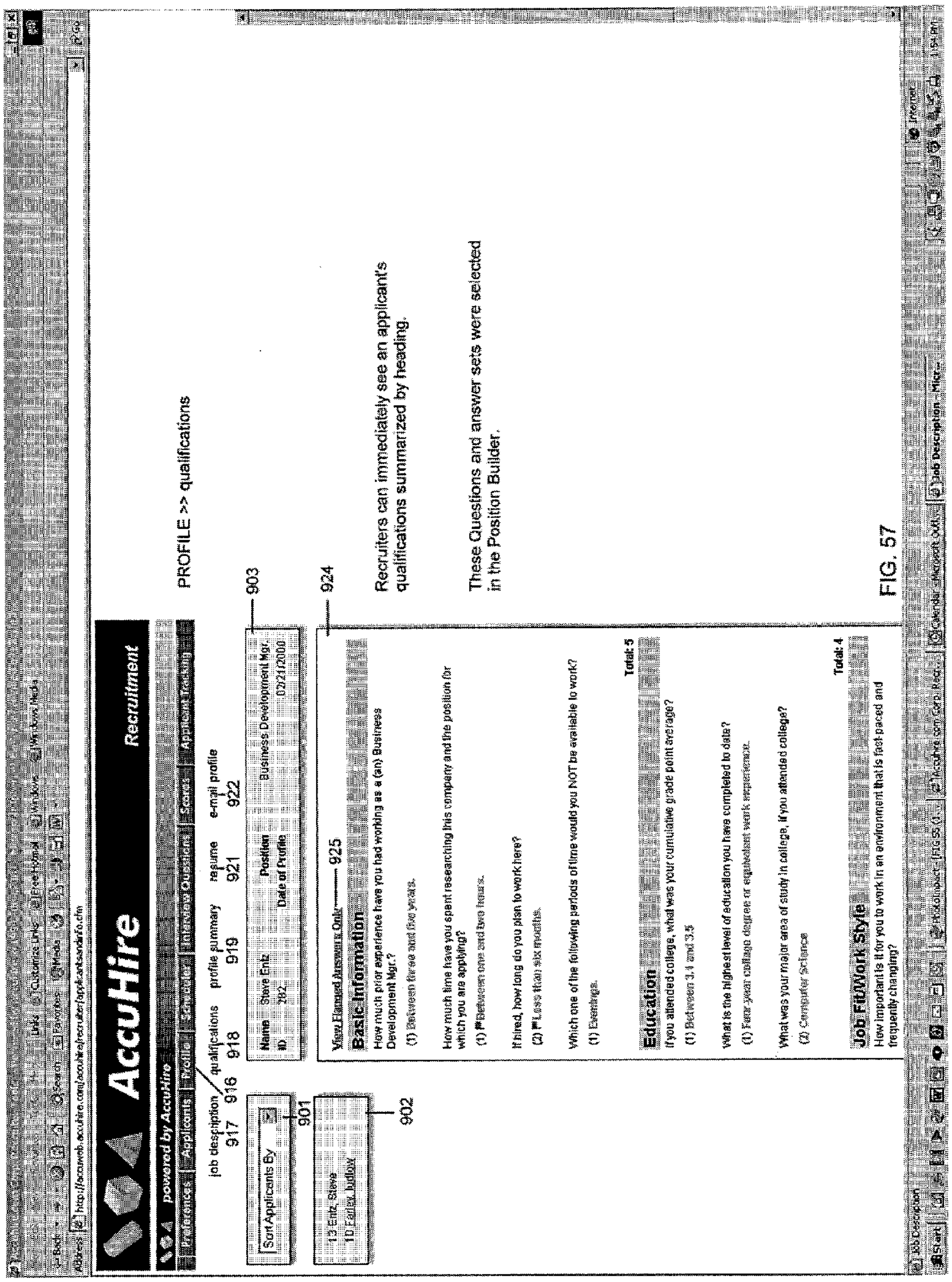
FIG. 57 illustrates an exemplary screen display (graphical user interface) of the present invention showing qualifications of a particular job applicant with answers to profile questions.

Selecting link 918 for qualifications provides an output 924 for answers to profile questions. These question answers that were selected in the position builder provide important answers that are pertinent to a job applicant's candidacy. This is shown in FIG. 57. Through the profile summary 903, the recruiter can view this information and gain insight into the applicant's work preferences.

Figure 58:
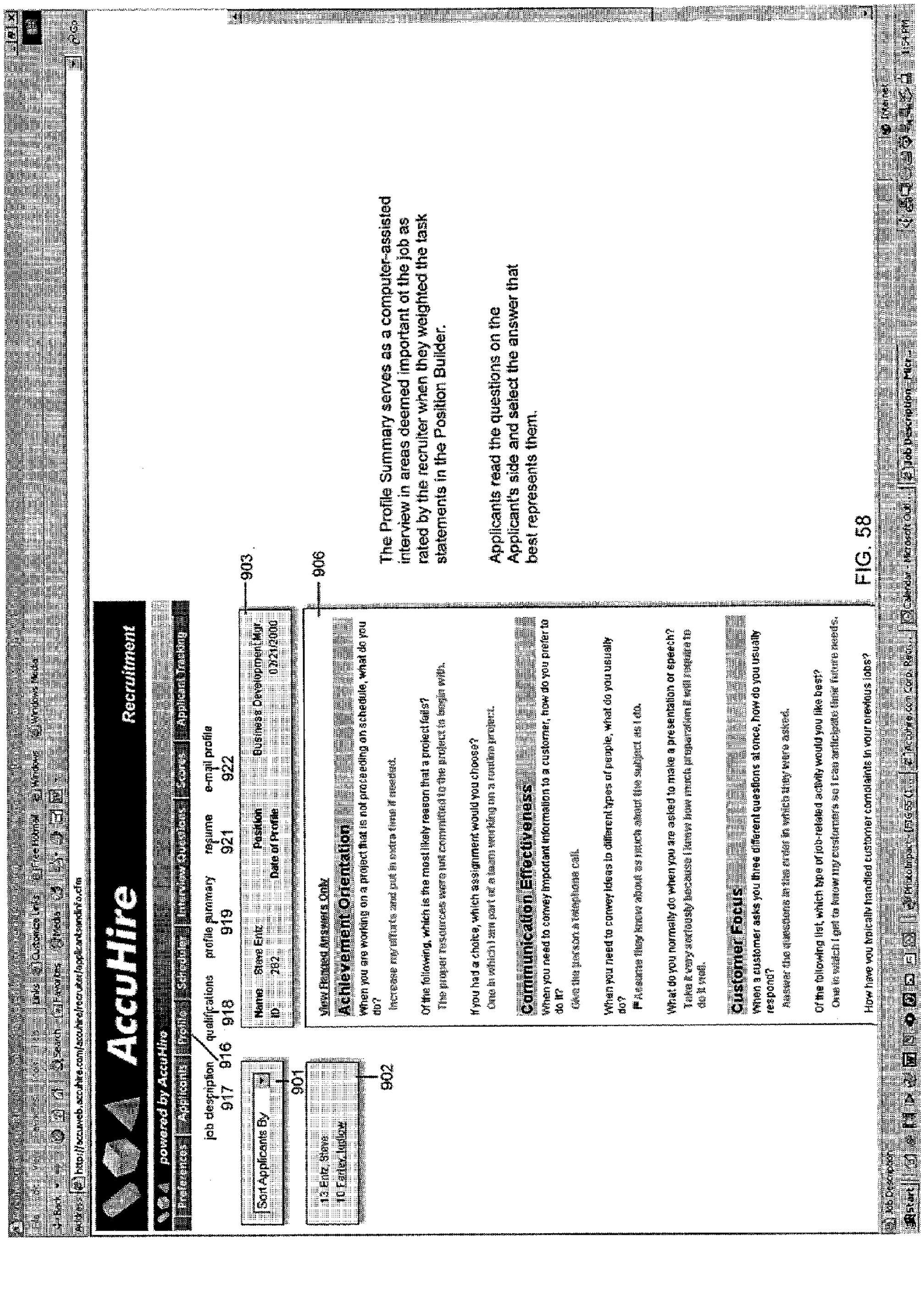
FIG. 58 illustrates an exemplary screen display (graphical user interface) of the present invention showing qualifications of a particular job applicant with answers to flagged profile questions.

Clicking on the profile summary 919, only flagged answers are shown where these problematic responses are flagged to help recruiters conduct a more detailed interview. Clicking link 925 to view the flagged answers only provides output 926, which lists each one that could represent a problem, shown in FIG. 58.

Figure 59:
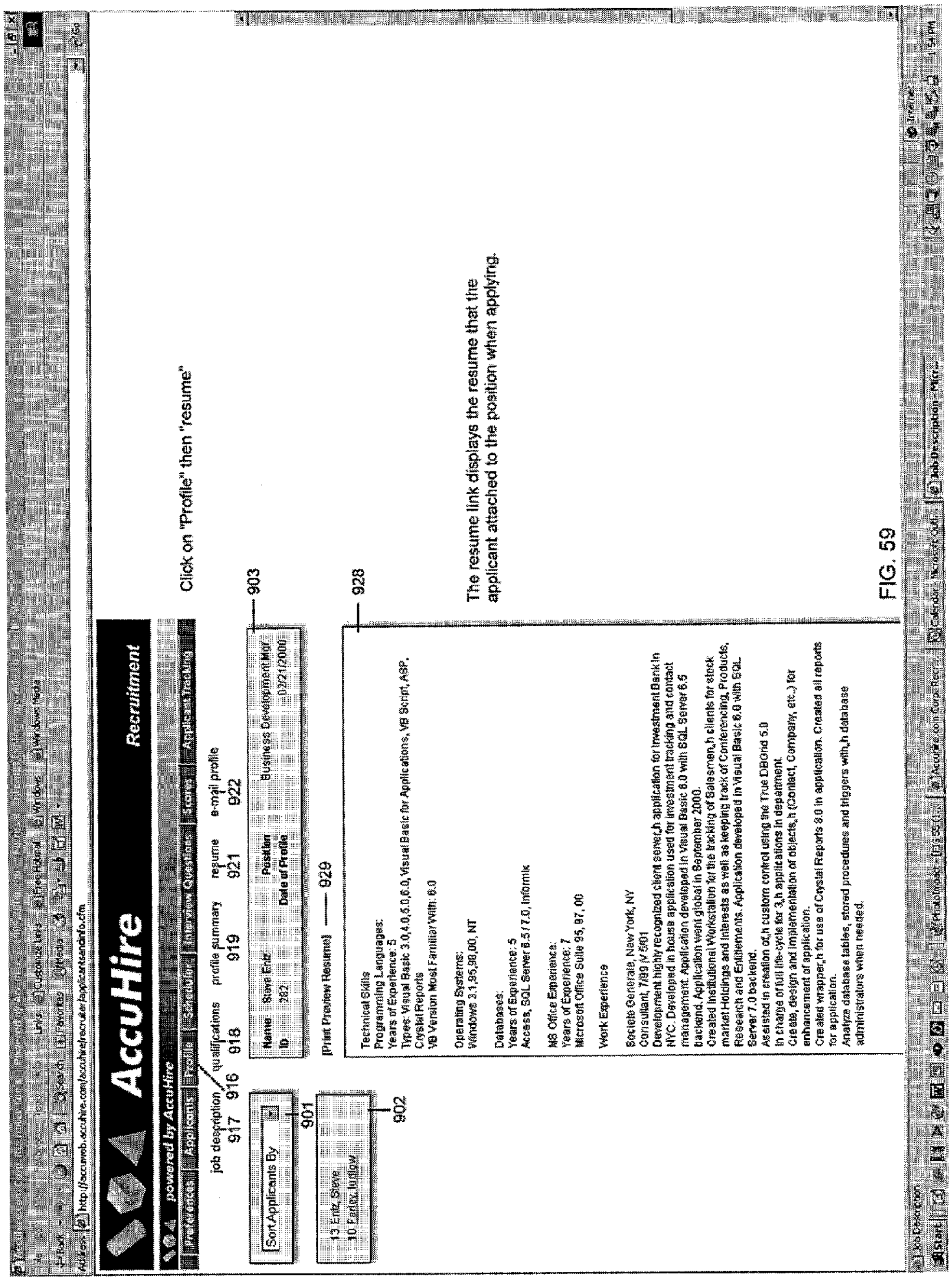
FIG. 59 illustrates an exemplary screen display (graphical user interface) of the present invention showing a summary of an applicant's resume.

Clicking the resume link 921 provides a summary of the resume 928, as shown in FIG. 59. The print function 929 is associated with receiving the resume.

Figure 60:
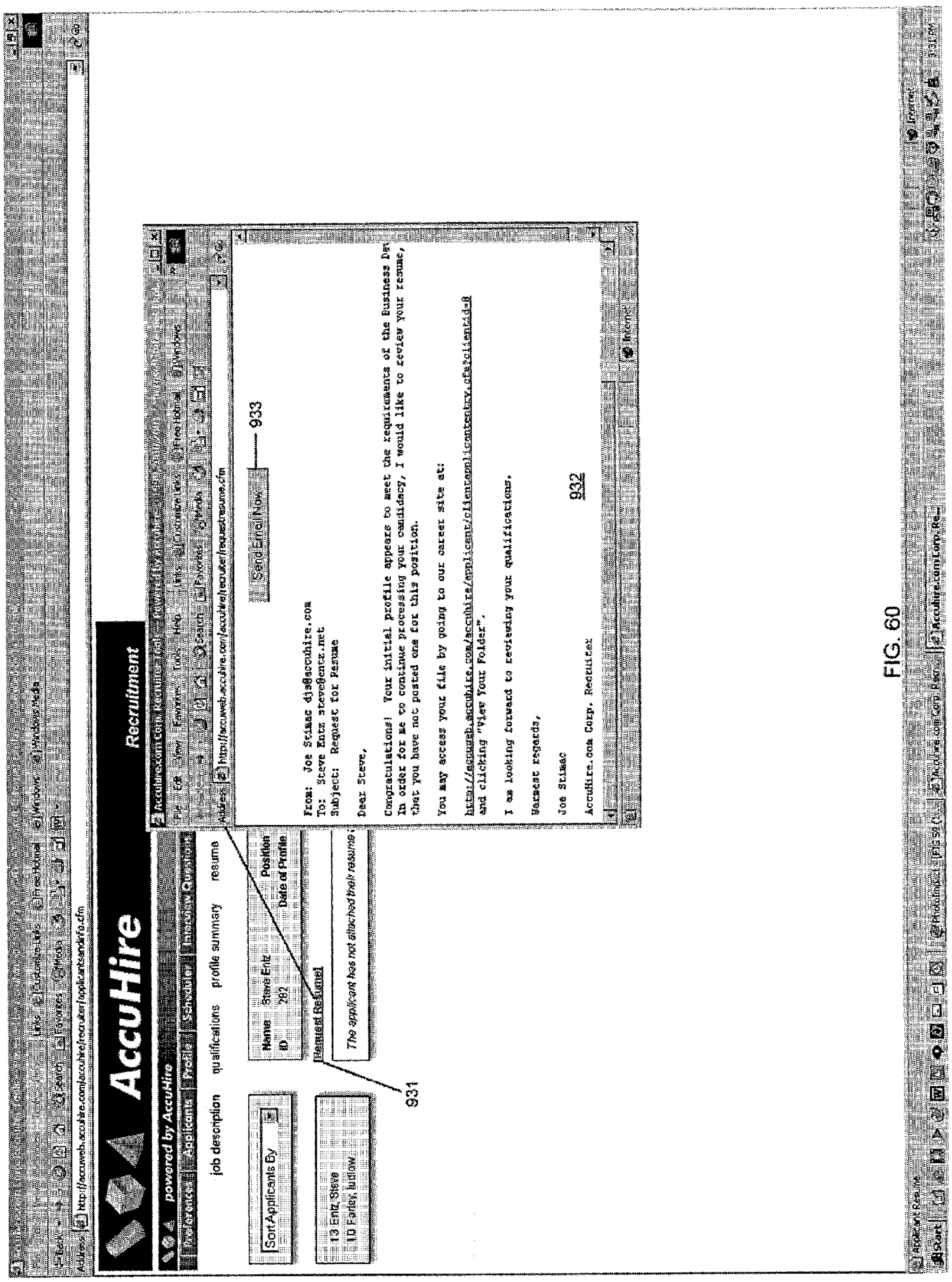
FIG. 60 illustrates an exemplary screen display (graphical user interface) of the present invention showing an e-mail request to a job applicant for additional information feature.
Figure 61:
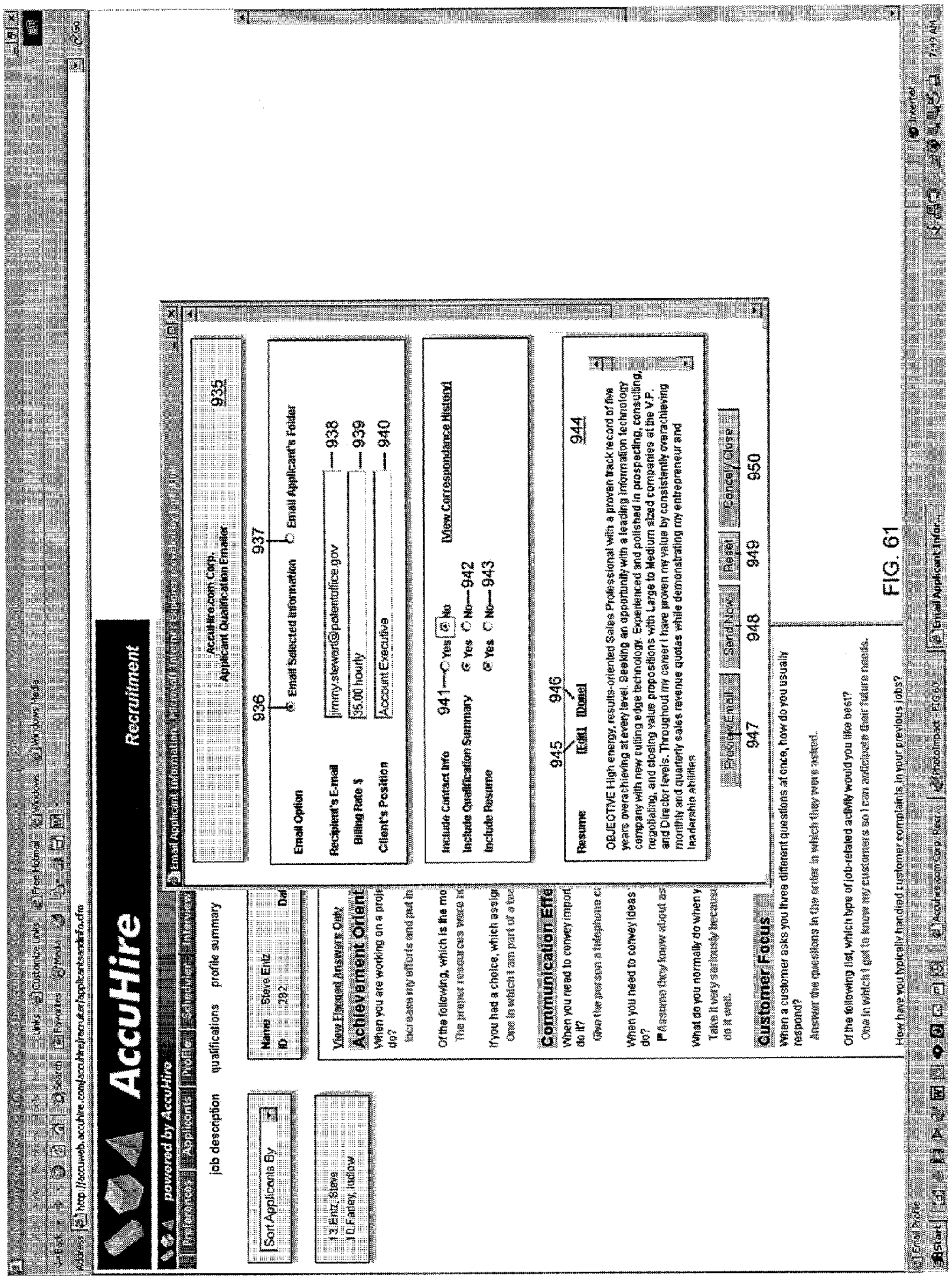
FIG. 61 illustrates an exemplary screen display (graphical user interface) of the present invention showing an e-mail job applicant summary feature.
Figure 62:
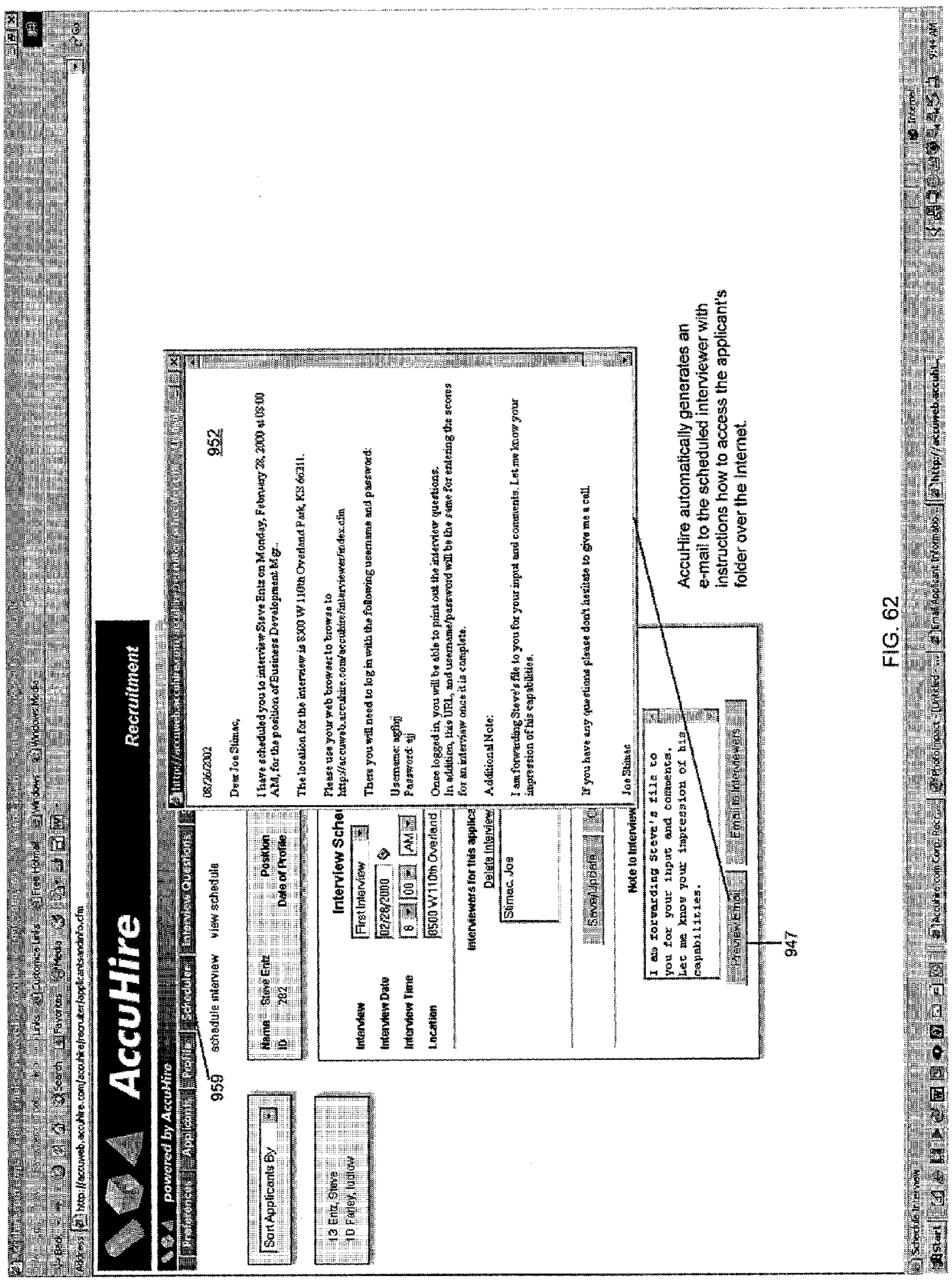
FIG. 62 illustrates an exemplary screen display (graphical user interface) of the present invention showing an interview-scheduling feature.
Figure 63:
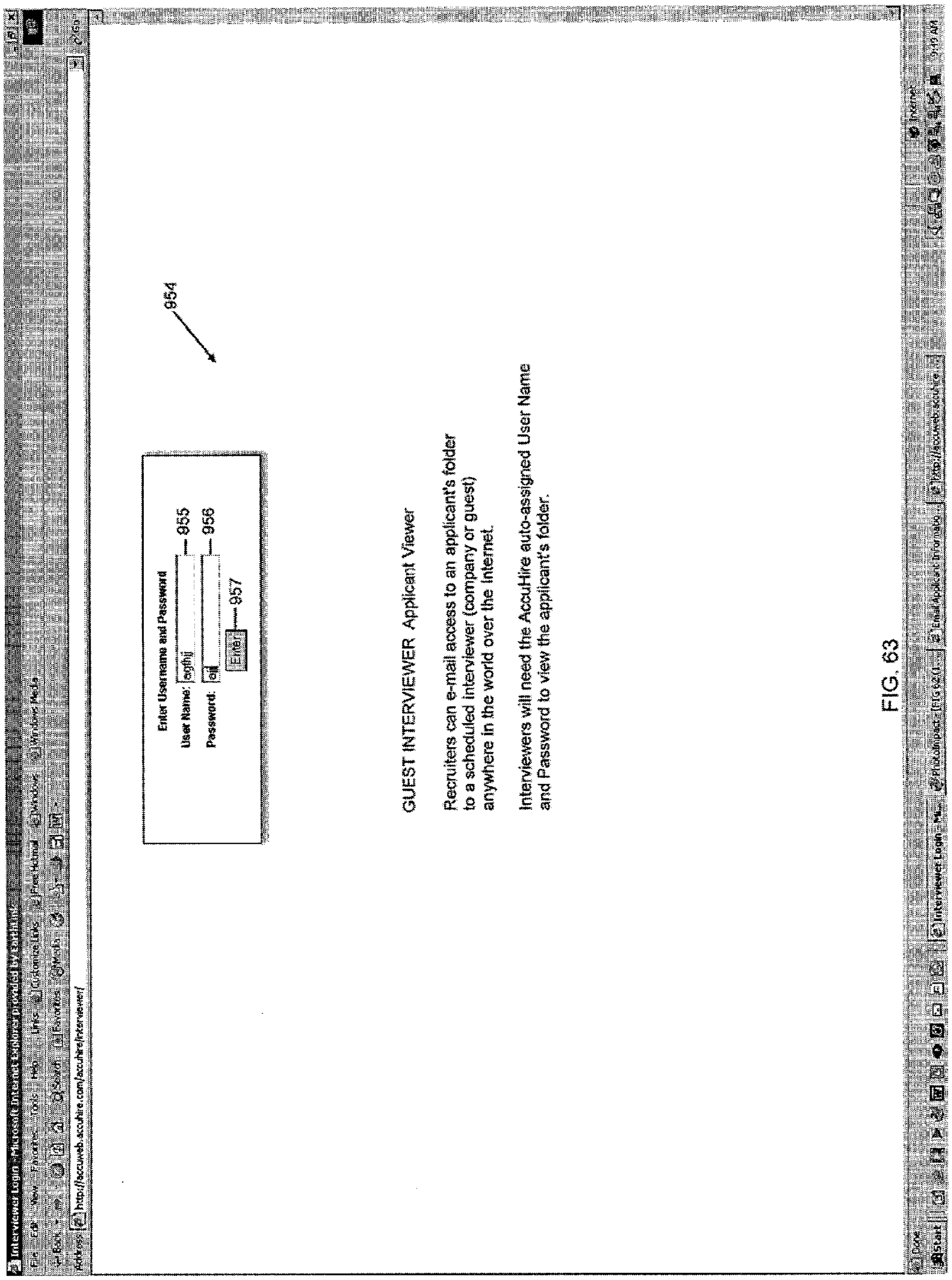
FIG. 63 illustrates an exemplary screen display (graphical user interface) of the present invention showing a guest interviewer log-on feature.

The user can also request a resume as indicated by function 931 in FIG. 60. This automatically generates a letter indicated by numeral 932, which invites the applicant to post their resume online through two different links. You can also send e-mail through pushbutton input 933. This will also generate a summary once the resume is received. By clicking on the e-mail profile link 922 as shown in FIG. 59, the recruiter can generate an applicant's qualification e-mail, generally indicated by numeral 935 on FIG. 61. This can be sent to other recruiters, other corporations, and so forth. The recruiter has a choice of e-mailing selected information through a mouse click-on input 936, or the applicant's entire folder through a click of the mouse in input 931. The recipient's e-mail address can be typed in input 938, with a billing rate in 939 and the client's position in 940. Through a series of yes and no single-click inputs the user can choose whether the e-mail includes contact information 940, qualification summary 942 or the resume 947. A summary of the resume is included in output 944, with an input 945 to edit or 946 when the editing of the summary is finished. There is a pushbutton input to preview the e-mail 947, send it immediately with pushbutton input 948, and the entire e-mail can be reset with pushbutton input 949, or the e-mail can be cancelled or closed with pushbutton input 950. This is a powerful tool that globally connects numerous recruiting functions throughout the world. The preview e-mail function 947 is shown in FIG. 62 with a sample e-mail generally indicated by 952. For someone else to view this confidential information such as a guest interviewer, there is a log-in input screen 954 for the user name, password and a submission button, indicated by 955, 956 and 957 respectively as shown on FIG. 63. One feature that should be highlighted is that guest interviewers can view all information available to the current interviewer, such as that shown on FIGS. 53 and 53A. This provides real-time informational input that allows the guest interviewer to make an interview based on all appropriate information. The viewer can decide which pre-qualified applicants can go to the interviewer, and interviewers can contact the applicant directly to schedule the interview, with the entire process absolutely paperless over the Internet. This includes access to all information found on FIGS. 57 and 58 for the guest interviewer and hiring manager.

Figure 64:
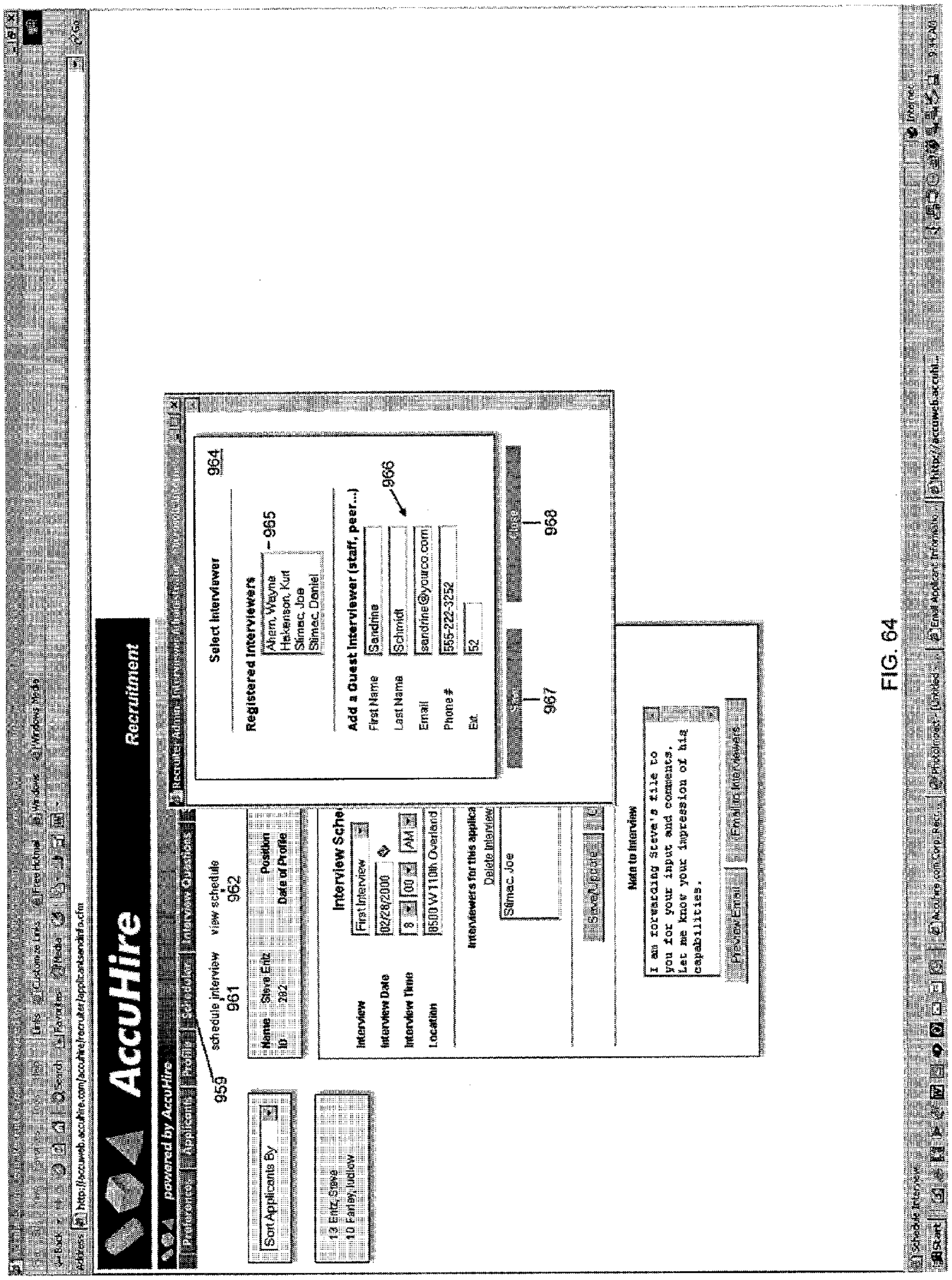
FIG. 64 illustrates an exemplary screen display (graphical user interface) of the present invention showing a guest interviewer-scheduling feature.

The next function is the scheduler function, indicated by numeral 959 on FIG. 64. This includes a schedule interview link 961 and a view schedule link 962. This allows you to select a particular interview on a screen indicated by numeral 964. There is a list of registered interviewers, found in 965, and you can add a guest interviewer with the functions listed under 966, which can include first name, last name, e-mail address, phone number and extension. This information can be saved under pushbutton input 967 or closed under pushbutton input 968.

Figure 65:
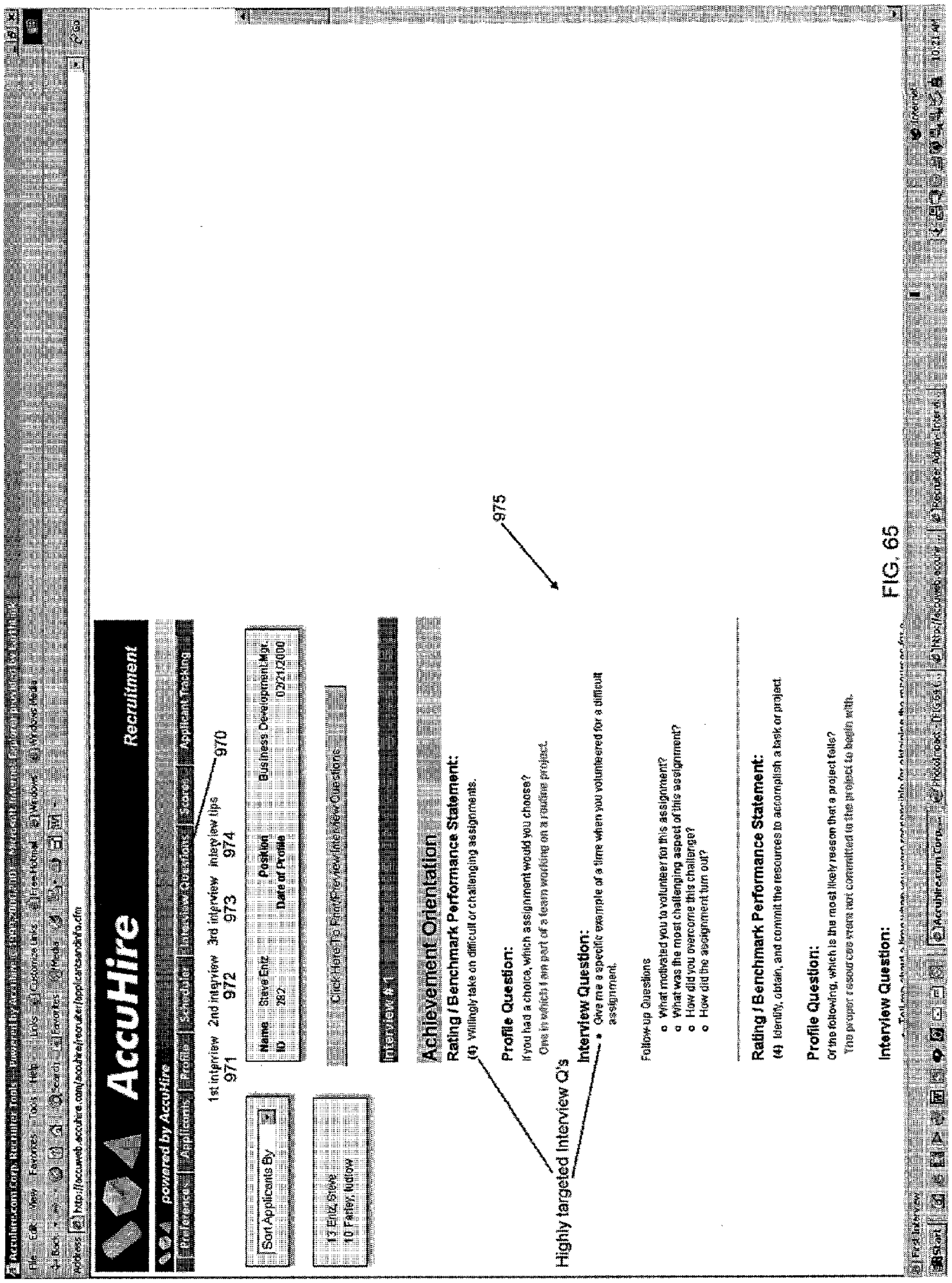
FIG. 65 illustrates an exemplary screen display (graphical user interface) of the present invention showing a first interview information feature.
Figure 66:
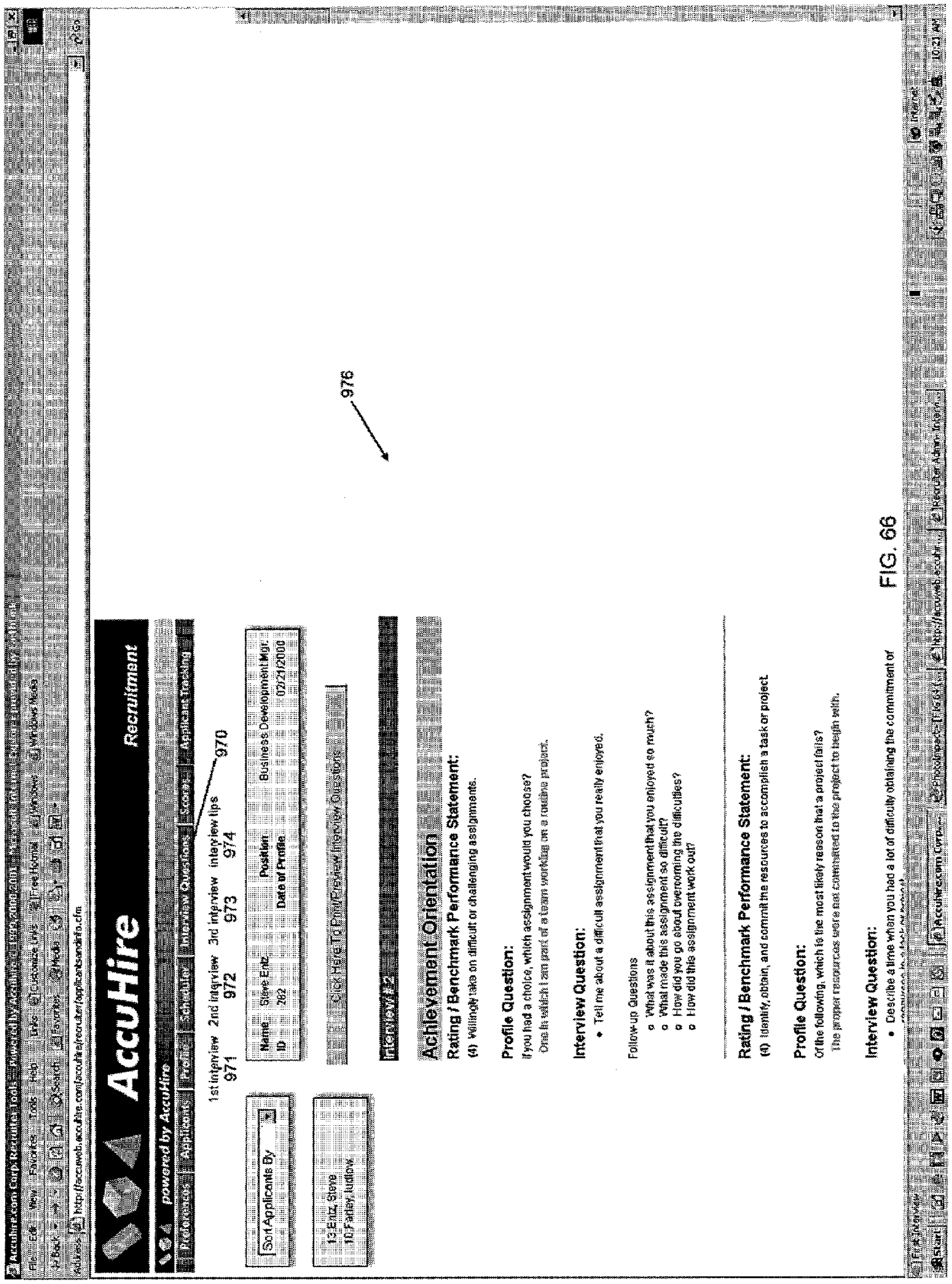
FIGS. 66 and 66A illustrate an exemplary screen display (graphical user interface) of the present invention showing a second interview information feature.
Figure 66A:
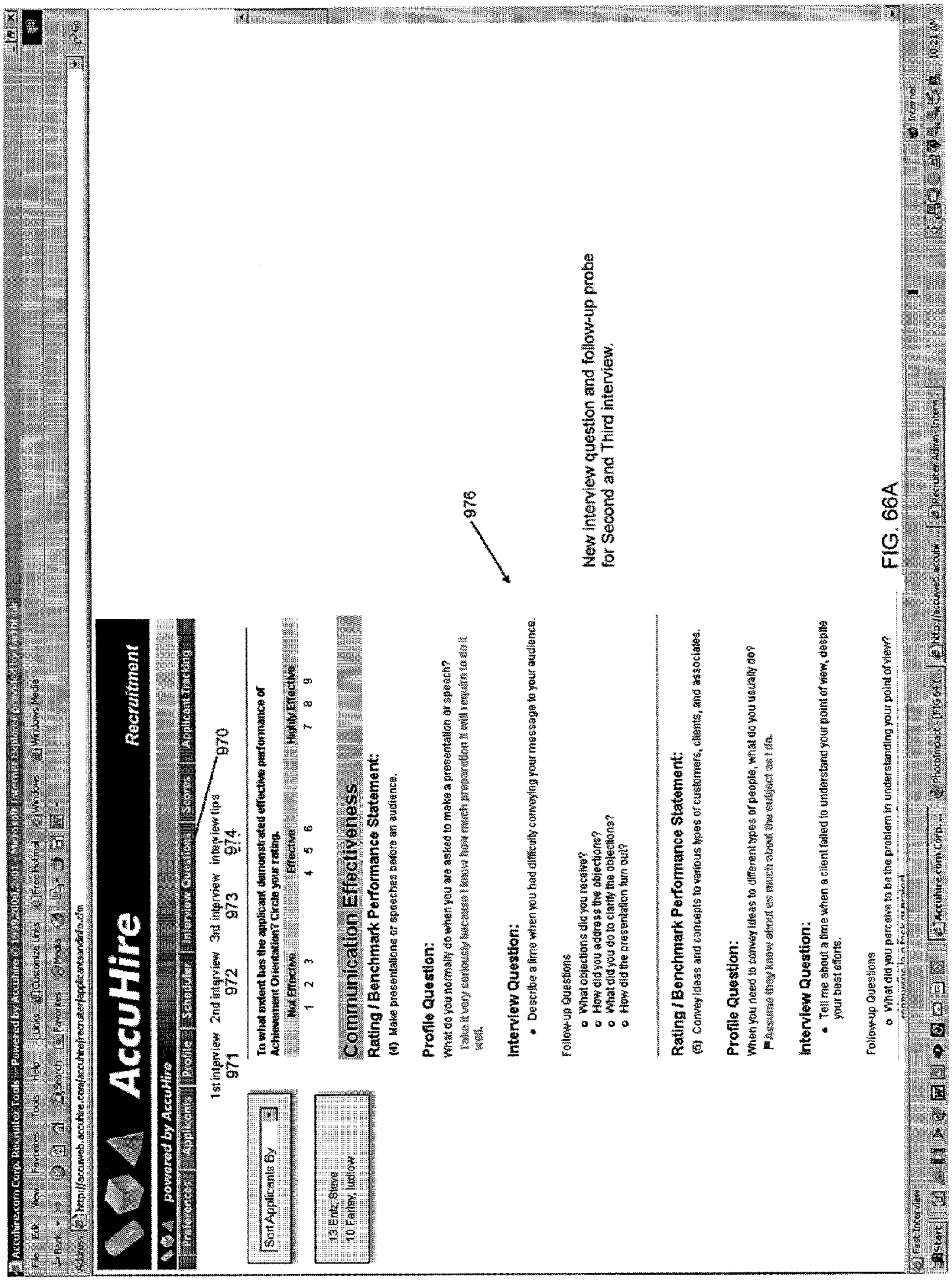
Figure 67:
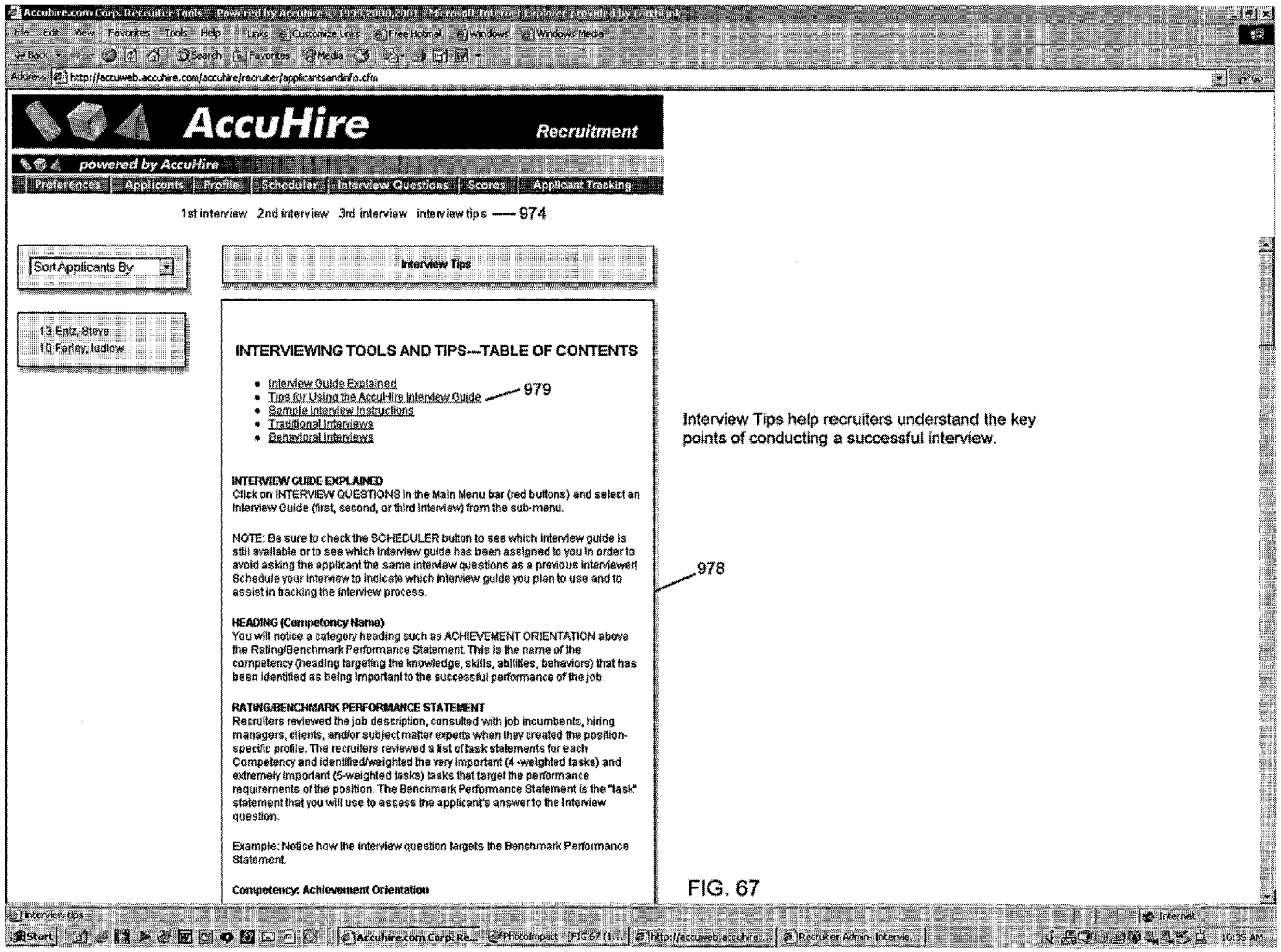
FIG. 67 illustrates an exemplary screen display (graphical user interface) of the present invention showing an interviewing tips feature.

The next function is the interview questions pushbutton 970, which provides three links. There is a first interview link 971, a second interview link 972, and interview tips 974. Clicking on the first interview link 971, as shown in FIG. 65, by selection material, including a rating/benchmark performance statement, the profile question, the interview question and follow up questions, all indicated by numeral 975. Clicking on the second interview link 972 also provides more information for the second interview regarding rating/benchmark performance statement, profile question, interview question and follow up questions, indicated by numeral 976 in FIGS. 66 and 66A. The third interview link 973 would provide similar information. The interview tips link 974 provides a helpful guide to interviewing, linked to various parts of an interview tips recruiting manual that provides insight into what types of questions to ask, how to ask them and some of the legal parameters involved. This is generally indicated by numeral 978, with a listing of links to various portions of this manual indicated by 979 on FIG. 67.

Figure 68:
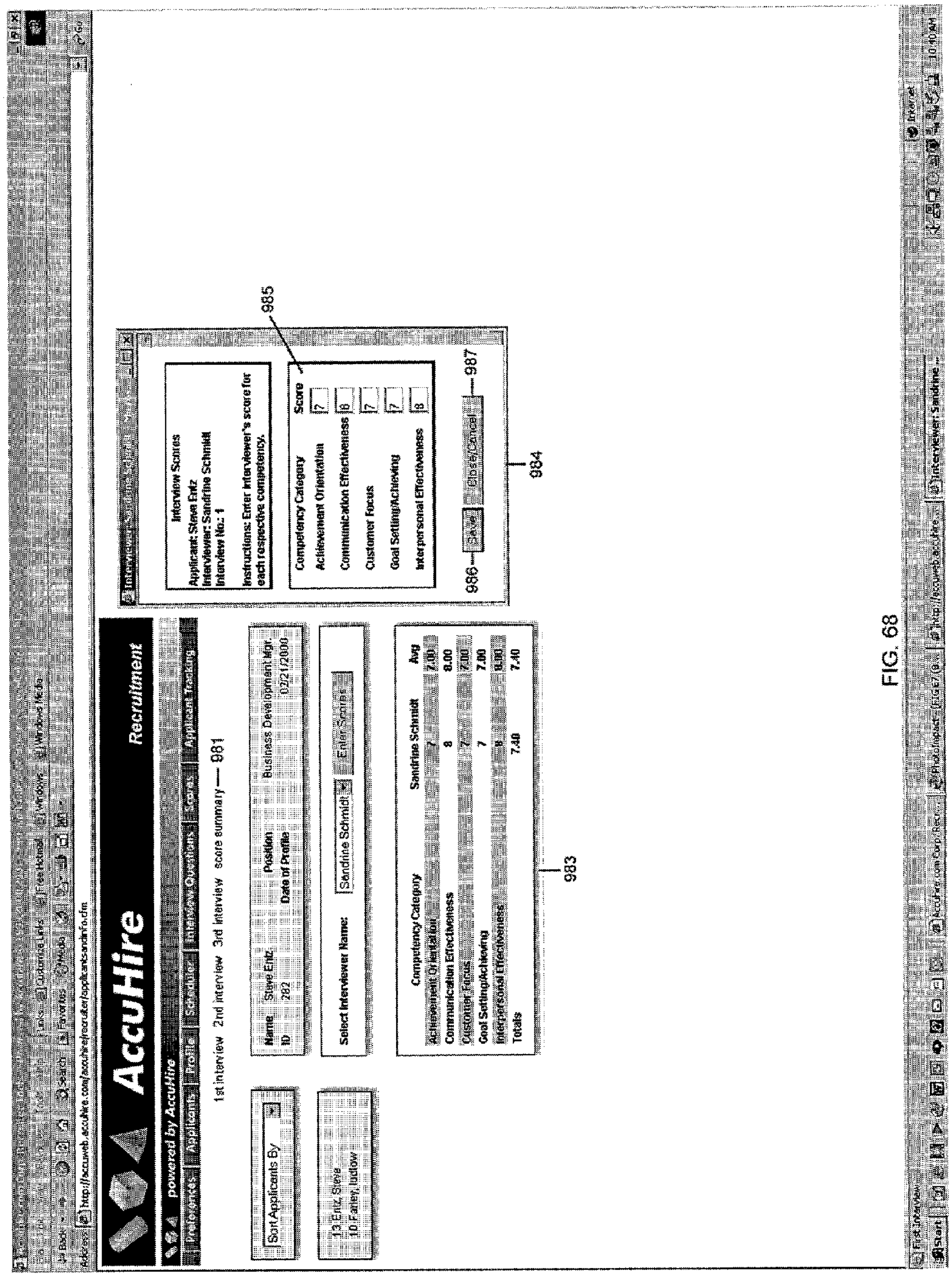
FIG. 68 illustrates an exemplary screen display (graphical user interface) of the present invention showing a job applicant score summary feature.
Figure 69:
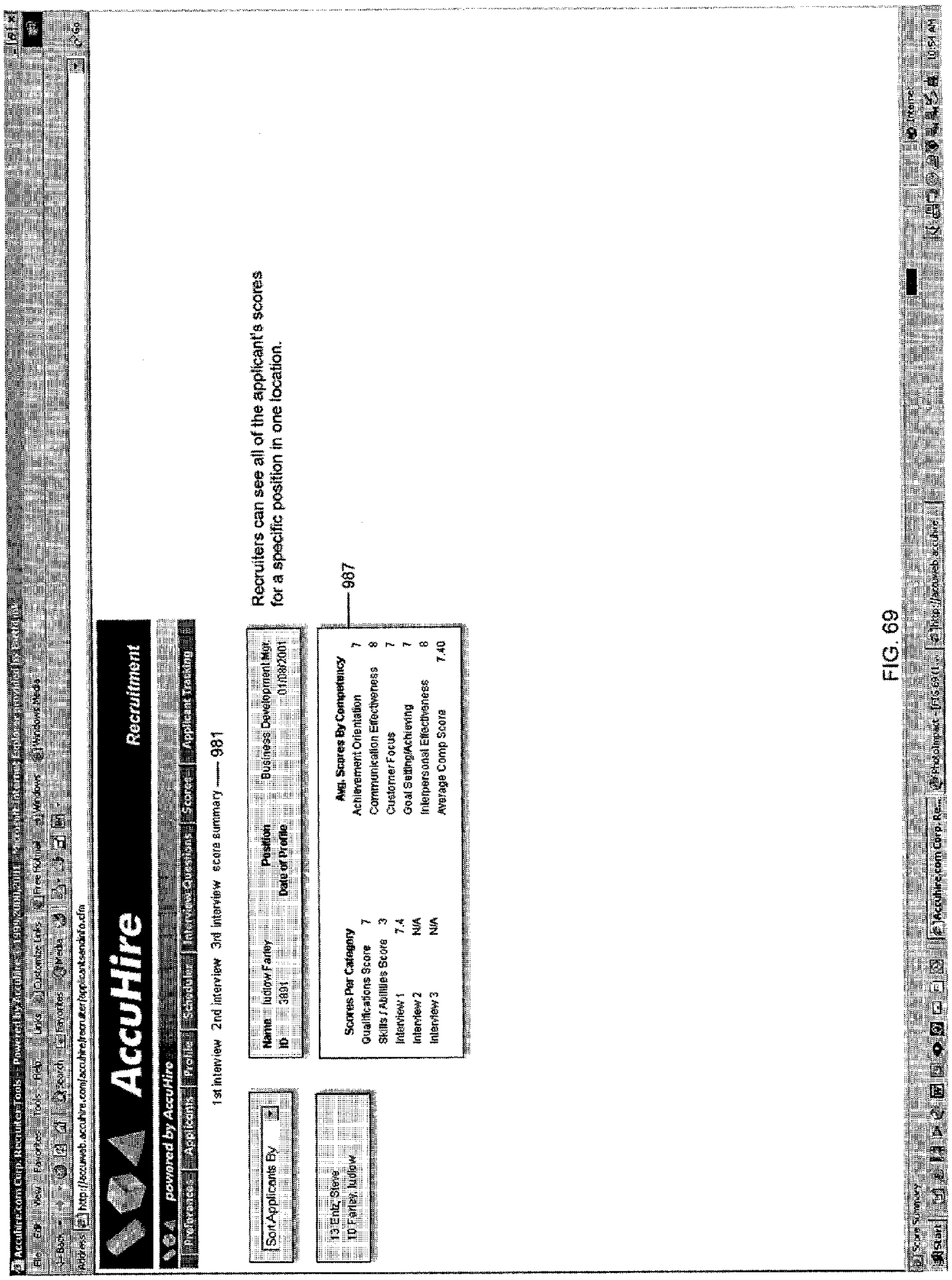
FIG. 69 illustrates an exemplary screen display (graphical user interface) of the present invention showing another aspect of the job applicant score summary feature as shown in FIG. 68.

As shown in FIG. 68, there is score summary link for each applicant listed under numeral 981, with the output of competency categories, the applicant and the average under output 983, and a listing of interview scores through output 984, including a listing of scoring under 985. This screen can be saved under 986 or closed and canceled under 987. This feature is listed in FIG. 68. The score summary under 981 also lists the scores per category and average scores by competency, as indicated by numeral 987 on FIG. 69.

Figure 70:
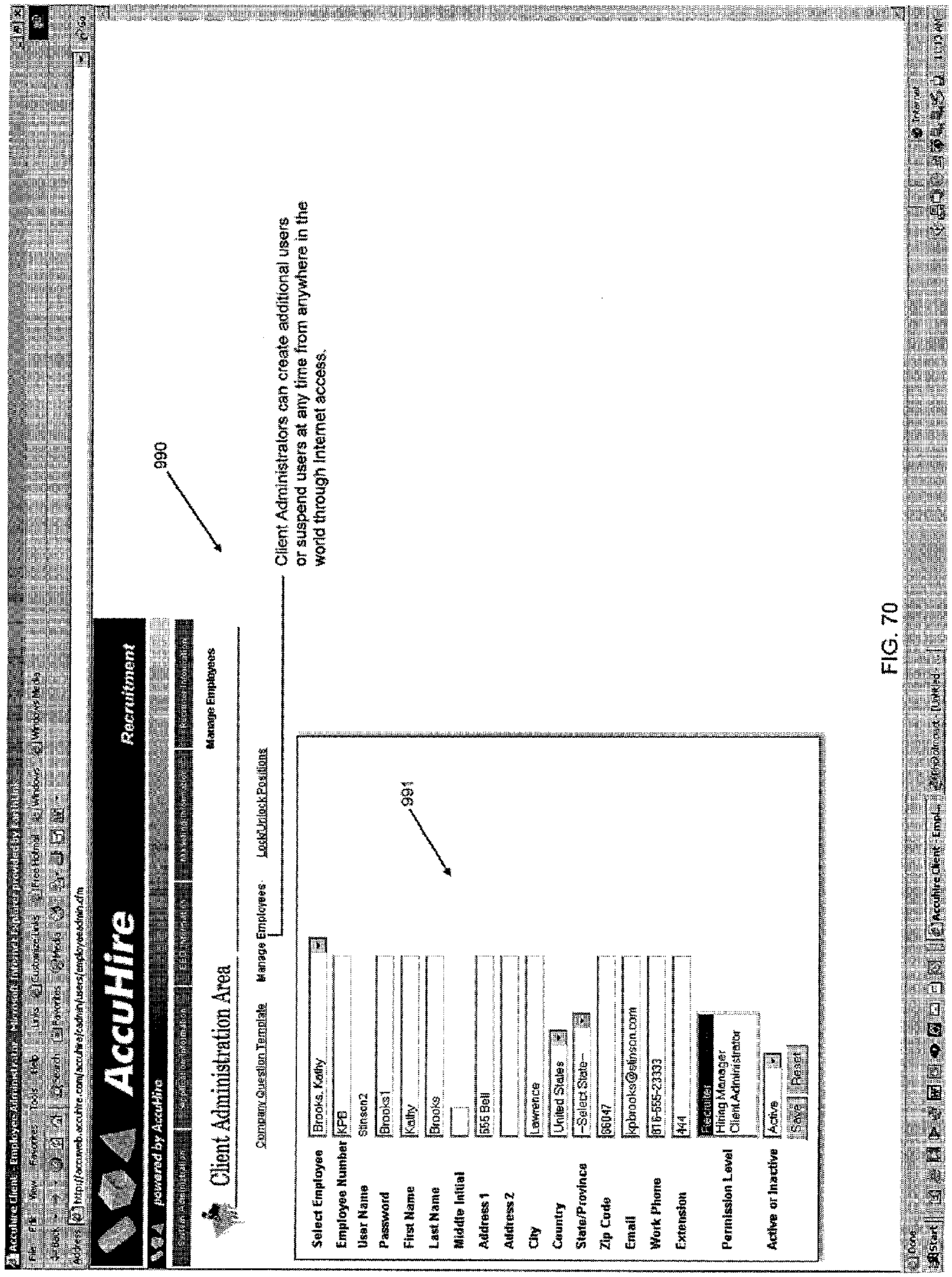
FIG. 70 illustrates an exemplary screen display (graphical user interface) of the present invention showing a main client administration screen.
Figure 71:
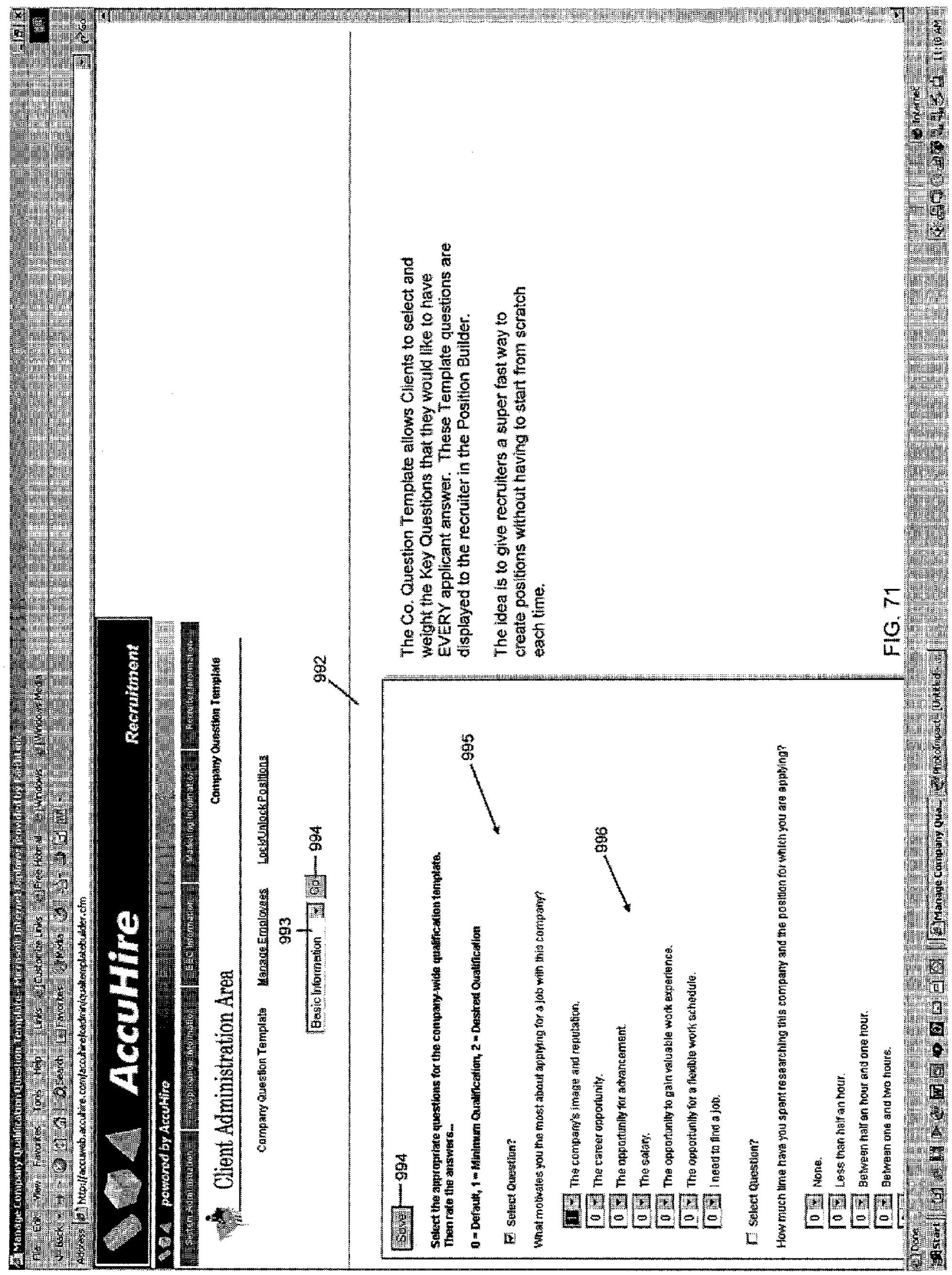
FIG. 71 illustrates an exemplary screen display (graphical user interface) of the present invention showing a question template development feature for common questions affecting all members of an organization.

Yet another feature of the present invention is the client administration area, generally indicated by number 990. Input 991 provides a complete listing of information for users, such as name, address, middle initial, city, state/province, and zip code, which could include some drop-down menus, shown in FIG. 70. FIG. 71 provides a basic organization-wide listing of questions for every job applicant as generally indicated by numeral 992. The type of template can be selected in drop-down menu 993 with a go pushbutton input function 994. The defaults can be changed under 995, with the specific questions indicated by 996 in drop-down menus, and saved through pushbutton input 997 on FIG. 71.

Figure 72:
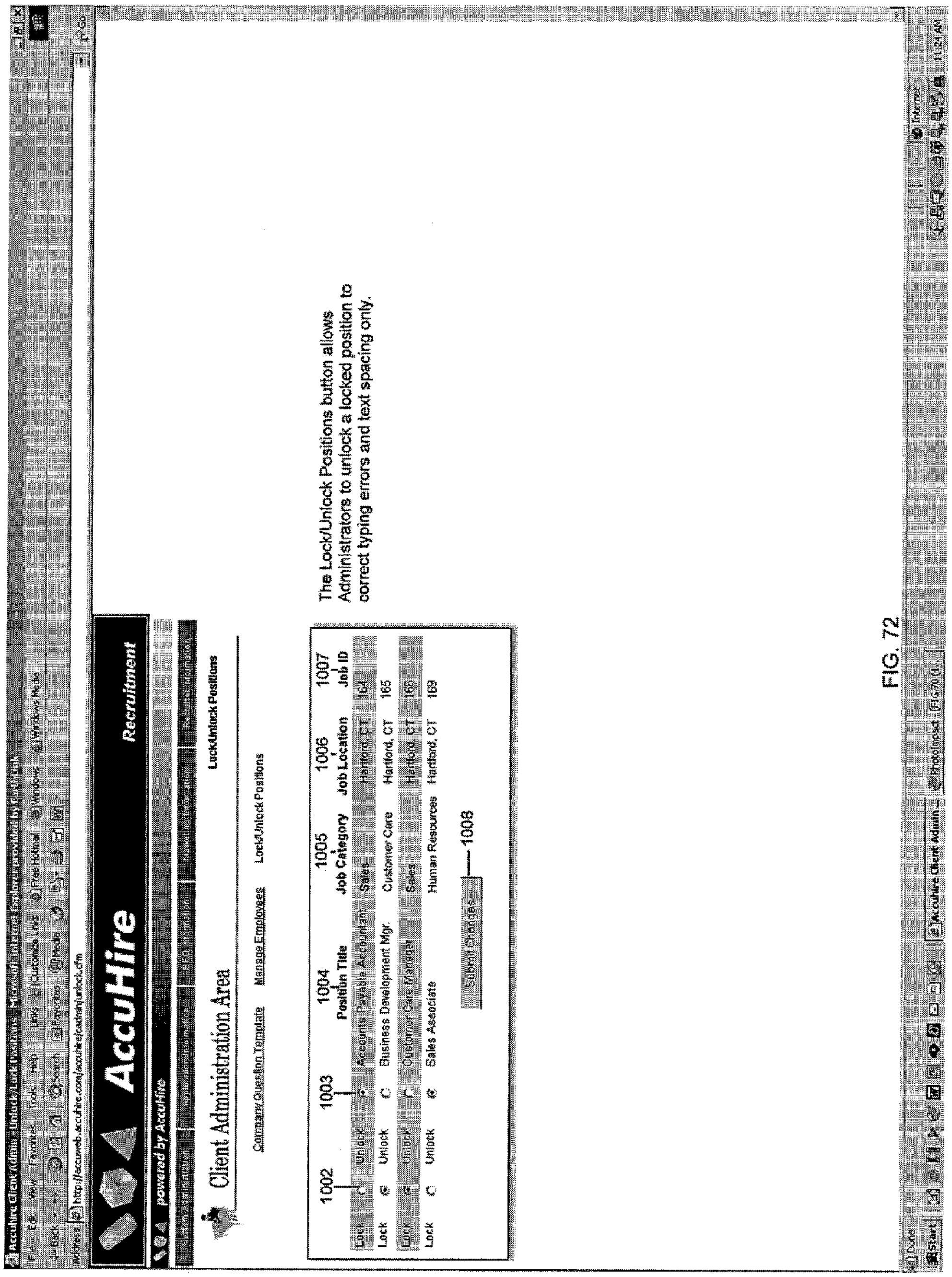
FIG. 72 illustrates an exemplary screen display (graphical user interface) of the present invention showing a position lock-down feature.

Position information can be locked and unlocked by selecting a location through drop-down input 1001. They can be either locked through a click-on mouse input in column 1002 or unlocked in column 1003 through the same process. Column 1004 lists the position title, 1005 lists the job category, 1006 the job location and 1007 the job identification number. These changes can be submitted through pushbutton input 1008 on FIG. 72.

Figure 73:
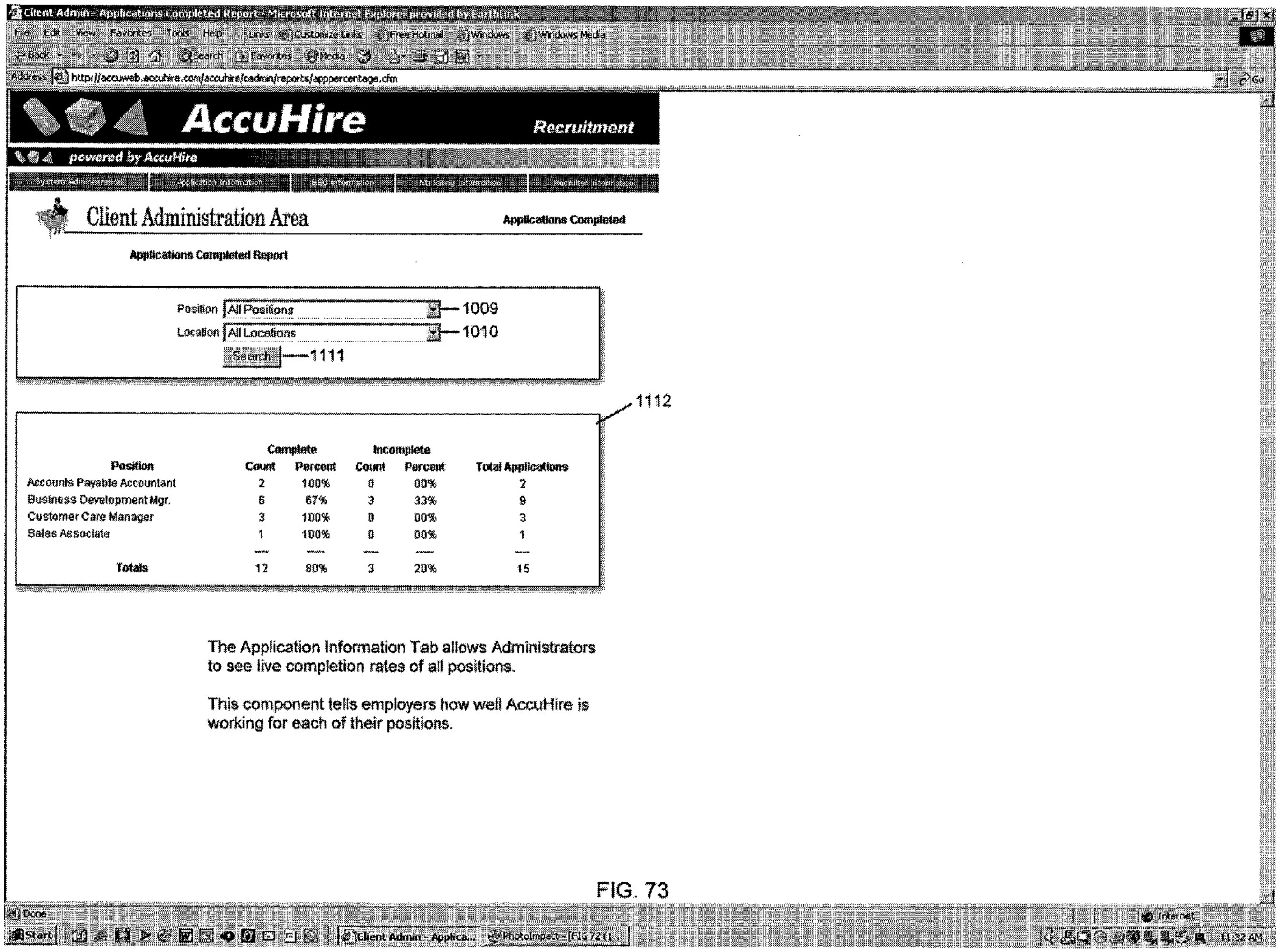
FIG. 73 illustrates an exemplary screen display (graphical user interface) of the present invention showing a job applicant information screen detailing the filing of open positions.

Referring now to FIG. 73, drop-down input 1009 in the client administration area allows you to search for all selected positions as well as locations through drop-down input 1010. Once a position and location are selected a search function can be initiated through search input pushbutton 1011, which provides a complete readout of the position, whether it has been filled, whether it is incompletely filled, and the total number of applications. The completion rates on all positions will tell how well the present invention is working for each of these positions. This is indicated by the output found in numeral 1012.

Figure 74:
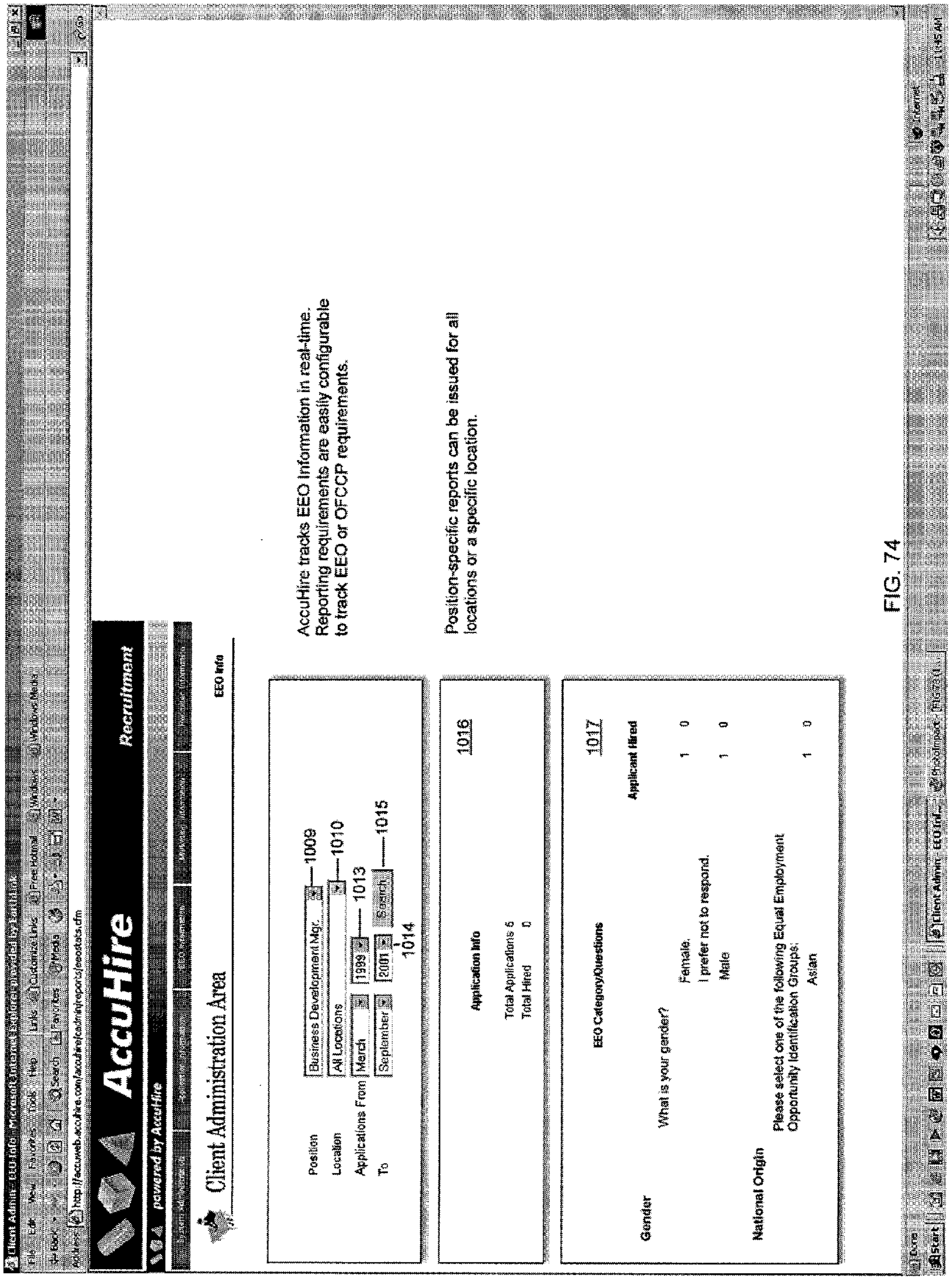
FIG. 74 illustrates an exemplary screen display (graphical user interface) of the present invention showing a job applicant information screen detailing equal employment opportunity data.

Referring now to FIG. 74, equal employment opportunity information from job applications can be revealed through the position drop-down input 1009 and location drop-down input 1010 where you can select from job applications in a certain date range with both the month and the year, indicated by drop-down input 1013 to an end date through drop-down input 1014, and then search on those functions based on clicking pushbutton input 1015. The output will be the total applicants and total number of people hired in application information indicated by output 1016, and also an output on Equal Employment Opportunity categories and questions indicated by 1017.

Figure 75:
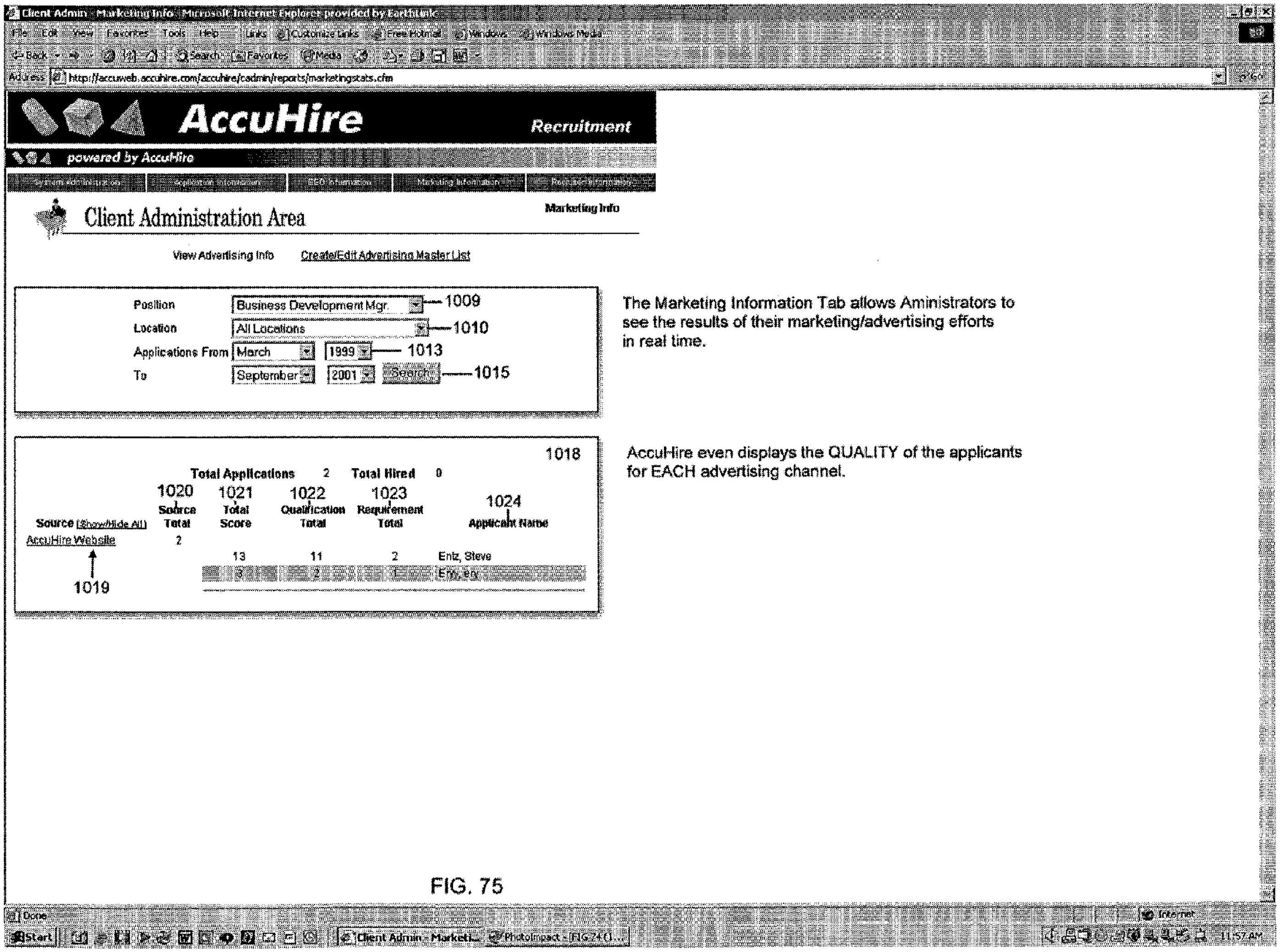
FIG. 75 illustrates an exemplary screen display (graphical user interface) of the present invention showing a job applicant information screen detailing marketing effectiveness for various job positions.

So by inputting the position, location, and date range, as shown in FIG. 75, you can also see the marketing source of the job applications, as indicated by numeral 1018, such as what marketing source the job application came from 1019, the total job applications for that marketing source 1020, the total score 1021, qualification score 1022, requirement total 1023 and the name of the job applicant 1024. The user can see the effectiveness of each advertising channel, based on the score and the ability to obtain qualified applicants.

Figure 76:
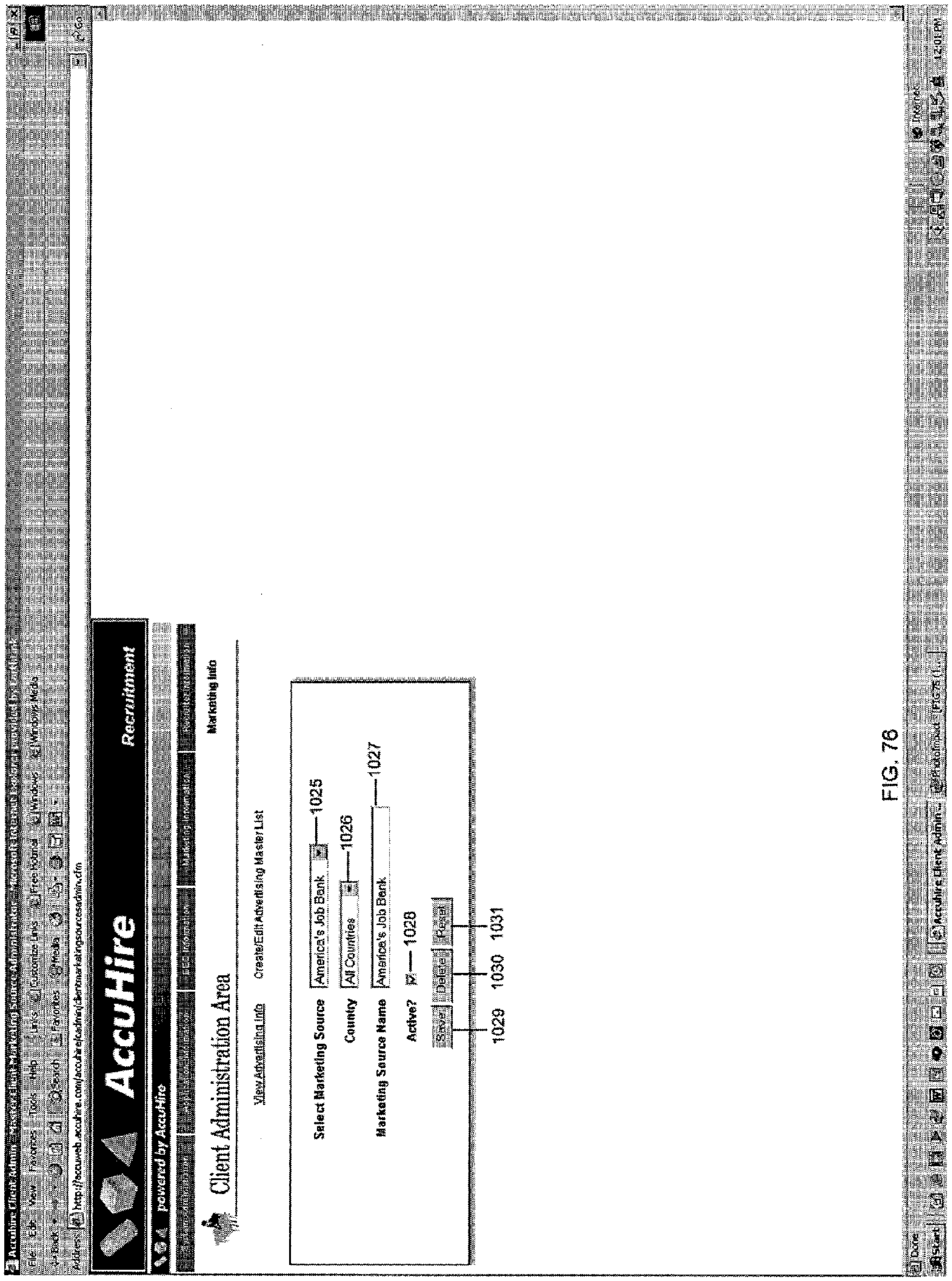
FIG. 76 illustrates an exemplary screen display (graphical user interface) of the present invention showing an import function for key marketing channels for job positions.

Also, the user can also select a certain marketing source, as shown in FIG. 76, through drop-down input 1025, a particular country 1026, a marketing source name 1027, and an input as to whether this marketing source is active through click-on input 1028. This information can be saved through pushbutton input 1029, deleted through pushbutton input 1030, or reset in pushbutton input 1031 as shown in FIG. 76. This allows administrators to create key advertising channels so recruiters can import this information to the position builder function of the present invention.

Figure 77:
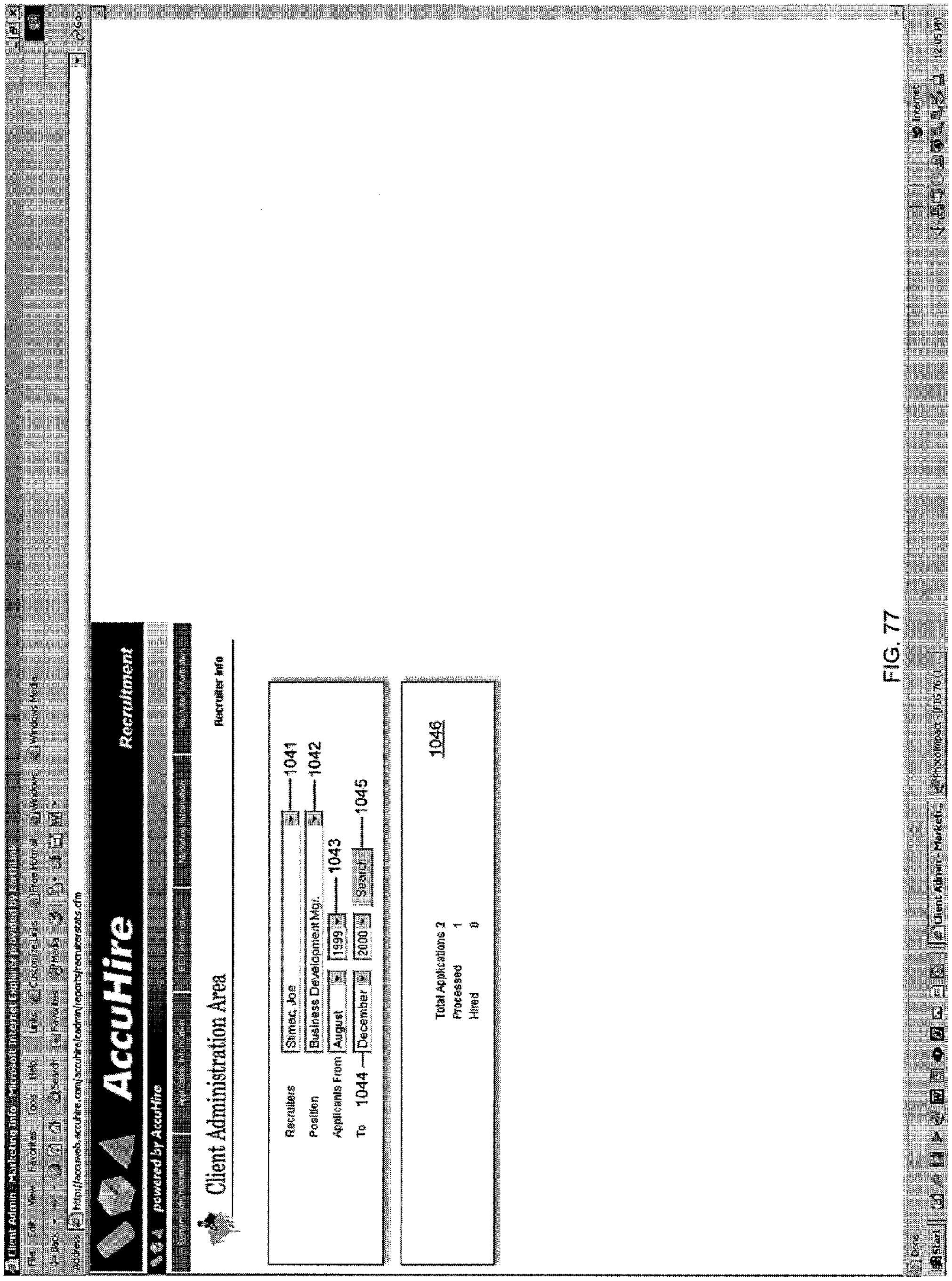
FIG. 77 illustrates an exemplary screen display (graphical user interface) of the present invention showing performance statistics for each individual recruiter or human resource personnel.
Figure 78:
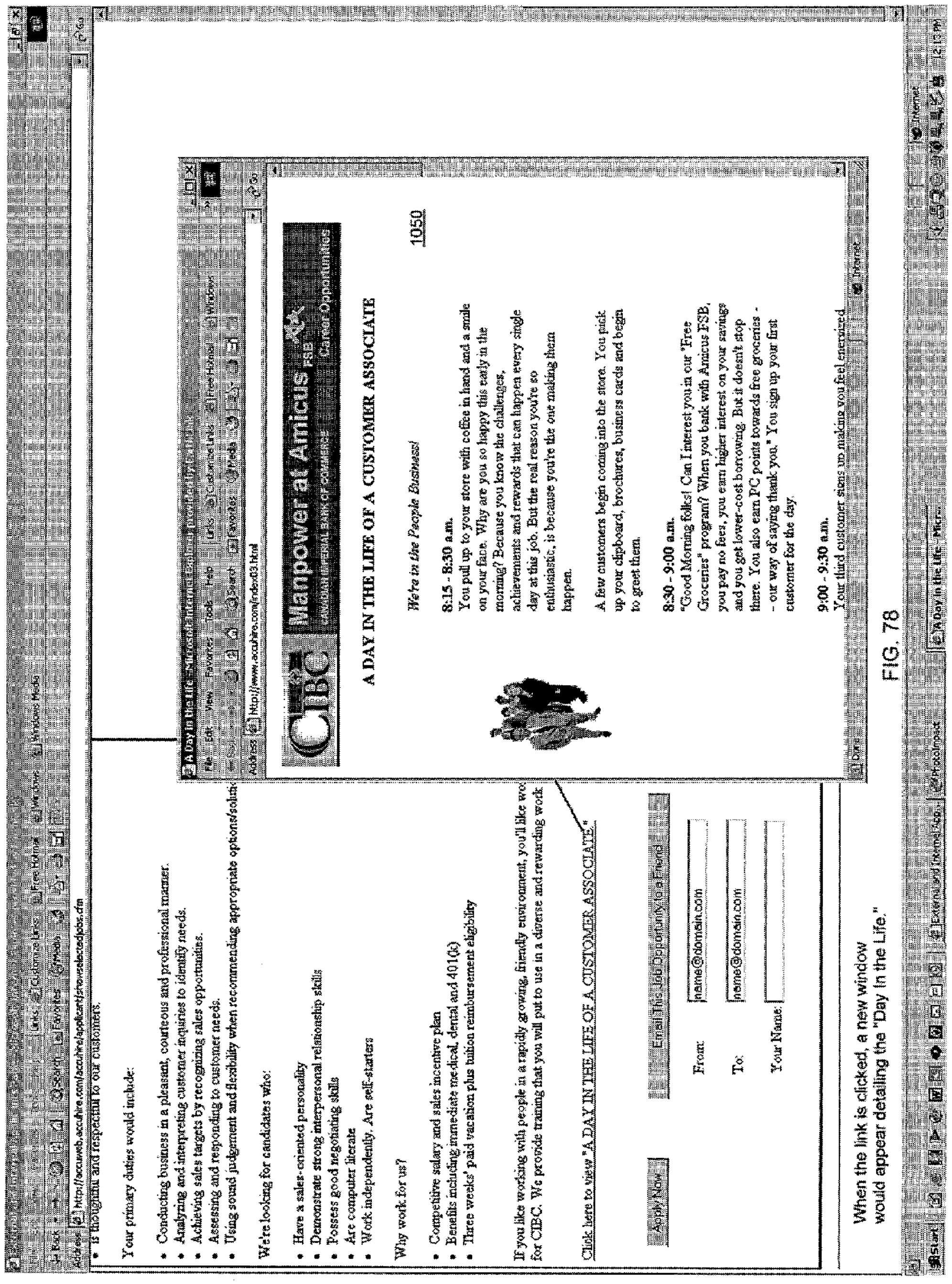
FIG. 78 illustrates an exemplary screen display (graphical user interface) of the present invention showing what it would be like to spend a day in the job that has the offered job opening.

Another important feature is shown in FIG. 77, which allows an individual to track a recruiter's or human resource personnel's performance through drop-down input 1041 or with respect to a particular position through drop-down input 1042. The user can set a beginning date with a month and year through drop-down input 1043, or an ending date with a month and year through drop-down input 1044, with a search input function 1045. The result is outputted as shown by numeral 1046, which lists the total number of applications, such as those processed and the applicants that are hired from this source. This provides a powerful tool that truly and effectively determines the effectiveness of the marketing tools.

Yet another feature of the present invention is shown in FIG. '78, which allows the job applicant to evaluate what it would be like to spend a day in the life of the person who would be in that job position as indicated by numeral 150. This provides real insight into the job opening so that better suited and more qualified candidates apply for the job by opening this window into the position.

Figure 79:
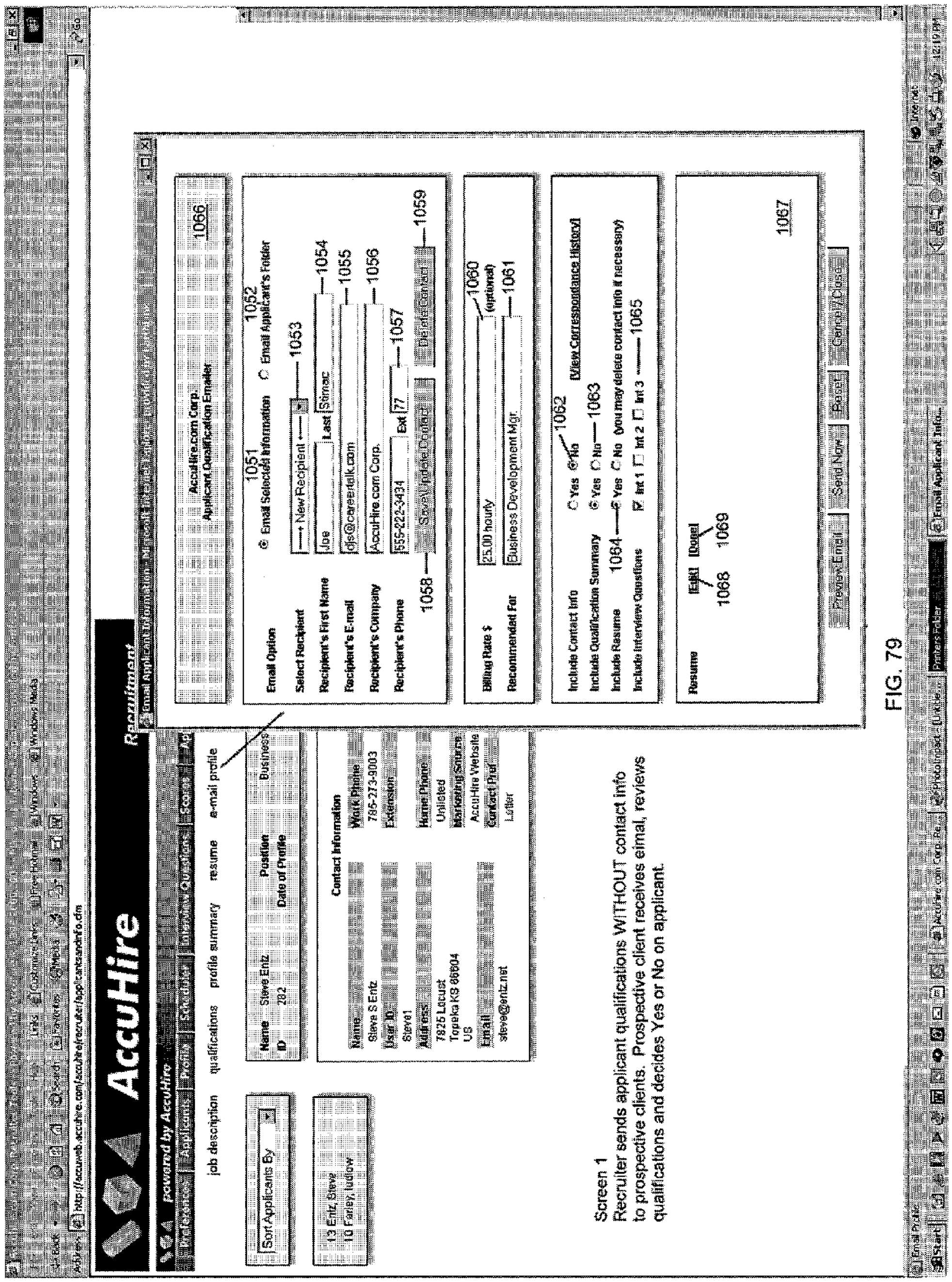
FIG. 79 illustrates an exemplary screen display (graphical user interface) of the present invention showing an e-mail job applicant summary feature.
Figure 80:
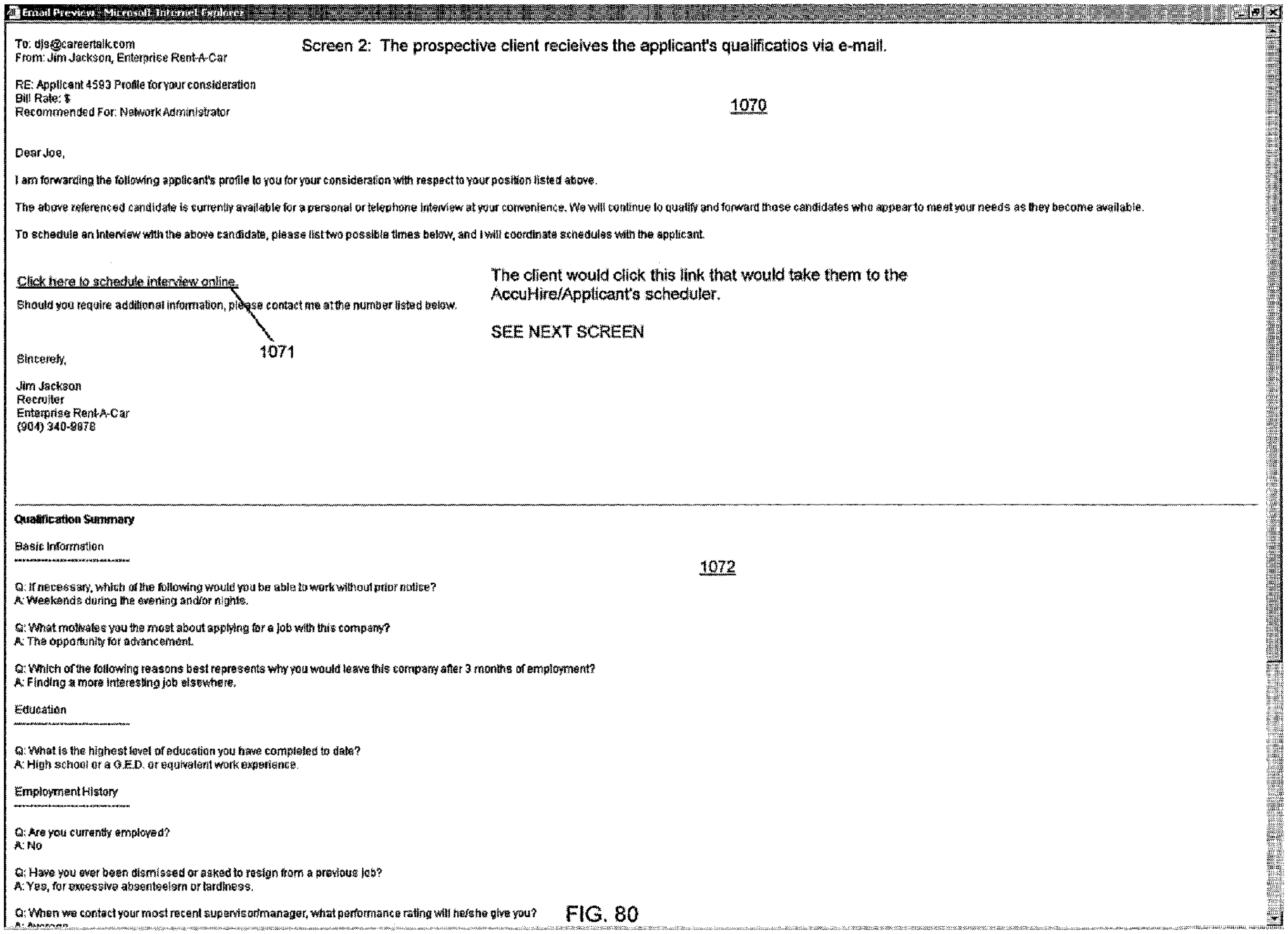
FIG. 80 illustrates an exemplary screen display (graphical user interface) of the present invention showing an e-mail sent to a client providing the applicant's qualifications.

Another feature of the present invention allows the recruiter to generate an applicant's qualification e-mail. The job applicant's qualification e-mail is generally indicated by numeral 1066 on FIG. 79. The e-mail can be sent to various clients prospecting the job applicant. The recruiter has a choice of e-mailing selected information through a mouse click-on input 1051, or the applicant's entire folder through a click of the mouse input 1052. The recipient can be specified with a drop-down input indicated by numeral 1053. The recruiter may create or modify default contact information by typing recipient's name 1054, recipient's e-mail address 1055, recipient's company 1056, or recipient's phone number 1057. The recruiter can save the contact information through pushbutton input 1058. The recruiter may also delete all contact information through pushbutton input 1059. The recruiter can type in the billing rate in 1060 and the client's position in 1061. Through a series of yes and no single-click inputs the recruiter can choose whether the e-mail includes contact information 1062, qualification summary 1063, or the resume 1064. The recruiter may include several interview questions through single-click inputs 1065. A summary of the resume is included in output 1067, with an input 1068 to edit, or 1069 when the editing of the summary is finished. There is a pushbutton input to preview the e-mail, send it immediately with pushbutton input, and the entire e-mail can be reset with pushbutton input, or the e-mail can be cancelled or closed with pushbutton input. The generated e-mail is generally indicated by numeral 1070 in FIG. 80. The e-mail includes a qualification summary as generally indicated by numeral 1072. The e-mail also provides an interview schedule link 1071.

Figure 81:
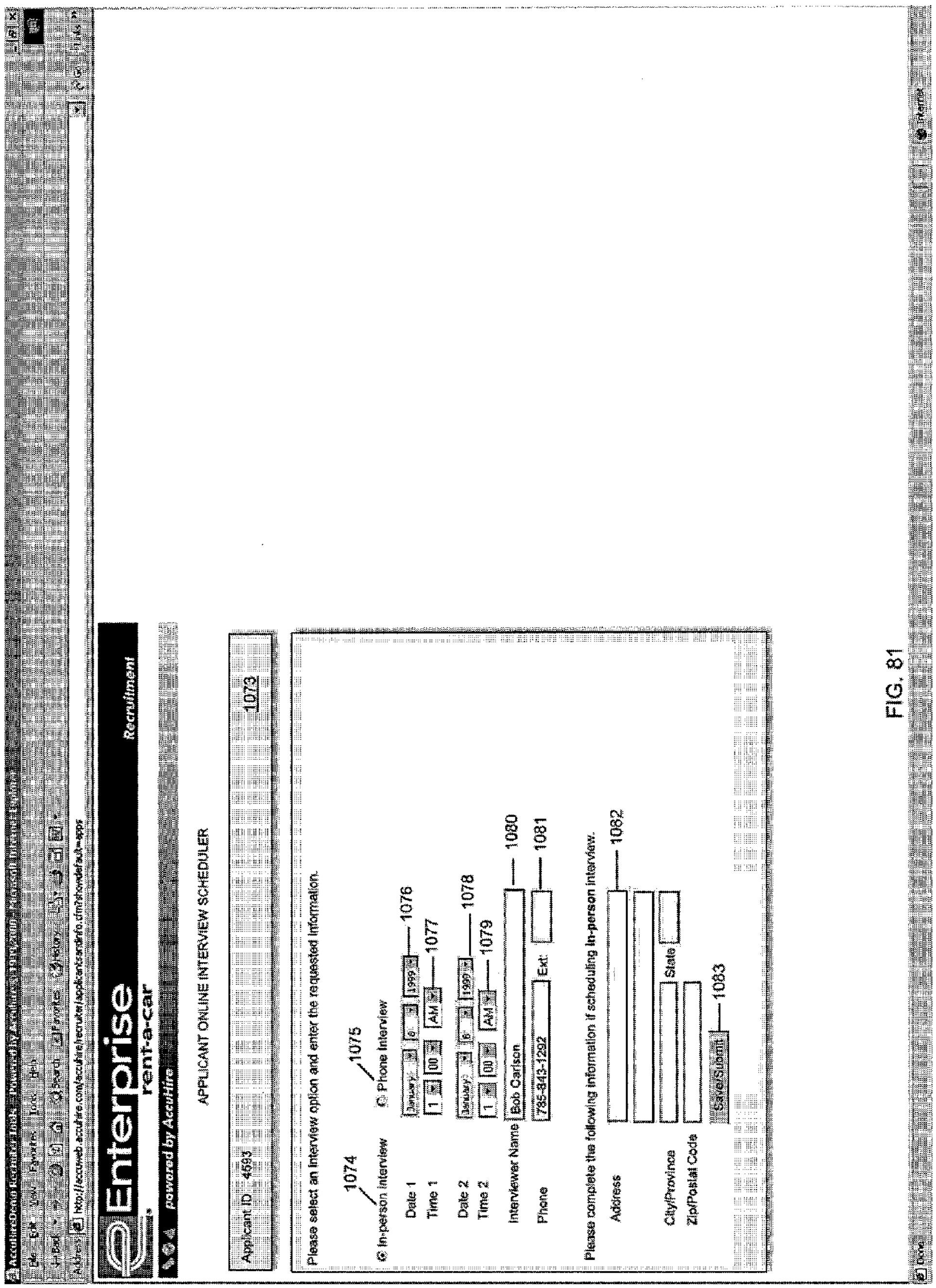
FIG. 81 illustrates an exemplary screen display (graphical user interface) of the present invention showing an interview scheduling function allowing the client to arrange an interview.

Clicking the interview schedule link displays the interview scheduler function as shown in FIG. 81. The applicant identification is generally indicated by numeral 1073. The client has the choice of an in-person interview through a mouse click-on input 1074, or a phone interview through a click of the mouse input 1075. Through a series of drop-down inputs the client can choose a first date 1076, first time 1077, second date 1078, and a second time 1079. The client may input through typing the interviewer's name 1080 and phone number 1081. If the client chooses an in-person interview, the client specifies an address for the interview through typed input 1082. After completing the information, the client saves and submits the information through pushbutton 1083.

Figure 82:
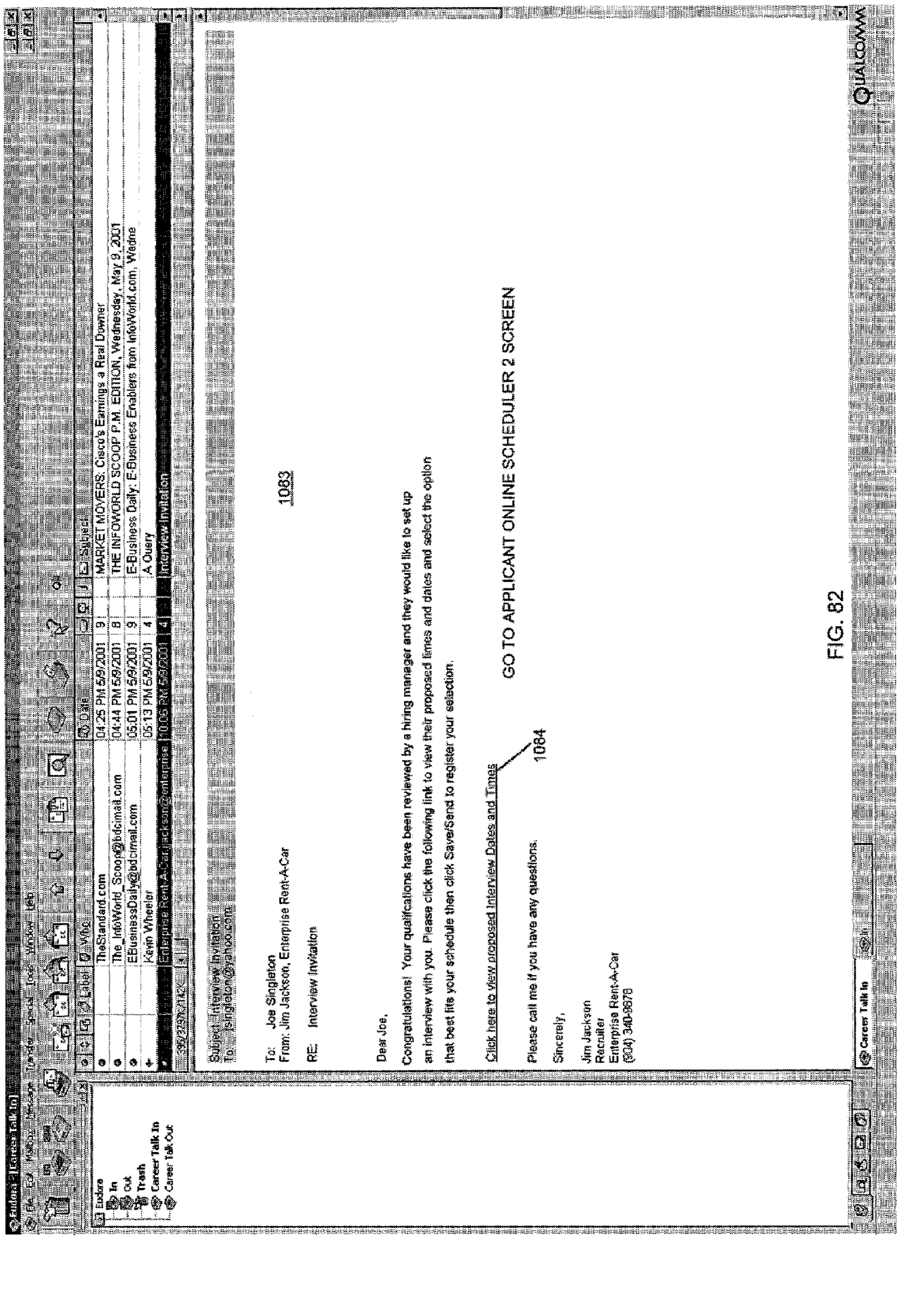
FIG. 82 illustrates an exemplary screen display (graphical user interface) of the present invention showing an e-mail sent to the applicant indicating there is an interest in his/her qualifications.
Figure 83:
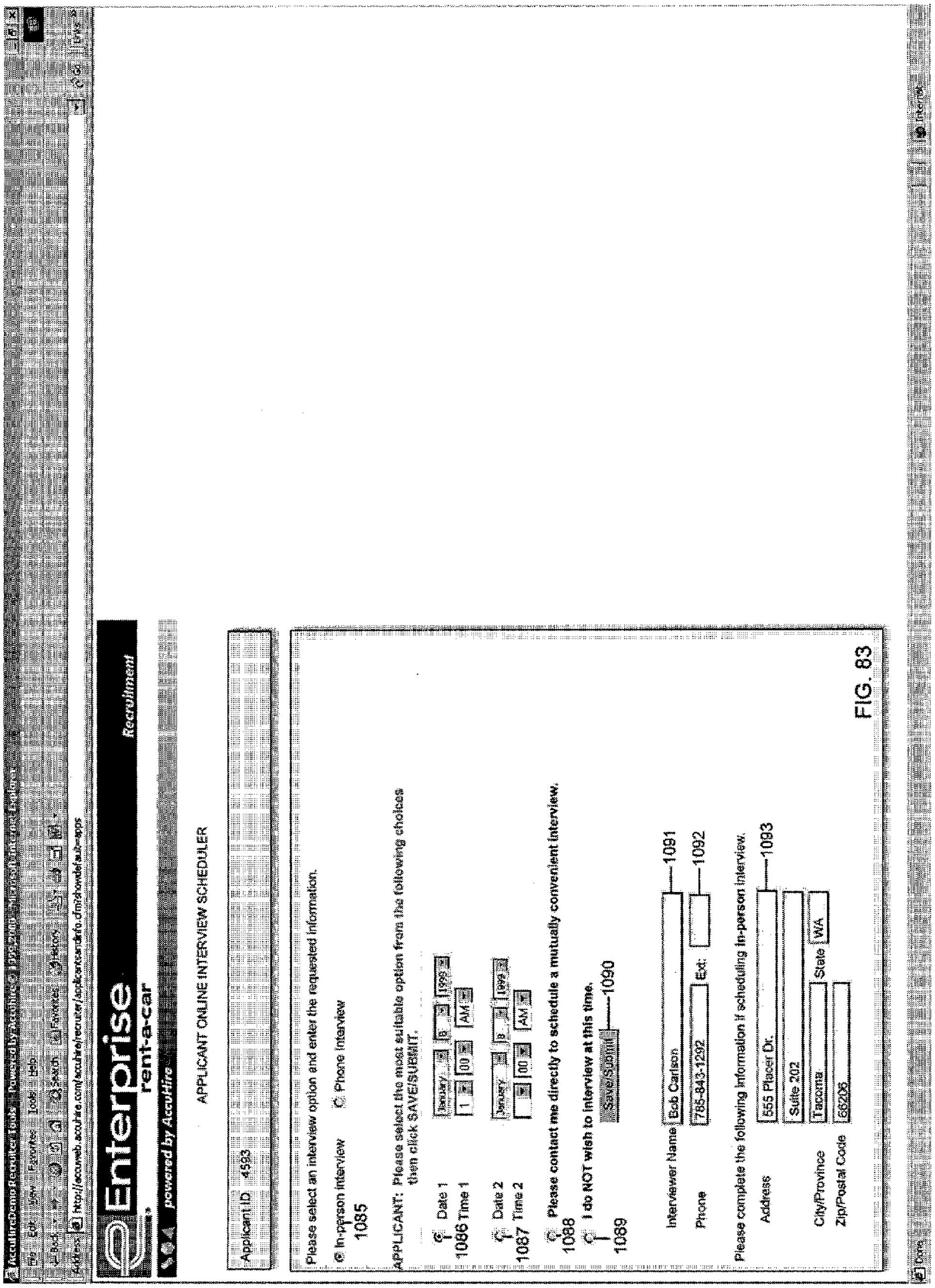
FIG. 83 illustrates an exemplary screen display (graphical user interface) of the present invention showing the on-line interview scheduler function.
Figure 84:
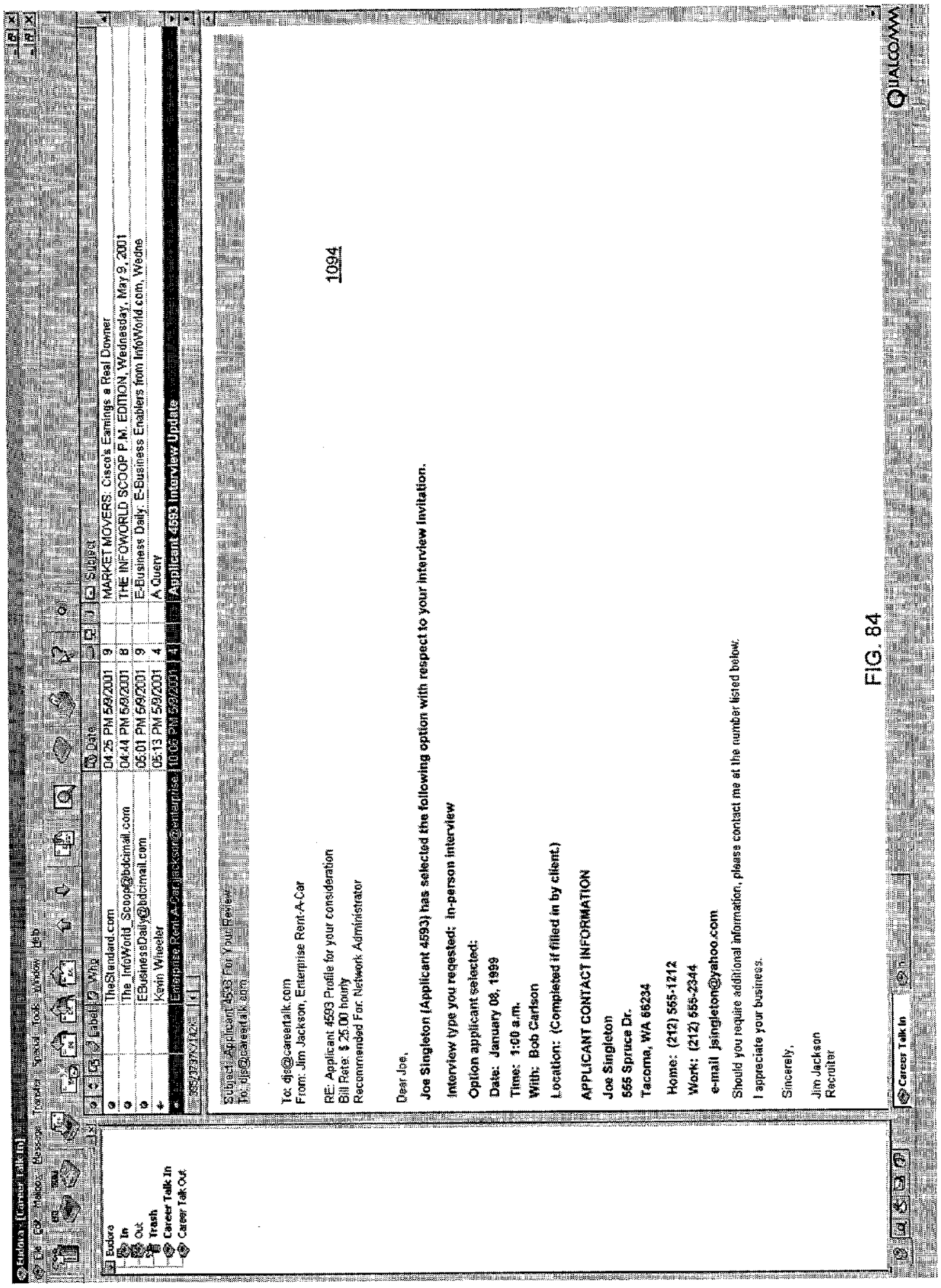
FIG. 84 illustrates an exemplary screen display (graphical user interface) of the present invention showing an e-mail sent to the client indicating if the applicant has accepted the invitation for an interview.

When the client saves and submits the information, an e-mail is generated automatically. The e-mail is sent to the job applicant. The e-mail is generally indicated by numeral 1083 in FIG. 82. The e-mail includes a link 1084 to review the proposed interview dates and times. Clicking the link displays for the applicant on-line interview scheduler as shown in FIG. 83. The interview scheduler option 1085 indicates whether an in-person interview or phone interview is offered to the job applicant. The applicant may choose the first interview time 1086, the second interview time 1087, make a request to schedule an interview 1088, or decline to interview 1089. The interview scheduler function also displays the interviewer's name 1091, the interviewer's phone number 1092, and the location of the interview 1093. After reviewing the information and making the appropriate choices, the job applicant saves and submits the choices made through pushbutton input 1090. After the job applicant saves and submits, an e-mail is generated automatically and sent to the client as generally indicated by numeral 1094 in FIG. 84.

A final feature of the present invention is an e-mail automatically generated and sent to the client after the date and time picked by the applicant which requests the client contact the recruiter to discuss the next step.

This present invention should not be limited to job recruitment but can extend to any area where evaluations of individuals take place to provide effective sharing and management of that information.

The invention claimed is:

1. A method for screening a plurality of job applicants comprising:

receiving input to a predetermined plurality of job related profile questions through at least one input device, which are locked to prevent alteration by the job applicant, wherein the plurality of job related profile questions include at least one job-related question regarding a preferred work style for a job applicant, that provides an indication of motivation for the job applicant to perform a particular job, and are targeted to a predetermined job opening from the plurality of job applicants;

providing a numeral score associated with each predetermined response with at least one processor; and tabulating the total score for all predetermined responses so that each job applicant can be objectively compared to other job applicants based on the received input with the at least one processor for viewing on at least one electronic display.

2. The method for screening a plurality of job applicants according to claim 1, wherein the predetermined plurality of job related profile questions are locked and are selected from a database of questions or created based on the predetermined job opening with at least one question indicating motivation to perform a particular job based on a preferred work style for a job applicant, that is weighted based on a prior history of responses from prior job holders with desirable past performance data utilized for indicating motivation to perform a particular job utilizing the at least one processor.

3. The method for screening a plurality of job applicants according to claim 2, wherein each predetermined response of the plurality of predetermined responses is assigned a numerical value that provides insight into the motivation of the job applicant based on a preferred work style for a job applicant wherein the numerical value for each predetermined response of the plurality of predetermined responses is correlated against a predetermined numerical value with the at least one processor.

4. The method for screening a plurality of job applicants according to claim 2, wherein at least one predetermined response of the plurality of predetermined responses is designated or flagged as having a higher priority than other predetermined responses of the plurality of predetermined responses utilizing the at least one processor.

5. The method for screening a plurality of job applicants according to claim 3, wherein the database of predetermined questions are grouped into a plurality of predetermined categories indicating motivation to perform a particular job based on a preferred work style for a job applicant, utilizing the at least one processor.

6. The method for screening a plurality of job applicants according to claim 5, wherein at least one of the predetermined categories are related to information regarding a preferred work style for a job applicant utilizing the at least one processor.

7. The method for screening a plurality of job applicants according to claim 6, wherein the receiving input to a predetermined plurality of job related profile questions through the at least one input device includes the plurality of predetermined categories which include information regarding a preferred work style for a job applicant, that indicate motivation to perform a particular job are selected from the group consisting of achievement orientation, adaptability, flexibility, administrative effectiveness, analytical thinking, conceptual thinking, assertiveness, attention to detail, leadership change, commitment to task, commitment to quality, communication effectiveness, conflict management, coping, frustration tolerance, customer focus, decision making, empowering others, goal setting, goal achieving, honesty, integrity, impact, influence, initiative, innovation, interpersonal effectiveness, leadership orientation, learning orientation, organization, planning, performance management, policy, procedure, problem solving, sales aptitude, team building, tolerance of ambiguity, and any combination thereof, which are displayed on a graphical user interface for viewing on at least one electronic display utilizing the at least one processor.

8. The method for screening a plurality of job applicants according to claim 1, further including providing a plurality of interview questions or interview tips for the predetermined job opening that are selected from a database of interview questions or interview tips, wherein the plurality of interview questions or interview tips include at least one interview question or interview tip that involves information regarding a preferred work style for a job applicant that is weighted based on a prior history of responses from prior job holders with desirable past performance data utilized for indicating motivation to perform a particular job utilizing the at least one processor.

9. The method for screening a plurality of job applicants according to claim 8, wherein the plurality of interview questions for the predetermined job opening are divided into a plurality of separate interviews and are based on past performance data utilizing the at least one processor.

10. The method for screening a plurality of job applicants according to claim 1, further includes tracking the status of a job applicant by determining an action to be taken with regard to a particular job applicant of the plurality of job applicants from a plurality of possible actions; and associating a status with the particular job applicant utilizing the at least one processor.

11. The method for screening a plurality of job applicants according to claim 10, wherein the action to be taken with regard to a particular job applicant from a plurality of possible actions is selected from the group consisting of at least two of the following: further consideration, called and left message, awaiting response, hired as of a particular date, archive, consider in future and any combination thereof and the event with regard to a particular job applicant is selected from the group consisting of qualifications review, first interview review, second interview review, third interview review, testing, send offer, upgrade offer, offer accepted, offer rejected, withdraw offer and any combination thereof and the reason for an event is selected from the group consisting of highly qualified, qualified, not qualified, need additional information, see notes, information inconsistent, inadequate compensation, accepted another position, withdrew candidacy, did not show-up for interview, did not call to follow-up and any combination thereof, which are displayed on a graphical user interface for the at least one electronic display utilizing the at least one processor.

12. A method for screening a plurality of job applicants comprising:

receiving input to a predetermined plurality of job related profile questions through at least one input device, which are locked to prevent alteration by the job applicant, wherein the plurality of job related profile questions include at least one job-related question that provides information regarding a preferred work style for a job applicant, indicating motivation for the job applicant to perform a particular job, that is targeted to a predetermined job opening from the plurality of job applicants;

providing a numeral score associated with each predetermined response with at least one processor; and tabulating the total score for all predetermined responses so that each job applicant can be objectively compared to other job applicants based on the received input with the at least one processor, wherein the predetermined plurality of job related profile questions are locked and are selected from a database of questions based on the predetermined job opening and each predetermined response is assigned a numerical value that provides insight into the motivation of the job applicant wherein the numerical value for each predetermined response of the plurality of predetermined responses is correlated against a predetermined numerical value and weighted based on a prior history of responses from prior job holders with desirable past performance data utilizing at least one processor for display on at least one electronic display.

13. A method for screening a plurality of job applicants comprising:

listing at least one job opening on at least one processor;

associating a plurality of job related profile questions with the at least one job opening, wherein the job related profile questions include at least one job-related question which provides information regarding a preferred work style for a job applicant, indicating motivation to perform a particular job with the at least one processor with response to the plurality of job related profile questions from the job applicant through an input device for viewing on at least one electronic display;

providing a plurality of potential predetermined responses to each question of the plurality of job related profile questions with the at least one processor; and prioritizing the plurality of potential predetermined responses to each question of the plurality of job related profile questions with the at least one processor.

14. The method for screening a plurality of job applicants according to claim 13, wherein the listing for the at least one job opening includes information selected from the group consisting of at least two of a job category, a position title, a job reference code, an approval code, a travel description, a type of employment, a job description, a salary range, posting information, marketing sources and any combination thereof, which are displayed on a graphical user interface for the listing for the at least one job opening utilizing the at least one processor.

15. The method for screening a plurality of job applicants according to claim 13, further including:

electronically communicating to notify a selected job applicant of a potential interview by at least one recruiter utilizing the at least one processor; and electronically communicating to the at least one recruiter to provide an indication of at least one desired time for an interview by the selected job applicant in direct response to the notification of the potential interview utilizing the at least one processor.

16. The method for screening a plurality of job applicants according to claim 13, further including generating a summary of selected responses from the plurality of potential responses for each job applicant of the plurality of job applicants, which are locked to prevent alteration by the job applicant utilizing the at least one processor.

17. The method for screening a plurality of job applicants according to claim 13, further including providing the prioritized plurality of potential predetermined responses to each question of the plurality of job related profile questions indicating motivation to perform a particular job based on a preferred work style for a job applicant, that are weighted based on a prior history of responses from prior job holders with desirable past performance data utilized for indicating motivation to perform a particular job to at least one recruiter of a plurality of recruiters utilizing the at least one processor.

18. The method for screening a plurality of job applicants according to claim 17, further including providing an electronic resume to at least one of a plurality of recruiters utilizing the at least one processor.

19. The method for screening a plurality of job applicants according to claim 17, further including providing a numerical value based on an interview of at least one job applicant of the plurality of job applicants to at least one recruiter of a plurality of recruiters involving job related profile questions that provide information regarding a preferred work style for a job applicant to provide an indication of motivation to perform a particular job utilizing the at least one processor.

20. The method for screening a plurality of job applicants according to claim 17, further including providing a plurality of potential interview questions or a plurality of interview tips to at least one recruiter of a plurality of recruiters involving job related profile questions that provide information regarding a preferred work style for a job applicant to provide an indication of motivation to perform a particular job utilizing the at least one processor.

21. The method for screening a plurality of job applicants according to claim 17, wherein the listing for the at least one job opening includes material describing a day working in a job that corresponds to the at least one job opening, which is displayed on a graphical user interface utilizing the at least one processor.

22. The method for screening a plurality of job applicants according to claim 17, further including providing contact information for at least one job applicant of the plurality of job applicants to at least one of a plurality of recruiters utilizing the at least one processor.

23. A system for screening a plurality of job applicants comprising:

at least one input device that receives an input regarding a predetermined plurality of job related profile questions which are locked to prevent alteration by the job applicant, wherein the plurality of job related profile questions include at least one job-related question that provides information regarding a preferred work style for a job applicant, that provides an indication of motivation for the job applicant to perform a particular job, that is targeted to a predetermined job opening from the plurality of job applicants;

at least one processor that provides a numeral score associated with each predetermined response and tabulates the total score for all predetermined responses so that each job applicant can be objectively compared to other job applicants; and at least one electronic display for showing the numeral score associated with each predetermined response and the tabulation of the total score for all predetermined responses.

24. The system for screening a plurality of job applicants according to claim 23, wherein the predetermined plurality of job related profile questions are locked and are selected from or entered into a database of questions based on the predetermined job opening with at least one question indicating motivation to perform a particular job of the plurality of job related profile questions that provides information regarding a preferred work style for a job applicant that are weighted based on a prior history of responses from prior job holders with desirable past performance data utilized for indicating motivation to perform a particular job utilizing the at least one processor and the input to each question of the plurality of questions includes a selection from a plurality of potential predetermined responses.

25. The system for screening a plurality of job applicants according to claim 24, wherein the at least one processor designates a numerical value for each response of the plurality of predetermined responses that provide information regarding a preferred work style for a job applicant to provide insight into the motivation of the job applicant wherein the numerical value for each predetermined response of the plurality of predetermined responses is correlated against a predetermined numerical value.

26. The system for screening a plurality of job applicants according to claim 25, wherein the at least one processor designates or flags at least one predetermined response of the plurality of predetermined responses as having a higher priority than other predetermined responses of the plurality of predetermined responses.

27. The system for screening a plurality of job applicants according to claim 24, wherein the at least one processor groups the database of predetermined questions into a plurality of predetermined categories that include information regarding a preferred work style for a job applicant, indicating motivation to perform a particular job.

28. The system for screening a plurality of job applicants according to claim 27, wherein at least one of the predetermined categories are related to information regarding a preferred work style for a job applicant utilizing the at least one processor.

29. The system for screening a plurality of job applicants utilizing at least one processor according to claim 28, wherein the receiving input to a predetermined plurality of job related profile questions through the at least one input device includes the plurality of predetermined categories which include information regarding a preferred work style for a job applicant, that indicate motivation to perform a particular job are selected from the group consisting of achievement orientation, adaptability, flexibility, administrative effectiveness, analytical thinking, conceptual thinking, assertiveness, attention to detail, leadership change, commitment to task, commitment to quality, communication effectiveness, conflict management, coping, frustration tolerance, customer focus, decision making, empowering others, goal setting, goal achieving, honesty, integrity, impact, influence, initiative, innovation, interpersonal effectiveness, leadership orientation, learning orientation, organization, planning, performance management, policy, procedure, problem solving, sales aptitude, team building, tolerance of ambiguity, and any combination thereof, which are displayed on a graphical user interface utilized by the at least one processor.

30. The system for screening a plurality of job applicants according to claim 23, wherein the at least one processor utilizes data involving a plurality of interview questions or a plurality of interview tips for the predetermined job opening that are selected from a database of interview questions or interview tips, wherein the plurality of interview questions or interview tips include at least one interview question or interview tip that involves information regarding a preferred work style for a job applicant that is weighted based on a prior history of responses from prior job holders with desirable past performance data utilized for indicating motivation to perform a particular job utilizing the at least one processor.

31. The system for screening a plurality of job applicants according to claim 30, wherein the plurality of interview questions for the predetermined job opening are divided into a plurality of separate interviews and are based on past performance data.

32. The system for screening a plurality of job applicants according to claim 23, wherein the at least one processor tracks the status of a job applicant and then determines an action to be taken with regard to a particular job applicant from a plurality of possible actions and associates a status with the particular job applicant.

33. A system for screening a plurality of job applicants comprising:

at least one input device that provides an input to a predetermined plurality of job related profile questions which are locked to prevent alteration by the job applicant, wherein the plurality of job related profile questions include at least one job-related question that involves information regarding a preferred work style for a job applicant, providing an indication of motivation for the job applicant to perform a particular job, that is targeted to a predetermined job opening from the plurality of job applicants;

at least one processor that provides a numeral score associated with each predetermined response and tabulates the total score for all predetermined responses so that each job applicant can be objectively compared to other job applicants based on the received input, wherein the predetermined plurality of job related profile questions that involve information regarding a preferred work style for a job applicant are weighted based on a prior history of responses from prior job holders with desirable past performance data utilized for indicating motivation to perform a particular job utilizing the at least one processor, are locked and are selected from or entered into a database of questions based on the predetermined job opening and each predetermined response is assigned a numerical value that provides insight into the motivation of the job applicant wherein the numerical value for each predetermined response of the plurality of predetermined responses is correlated against a predetermined numerical value; and at least one electronic display for showing the numeral score associated with each predetermined response and the tabulation of the total score for all predetermined responses.

34. A system for screening a plurality of job applicants comprising:

at least one processor for listing at least one job opening and an associated plurality of job profile related questions with the at least one job opening, wherein the job related profile questions include at least one job profile question that provides information regarding a preferred work style for a job applicant, providing an indication of motivation for the job applicant to perform a particular job;

at least one input device to provide responses from the job applicant to the plurality of job related profile questions, wherein the processor provides a plurality of potential predetermined responses to each question of the plurality of job related profile questions and prioritizing the plurality of potential predetermined responses to each question of the plurality of job related profile questions utilizing the at least one processor; and at least one electronic display for showing the plurality of job related profile questions.

35. The system for screening a plurality of job applicants according to claim 34, wherein the listing for the at least one job opening includes information selected from the group consisting of at least two of a job category, a position title, a job reference code, an approval code, a travel description, a type of employment, a job description, a salary range, posting information, marketing sources and any combination thereof that is displayed on the listing for the at least one job opening on a electronic display associated with the at least on processor.

36. The system for screening a plurality of job applicants according to claim 34, further including:

a first electronic communication device that is capable of notifying a selected job applicant of a potential interview by at least one recruiter utilizing at least one processor; and a second electronic communication device that is capable of providing an indication of at least one desired time for an interview from the selected job applicant to the at least one recruiter in direct response to the notification of the potential interview utilizing the at least one processor.

37. The system for screening a plurality of job applicants according to claim 34, wherein the at least one processor is capable of generating a summary of selected responses that are locked to prevent alteration by the job applicant from the plurality of selected responses for each job applicant.

38. The system for screening a plurality of job applicants according to claim 34, further including at least one electronic communication device, wherein the at least one processor is capable of providing the prioritized plurality of potential predetermined responses to each question of the plurality of job related profile questions to at least one recruiter of a plurality of recruiters, wherein the job related profile questions that involve information regarding a preferred work style for a job applicant are weighted based on a prior history of responses from prior job holders with desirable past performance data utilized for indicating motivation to perform a particular job utilizing the at least one processor.

39. The system for screening a plurality of job applicants according to claim 38, further including at least one electronic communication device for providing an electronic resume to at least one of a plurality of recruiters from the at least one processor.

40. The system for screening a plurality of job applicants according to claim 38, further including at least one electronic communication device, wherein the at least one processor is capable of providing a quantified value based on an interview of a job applicant through the at least one electronic communication device to at least one recruiter of a plurality of recruiters involving job related profile questions that provide information regarding a preferred work style for a job applicant to provide an indication of motivation to perform a particular job.

41. The system for screening a plurality of job applicants according to claim 38, further including at least one electronic communication device, wherein the at least one processor is capable of providing a plurality of potential interview questions or interview tips through the at least one electronic communication device to at least one recruiter of a plurality of recruiters involving job related profile questions that provide information regarding a preferred work style for a job applicant to provide an indication of motivation to perform a particular job.

42. The system for screening a plurality of job applicants according to claim 38, wherein the at least one processor is capable of listing for the at least one job opening includes material describing a day working in a job that corresponds to the at least one job opening, which is displayed on a graphical user interface for the at least one electronic display.

43. The system for screening a plurality of job applicants according to claim 38, further including at least one electronic communication device, wherein the at least one processor is capable of providing contact information for at least one job applicant of the plurality of job applicants through the at least one electronic communication device to at least one of a plurality of recruiters.

44. A data processing system for screening a plurality of job applicants comprising:

at least one processor for processing the application program;

at least one database of at least one data file of job related profile questions that are locked to prevent alteration by the job applicant, wherein the plurality of job related profile questions that provide information regarding a preferred work style for a job applicant utilized for indicating motivation to perform a particular job utilizing the at least one processor, include at least one question indicating motivation to perform a particular job for the plurality of job applicants;

at least one database of at least one data file of proposed predetermined responses for the plurality of job applicants; and at least one database of predetermined responses for a predetermined job opening, wherein the processor is capable of correlating the selected responses from the plurality of job applicants from at least one input device to the predetermined responses and creating a score for each job applicant of the plurality of job applicants so that each job applicant can be objectively compared to other job applicants.

45. The data processing system for screening a plurality of job applicants according to claim 44, wherein the selected predetermined responses from the plurality of job applicants are weighted based on a prior history of responses from prior job holders with desirable past performance data utilized for indicating motivation to perform a particular job to determine important questions for determining potentially successful job candidates.

46. A software program product for use in screening a plurality of job applicants comprising:

a computer usable medium for correlating inputted responses to a series of job related profile questions that are locked to prevent alteration by the job applicant, wherein the plurality of job related profile questions that provide information regarding a preferred work style for a job applicant that is weighted based on a prior history of responses from prior job holders with desirable past performance data utilized for indicating motivation to perform a particular job to predetermined desired responses and creating a score for each job applicant of the plurality of job applicants so that the plurality of job applicants can be ranked and objectively compared to other job applicants, wherein the computer usable medium is utilized on at least one processor and the job related profile questions are shown on at least one electronic display.

* * * * *